US008382573B2

(12) United States Patent
Okada et al.

(10) Patent No.: US 8,382,573 B2

(45) Date of Patent: Feb. 26, 2013

(54) GAMING SYSTEM AND CONTROL METHOD THEREOF WHICH DETERMINES TRANSITION TO SPECIAL GAME

(75) Inventors: Kazuo Okada, Tokyo (JP); Hiroki Abe, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 681 days.

(21) Appl. No.: 12/533,497

(22) Filed: Jul. 31, 2009

(65) Prior Publication Data

US 2010/0048286 A1 Feb. 25, 2010

Related U.S. Application Data

(60) Provisional application No. 61/114,812, filed on Nov. 14, 2008, provisional application No. 61/091,025, filed on Aug. 22, 2008, provisional application No. 61/091,014, filed on Aug. 22, 2008.

(51) Int. Cl.
*A63F 13/00* (2006.01)

(52) U.S. Cl. ................ 463/20; 463/16; 463/17; 463/18; 463/19; 463/21; 463/25

(58) Field of Classification Search .............. 463/16–21, 463/25

See application file for complete search history.

(56) References Cited

U.S. PATENT DOCUMENTS

| | | | | |
|---|---|---|---|---|
| 4,283,709 | A | 8/1981 | Lucero et al. | |
| 4,837,728 | A | 6/1989 | Barrie et al. | |
| 4,842,278 | A | 6/1989 | Markowicz | |
| 4,964,638 | A | 10/1990 | Ishida | |
| 5,116,055 | A | 5/1992 | Tracy | |
| 5,820,459 | A | 10/1998 | Acres et al. | |
| 6,003,013 | A | 12/1999 | Boushy et al. | |
| 6,012,983 | A | 1/2000 | Walker et al. | |
| 6,093,102 | A | 7/2000 | Bennett | |
| 6,142,872 | A | 11/2000 | Walker et al. | |
| 6,155,925 | A * | 12/2000 | Giobbi et al. | 463/20 |
| 6,224,483 | B1 * | 5/2001 | Mayeroff | 463/20 |
| 6,312,332 | B1 | 11/2001 | Walker et al. | |
| 6,361,441 | B1 | 3/2002 | Walker et al. | |
| 6,565,436 | B1 * | 5/2003 | Baerlocher | 463/26 |
| 6,733,390 | B2 | 5/2004 | Walker et al. | |
| 6,960,133 | B1 | 11/2005 | Marks et al. | |
| 7,056,215 | B1 | 6/2006 | Olive | |
| 7,108,603 | B2 | 9/2006 | Olive | |
| 7,278,919 | B2 * | 10/2007 | Souza et al. | 463/25 |
| 7,311,598 | B2 | 12/2007 | Kaminkow et al. | |

(Continued)

FOREIGN PATENT DOCUMENTS

| | | | |
|---|---|---|---|
| AU | 200119729 | A1 | 9/2001 |
| WO | WO 99/03078 | | 1/1999 |

*Primary Examiner* — Dmitry Suhol
*Assistant Examiner* — David Duffy
(74) *Attorney, Agent, or Firm* — Edwards Wildman Palmer LLP

(57) ABSTRACT

A gaming system of the present invention includes: an input device which starts a base game awarding a payout according to a given winning; a data storage device storing special game condition data which defines, within a given value range, a plurality of sub ranges respectively allotted to special game conditions or "No Special Game" meaning no special game is run, each of the special game conditions being associated with an average payout different from those associated with the other conditions. In the system, a random number is sampled based on an input from the input device. A base game is run using the random number, and a payout according to a resulted winning is awarded. One of the sub ranges each allotted to one of the special game conditions or "No Special Game" is selected, based on a given condition with reference to the random number and the special game condition data. When the selected sub range is allotted to a special game condition, the special game is run under that special game condition and a payout is awarded.

6 Claims, 102 Drawing Sheets

U.S. PATENT DOCUMENTS

| | | | | |
|---|---|---|---|---|
| 7,311,604 | B2 | 12/2007 | Kaminkow et al. | |
| 7,329,183 | B2 * | 2/2008 | Michaelson et al. | 463/21 |
| 2002/0042296 | A1 | 4/2002 | Walker et al. | |
| 2003/0008702 | A1 * | 1/2003 | Meyer | 463/16 |
| 2003/0125107 | A1 * | 7/2003 | Cannon | 463/25 |
| 2004/0023716 | A1 * | 2/2004 | Gauselmann | 463/26 |
| 2005/0020340 | A1 * | 1/2005 | Cannon | 463/16 |

* cited by examiner

GAMING SYSTEM FUNCTION FLOW

FIG. 8

BASE GAME SYMBOL TABLE

| | | FIRST COLUMN | SECOND COLUMN | THIRD COLUMN | FOURTH COLUMN | FIFTH COLUMN |
|---|---|---|---|---|---|---|
| CODE NO. | RANDOM NUMBER | SYMBOL | SYMBOL | SYMBOL | SYMBOL | SYMBOL |
| 00 | 0～3277 | J | WILD | A | Q | J |
| 01 | 3278～6555 | Q | A | J | J | A |
| 02 | 6556～9833 | CLUB | Q | CLUB | CLUB | CLUB |
| 03 | 9834～13111 | J | WILD | 10 | Q | J |
| 04 | 13112～16389 | Q | WILD | REINDEER | K | A |
| 05 | 16390～19667 | REINDEER | WILD | CLUB | CLUB | BUFFALO |
| 06 | 19668～22945 | A | BUFFALO | FEATURE | A | REINDEER |
| 07 | 22946～26223 | RHINO | RHINO | A | K | FEATURE |
| 08 | 26224～29501 | 10 | K | J | 9 | K |
| 09 | 29502～32779 | 9 | REINDEER | 9 | Q | 9 |
| 10 | 32780～36057 | A | WILD | A | RHINO | Q |
| 11 | 36058～39335 | Q | A | Q | 10 | CLUB |
| 12 | 39336～42613 | 10 | 9 | RHINO | FEATURE | K |
| 13 | 42614～45891 | FEATURE | RHINO | K | K | RHINO |
| 14 | 45892～49169 | K | J | BUFFALO | 10 | 10 |
| 15 | 49170～52447 | A | WILD | Q | BUFFALO | J |
| 16 | 52448～55725 | WILD | 10 | FEATURE | A | WILD |
| 17 | 55726～59003 | J | CLUB | A | WILD | WILD |
| 18 | 59004～62281 | Q | WILD | WILD | BUFFALO | WILD |
| 19 | 62282～65535 | BUFFALO | FEATURE | WILD | REINDEER | Q |

(RANGE OF RANDOM NUMBERS:0～65535)

FIG. 9A

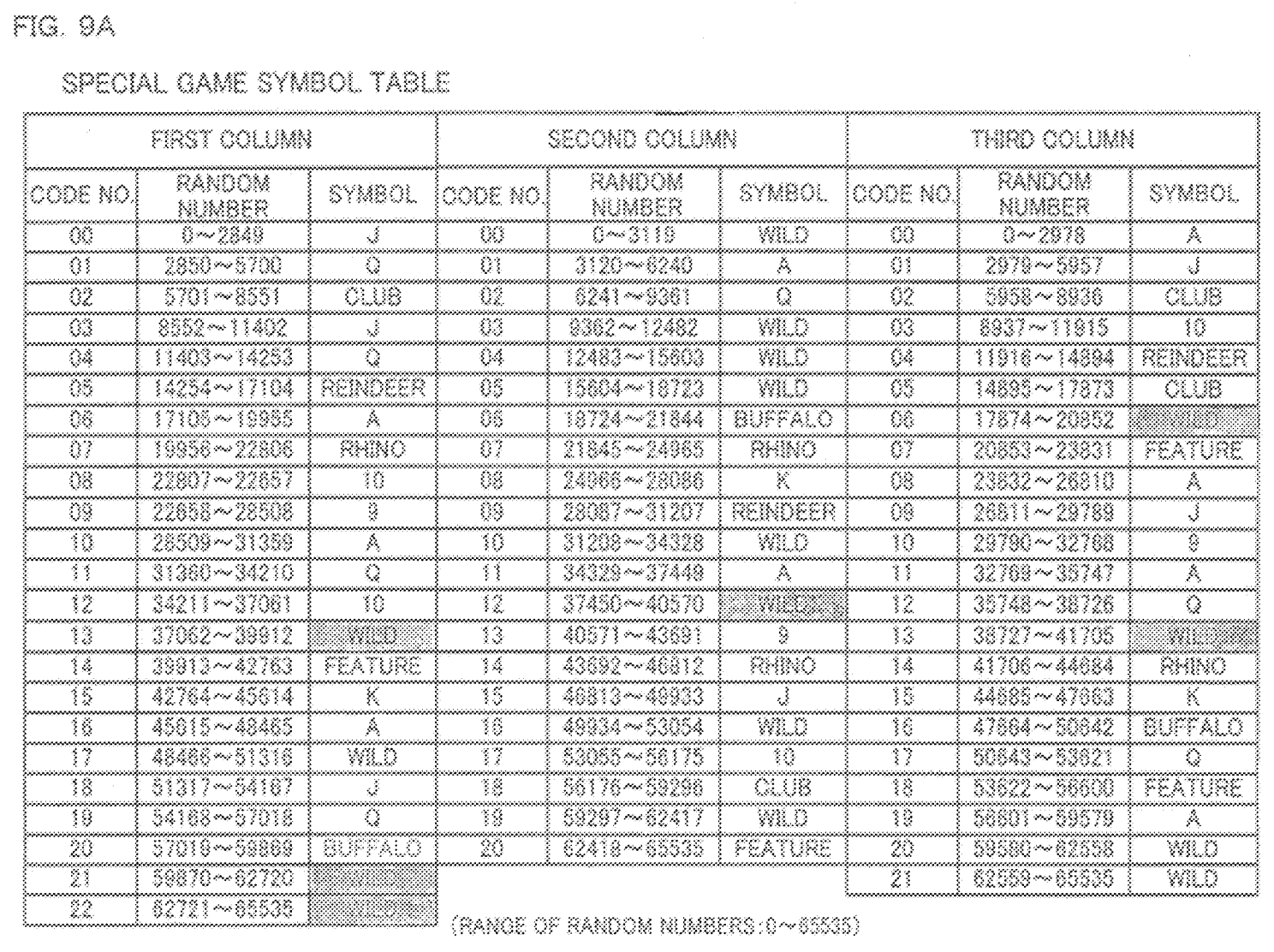

SPECIAL GAME SYMBOL TABLE

| FIRST COLUMN | | | SECOND COLUMN | | | THIRD COLUMN | | |
|---|---|---|---|---|---|---|---|---|
| CODE NO. | RANDOM NUMBER | SYMBOL | CODE NO. | RANDOM NUMBER | SYMBOL | CODE NO. | RANDOM NUMBER | SYMBOL |
| 00 | 0~2849 | J | 00 | 0~3119 | WILD | 00 | 0~2978 | A |
| 01 | 2850~5700 | Q | 01 | 3120~6240 | A | 01 | 2979~5957 | J |
| 02 | 5701~8551 | CLUB | 02 | 6241~9361 | Q | 02 | 5958~8936 | CLUB |
| 03 | 8552~11402 | J | 03 | 9362~12482 | WILD | 03 | 8937~11915 | 10 |
| 04 | 11403~14253 | Q | 04 | 12483~15603 | WILD | 04 | 11916~14894 | REINDEER |
| 05 | 14254~17104 | REINDEER | 05 | 15604~18723 | WILD | 05 | 14895~17873 | CLUB |
| 06 | 17105~19955 | A | 06 | 18724~21844 | BUFFALO | 06 | 17874~20852 | [illegible] |
| 07 | 19956~22806 | RHINO | 07 | 21845~24965 | RHINO | 07 | 20853~23831 | FEATURE |
| 08 | 22807~22657 | 10 | 08 | 24966~28086 | K | 08 | 23832~26810 | A |
| 09 | 22658~28508 | 9 | 09 | 28087~31207 | REINDEER | 09 | 26811~29789 | J |
| 10 | 28509~31359 | A | 10 | 31208~34328 | WILD | 10 | 29790~32768 | 9 |
| 11 | 31360~34210 | Q | 11 | 34329~37449 | A | 11 | 32769~35747 | A |
| 12 | 34211~37061 | 10 | 12 | 37450~40570 | WILD | 12 | 35748~38726 | Q |
| 13 | 37062~39912 | WILD | 13 | 40571~43691 | 9 | 13 | 38727~41705 | WILD |
| 14 | 39913~42763 | FEATURE | 14 | 43692~46812 | RHINO | 14 | 41706~44684 | RHINO |
| 15 | 42764~45614 | K | 15 | 46813~49933 | J | 15 | 44685~47663 | K |
| 16 | 45615~48465 | A | 16 | 49934~53054 | WILD | 16 | 47664~50642 | BUFFALO |
| 17 | 48466~51316 | WILD | 17 | 53055~56175 | 10 | 17 | 50643~53621 | Q |
| 18 | 51317~54167 | J | 18 | 56176~59296 | CLUB | 18 | 53622~56600 | FEATURE |
| 19 | 54168~57018 | Q | 19 | 59297~62417 | WILD | 19 | 56601~59579 | A |
| 20 | 57019~59869 | BUFFALO | 20 | 62418~65535 | FEATURE | 20 | 59580~62558 | WILD |
| 21 | 59870~62720 | [illegible] | | | | 21 | 62559~65535 | WILD |
| 22 | 62721~65535 | [illegible] | | | | | | |

(RANGE OF RANDOM NUMBERS:0~65535)

FIG. 9B

SPECIAL GAME SYMBOL TABLE

| FOURTH COLUMN | | | FIFTH COLUMN | | |
|---|---|---|---|---|---|
| CODE NO. | RANDOM NUMBER | SYMBOL | CODE NO. | RANDOM NUMBER | SYMBOL |
| 00 | 0~2978 | Q | 00 | 0~2978 | J |
| 01 | 2979~5957 | J | 01 | 2979~5957 | A |
| 02 | 5958~8936 | CLUB | 02 | 5958~8936 | CLUB |
| 03 | 8937~11915 | Q | 03 | 8937~11915 | J |
| 04 | 11916~14894 | K | 04 | 11916~14894 | A |
| 05 | 14895~17873 | CLUB | 05 | 14895~17873 | BUFFALO |
| 06 | 17874~20852 | A | 06 | 17874~20852 | REINDEER |
| 07 | 20853~23831 | K | 07 | 20853~23831 | FEATURE |
| 08 | 23832~26810 | 9 | 08 | 23832~26810 | K |
| 09 | 26811~29789 | Q | 09 | 26811~29789 | 9 |
| 10 | 29790~32768 | RHINO | 10 | 29790~32768 | Q |
| 11 | 32769~35747 | | 11 | 32769~35747 | CLUB |
| 12 | 35748~38726 | | 12 | 35748~38726 | K |
| 13 | 38727~41705 | 10 | 13 | 38727~41705 | RHINO |
| 14 | 41706~44684 | FEATURE | 14 | 41706~44684 | 10 |
| 15 | 44685~47663 | K | 15 | 44685~47663 | J |
| 16 | 47664~50642 | 10 | 16 | 47664~50642 | WILD |
| 17 | 50643~53621 | RHINO | 17 | 50643~53621 | WILD |
| 18 | 53622~56600 | A | 18 | 53622~56600 | WILD |
| 19 | 56601~59579 | WILD | 19 | 56601~59579 | |
| 20 | 59580~62558 | BUFFALO | 20 | 59580~62558 | |
| 21 | 62559~65535 | REINDEER | 21 | 62559~65535 | Q |

FIG. 10

SYMBOL COLUMN DETERMINATION TABLE

| SYMBOL COLUMN NO. | RANDOM NUMBER |
|---|---|
| L1 | 0～13106 |
| L2 | 13107～26214 |
| L3 | 26215～39321 |
| L4 | 39322～52428 |
| L5 | 52429～65535 |

(RANGE OF RANDOM NUMBERS: 0～65535)

FIG. 11

CODE NO. DETERMINATION TABLE

| RANDOM NUMBER | / |
|---|---|
| 0～2978 | 00 |
| 2979～5957 | 01 |
| 5958～8936 | 02 |
| 8937～11915 | 03 |
| 11916～14894 | 04 |
| 14895～17873 | 05 |
| 17874～20852 | 06 |
| 20853～23831 | 07 |
| 23832～26810 | 08 |
| 26811～29789 | 09 |
| 29790～32768 | 10 |
| 32769～35747 | 11 |
| 35748～38726 | 12 |
| 38727～41705 | 13 |
| 41706～44684 | 14 |
| 44685～47663 | 15 |
| 47664～50642 | 16 |
| 50643～53621 | 17 |
| 53622～56600 | 18 |
| 56601～59579 | 19 |
| 59580～62558 | 20 |
| 62559～65535 | END |

FIG. 12

ADDITIONAL WILD SYMBOL
COUNT DETERMINATION TABLE

| INCREASES IN THE NUMBER OF WILD SYMBOLS | RANDOM NUMBER |
|---|---|
| 10 | 0~13106 |
| 30 | 13107~26214 |
| 50 | 26215~39321 |
| 70 | 39322~52428 |
| 90 | 52429~65535 |

(RANGE OF RANDOM NUMBERS:0~65535)

FIG. 13

PAYOUT TABLE

| SYMBOL | THE NUMBER OF PARTICULAR SYMBOLS REARRANGED | | | |
|---|---|---|---|---|
| | TWO SYMBOLS | THREE SYMBOLS | FOUR SYMBOLS | FIVE SYMBOLS |
| A | 20 | 40 | 60 | 400 |
| Q | 20 | 40 | 60 | 400 |
| J | 20 | 40 | 60 | 400 |
| K | 50 | 100 | 200 | 1000 |
| 10 | 50 | 100 | 200 | 1000 |
| 9 | 50 | 100 | 200 | 1000 |
| CLUB | 150 | 300 | 600 | 3000 |
| REINDEER | 150 | 300 | 600 | 3000 |
| RHINO | 200 | 400 | 800 | 4000 |
| BUFFALO | 200 | 500 | 1000 | 5000 |
| FEATURE | (※) | | | |

* Rearrangement of three or more feature symbols starts the process of selecting one of sub ranges allotted to the special game settings or "no special game"

* Jackpot is awarded when five feature symbols are rearranged

FIG. 14

FREE GAME COUNT DETERMINATION TABLE

| CONDITIONS | GAME COUNT |
|---|---|
| GRAND CHANCE | 30 |
| MAJOR CHANCE | 15 |
| MINOR CHANCE | 10 |
| MINI CHANCE | 5 |

FIG. 15

SPECIAL GAME CONDITION DATA TABLE

| | | BET AMOUNT | | | | |
|---|---|---|---|---|---|---|
| CONDITIONS | THE NUMBER OF TIMES SELECTED | 0 TO 49 GAME MEDIA | 50 TO 149 GAME MEDIA | 150 TO 299 GAME MEDIA | 300 TO 499 GAME MEDIA | 500(MAX) GAME MEDIA |
| | | RANDOM NUMBER | RANDOM NUMBER | RANDOM NUMBER | RANDOM NUMBER | RANDOM NUMBER |
| GRAND CHANCE | 1 | 0～299 | 0～599 | 0～899 | 0～1199 | 0～1499 |
| MAJOR CHANCE | 0 | 1300～3899 | 2600～7799 | 3900～11699 | 5200～15599 | 6500～19499 |
| MINOR CHANCE | 2 | 3900～7299 | 7800～14599 | 11700～21899 | 15600～29199 | 19500～36499 |
| MINI CHANCE | 3 | 7800～12624 | 15600～25249 | 23400～37874 | 31200～50499 | 1500～6499、36500～38999、39000～65535 |
| NO SPECIAL GAME | — | 300～1299、7300～7799、12625～12999、13000～65535 | 600～2599、14600～15599、25249～25999 26000～65535 | 900～3899、21900～23399、37875～38999、39000～65535 | 1200～5199、29200～31199、50500～51999 52000～65535 | — |

FIG. 16

SPECIAL GAME CONDITION BASIC DATA TABLE

| CONDITIONS | BET AMOUNT | | | | | | | | | |
|---|---|---|---|---|---|---|---|---|---|---|
| | 0 TO 49 GAME MEDIA | | 50 TO 149 GAME MEDIA | | 150 TO 299 GAME MEDIA | | 300 TO 499 GAME MEDIA | | 500(MAX) GAME MEDIA | |
| | RANDOM NUMBER | ALLOCATION COUNT | RANDOM NUMBER | ALLOCATION COUNT | RANDOM NUMBER | ALLOCATION COUNT | RANDOM NUMBER | ALLOCATION COUNT | RANDOM NUMBER | ALLOCATION COUNT |
| GRAND CHANCE | 0~1299 | 1300 | 0~2599 | 2600 | 0~3899 | 3900 | 0~5199 | 5200 | 0~6499 | 6500 |
| MAJOR CHANCE | 1300~3899 | 2600 | 2600~7799 | 5200 | 3900~11699 | 7800 | 5200~15599 | 10400 | 6500~19499 | 13000 |
| MINOR CHANCE | 3900~7799 | 3900 | 7800~15599 | 7800 | 11700~23399 | 11700 | 15600~31199 | 15600 | 19500~38999 | 19500 |
| MINI CHANCE | 7800~12999 | 5200 | 15600~25999 | 10400 | 23400~38999 | 15600 | 31200~51999 | 20800 | 39000~65535 | 26536 |
| NO SPECIAL GAME | 13000~65535 | 52536 | 26000~65535 | 39536 | 39000~65535 | 26536 | 52000~65535 | 13536 | — | 0 |

(RANGE OF RANDOM NUMBERS: 0~65535)

FIG. 17

ALLOCATION NUMBER REDUCTION TABLE

| | BET AMOUNT | | | | |
|---|---|---|---|---|---|
| CONDITIONS | 0 TO 49 GAME MEDIA | 50 TO 149 GAME MEDIA | 150 TO 299 GAME MEDIA | 300 TO 499 GAME MEDIA | 500(MAX) GAME MEDIA |
| GRAND CHANCE | 1000 | 2000 | 3000 | 4000 | 5000 |
| MAJOR CHANCE | 500 | 1000 | 1500 | 2000 | 2500 |
| MINOR CHANCE | 250 | 500 | 750 | 1000 | 1250 |
| MINI CHANCE | 125 | 250 | 375 | 500 | — |

FIG. 18

ALLOCATION COUNT OF GRAND CHANCE
(THE NUMBER OF TIMES GRAND CHANCE BEING SELECTED: 0)

| | BET AMOUNT | | | | |
|---|---|---|---|---|---|
| SPECIAL GAME CONDITIONS | 0 TO 49 GAME MEDIA | 50 TO 149 GAME MEDIA | 150 TO 299 GAME MEDIA | 300 TO 499 GAME MEDIA | 500(MAX) GAME MEDIA |
| GRAND CHANCE | 1300 | 2600 | 3900 | 5200 | 6500 |

GRAND CHANCE (FIRST TIME) ⇩

ALLOCATION COUNT OF GRAND CHANCE
(THE NUMBER OF TIMES GRAND CHANCE BEING SELECTED: 1)

| | BET AMOUNT | | | | |
|---|---|---|---|---|---|
| SPECIAL GAME CONDITIONS | 0 TO 49 GAME MEDIA | 50 TO 149 GAME MEDIA | 150 TO 299 GAME MEDIA | 300 TO 499 GAME MEDIA | 500(MAX) GAME MEDIA |
| GRAND CHANCE | 300 | 600 | 900 | 1200 | 1500 |

GRAND CHANCE SELECTED AFTER 500 BASE GAMES (SECOND TIME) ⇩

ALLOCATION COUNT OF GRAND CHANCE
(THE NUMBER OF TIMES GRAND CHANCE BEING SELECTED: 2)

| | BET AMOUNT | | | | |
|---|---|---|---|---|---|
| SPECIAL GAME CONDITIONS | 0 TO 49 GAME MEDIA | 50 TO 149 GAME MEDIA | 150 TO 299 GAME MEDIA | 300 TO 499 GAME MEDIA | 500(MAX) GAME MEDIA |
| GRAND CHANCE | 0 | 0 | 0 | 0 | 0 |

RUNNING BASE GAME 500 TIMES ⇩

ALLOCATION COUNT OF GRAND CHANCE
(THE NUMBER OF TIMES GRAND CHANCE BEING SELECTED: 2)

| | BET AMOUNT | | | | |
|---|---|---|---|---|---|
| SPECIAL GAME CONDITIONS | 0 TO 49 GAME MEDIA | 50 TO 149 GAME MEDIA | 150 TO 299 GAME MEDIA | 300 TO 499 GAME MEDIA | 500(MAX) GAME MEDIA |
| GRAND CHANCE | 300 | 600 | 900 | 1200 | 1500 |

RUNNING BASE GAME 1000 TIMES ⇩

ALLOCATION COUNT OF GRAND CHANCE
(THE NUMBER OF TIMES GRAND CHANCE BEING SELECTED: 1)

| | BET AMOUNT | | | | |
|---|---|---|---|---|---|
| SPECIAL GAME CONDITIONS | 0 TO 49 GAME MEDIA | 50 TO 149 GAME MEDIA | 150 TO 299 GAME MEDIA | 300 TO 499 GAME MEDIA | 500(MAX) GAME MEDIA |
| GRAND CHANCE | 1300 | 2600 | 3900 | 5200 | 6500 |

JACKPOT TABLE

| RANKS | INITIAL VALUE | INCREASE AMOUNT FOR BETTING OF ONE GAME MEDIUM |
|---|---|---|
| GRAND WINNING | 10,000 | 0.05 |
| MAJOR WINNING | 3,000 | 0.06 |
| MINOR WINNING | 500 | 0.07 |
| MINI WINNING | 30 | 0.08 |

FIG. 45

SPECIAL AWARD RANK DATA TABLE

| | BET AMOUNT | | | |
|---|---|---|---|---|
| WIN/LOSS OF SPECIAL AWARD | 1 GAME MEDIUM | 2 GAME MEDIA | 100 GAME MEDIA | 1000 GAME MEDIA |
| | RANDOM NUMBER | RANDOM NUMBER | RANDOM NUMBER | RANDOM NUMBER |
| GRAND WINNING | 1 | 1～2 | 1～100 | 1～1000 |
| MAJOR WINNING | 2～3 | 3～6 | 101～300 | 1001～3000 |
| MINOR WINNING | 4～6 | 7～12 | 301～600 | 3001～6000 |
| MINI WINNING | 7～20 | 13～40 | 601～2000 | 6001～20000 |
| NO SPECIAL AWARD | 21～20000 | 41～20000 | 2001～20000 | — |

FIG. 51

BASE GAME WINNING COMBINATION LOTTERY TABLE

130

| WINNING COMBINATION | RANDOM NUMBER VALUE |
|---|---|
| ☀×5 | 0～29 |
| ♥×5 | 30～51 |
| ☾×5 | 52～107 |
| K×5 | 108～207 |
| A×5 | 208～407 |
| Q×5 | 408～807 |
| J×5 | 808～1477 |
| [10]×5 | 1478～1807 |
| LOSS | 1808～5998 |

FIG. 52

BASE GAME PAYOUT TABLE

131

| WINNING COMBINATION | PAYOUT (PAYING OUT COINS) |
|---|---|
| ☀×5 | 70COINS |
| ♥×5 | 50COINS |
| ☾×5 | 30COINS |
| K×5 | 25COINS |
| A×5 | 20COINS |
| Q×5 | 15COINS |
| J×5 | 10COINS |
| [10]×5 | 5COINS |
| LOSS | 0COIN |

FIG. 53

JACKPOT GAME LOTTERY TABLE

132

| THE NUMBER OF JACKPOT SYMBOLS (THE NUMBER OF SYMBOLS OF "SUN") | RANDOM NUMBER VALUES |
|---|---|
| ☀×5 | 0～51 |
| ☀×4 | 52～207 |
| ☀×3 | 208～807 |
| ☀×2 | 808～1807 |
| ☀×1 | 1808～2998 |
| ☀×0 | 2999～5998 |

FIG. 54

JACKPOT GAME PAYOUT TABLE

133

| THE NUMBER OF JACKPOT SYMBOLS (THE NUMBER OF SYMBOLS OF "SUN") | PAYOUT |
|---|---|
| ☀×5 | JP WINNING (ALL OF ACCUMULATED COINS ARE PAID OUT) |
| ☀×4 | LOSS |
| ☀×3 | LOSS |
| ☀×2 | LOSS |
| ☀×1 | LOSS |
| ☀×0 | LOSS |

FIG. 57

| | Symbol Line A | Symbol Line B | Symbol Line C | Symbol Line D | Symbol Line E |
|---|---|---|---|---|---|
| CODE No. | SYMBOL | SYMBOL | SYMBOL | SYMBOL | SYMBOL |
| 00 | SUN | J | J | HEART | 10 |
| 01 | 10 | HEART | MOON | SUN | J |
| 02 | SUN | J | SUN | 10 | SUN |
| 03 | A | HEART | J | K | HEART |
| 04 | SUN | 10 | A | HEART | J |
| 05 | 10 | SUN | 10 | A | Q |
| 06 | SUN | A | SUN | J | SUN |
| 07 | A | MOON | K | Q | J |
| 08 | Q | HEART | A | 10 | A |
| 09 | MOON | J | K | SUN | HEART |
| 10 | SUN | HEART | SUN | HEART | Q |
| 11 | HEART | K | 10 | SUN | 10 |
| 12 | SUN | MOON | HEART | 10 | HEART |
| 13 | K | Q | Q | MOON | SUN |
| 14 | Q | HEART | SUN | J | J |
| 15 | SUN | J | HEART | K | A |
| 16 | J | HEART | MOON | MOON | MOON |
| 17 | K | K | 10 | HEART | SUN |
| 18 | SUN | 10 | SUN | 10 | HEART |
| 19 | 10 | MOON | 10 | SUN | SUN |
| 20 | Q | HEART | SUN | MOON | 10 |
| 21 | MOON | SUN | Q | A | K |

INITIAL PROCESS

FIG. 67

THIRD BASE GAME WINNING COMBINATION LOTTERY TABLE

330

| WINNING COMBINATION | RANDOM NUMBER VALUE |
|---|---|
| ☀×4 | 0～29 |
| ♥×5 | 30～51 |
| ☾×5 | 52～107 |
| K×5 | 108～207 |
| A×5 | 208～407 |
| Q×5 | 408～807 |
| J×5 | 808～1477 |
| [10]×5 | 1478～1807 |
| LOSS | 1808～5809 |
| ☀×5 | 5810～5998 |

FIG. 68

THIRD BASE GAME PAYOUT TABLE

331

| WINNING COMBINATION | PAYOUT (PAYING OUT COINS) |
|---|---|
| ☀×4 | 70COINS |
| ♥×5 | 50COINS |
| ☾×5 | 30COINS |
| K×5 | 25COINS |
| A×5 | 20COINS |
| Q×5 | 15COINS |
| J×5 | 10COINS |
| [10]×5 | 5COINS |
| LOSS | 0COIN |
| ☀×5 | JP WINNING (ALL OF ACCUMULATED COINS ARE PAID OUT) |

FIG. 87

| | DISPLAY WINDOW151 | DISPLAY WINDOW152 | DISPLAY WINDOW153 | DISPLAY WINDOW154 | DISPLAY WINDOW155 |
|---|---|---|---|---|---|
| CODE NO. | SYMBOL | SYMBOL | SYMBOL | SYMBOL | SYMBOL |
| 00 | Angelfish | Tuna | Tuna | Coelacanth | Clownfish |
| 01 | Clownfish | Coelacanth | Tuna | Angelfish | Tuna |
| 02 | Angelfish | Tuna | Angelfish | Clownfish | Angelfish |
| 03 | Clownfish | Coelacanth | Tuna | BONUS | Coelacanth |
| 04 | Angelfish | Tuna | Angelfish | Coelacanth | Clownfish |
| 05 | Clownfish | Angelfish | Clownfish | Clownfish | 7 |
| 06 | Angelfish | Clownfish | Angelfish | Tuna | Angelfish |
| 07 | Clownfish | Tuna | Clownfish | 7 | Tuna |
| 08 | 7 | Coelacanth | Angelfish | Clownfish | Clownfish |
| 09 | Tuna | Tuna | Clownfish | Angelfish | Coelacanth |
| 10 | Angelfish | Coelacanth | Angelfish | Coelacanth | Tuna |
| 11 | Coelacanth | BONUS | Clownfish | Angelfish | Clownfish |
| 12 | Angelfish | Clownfish | Coelacanth | Clownfish | Coelacanth |
| 13 | BONUS | 7 | BONUS | Tuna | Angelfish |
| 14 | 7 | Coelacanth | 7 | Tuna | Tuna |
| 15 | Angelfish | Tuna | Coelacanth | BONUS | Clownfish |
| 16 | Tuna | Coelacanth | Tuna | Tuna | Tuna |
| 17 | Clownfish | BONUS | Clownfish | Coelacanth | Angelfish |
| 18 | Angelfish | Clownfish | Angelfish | Clownfish | Coelacanth |
| 19 | Clownfish | Tuna | Clownfish | Angelfish | Angelfish |
| 20 | 7 | Coelacanth | Angelfish | Tuna | Clownfish |
| 21 | Tuna | Tuna | Clownfish | Clownfish | BONUS |

FIG. 88

PARTICIPATION STATE TABLE

| BONUS GAME NAME | AMOUNT OF PARTICIPATION BET | PARTICIPATION STATE |
|---|---|---|
| BONUS GAME NAME A | $10 | ACCEPTED |
| BONUS GAME NAME B | $1 | REQUESTING |
| BONUS GAME NAME C | $15 | REQUESTING |

FIG. 89

PARTICIPATION ACCEPTANCE TABLE

| BONUS GAME NAME | TERMINAL UNIT | AMOUNT OF PARTICIPATION BET | PARTICIPATION STATE |
|---|---|---|---|
| BONUS GAME NAME A | TERMINAL UNIT 1 | $10 | NOT FINAL |
| BONUS GAME NAME A | TERMINAL UNIT 2 | $20 | FINAL |
| BONUS GAME NAME B | TERMINAL UNIT 3 | $15 | NOT FINAL |

FIG. 90

PARTICIPATION HISTORY TABLE

| BONUS GAME NAME | TERMINAL UNIT | AMOUNT OF PARTICIPATION BET |
|---|---|---|
| BONUS GAME NAME A | TERMINAL UNIT 1 | $500 |
| BONUS GAME NAME A | TERMINAL UNIT 2 | $20 |
| BONUS GAME NAME B | TERMINAL UNIT 3 | $15 |

INITIAL PROCESS

GAMING SYSTEM AND CONTROL METHOD THEREOF WHICH DETERMINES TRANSITION TO SPECIAL GAME

CROSS REFERENCE TO RELATED APPLICATION

The present application claims priority from U.S. Provisional Application No. 61/114,812, which was filed on Nov. 14, 2008, U.S. provisional application No. 61/091,014, which was filed on Aug. 22, 2008, and U.S. provisional application No. 61/091,025, which was filed on Aug. 22, 2008, the entire disclosure of which is herein incorporated by reference.

BACKGROUND OF THE INVENTION

1. Field of the Invention

The present invention relates to a gaming system which determines whether to shift to a special game, and a control method thereof.

2. Description of Related Art

There have been known gaming machines configured to display plural types of symbols scrolled and then stopped, and to award a predetermined amount of game media (e.g. a predetermined amount of coins or money) according to a combination of symbols stopped and displayed. Such gaming machines are disclosed in the specifications of U.S. Pat. No. 6,960,133, No. 6,012,983, and No. 6,093,102, for example.

Further, as the specifications of U.S. Pat. No. 4,837,728, No. 5,116,055, No. 4,964,638, No. 4,842,278, No. 7,056,215, and No. 7,108,603 disclose, there are known gaming systems each having plural gaming machines linked to each other via a network. Among these gaming systems is a system which pools part of game media input in each gaming machine, and paying out the pooled game media to a gaming machine having won the progressive jackpot.

Further, among the gaming machines is a gaming machine which runs a free game (special game) when a predetermined condition (e.g. rearrangement of a particular symbol during a game) is met during a game. The free game is a game playable without a need of betting a game media. For example, the specification of the publication of Australian patent application No. 200119729 discloses a gaming machine which runs a free game as a sub game, when a predetermined condition (e.g. a particular arrangement of symbols) is met during a base game.

Since the free game is played without consuming a game medium, players in general plays a game with a strong hope for occurrence of the free game. For this reason, there is a demand for a gaming machine which draws more attention of players to the game, with additional characteristics of conditions for occurrence of a free game, effects used when the free game occurs, the number of times the free game is repeated, or effects used during the free game.

Another known problem of such a gaming machine running a free game or the like as a special game is a complicated program for running the games. This is attributed to the need for a program or control for running the special game. Simplification of the program or control therefore is also required.

The present invention is made in view of the above problems, and an object of the present invention is to provide a gaming system with a simplified program for running a special game and control, which is capable of drawing more attention of players to the game. It is also an object of the present invention to provide a control method of such a gaming system.

SUMMARY OF THE INVENTION

A gaming system of the present invention includes: a random number sampling device which samples a random number from a predetermined range of random numbers; an input device which starts a base game configured to award a payout according to a given winning; a data storage device storing special game condition data which defines, within a given value range, a plurality of sub ranges respectively allotted to special game conditions or "No Special Game" meaning no special game is run, each of the special game conditions being associated with an average payout different from those associated with the other conditions; and a controller wherein the controller is programmed to perform the processes of:

(a1) sampling a random number based on an input information from the input device;

(a2) running a base game using the random number, and awarding a payout according to a resulted winning;

(a3) selecting one of the sub ranges each allotted to one of the special game conditions or "No Special Game", based on a predetermined condition and with reference to the random number used in the base game and the special game condition data; and (a4) when a sub range allotted to any of the special game conditions is selected, running a special game under that special game condition and awarding a payout when a winning is achieved.

With the structure, a random number within the predetermined range of random numbers is sampled based on the input information from the input device. The random number thus sampled is used for running the base game. Further, based on the given condition and with reference to the random number and the special game condition data, one of the sub ranges each allotted to one of the different special game conditions or "No Special Game" is selected. As described, the program and control is simplified by using a single random number for running the base game and selecting one of the sub ranges each allotted to one of the different special game conditions or "No Special Game". Determining whether to run the special game while selecting the special game condition allows wider variation of effects for the special game.

Further, the gaming system of the present invention may be adapted so that the sub ranges allotted to the special game conditions in the special game condition data are variable according to an amount of bet placed by a player in the base game. With the structure, the sub ranges each allotted to the special game conditions or "No Special Game" in the special game condition data are variable according to the amount of bet placed by the player. These sub ranges variable according to the amount of bet placed by the player in the base game draw more attention of players to the special game.

Further, the gaming system of the present invention may be adapted so that, when the amount of bet placed by the player is a maximum bet amount, The sub ranges each allotted to the special game conditions or "No Special Game" in the special game condition data are varied so that the sub range allotted to "No Special Game" covers no values. In the structure, The sub ranges each allotted to the special game conditions are varied so that the sub range allotted to "No Special Game" covers no values, when the amount of bet placed by the player in the base game is the maximum bet amount that can be placed by the player. Thus, when the amount of bet placed by the player in the base game is the maximum bet acceptable in the base game, the sub ranges are varied so that the sub range allotted to "No Special Game" covers no values. Therefore, the sub range allotted to "No Special Game" will not be selected in the process of selecting the sub range. This encourages players to place the maximum bet amount in the base game, increase the profit of the hall, and draws more attention of players to the special game as compared with the case of known gaming systems.

Further, a gaming system of the present invention includes: plural gaming terminals each having a random number sampling device which samples a random number from a predetermined range of random numbers, an input device which starts a base game awarding a payout according to a given winning, and a terminal controller; and a center server having a data storage device storing special game condition data which defines, within a given value range, a plurality of sub ranges respectively allotted to special game conditions or "No Special Game" meaning no special game is run, each of the special game conditions being associated with an average payout different from those associated with the other conditions, a selection storage device which stores how many times each sub range has been selected, and a center controller, wherein the terminal controller is programmed to perform the processes of:

(b1) sampling a random number based on an input information from the input device, (b2) running the base game independently of the other gaming terminals, using the random number, and awarding a payout according to a given winning, (b3) transmitting to the center controller the random number, based on a predetermined condition, and (b4) running a special game under a special game condition associated with a selected sub range, in response to an instruction from the center controller, and awarding a payout, and wherein the center controller is programmed to perform the processes of:

(c1) selecting one of the sub ranges each allotted to one of the special game conditions or "No Special Game", with reference to the random number transmitted from the gaming terminal and the special game condition data; and (c2) storing the result of selection in (c1) in the selection storage device;

(c3) varying the sub ranges each allotted to one of the special game conditions and/or the sub range allotted to "No Special Game" in the special game condition data, based on a given condition and with reference to the selection storage device;

(c4) if the selected sub range is allotted to a special game condition, informing that gaming terminal of which special game condition has been selected.

With the structure, a random number is sampled from the predetermined range of random numbers, based on the input information from the input device, in each of the gaming terminals. The random number thus sampled is used for running the base game. Further, based on a predetermined condition, the random number is transmitted from the gaming terminal to the center server. In the center server, the random number having been transmitted from the gaming terminal and the special game condition data are referred to select one of the sub ranges each allotted to one of the special game conditions or "No Special Game". The result of the selection is stored in the selection storage device. Further, with reference to the selection storage device, the sub ranges each allotted to one of the special game conditions and/or the sub range allotted to "No Special Game" in the special game condition data is/are varied based on the predetermined condition. If any sub range allotted to a special game condition is selected, the center server informs the gaming terminal of which special game condition has been selected. The gaming terminal runs the special game under the special game condition informed by the center server. As described, the program and control is simplified by using a single random number for running the base game and selecting one of the sub ranges each allotted to one of the special game conditions or "No Special Game". Determining whether to run the special game while selecting the special game condition allows wider variation of effects for the special game. Further, with the center server collectively managing the special game condition data of the gaming terminals, the settings of the sub ranges each allotted to the special game conditions or "No Special Game" are easily modifiable.

Further, a gaming system of the present invention includes: a random number sampling device which samples a random number from a predetermined range of random numbers; an input device which starts a base game awarding a payout according to a given winning; a data storage device storing special game condition data which defines, within a given value range, a plurality of sub ranges respectively allotted to special game conditions or "No Special Game" meaning no special game is run, each of the special game conditions being associated with an average payout different from those associated with the other conditions; and a controller, wherein the controller is programmed to perform the processes of:

(d1) sampling a random number based on an input information from the input device;

(d2) selecting one of the sub ranges each allotted to one of the special game conditions or "No Special Game", with reference to the input information, the random number, and the special game condition data; and (d3) when a sub range allotted to any of the special game conditions is selected, running a special game under that special game condition and awarding a payout when a winning is achieved.

As described, the program and control is simplified by using a single random number for running the base game and selecting one of the sub ranges each allotted to one of the different special game conditions or "No Special Game". Determining whether to run the special game while selecting the special game condition allows wider variation of effects for the special game.

Further, the gaming system of the present invention may be adapted so that the input information is an amount of bet placed by a player, and the sub ranges each allotted to the special game conditions or "No Special Game" in the special game condition data are variable according to the amount of that bet placed by the player. With the structure, the sub ranges each allotted to the special game conditions in the special game condition data are variable according to the amount of bet placed by the player. These sub ranges variable according to the amount of bet placed by the player in the base game draw more attention of players to the special game.

Further, a gaming system of the present invention includes: a random number sampling device which samples a random number from a predetermined range of random numbers; an input device which starts a base game awarding a payout according to a given winning; a data storage device storing special award rank data which defines, within a given value range, sub ranges each allotted to one of winning ranks respectively associated with different average payouts or "Loss"; and a controller, wherein the controller is programmed to perform the processes of:

(e1) sampling a random number based on an input information from the input device;

(e2) selecting one of the sub ranges each allotted to one of the winning ranks or "Loss" based on the input information and with reference to the random number and the special award rank data; and (e3) when the sub range thus selected is allotted to one of the winning ranks, awarding a payout according to that winning rank.

In the structure, the program and control is simplified by using a single random number for running the base game and selecting one of the sub ranges each allotted to one of the winning ranks or "Loss". Further, a winning rank of the special award is also determined when determining a winning or loss of the special award. Various effects can be used for the special award.

Further, the gaming system of the present invention may be adapted so that the input information is an amount of bet placed by a player, and the sub ranges each allotted to one of the winning ranks or "Loss" in the special award rank data are variable according to that amount of bet placed by the player. With the structure, the sub ranges each allotted to one of the winning ranks of the special award in the special award rank data are variable according to the amount of bet placed by the player. These sub ranges variable according to the amount of bet placed by the player in the base game draws more attention of players to the special award.

Further, a control method of the present invention is a control method of a gaming system including: a random number sampling device which samples a random number from a predetermined range of random numbers; an input device which starts a base game awarding a payout according to a given winning; data storage device storing special game condition data which defines, within a given value range, a plurality of sub ranges respectively allotted to different special game conditions or "No Special Game" which means no special game is run, each of the special game conditions being associated with an average payout different from those associated with the other conditions; and a controller, the method comprising the steps of:

(f1) sampling a random number based on an input from the input device;

(f2) running a base game using the random number, and awarding a payout according to a resulted winning;

(f3) selecting one of the sub ranges each allotted to one of the special game conditions or "No Special Game", based on a predetermined condition and with reference to the random number used in the base game and the special game condition data; and (f4) if the sub range selected is allotted to a special game condition, running the special game under that special game condition and awarding a payout.

In the structure, the program and control is simplified by using a single random number for running the base game and selecting one of the sub ranges each allotted to one of the special game conditions or "No Special Game". Determining whether to run the special game while selecting the special game condition allows wider variation of effects for the special game.

The present invention relates to a gaming system which determines whether to shift to bonus game and a control method to operate the gaming system.

Existing gaming machines or gaming systems each include: two or more gaming terminals; terminal controllers respectively provided to the gaming terminals, each of which controllers causes associated one of the gaming terminals to run a game; and a center controller which controls the terminal controllers. Such a gaming machine or gaming system is disclosed in, for example, specifications of U.S. Patent Application Publication No. 2002/0042296, U.S. Pat. No. 6,733,390, U.S. Pat. No. 6,312,332, U.S. Pat. No. 6,142,872, U.S. Pat. No. 6,361,441, U.S. Pat. No. 5,820,459, U.S. Pat. No. 4,283,709, and U.S. Pat. No. 6,003,013. A terminal controller of a gaming terminal runs a game and awards a payout based on the result of the game independently from another terminal controller of another gaming terminal. The center controller provides a bonus game, in which two or more players compete against one another for various jackpots, such as a progressive jackpot and a mystery jackpot, through the gaming terminals.

An object of the present invention is to provide a gaming system realizing entertainment characteristic unobtainable from the above-described conventional arts by improving the aforesaid bonus game, and a control method to operate the gaming system machine.

The present invention relates to a gaming system (gaming system 1) including: a plurality of terminal devices (slot machines 3A to 3J) each of which executes a base game and a bonus game with a game value being bet and awards a prize according to a predetermined winning; and a server (server 2) which includes a storage device and a controller which is programmed to perform the steps of:

(a1) accumulatively storing a percentage of a betted game value in the storage device in each base game executed at each of the terminal devices; (a2) causing each of the terminal devices to independently run a bonus game when the game value accumulatively stored in the storage device reaches a predetermined value; (a3) in the bonus game run in each of the terminal devices, awarding a game value equivalent to the predetermined value to a terminal device which achieves a predetermined winning first; and (a4) adjusting terminal devices other than the terminal device which achieves the predetermined winning first not to achieve the predetermined winning.

According to the structure above, in a bonus game independently run in each terminal device, the server awards a game value equivalent to a predetermined value accumulated in the storage device to the terminal device in which a predetermined winning is met first, and performs adjustment so that the predetermined winning is not met in the terminal devices other than the terminal device in which the predetermined winning is met first. This makes it possible to prevent two or more terminal devices from simultaneously achieving a winning in a bonus game and to award a game value accumulated for a bonus game only to a player who has achieved a winning first.

In addition to the above, the present invention is the above-described gaming system in which the controller awards a special prize to the terminal devices which are adjusted so as not to achieve the predetermined winning.

According to this structure, the server awards, to the terminal devices which are adjusted so as not to achieve the predetermined winning, a special prize which is different from the game value equivalent to the predetermined value accumulated in the storage device. With this, a terminal device, which is disadvantageously adjusted so as not to achieve the predetermined winning for the purpose of preventing two or more of the terminal devices from simultaneously achieving a winning in a bonus game, can receive a prize (such as payout) as a consolation prize.

The present invention relates to a gaming system including: a plurality of terminal devices (slot machines) each of which executes a base game and a bonus game with a game value being bet and awards a prize according to a predetermined winning; and a server which includes a storage device and a controller which is programmed to perform the steps of:

(b1) accumulatively storing a percentage of a betted game value in the storage device in each base game executed at each of the terminal devices; (b2) causing each of the terminal devices to independently run a bonus game when the game value accumulatively stored in the storage device reaches a predetermined value; (b3) in the bonus game run by each of the terminal devices, awarding a share of a game value equivalent to the predetermined value to each of a predetermined number of terminal devices among those having achieved a predetermined winning; and (b4) performing adjustment so that the predetermined winning is not achieved in terminal devices other than the predetermined number of terminal devices among those having achieved a predetermined winning.

According to the structure above, it is possible to arrange the system so that, in a bonus game independently run in each of the terminal devices, the server awards a share of the game value equivalent to the predetermined value to each of a predetermined number of terminal devices among those having achieved a jackpot, and performs adjustment so that the predetermined winning is not achieved in the terminal devices other than the predetermined number of terminal devices among those having achieved a predetermined winning. In this case, the number of terminal devices achieving a winning in a bonus game does not exceed a planned number of winning, and each of players corresponding to the planned number of winning receives a share of the game value pooled for the bonus game.

In addition to the above, the present invention is the above-described gaming system in which the controller awards a special prize to the terminal devices which are adjusted so as not to achieve the predetermined winning.

According to this structure, the server awards, to the terminal devices which are adjusted so as not to achieve the predetermined winning, a special prize which is different from the game value equivalent to the predetermined value accumulated in the storage device. With this, a terminal device, which is disadvantageously adjusted so as not to achieve the predetermined winning for the purpose of preventing two or more of the terminal devices from simultaneously achieving a winning in a bonus game, can receive a prize (such as payout) as a consolation prize.

The present invention relates to a gaming system including: a plurality of terminal devices each of which executes a base game and a bonus game with a game value being bet and awards a prize according to a predetermined winning; and a server which includes a storage device, a counter device which performs counting, and a controller which is programmed to perform the steps of:

(c1) accumulatively storing a percentage of a betted game value in the storage device in each base game executed at each of the terminal devices; (c2) changing a count of the counter device in each base game run by each of the terminal devices; (c3) causing each of the terminal devices to independently run a bonus game when the count of the counter device reaches a predetermined value; (c4) in the bonus game run by each of the terminal devices, awarding the accumulated game value to a terminal device which achieves a predetermined winning first; and (c5) adjusting terminal devices other than the terminal device which achieves the predetermined winning first not to achieve the predetermined winning.

According to the structure above, in a bonus game independently run in each terminal device, the server awards an accumulated game value to the terminal device in which a predetermined winning is met first, and performs adjustment so that the predetermined winning is not met in the terminal devices other than the terminal device in which the predetermined winning is met first, when the count of the counter device reaches a predetermined value. With this, the total number of base games run by all of the terminal devices can be used as a trigger of the running of a bonus game. This makes it possible to prevent two or more terminal devices from simultaneously achieving a winning in a bonus game and to award a game value accumulated for a bonus game only to a player who has achieved a winning first.

In addition to the above, the present invention is the above-described gaming system in which the controller awards a special prize to the terminal devices which are adjusted so as not to achieve the predetermined winning.

According to this structure, the server awards, to the terminal devices which are adjusted so as not to achieve the predetermined winning, a special prize which is different from the game value equivalent to the predetermined value accumulated in the storage device. With this, a terminal device, which is disadvantageously adjusted so as not to achieve the predetermined winning for the purpose of preventing two or more of the terminal devices from simultaneously achieving a winning in a bonus game, can receive a prize (such as payout) as a consolation prize.

The present invention relates to a gaming system including: a plurality of terminal devices each of which executes a base game with a game value being bet and awards a prize according to a predetermined winning; and a server which includes a storage device and a controller which is programmed to perform the steps of:

(d1) accumulatively storing a percentage of a betted game value in the storage device in each base game executed at each of the terminal devices; (d2) when a predetermined winning is achieved as a result of the base game run by each of the terminal devices, awarding the accumulated game value to a terminal device which achieves the predetermined winning first; and (d3) performing adjustment so that the predetermined winning is not achieved in terminal devices other than the terminal device which achieves the predetermined winning first.

According to the structure above, in a base game independently run in each terminal device, the server awards an accumulated game value to the terminal device in which a predetermined winning is met first, and performs adjustment so that the predetermined winning is not met in the terminal devices other than the terminal device in which the predetermined winning is met first. This makes it possible to prevent two or more terminal devices from simultaneously achieving a predetermined winning and to award a pooled game value only to a player who has achieved a winning first.

In addition to the above, the present invention is the above-described gaming system in which the controller awards a special prize to the terminal devices which are adjusted so as not to achieve the predetermined winning.

According to this structure, the server awards, to the terminal devices which are adjusted so as not to achieve the predetermined winning, a special prize which is different from the game value equivalent to the predetermined value accumulated in the storage device. With this, a terminal device, which is disadvantageously adjusted so as not to achieve the predetermined winning for the purpose of preventing two or more of the terminal devices from simultaneously achieving a winning, can receive a prize (such as payout) as a consolation prize.

The present invention relates to a playing method of a gaming system which includes: a plurality of terminal devices (slot machines) each of which executes a base game and a bonus game with a game value being bet and awards a prize according to a predetermined winning; and a server which includes a storage device and a controller which is programmed to perform the steps of: accumulatively storing a percentage of a betted game value in the storage device in each base game executed at each of the terminal devices; causing each of the terminal devices to independently run a bonus game when the game value accumulatively stored in the storage device reaches a predetermined value; in the bonus game run in each of the terminal devices, awarding a game value equivalent to the predetermined value to a terminal device which achieves a predetermined winning first; and adjusting terminal devices other than the terminal device which achieves the predetermined winning first not to achieve the predetermined winning.

According to the structure above, in a bonus game independently run in each terminal device, the server awards a game value equivalent to a predetermined value accumulated in the storage device to the terminal device in which a predetermined winning is met first, and performs adjustment so that the predetermined winning is not met in the terminal devices other than the terminal device in which the predetermined winning is met first. This makes it possible to prevent two or more terminal devices from simultaneously achieving a winning in a bonus game and to award a game value accumulated for a bonus game only to a player who has achieved a winning first.

The present invention relates to a gaming system which allowing simultaneous participation of player in a plurality of bonus game and a playing method thereof.

Among existing gaming systems, there is a gaming system including: two or more terminals; terminal controllers causing the terminals to run a base game; and a bonus controller running a multiplayer bonus game. Such gaming systems are disclosed in, for example, the specifications of WO99/03078, U.S. Pat. No. 7,311,598, and U.S. Pat. No. 7,311,604. A terminal controller of a terminal unit runs a base game and awards a payout based on the result of the base game independently from another terminal controller of another terminal unit. The bonus controller provides a bonus game, in which two or more players compete against one another for bonus payouts, such as progressive jackpots or mystery jackpots, through the terminals.

An object of the present invention is to provide a gaming system providing an entertainment characteristic which is not brought about by the above mentioned known art, and a playing method thereof.

A gaming system of the present invention includes:

a plurality of terminals;

a base game;

simultaneously occurring multiplayer bonus games runnable independently of the base game;

a base bet input unit for receiving a base bet for the base game, which is provided to each of the terminals;

a participation bet input unit for receiving a participation bet for the bonus games, which is provided to each of the terminals;

a terminal controller provided to each of the terminals; and a plurality of bonus controllers;

a payout memory provided to each of the bonus controllers, which stores a bonus payout corresponding to the sum of participation bets; and a network connecting the terminals and the bonus controllers with each other to enable communications therebetween, wherein each terminal controller is programmed to perform processes of (a1) running the base game when the base bet input unit receives the base bet, and awarding a payout when a base game is won, (a2) detecting a participable bonus game, (a3) causing the participation bet input unit to receive a participation bet for the participable bonus game detected by running the second process, (a4) when a participation bet is received, sending a participation request to the bonus controller running the bonus game of interest, and notifying an amount of participation bet received to the bonus controller, (a5) finalizing the entry of the participation bet when a notification of acceptance of the request is received from all of the bonus controllers to which the request was sent, and canceling the entry of the participation bet and sending a participation cancellation notification to the bonus controllers to which the request was sent, when a notification of acceptance of the request is not received from all of the bonus controllers to which the request was sent, (a6) awarding a bonus payout based on an instruction from the bonus controller;

and wherein each bonus controller performs the processes of (b1) when a request to participate in a bonus game and a notification concerning the amount of participation bet are received from a terminal controller, storing the request and accumulatively storing a bonus payout, equivalent of the amount of participation bet, in the payout memory, while sending a notification of acceptance of the request to the terminal controller sending the request;

(b2) based on a predetermined condition, running a bonus game;

(b3) determining whether to award a bonus payout for each terminal participating in the bonus game being run; and (b4) when it decides to award a bonus payout to a terminal, sending an instruction to award a bonus payout to the terminal controller of the terminal so qualified to receive a bonus payout.

With the structure, the bonus controllers simultaneously run multiplayer bonus games. Since a bonus game can be participated by placing a participation bet on a participable bonus game through the participation bet input unit, a gaming system can be provided that enables one terminal to simultaneously participate in more than one bonus game. Further, since the entry of participation bet is finalized upon receipt of a notification of acceptance of the participation request from all of the bonus controllers to which the request was made, there will be no trouble, such as not being able to participate in a bonus game despite spending the participation bet, which may occur when there is a network error or other failures in bonus games simultaneously participated by one terminal. Further, when a notification of acceptance of the participation request is not received from all of the bonus controllers to which the request was made, the entry of participation bet and the participation request are cancelled. In this way, the participation request will be cancelled in all of the bonus games to which the request was made, when any of the bonus games is not available for participation. This makes the procedure more predictable because the player knows that the participation-requested bonus games are all treated equally.

The gaming system of the present invention may be adapted so that, in (a5), the terminal controller finalizes the entry of the participation bet when a notification of acceptance of the request is received from all of the bonus controllers to which the request was sent before the decision is made on win or lose of the base game, and cancels the entry of the participation bet and sends a participation cancellation notification to the bonus controllers to which the request was sent when a notification of acceptance of the request is not received from all of the bonus controllers to which the request was sent before the decision is made on win or lose of the base game.

Since whether a notification of acceptance of the participation request is received is determined before the decision is made on win or lose of a base game, whether to participate in a bonus game is finalized before the base game ends. Because there is no interference to the next base game, the player can play games without any interference.

The gaming system of the present invention may be adapted so that: each of the terminals; has a terminal display which displays information concerning availability of a participable bonus game; each bonus controller, when a terminal is ready to participate in a bonus game, notifies the participable bonus game to each terminal controller; and each terminal controller, when receiving the notification of the participable bonus game, displays on the terminal display information of availability of the bonus game and has the participation bet input unit receive a participation bet.

As described, when a bonus game becomes available to the terminals, the terminal display of each terminal displays information concerning availability of the participable bonus game to have the participation bet input unit receive a participation bet, facilitating a player to participate in the bonus game.

The gaming system of the present invention may be adapted so that: the terminal controller, when finalizing the entry of the participation bet, sums up all the participation bets, and deduct the sum from the credit.

With the structure, the process of deducting the participation bet from the credit can be performed by the terminal controller alone.

A playing method of the present invention is a playing method of a gaming system including terminals that run a base game, and a bonus controller that runs a multiplayer bonus game, the method including the steps of: detecting a participable bonus game; receiving a participation bet for the bonus game detected; making a request to participate in a bonus game upon receipt of the participation bet; and finalizing the entry of participation bet upon acceptance of the participation request for the bonus game.

With this playing method, the entry of participation bet is finalized upon receipt of a notification of acceptance of the request from all of the bonus controllers to which the request was made. In this way, there will be no trouble, such as not being able to participate in a bonus game despite spending the participation bet, which may occur when there is a network error or other failures in bonus games simultaneously participated by one terminal.

A gaming system of the present invention includes:

a base game;

simultaneously occurring multiplayer bonus games runnable independently of the base game;

a base bet input unit for receiving a base bet for the base game;

a participation bet input unit for receiving a participation bet for the bonus games;

a terminal controller;

a bonus controller;

terminals each having a payout memory which stores a bonus payout corresponding to the sum of participation bets and a participation history memory which stores history of participation bets; and a network connecting the terminals with each other to enable communications therebetween, wherein each terminal controller is programmed to perform processes of (c1) running the base game when the base bet input unit receives the base bet, and awarding a payout when a base game is won, (c2) detecting a participable bonus game, (c3) causing the participation bet input unit to receive a participation bet for the participable bonus game detected by running the second process, (c4) when a participation bet is received, sending a participation request to the bonus controller running the bonus game of interest, and notifying an amount of participation bet received to the bonus controller, (c5) finalizing the entry of the participation bet when a notification of acceptance of the request is received from all of the bonus controllers to which the request was sent, and canceling the entry of the participation bet and sending a participation cancellation notification to the bonus controllers to which the request was sent, when a notification of acceptance of the request is not received from all of the bonus controllers to which the request was sent, (c6) awarding a bonus payout based on an instruction from the bonus controller;

and wherein each bonus controller performs the processes of (d1) when a request to participate in a bonus game and a notification concerning the amount of participation bet are received from a terminal controller, storing the request and accumulatively storing a bonus payout, equivalent of the amount of participation bet, in the payout memory, while sending a notification of acceptance of the request to the terminal controller sending the request, and storing the participation bet in the participation history memory;

(d2) based on a predetermined condition, running a bonus game;

(d3) determining whether to award a bonus payout for each terminal participating in the bonus game being run; and (d4) when it decides to award a bonus payout to a terminal, sending an instruction to award a bonus payout to the terminal controller of the terminal so qualified to receive a bonus payout;

(d5) when a terminal in which the bonus game is run ends participation in the bonus game, determining which terminal to transfer the bonus game based on the information stored in the participation history memory;

(d6) transferring data related to the bonus game to that terminal thus so determined.

With the structure, the bonus controllers simultaneously run multiplayer bonus games. Since a bonus game can be participated by placing a participation bet on at least one participable bonus game through the participation bet input unit, a gaming system can be provided that enables one terminal to simultaneously participate in more than one bonus game. Further, the entry of participation bet is finalized upon receipt of a notification of acceptance of the request from all of the bonus controllers to which the request was made. In this way, there will be no trouble, such as not being able to participate in a bonus game despite spending the participation bet, which may occur when there is a network error or other failures in bonus games simultaneously participated by one terminal. Further, when a notification of acceptance of the participation request is not received from all of the bonus controllers to which the request was made, the entry of participation bet and the participation request are cancelled. In this way, the participation request will be cancelled in all of the bonus games to which the request was made, when any of the bonus games is not available for participation. This makes the procedure more predictable because the player knows that the participation-requested bonus games are all treated equally. Further, a need for a device exclusively used as a bonus controller is eliminated, because the bonus controller runs the bonus game after transferring the data related to the bonus game to a terminal, based on the history of the participation bet.

The gaming system of the present invention may be adapted so that the bonus controller determines to which terminal data related to bonus game is transferred, in the descending order of amounts of the summed bet value on the bonus game.

With the structure, a terminal to which data related to bonus game is transferred is determined, in the descending order of amounts of the summed bet value on the bonus game. A player having placed a large amount of bet on a bonus game more likely continues the bonus game to win a bonus payout from the bonus game. Therefore, a terminal with a large summed bet value on the base game less likely stop participating in the bonus game. It is therefore more appropriate to transfer the data related to the bonus game to such a terminal. This reduces the number of times the data related to the bonus game is transferred.

A gaming system of the present invention includes:

a plurality of terminals;

a base game;

simultaneously occurring multiplayer bonus games runnable independently of the base game;

a base bet input unit for receiving a base bet for the base game, which is provided to each of the terminals;

a participation bet input unit for receiving a participation bet for the bonus games, which is provided to each of the terminals;

a terminal controller provided to each of the terminals; and a plurality of bonus controllers;

a payout memory provided to each of the bonus controllers, which stores a bonus payout corresponding to the sum of participation bets; and a master controller;

a network connecting the terminals, the bonus controllers, and the master controller with each other to enable communications therebetween, wherein each terminal controller is programmed to perform processes of (e1) running the base game when the base bet input unit receives the base bet, and awarding a payout when a base game is won, (e2) detecting a participable bonus game, (e3) causing the participation bet input unit to receive a participation bet for the participable bonus game detected by running the second process, (e4) when a participation bet is received, sending a participation request to the bonus controller running the bonus game of interest, and notifying an amount of participation bet received to the bonus controller, (e5) when an amount of the sum of participation bets is notified from the master controller, deducting the sum from the credit and finalizing the entry of the participation bet;

(e6) awarding a bonus payout based on an instruction from the bonus controller;

and wherein each bonus controller performs the processes of (f1) when a request to participate in a bonus game and a notification concerning the amount of participation bet are received from a terminal controller, storing the request and accumulatively storing a bonus payout, equivalent of the amount of participation bet, in the payout memory, while notifying the master controller of the amount of the participation bet and information indicative of the terminal controller requesting the participation in the bonus game, (f2) based on a predetermined condition, running a bonus game, (f3) determining whether to award a bonus payout for each terminal participating in the bonus game being run, (f4) when it decides to award a bonus payout to a terminal, sending an instruction to award a bonus payout to the terminal controller of the terminal so qualified to receive a bonus payout;

and wherein the master controller is programmed to perform the processes of (g1) summing up participation bets for each terminal controller, when receiving from the bonus controller, information indicative of a terminal controller requesting participation in the bonus game and notification of the amount of the participation bet, (g2) notifying the terminal controller of the amount of the sum of participation bets.

With the above structure, the process of deducting the participation bet from the credit is centralized in the master controller.

BRIEF DESCRIPTION OF THE DRAWINGS

FIG. 8 shows a base game symbol table stored in the gaming terminal of the Embodiment 1, according to the present invention.

FIG. 9A shows a special game symbol table stored in the gaming terminal of the Embodiment 1, according to the present invention.

FIG. 9B shows a special game symbol table stored in the gaming terminal of the Embodiment 1, according to the present invention.

FIG. 10 shows a symbol column determination table stored in the gaming terminal of the Embodiment 1, according to the present invention.

FIG. 11 shows a code No. determination table stored in the gaming terminal of the Embodiment 1, according to the present invention.

FIG. 12 shows an additional wild symbol count determination table stored in the gaming terminal of the Embodiment 1, according to the present invention.

FIG. 13 shows a payout table stored in the gaming terminal of the Embodiment 1, according to the present invention.

FIG. 14 shows a free game count determination table stored in the gaming terminal of the Embodiment 1, according to the present invention.

FIG. 15 shows a special game condition data table stored in the center server of the Embodiment 1, according to the present invention.

FIG. 16 shows a special game condition basic data table stored in the center server of the Embodiment 1, according to the present invention.

FIG. 17 shows allocation number reduction table stored in the center server of the Embodiment 1, according to the present invention.

FIG. 18 is an explanatory diagram providing an explanation for updating of the special game condition data table of the Embodiment 1, according to the present invention.

FIG. 45 shows a special award rank data table stored in the center server of the Embodiment 2, according to the present invention.

FIG. 51 is an explanatory diagram showing a base game winning combination lottery table.

FIG. 52 is an explanatory diagram showing a base game payout table.

FIG. 53 is an explanatory diagram showing a jackpot game lottery table.

FIG. 54 is an explanatory diagram showing a jackpot game payout table.

FIG. 57 is a table showing symbol columns and code numbers of respective symbols.

FIG. 67 is an explanatory diagram of a third base game winning combination lottery table of an Embodiment 3-3.

FIG. 68 is an explanatory diagram of a third base game payout table of the Embodiment 3-3.

FIG. 87 is an explanatory diagram illustrating a symbol column of symbols rearranged on a terminal display.

FIG. 88 is a diagram illustrating a participation state table stored in the terminal.

FIG. 89 is a diagram illustrating a participation acceptance table stored in the bonus controller.

FIG. 90 is a diagram illustrating a participation history table stored in the bonus controller.

DESCRIPTION OF THE PREFERRED EMBODIMENTS (Gaming System Overview)

Embodiment 1

Figure 1:
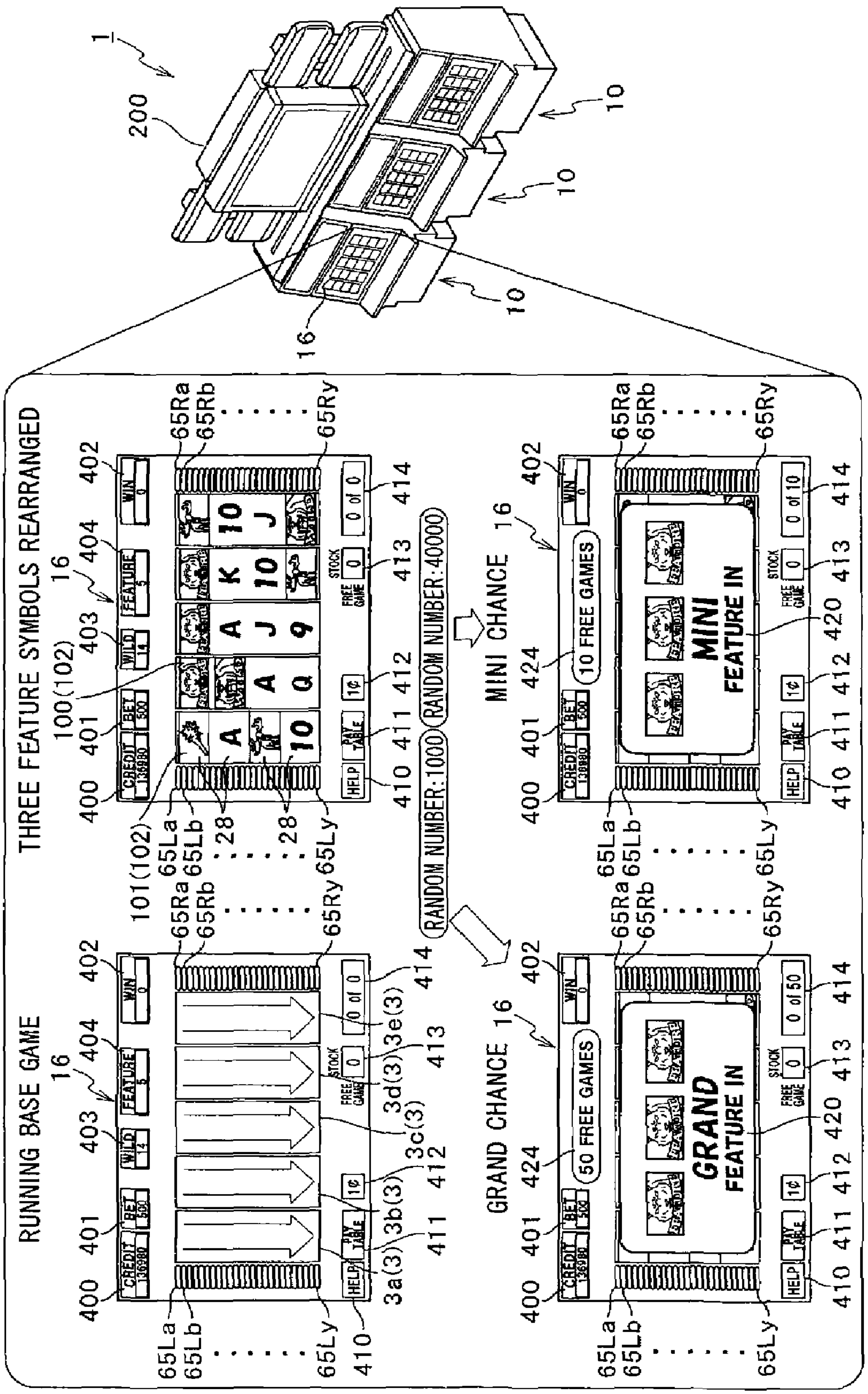
FIG. 1 is a schematic diagram illustrating a gaming system of an Embodiment 1, according to the present invention.

The following describes an Embodiment 1 of the present invention, with reference to FIGS. 1 to 39. Note that reference numbers and symbols given to members and steps of flowcharts are only applicable to those described within the present embodiment, and do not represent the members or the steps of the other embodiments. As illustrated in FIG. 1, a gaming system 1 of the present embodiment includes: a gaming terminal 10 capable of running a base game and a special game, and a center server 200. Further, the gaming system 1 is capable of selecting one of different special game conditions or "No special Game" which means no special game is run, by referring to a random number used in the base game.

The "base game" herein means a game runnable on the premise that a bet of game medium is placed by a player. According to the resulting winning, a payout is awarded to the player. Further, the "special game" herein means a game in which a free game is repeated a predetermined number of times. A game runnable with a bet of less game media than the base game is referred to as "free game". Note that "bet of less game media" encompasses betting of zero game media. The "free game" therefore may be a game runnable without a bet of game medium, which awards a payout to the player according to a given winning. In other words, "free game" is a game which is started without the premise of consuming a game medium.

Each of the special game conditions is associated with an average amount of game media awarded to the player in the special game. In the present embodiment, there are four special game conditions in the special game which are respectively referred to as follows: "Grand Chance", "Major Chance", "Minor Chance", and "Mini Chance". These special game conditions are respectively associated with different average payouts that could be awarded to the player in the special game. The highest average payout is associated with "Grand Chance", sequentially followed by the average payouts associated with "Major Chance" and "Minor Chance", respectively. The lowest average payout associated with "Mini Chance".

Specifically, the gaming system 1 includes: a random number generating circuit 64 which samples a random number from a predetermined range of random numbers; start button 23 which starts a base game awarding a payout according to a given winning; a RAM 243 storing special game condition data which defines, within a given value range, a plurality of sub ranges respectively allotted to different special game conditions or "No Special Game" which means no special game is run, each of the special game conditions being associated with an average payout different from those associated with the other conditions; and a controller programmed to perform the following processes of (a1) to (a4).

In (a1), a random number is sampled based on an input from the start button 23. In (a2), a base game is run using the random number, and a payout is awarded according to a resulted winning.

In (a3), one of the sub ranges each allotted to one of the special game conditions or "No Special Game" is selected, based on a predetermined condition and with reference to the random number used in the base game and the special game condition data. Note that, in the present embodiment, this process of selecting one of the sub ranges is performed, by referring to the random number used in the base game and the special game condition data, when three or more feature symbols 100 are rearranged on a later-mentioned payline 300.

Here, the "feature symbol 100" along with the ordinary symbols 101 constitute a group of symbols 102. That is, the "symbols 102" is a superordinate conception of the ordinary symbols 101 and feature symbols 100. The feature symbol 100 is a symbol serving as a special game trigger for starting the process of selecting one of the sub ranges.

The expression "rearrange" means dismissing an arrangement of symbols 102, and once again arranging symbols 102. An "arrangement" in this specification means a state of symbols 102, which can be visibly confirmed by a player.

In (a4), when a sub range allotted to anyone of the special game conditions is selected, the special game is run and a payout is awarded when a winning occurs. Note that the present embodiment deals with a case where, when a sub range allotted to one of the special game conditions is selected, a special game notifying screen 420 indicating the special game condition selected is displayed on a lower image display panel 16.

In the gaming system 1 having the above mentioned structure, the program and control is simplified by using a single random number for running the base game and selecting one of the sub ranges each allotted to one of the special game conditions or "No Special Game". Determining whether to run the special game while selecting the special game condition allows wider variation of effects for the special game.

[Functional Blocks of Gaming System 1]

Figure 2:
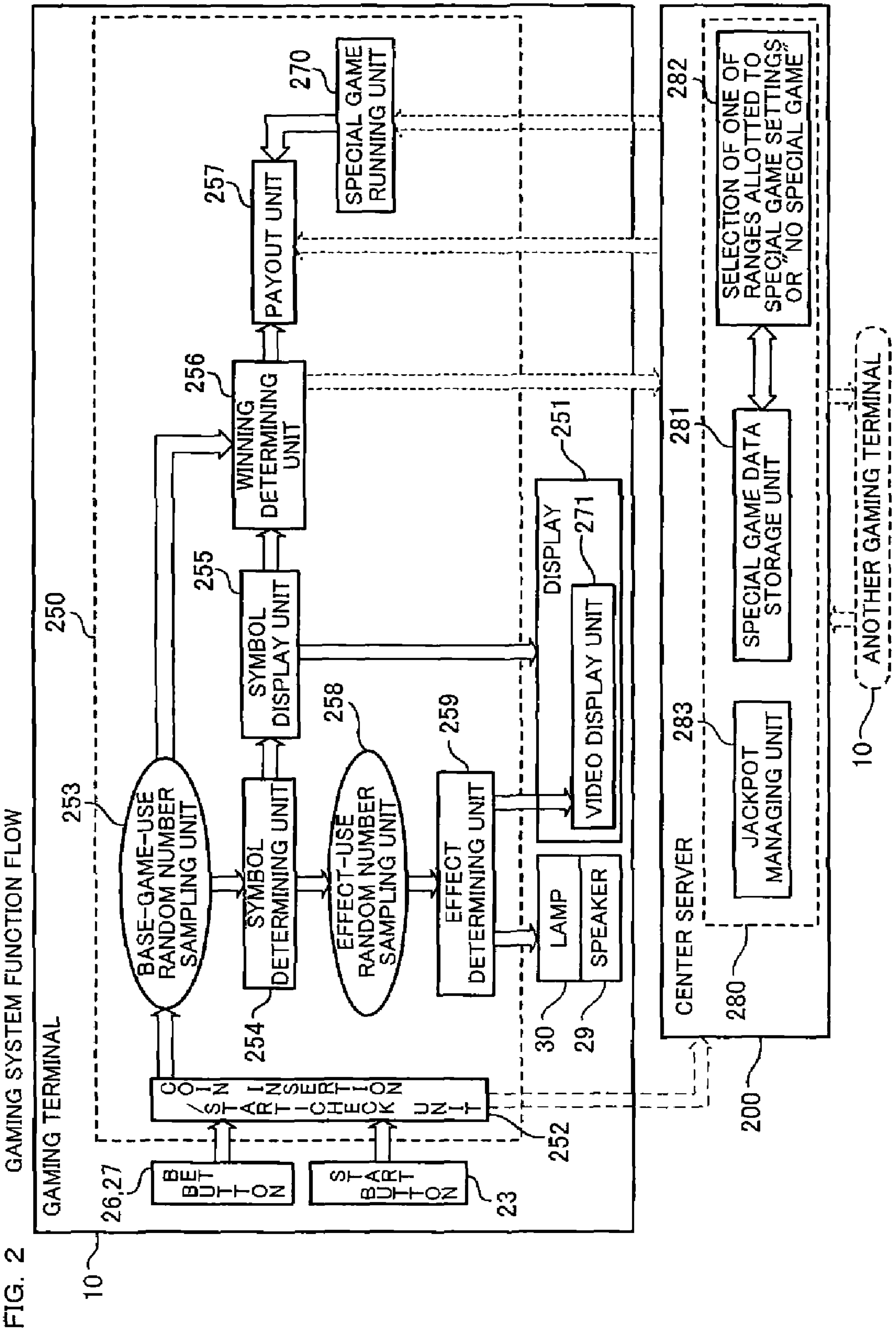
FIG. 2 is a functional block diagram of the gaming system of the Embodiment 1, according to the present invention.

The following describes basic functions of the gaming system of the present embodiment, with reference to FIG. 2. As illustrated in FIG. 2, the gaming system 1 includes plural gaming terminals 10 and a center server 200.

(Gaming Terminal 10)

The gaming terminal 10 includes: a terminal controller 250, bet buttons (1-bet button 26, maximum bet button 27), start button 23, a speaker 29, a lamp 30, and a display 251.

The gaming terminal 10 is connected to the center server 200 and is in communication therewith.

The terminal controller 250 has a coin insertion/start-check unit 252, a base game random number sampling unit 253, a symbol determining unit 254, a symbol display unit 255, a winning determining unit 256, a payout unit 257, an effect-use random number sampling unit 258, an effect determining unit 259, and a special game running unit 270.

The coin insertion/start-check unit 252 has a function of determining whether any of the bet buttons (1-bet button 26, maximum bet button 27) is pressed by a player, and a function of determining whether the start button 23 is pressed by the player.

The base game random number sampling unit 253 samples a random number for the base game (hereinafter, base game random number), when the coin insertion/start-check unit 252 determines that the start button 23 is pressed by the player. Using the base game random number sampled by the random number sampling unit 253, the symbol determining unit 254 determines symbols 102 to be displayed to the player, after scrolling of symbol columns is stopped, are determined for each of video reels 3 displayed on the display 251.

The symbol display unit 255 starts scrolling of a symbol column on each video reel 3 displayed on the display 251, and stops the scroll so that the symbols determined are displayed to the player.

The winning determining unit 256 determines whether a combination of symbols rearranged on a later-described payline 300 relates to a winning. The winning determining unit 256 transmits, based on a given condition, a random number signal to the center server 200. The random number signal is a signal indicative of the base game random number sampled by the base game random number sampling unit 253. Further, the winning determining unit 256 transmits a jackpot awarding signal to the center server 200, based on a given condition.

When the winning determining unit 256 determines that the combination of symbols rearranged on the payline 300 relates to a winning, the payout unit 257 awards a benefit to the player according to the combination of symbols arranged on the payline 300. For example, when the combination of symbols arranged on the payline 300 relates to payout of coins, the payout unit 257 pays out to the player a predetermined number of coins according to the combination of the symbols.

The payout unit 257 awards to the player a jackpot prize indicated by the payout signal from the center server 200. A jackpot in this specification is a function of (i) partially accumulating coins consumed by a player of each gaming terminal 10 as a jackpot prize, and (ii) awarding the jackpot prize thus accumulated through a jackpot-award-targeted gaming terminal 10. In each game, the gaming terminal 10 calculates an amount accumulated as a jackpot prize (accumulation amount) and transmits a jackpot signal indicative of the accumulation amount to the center server 200. The center server 200 adds to the jackpot prize the accumulation amount indicated by the jackpot signal received from each gaming terminal 10.

The special game running unit 270 runs the special game under the special game condition informed by the center server 200. In the special game of the present embodiment, a free game is run a predetermined number of times according to the special game condition selected. This free game is runnable simply by an operation of the start button 23.

The effect-use random number sampling unit 258 samples an effect-use random number, based on the symbols determined by the symbol determining unit 254. The effect determining unit 259 determines the effect based on the random number sampled, and controls the video display unit 271 of the display 251, lamp 30 and speaker 29 to provide an effect in the form of video, illumination and sound. Note that the effect-use random number sampling unit 258 may sample the effect use random number based on the special game condition selected by the special game running unit 270.

(Center Server 200)

Center Server 200 has a center controller 280. Further, the center controller 280 has a special game data storage 281, a sub range selecting unit 282 for selecting one of the sub ranges each allotted to one of the special game conditions or "No Special Game", and a jackpot managing unit 283.

The sub range selecting unit 282 determines whether or not a random number signal is received from the gaming terminal 10. When the sub range selecting unit 282 determines that the random number signal is received, the unit 282 selects one of the sub ranges each allotted to one of the different special game conditions or "No Special Game", based on the special game condition data stored in the special game data storage 281. Further, the sub range selecting unit 282 transmits a signal indicating the selected sub range to the gaming terminal 10 having transmitted the random number signal.

The jackpot managing unit 282 accumulatively stores an accumulation amount indicated by the jackpot signal from the gaming terminal 10, as the jackpot prize, and displays the jackpot prize on a later-mentioned jackpot display panel 500. Further, the jackpot managing unit 282 determines whether a jackpot awarding signal is received from the gaming terminal 10. If the unit 282 determines that the jackpot awarding signal is received from the gaming terminal 10, the jackpot managing unit 282 transmits a payout signal indicative of the jackpot prize to the gaming terminal 10 from which the jackpot awarding signal has been transmitted.

(Operation of Gaming Terminal 10)

The following describes an operation of the gaming terminal 10 having the above structure.

First, the gaming terminal 10 checks if any of the bet buttons (1-bet button 26, maximum bet button 27) is pressed by a player. Then, the gaming terminal 10 checks whether the start button 23 is pressed by the player.

Next, when the start button 23 is pressed by the player, the gaming terminal 10 samples a base game random number, and determines, for each video reel 3 displayed on the display 251, symbols 102 to be displayed to the player when scrolling of symbol columns is stopped.

Next, the gaming terminal 10 starts scrolling the symbol columns on the video reels 3, and stops the scrolling so that the symbols 102 thus determined are displayed to the player.

Next, when the scrolling of the symbol columns on the video reels 3 stops, the gaming terminal 10 determines if a combination of symbols rearranged on the later-mentioned payline 300 relates to a winning.

If it is determined that the combination of symbols rearranged on the payline 300 relates to a winning, the gaming terminal 10 awards a benefit to the player according to the combination of symbols rearranged on the payline 300.

Next, based on a predetermined condition, the gaming terminal 10 transmits a jackpot awarding signal to the center server 200, and awards to the player a jackpot prize indicated by a payout signal received from the center server 200 thereafter.

Next, based on a predetermined condition, the gaming terminal 10 transmits to the center server 200 a random number signal indicative of a base game random number sampled by the base game random number sampling unit 253. After that, the gaming terminal 10 runs a special game based on the special game condition associated with the selected sub range indicated by a special game condition signal received from the center server 200. When the combination of symbols rearranged on the payline 300 relates to a winning, the gaming terminal 10 awards a benefit to the player according to the combination of the symbols rearranged on the payline 300.

Further, the gaming terminal 10 is provided with an insurance. Insurance is a function provided for the purpose of salvaging a player when the bonus game is not run for a long period of time. In the present embodiment, whether to activate the insurance is selectable by a player. The insurance is activated in exchange of a predetermined amount of game media for purchasing the insurance. When the insurance is activated, the gaming terminal 10 starts counting the number of games played. When the count of games played reaches a predetermined number of times, the gaming terminal 10 runs a free game set for the insurance.

Note that the gaming terminal 10 may be provided with a mystery bonus, in addition to the benefits described above. Mystery bonus is a predetermined amount of payout awarded to a winner of a special lottery. When the start button 23 is pressed, the gaming terminal 10 samples a random number for a mystery bonus, and determines whether or not a mystery bonus is achieved by means of lottery.

Note that the "special game" is a synonym of "bonus game" and "feature game", in this specification. The bonus game may be any type of game, provided that the bonus game provides more advantageous conditions for player to obtain a benefit, compared to the base game. Another bonus game may be adopted in combination, provided that the player is given a more advantage than the base game in obtaining a benefit. For example, the bonus game may be a game that provides a player with a chance of winning more coins than the base game or a game that provides a player with a higher chance of winning coins than the base game. Alternatively, the bonus game may be a game that consumes less number of coins than the base game. Further, the bonus game may be a game that provides a combination of these and other advantageous conditions to a player.

(Operation of Center Server 200)

The following describes an operation of the center server 200 having the above described structure. First, the center server 200 determines whether a random number signal is received from the gaming terminal 10. When it is determined that the random number signal is received, the center server 200 selects one of the sub ranges each allotted to one of the different special game conditions or "No Special Game", based on the base game random number indicated by the random number signal and the special game condition data. Next, a special game condition signal indicating the sub range selected is transmitted to the gaming terminal 10 from which the random number signal has been transmitted. Further, the center server stores the selected sub range.

Further, the center server 200 determines whether a jackpot awarding signal is received from the gaming terminal 10. If it is determined that the jackpot awarding signal is received, the center server 200 transmits a payout signal indicative of a jackpot prize to the gaming terminal 10 from which the jackpot awarding signal has been transmitted.

Further, the center server 200 accumulatively stores, as a jackpot prize, an accumulation amount indicated by the jackpot signal received from the gaming terminal 10, and displays the jackpot prize on the later-mentioned jackpot display panel 500.

[Overall Structure of Gaming System 1]

Figure 3:
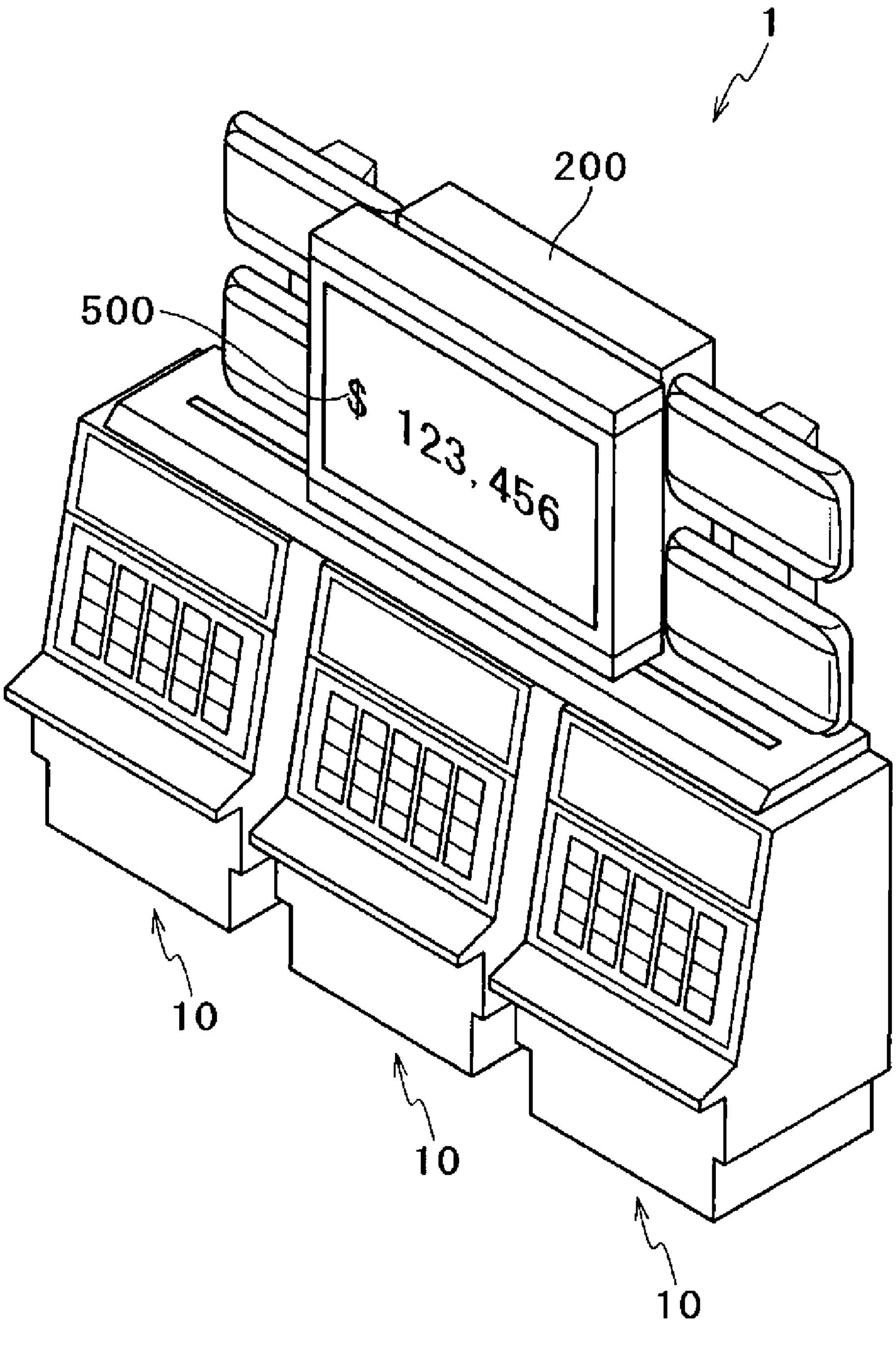
FIG. 3 is a perspective view illustrating an external appearance of the gaming system of the Embodiment 1, according to the present invention.

Next, the following describes an overall structure of the gaming system, with reference to FIG. 3.

As illustrated in FIG. 3, the gaming system 1 includes: gaming terminals 10 each capable of running a game independently of another; a center server 200 connected and in communication with the gaming terminals 10; and a jackpot display panel 500 which displays a jackpot prize.

The center server 200 controls the gaming terminals 10. Each gaming terminal 10 is given a unique identification number. The center server 200 identifies the source of data from any gaming terminal 10, by referring to the identification number. The identification number is also used for designating the destination, when transmitting data from the center server 200 to any gaming terminal 10.

Note that the center server 200 may be built in plural gaming facilities or a single gaming facility such as a casino where various games are provided. Further, when building the center server 200 in a single gaming facility, the center server 200 may be built in each floor or each section of the gaming facility. The communication between the center server 200 and the gaming terminals 10 may be wired or wireless. For example, an exclusive line, switched line, or the like may be adopted.

(Mechanical Structure of Gaming Terminal 10)

Figure 4:
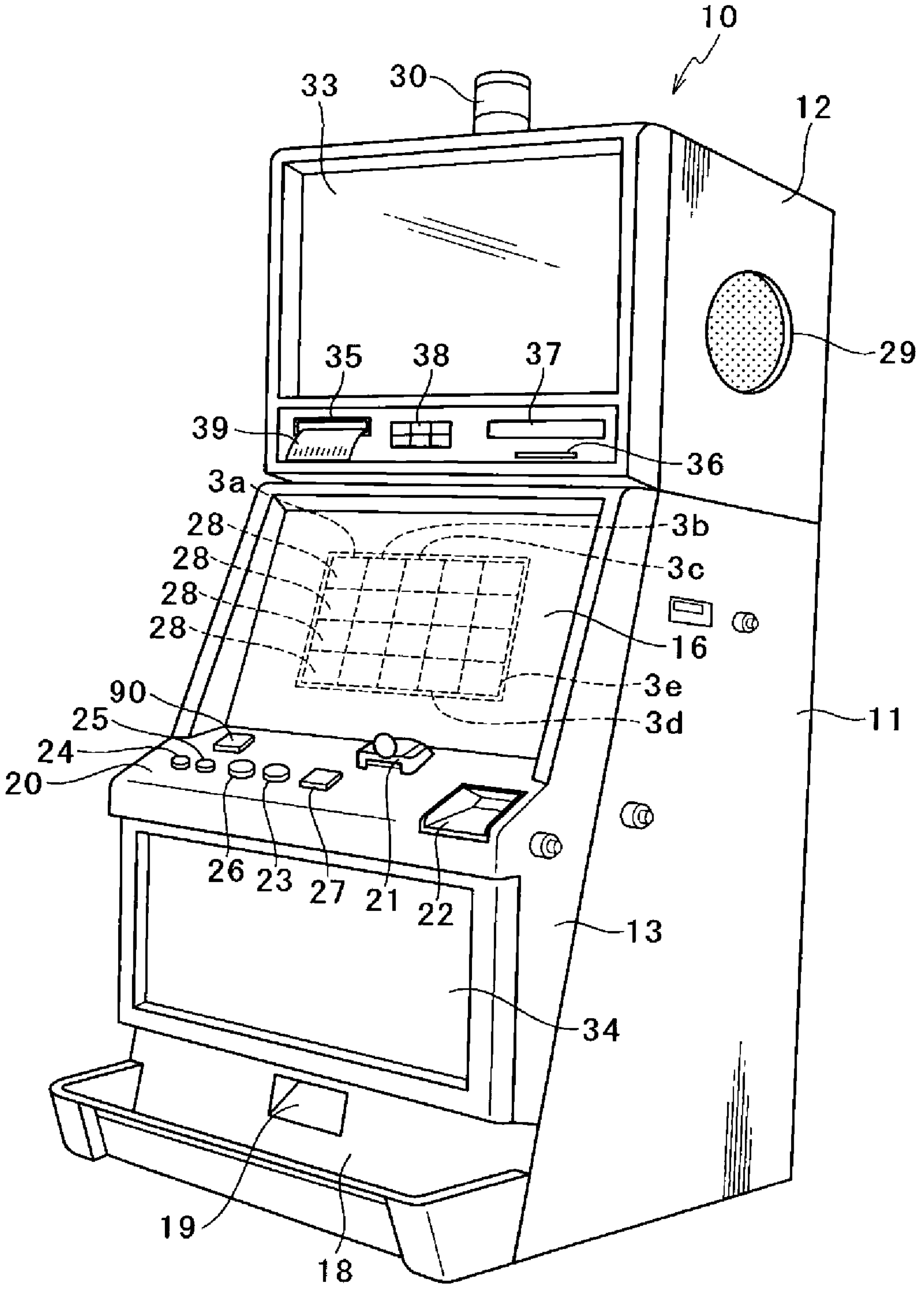
FIG. 4 is a perspective view illustrating an external appearance of a gaming terminal in the gaming system of the Embodiment 1, according to the present invention.

FIG. 4 is a perspective view illustrating an exterior appearance of the gaming terminal of the embodiment according to the present invention. In the gaming terminal 10 is used game medium such as coin, note, or electronic valuable information that equates to coins and notes. Note however that the present invention imposes no particular limitation on the game medium. For example, medal, token, electronic money, or ticket is adoptable. The ticket is not particularly limited, and for example, a later-mentioned barcode-attached ticket or the like is adoptable.

The gaming terminal 10 includes: a cabinet 11, a top box 12 provided above the cabinet 11, and a main door 13 provided on the front surface of the cabinet 11.

The main door 13 has a lower image display panel 16. The lower image display panel 16 is made of a transparent liquid crystal panel, and has display blocks 28 arranged in five columns and four rows. In each display block 28 is arranged a single symbol. Further, four display blocks 28 in each column form a video reel 3 (3*a*, 3*b*, 3*c*, 3*d*, 3*e*). Each video reel 3 is a video image of showing rotation and stopping of a mechanical reel having plural symbols 102 on the outer circumferential surface thereof. The lower image display panel 16 equates to a symbol display device.

Figure 5:
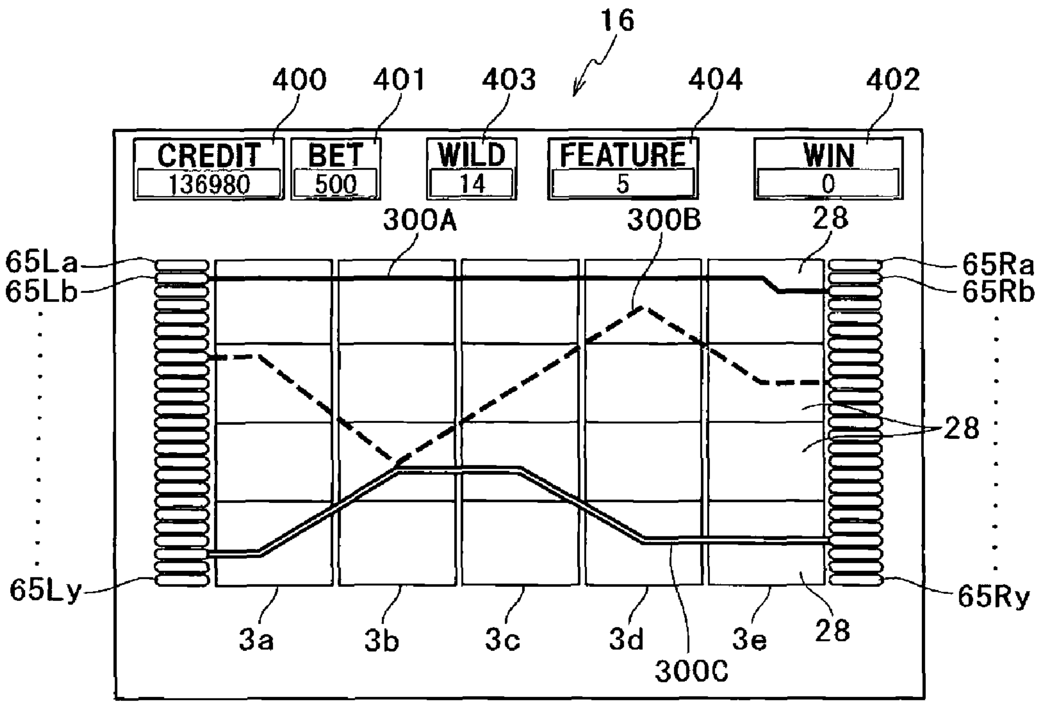
FIG. 5 is an explanatory diagram providing an explanation of paylines displayed on a lower image display panel of the gaming terminal of the Embodiment 1, according to the present invention.

As illustrated in FIG. 5, payline occurrence parts 65 are arranged on the left of the video reel 3*a* and the right of the video reel 3*e* so as to be symmetrical with respect to the video reels 3. On the left of the video reel 3*a* are 25 payline occurrence parts 65L (65La to 65Ly). On the other hand, 25 payline occurrence parts 65R (65Ra to 65Ry) are arranged on the right of the video reel 3*e*. Each payline occurrence part 65L is paired with one of the payline occurrence parts 65R. For each pair of the payline occurrence parts 65L and 65R, there is a prescribed payline 300 which extends from the payline occurrence part 65L to the payline occurrence part 65R paired with that payline occurrence part 65L. The payline 300A extends from the payline occurrence part 65Lb to payline occurrence part 65Rc. The payline 300B extends from the payline occurrence part 65Lh to payline occurrence part 65Rj. The payline 300C extends from the payline occurrence part 65Lw to payline occurrence part 65Rv. Although there are 25 paylines 300, FIG. 5 only shows three paylines 300 for the sake of easier understanding.

When a payline occurrence part 65L and a payline occurrence part 65R are tied, the payline 300 therebetween is active. The payline 300 otherwise is inactive. The number of active paylines 300 is determined base on the bet amount. In cases of MAXBET which is the maximum amount of bet, the maximum number of paylines 300, i.e., 25 paylines 300 are activated. Each active payline 300 forms various winning combinations of symbols 102. The winning combination is detailed later.

The present embodiment deals with a case where the gaming terminal 10 is a so-called video slot machine. However, the gaming terminal of the present invention may adopt a so-called mechanical reel to arrange symbols. Further, although the illustration is omitted, the lower image display panel 16 displays various images related to effect, in addition to those mentioned hereinabove.

Further, a not-shown touch panel 69 is disposed at the front of the lower image display panel 16, and a player is able to input various instructions by operating the touch panel 69. From the touch panel 69, an input signal is transferred to the main CPU 41.

Below the lower image display panel 16 are control panel 20, a coin receiving port 21, and a bill identifier 22. The control panel 20 includes plural buttons 23 to 27 and 90 by which a player is able to input an instruction related to progression of a game. The coin receiving port 21 receives a coin and takes it into the cabinet 11.

The control panel 20 has: a start button 23, a change button 24, a cash-out button 25, a 1-bet button 26, a maximum bet button 27, and an insurance bet button 90. The start button 23 is for inputting an instruction to start scrolling symbols. A change button 24 is used when requesting a gaming facility staff member to exchange money. The cash-out button 25 is for inputting an instruction to pay out credited coins to a coin tray 18.

The 1-bet button 26 is for inputting an instruction to bet a single coin out of the credited coins. The maximum bet button 27 is for inputting an instruction to bet the maximum number of coins bettable in one game (500 coins in this embodiment), out of the credited coins. The insurance bet button 90 is for inputting an instruction of transition from the non-insured mode to the insured mode.

The bill identifier 22 is for validating the legitimacy of a bill input, and takes into the cabinet 11 those recognized as legitimate. The bill identifier 22 may be also capable of reading a barcode on a later-mentioned barcode-attached ticket 39. On the lower front surface of the main door 13, that is, below the control panel 20, there is provided a belly glass 34 with a character or the like of the gaming terminal 10 being drawn thereon.

On the front surface of the top box 12 is an upper image display panel 33. The upper image display panel 33 has a liquid crystal panel, and displays thereon an image or text which provides introduction to the game, the rules of the game, or the like information.

Further, the top box 12 is provided with speakers 29. Below the upper image display panel 33 are a ticket printer 35, a card reader 36, a data displayer 37, and a key pad 38. The ticket printer 35 prints on a ticket a barcode and outputs the ticket as a barcode-attached ticket 39. A barcode is encoded data containing a credit amount, date, an identification number of the gaming terminal 10, or the like. By having another gaming terminal read the barcode-attached ticket 39, a player is able to play a game with that gaming terminal. Further, the ticket 39 can be exchanged with bill or the like at a predetermined location in the gaming facility (e.g. change booth of a casino).

The card reader 36 reads/writes data from/into a smart card. The smart card is carried by a player, and stores therein data for identifying the player, data relating to a history of games played by the player, or the like. The smart card may store data of coins, bill, or a credit card. Further, it is possible to adopt a magnet stripe card instead of the smart card. The data displayer 37 includes a fluorescent display or the like, and displays the data read by the card reader 36 and the data input by the player through the key pad 38. The key pad 38 is for entering instructions or data relating to issuing of a ticket or the like.

(Electric Structure of Gaming Terminal 10)

Figure 6:
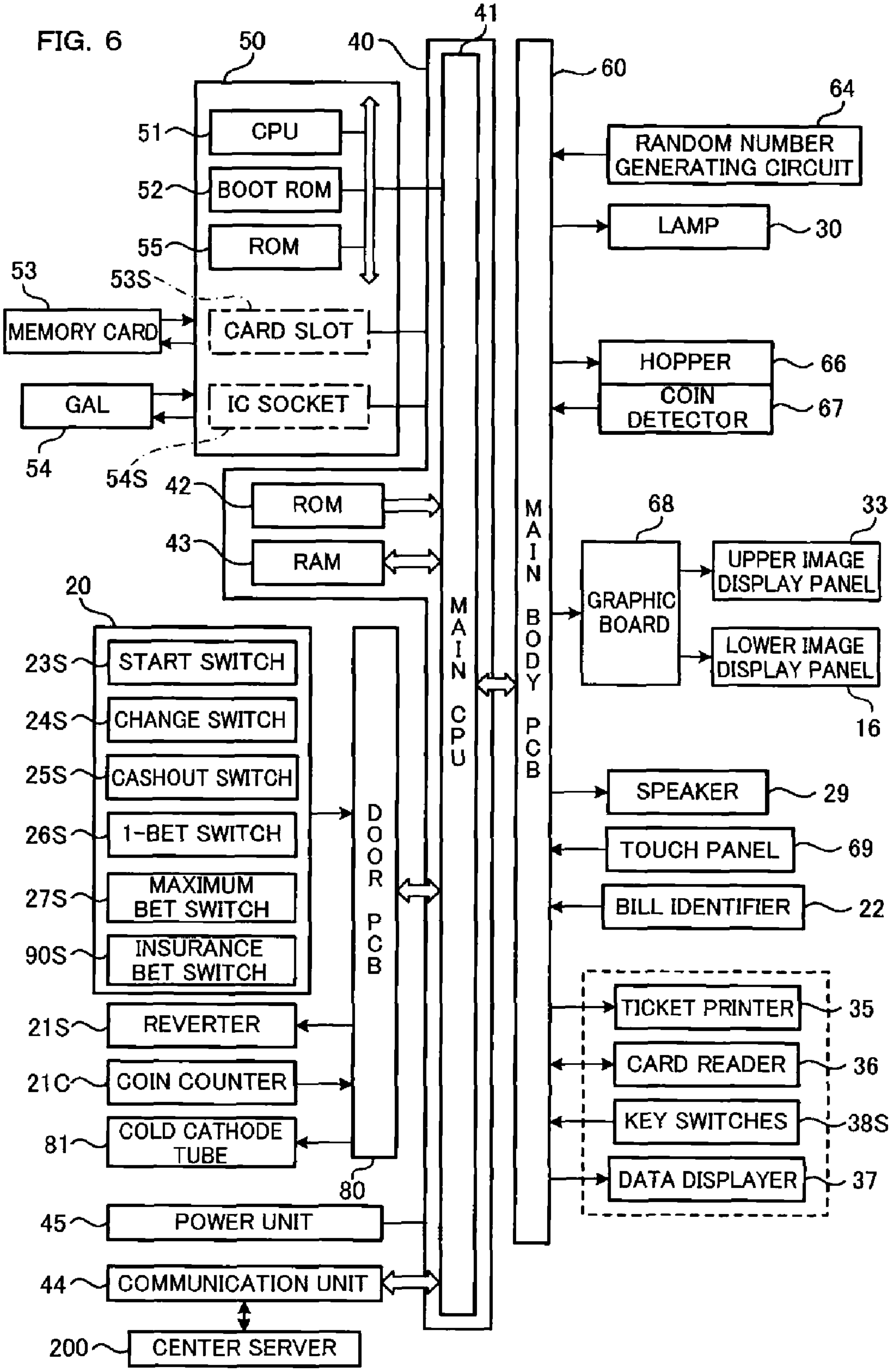
FIG. 6 is a block diagram illustrating an electric structure of the gaming terminal of the Embodiment 1, according to the present invention.

FIG. 6 is a block diagram illustrating an electric structure of the gaming terminal illustrated in FIG. 4. The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 is made of an involatile memory such as a compact Flash® or the like, and stores a game program. The game program includes a symbol determination program. The symbol determination program is a program for determining symbols to be rearranged on the display blocks 28.

The card slot 53S is structured so as to allow the memory card 53 to be attached to or detached from the card slot 53S. This card slot 53S is connected to the motherboard 40 through an IDE bus. Thus, the type and content of a game run by a gaming terminal 10 can be modified by detaching the memory card 53 from the card slot 53S, write a different game program into the memory card 53, and inserting the memory card 53 back into the card slot 53S. The game program includes a program related to a game progress. The game program further includes image data and audio data output during a game. The image data contains data sets of images related to effects of special game such as a special game notifying screen 420 or a bonus screen 421.

The game program includes data of, for example, the following tables: a base game symbol table (see FIG. 8), a payout table (odds data; see FIG. 13), an additional wild symbol count determination table (see FIG. 12), and a symbol column determination table (see FIG. 10), and a free game count determination table (see FIG. 14). The base game symbol table is used when determining symbols 102 for the base game, from which symbols 102 to be rearranged are selected. The payout table indicates a combination of symbol rearranged on a payline 300 and the associated amount of payout.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50. A communication unit 44 is for enabling communication among the gaming terminals 10 through a communication interface.

The motherboard 40 is structured by using a marketed general-purpose motherboard which is a printed circuit board having basic components of a personal computer, and includes: a main CPU 41; a ROM (Read Only Memory) 42; and a RAM (Random Access Memory) 43. The motherboard 40 corresponds to the terminal controller of the present invention.

The ROM 42 is made of a memory device such as a flash memory, and stores permanent data and a program such as BIOS (Basic Input/Output System) which is run by the main CPU 41. Running the BIOS by the main CPU 41 initializes predetermined peripherals and starts loading of a game program in a memory card 53 via the gaming board 50. Note that, in the present invention, the ROM 42 may be rewritable or non-rewritable.

The RAM 43 stores data used during operation of the main CPU 41 and a program such as a symbol determination program. Further, the RAM 43 is capable of storing a game program.

Further, the RAM 43 stores data of a credit amount, and data of an input amount and a payout amount for each game (unit game). Further, the RAM 43 stores data of a special game symbol table (see FIGS. 9A and 9B) or the like. The bonus game symbol table indicates (i) a symbol of a display block forming a symbol column and (ii) a code No. and a random number associated with the symbol.

Further, the RAM 43 has a free game count recording region, a total game count recording region, and a total payout amount recording region, a carried-over special game count recording region, a wild symbol count recording region, and a feature symbol count recording region. In the free game count recording region is stored remaining game count data which indicates a remaining free game count T. In the total game count recording region is stored total game count data indicating a total game count C. The total game count C is the number of base games played after a transition to the insured mode. In the total payout amount recording region is stored total payout amount data indicating a rescue game total payout amount. The rescue game total payout amount is a total of payout amount determined during the rescue game. In the carried-over special game count recording region is data indicating a number S which is the number of times the special game is repeated. In the wild symbol count recording region is stored wild symbol count data indicating the total count of the wild symbols 104. In the feature symbol count recording region is stored feature symbol count data indicating the total count of the feature symbols 100.

Further, the main RAM 43 is provided with a storage region for an insurance flag. Insurance flag is a flag which is activated when the insurance BET button 90 is pressed down. The insurance flag storage region is, for example, a storage region of a predetermined bits, and the insurance flag is turned on and off according to contents of the storage region. The insurance flag in the on state corresponds to the insured mode. The insurance flag in the off state corresponds to the non-insured mode.

The motherboard 40 is connected to a later-mentioned main body PCB (Printed Circuit Board) 60 and a door PCB 80 via a USB. The motherboard 40 is also connected to the power unit 45.

To the main body PCB 60 and door PCB 80 are connected equipment and devices which generate input signals to be input to the main CPU 41 or which are controlled by control signals output from the main CPU 41. The man CPU 41 runs a game program stored in the RAM 43 based on an input signal input to the main CPU 41, thereby storing a result of a predetermined computation in the RAM 43 or transmitting control signals to the equipment and devices to control the same.

To the main PCB 60 are connected: a lamp 30, a hopper 66, a coin detector 67, a graphic board 68, a speaker 29, a touch panel 69, a bill identifier 22, a ticket printer 35, a card reader 36, a key switches 38S, a data displayer 37, and a random number generating circuit 64. The lamp 30 flashes in a predetermined pattern, based on a control signal output from the main CPU 41. The random number generating circuit 64 corresponds to a random number sampling device of the present invention.

The hopper 66 is installed inside the cabinet 11, and outputs a predetermined number of coins from the coin payout port 19 to the coin tray 18, based on a control signal output from the main CPU 41. The coin detector 67 is provided inside the coin payout port 19, and outputs an input signal to the main CPU 41 when detecting that a predetermined number of coins are output from the coin payout port 19.

The graphic board 68 controls image displaying on the upper image display panel 33 and the lower image display panel 16, based on a control signal output from the main CPU 41. On the display blocks 28 of the lower image display panel 16 are displayed symbols to be scrolled and stopped. The credit amount display unit 400 of the lower image display panel 16 displays thereon a credit amount stored in the RAM 43. Further, the bet amount display unit 401 of the lower image display panel 16 displays the number of coins bet. Further, the payout display unit 402 of the lower image display panel 16 displays the number of coins paid out. The graphic board 68 has a VDP (Video Display Processor) which generates image data based on control signal output from the main CPU 41, a video RAM which temporarily stores image data generated by the VDP, or the like. The image data used at the time of generating image data by the VDP is in a game program which is read out from the memory card 53 and stored in the RAM 43.

The bill identifier 22 validates whether a bill is legitimate, and only receives a legitimate bill into the cabinet 11. The bill identifier 22, when receiving a legitimate bill, outputs an input signal indicating the value of the bill to the main CPU 41. The main CPU 41 stores in the RAM 43 a credit amount corresponding to the value of the bill indicated by the input signal.

Based on a control signal from the main CPU 41, the ticket printer 35 prints on a ticket a barcode and outputs the ticket as a barcode-attached ticket 39. The barcode is encoded data containing the credit amount stored in the RAM 43, date, and the identification number of the gaming terminal 10. The card reader 36 reads out data from a smart card and transmits the data to the main CPU 41, or writes data into a smart card based on a control signal from the main CPU 41. The key switches 38S are provided to the key pad 38, and transmit a predetermined input signal to the main CPU 41 when a player operates the key pad 38. The data displayer 37 displays data read out by the card reader 36 based on a control signal from the main CPU 41, or data input by the player through the key pad 38.

The random number generating circuit 64 generates a random number at a predetermined timing. Note that random numbers generated by the random number generating circuit 64 ranges from 0 to 65535.

The door PCB 80 is connected to a control panel 20, a reverter 21S, a coin counter 21C and a cold cathode tube 81. The control panel 20 is provided with a start switch 23S corresponding to the start button 23, a change switch 24S corresponding to the change button 24, a cash-out switch 25S corresponding to a cash-out button 25, a 1-bet switch 26S corresponding to the 1-bet button 26, a maximum bet switch 27S corresponding to the maximum bet button 27, and an insurance bet switch 90S corresponding to the insurance bet button 90. Each of the switches 23S to 27S and 90S outputs an input signal to the main CPU 41 when corresponding one of the buttons 23 to 27 and 90 is operated by a player.

The coin counter 21C is provided inside the coin receiving port 21, and validates whether a coin input by a player to the coin receiving port 21 is legitimate coin. Any non-legitimate coin is output from the coin payout port 19. Further, the coin counter 21C, when detecting a legitimate coin, outputs an input signal to the main CPU 41.

The reverter 21S operates based on a control signal from the main CPU 41, and delivers coins that are recognized as legitimate by the coin counter 21C into a not-shown cash box or hopper 66 in the gaming terminal 10. That is, when the hopper 66 is full of coins, legitimate coins are delivered by the reverter 21S to the cash box. On the other hand, if the hopper 66 is not full of coins, legitimate coins are delivered to the hopper 66. The cold cathode tube 81 functions as a back light disposed at the back sides of the lower image display panel 16 and the upper display panel 33. This cold cathode tube 81 lights based on a control signal output from the CPU 41.

(Electric Structure of Center Server 200)

Figure 7:
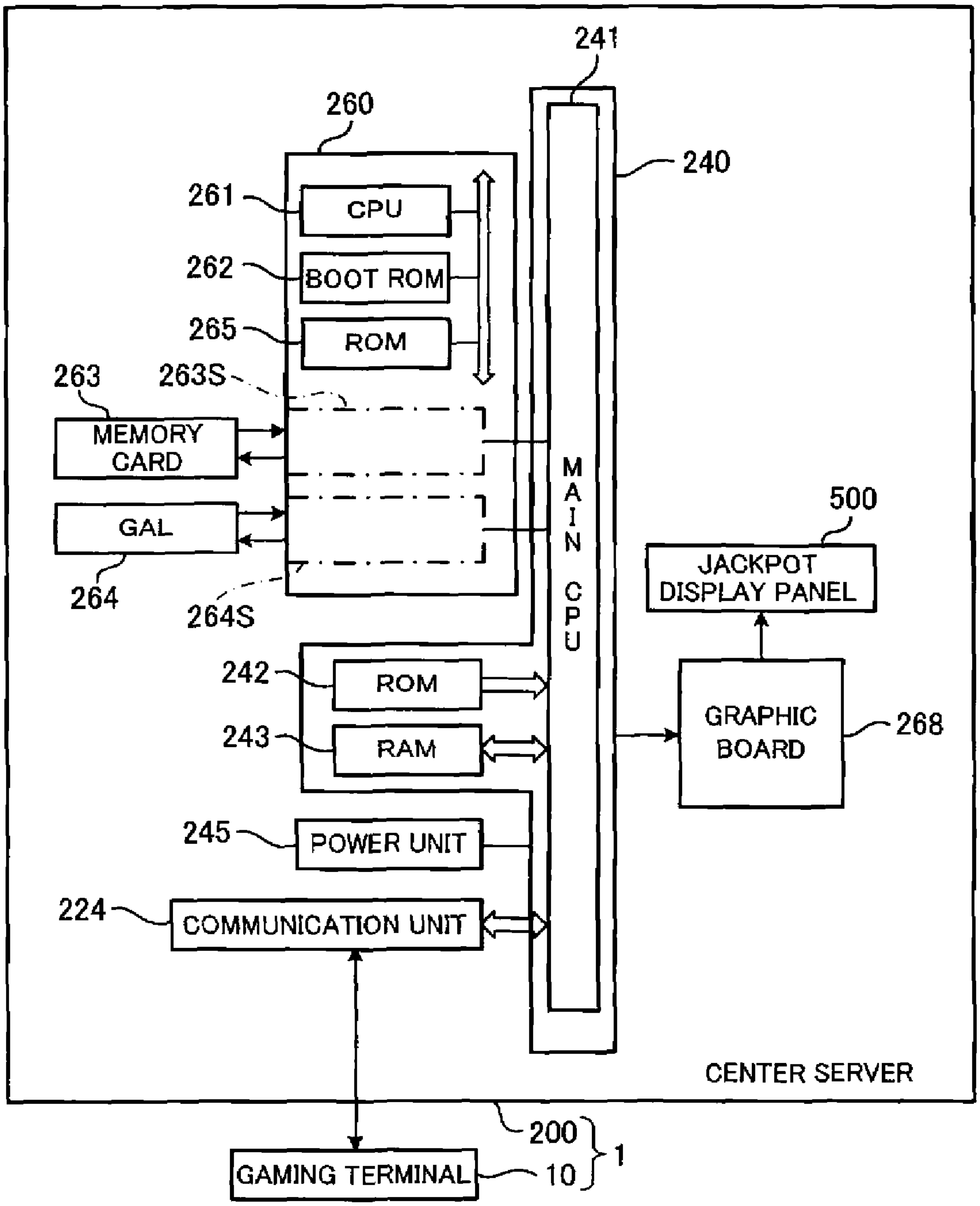
FIG. 7 is a block diagram illustrating an electric structure of a center server of the Embodiment 1, according to the present invention.

FIG. 7 is a block diagram illustrating an electric structure of the center server 200. The center server 200 is provided therein with a control unit. As illustrated in FIG. 7, the control unit has a motherboard 240, a gaming board 260, an actuator, or the like. The motherboard 240 corresponds to the center controller of the present invention.

The gaming board 260 has the same structure as that of the above-mentioned gaming board 50. The motherboard 240 has the same structure as that of the above-mentioned motherboard 40. A communication unit 244 is for enabling communication among the gaming terminals 10 through a communication interface.

The graphic board 268 has the same structure as that of the above-mentioned graphic board 68, except in that the graphic board 268 controls displaying of an image on the jackpot display panel 500 based on a control signal output from the main CPU 241. Note that the present embodiment deals with a case where the jackpot display panel 500 is provided to the center server 200; however the present invention is not limited to this. The jackpot display panel 500 may be provided to each gaming terminal 10. The RAM 243 stores a special game condition data table (see FIG. 15), a total count of base games run in the plural gaming terminals 10 connected to the center server 200, how many times each sub range allotted to a special game condition has been selected, a jackpot prize, or the like. The RAM 243 corresponds to data storage device and selection storage device of the present invention.

The ROM 242 stores a special game condition basic data table (see FIG. 16), allocation number reduction table (see FIG. 17) or the like.

(Symbols, Combinations, or the Like)

The symbols 102 displayed on the video reels 3 of the gaming terminal 10 form symbol columns each including plural symbols 102. Each symbol 102 forming a symbol column is given any of the code Nos. 0 to 19 or more, as shown in FIGS. 8, 9A, and 9B. Each symbol column has a combination of symbols 102 which are: "WILD", "FEATURE", "A", "Q", "J", "K", "9", "10", "CLUB", "RHINO", "REINDEER", and "BUFFALO". Note that the symbol "WILD" is a wild symbols 104. The wild symbol is a symbol substitutable for any symbol 102.

Any four consecutive symbols 501 of a symbol column are displayed (arranged) in the display blocks 28 at the uppermost stage, upper stage, lower stage, and lowermost stage of the corresponding one of the five video reels 3*a* to 3*e*, respectively, thereby forming a symbol matrix of five columns and four rows. Symbols 102 forming a symbol matrix are scrolled at least when the start button 23 is pressed to start a game. The scrolling of the symbols 102 stops (symbols 102 are rearranged), when a predetermined period elapses after the start of scrolling.

Further, for each symbol 102, various winning combinations are set beforehand. Each winning combination means a winning is achieved. A winning combination is a combination of symbols 102 stopped on the payline 300, which is advantageous for a player to obtain a benefit. The wording "advantageous" means, for example, a predetermined number of coins according to the winning combination are paid out; the number of coins to be paid out is added to the credit, a starting of the process of selecting one of the sub ranges each allotted to one of the different special game conditions or "No Special Game".

In the present embodiment, a winning combination is a combination of symbols 102 which is rearranged on an activated payline 300 and includes a predetermined number of at least one of the following symbols 102: "WILD", "FEATURE", "A", "Q", "J", "K", "10", "9", "CLUB", "REINDEER", "RHINO", "and "BUFFALO". When a predetermined type of symbols 102 is set as a scatter symbol, a winning combination is regarded as to be formed if a predetermined number or more of scatter symbols are rearranged, irrespective of the activation/inactivation status of the paylines 300.

Specifically, formation of a winning combination with the feature symbol 100 "FEATURE" on a display block 28 triggers the process of selecting one of the sub ranges each allotted to one of the different special game conditions or "No Special Game". The paying out process is detailed later with reference to the payout table of FIG. 13.

[Data Tables of Gaming Terminal 10]

Next, the following describes data tables stored in the gaming terminal.

(Base Game Symbol Table)

FIG. 8 shows a table used for determining symbols 102 to be rearranged during a base game. The base game symbol table indicates a symbol 102 on a display block 28 in the first row of a symbol column, a code No. associated with the symbol 102, and a random number range associated with the code No. The random number range is one of twenty ranges covering random numbers 0 to 65535 sampled by the random number generating circuit 64.

Note that the above numbers may be equally divided into twenty ranges or unequally divided into twenty ranges. The latter case enables adjustment of a winning possibility for each symbol 102 by adjusting the associated range of random numbers. Further, the range of random numbers associated with "FEATURE" serving as the feature symbol 100 or "WILD" serving as a wild symbol 104, may be narrower than ranges of random numbers associated with other symbols 101. This allows easier adjustment of winning or losing, by adjusting the possibility of winning a valuable symbol 102.

For example, a number "10000" is sampled by the random number generating circuit 64 as a random number for the first column, the symbol "J" whose code No. "3" is associated with a range of random numbers including "10000" is selected as a symbol to be rearranged in the first row of the first video reel 3*a*. This code No. 3 is used as the reference for determining the symbols to be rearranged for the second row and the subsequent rows of the video reel 3*a* at the first column. That is, a symbol "Q" whose code No. is "4" is selected for the second row, "REINDEER" whose code No. is "5" is selected for the third row, and "A" whose code No. is "6" is selected for the fourth row.

(Special Game Symbol Table)

FIGS. 9A and 9B are tables each for use at the time of determining symbols 102 to be rearranged during a special game. The special game symbol table stores a symbol 501 of a display block 28 of a symbol column, a code No. associated with the symbol 102, and a random number range associated with the code No. The random number range is one of ranges covering random numbers 0 to 65535 sampled by the random number generating circuit 64. These numbers 0 to 65535 are divided into the random number ranges as is the case of the base game symbol table.

Further, in the special game symbol table, the wild symbol 104 is added or replaces another symbol 102. The wording "replace" means that new symbol data is written over already existing symbol data. The number of additional symbols or the number of symbols replacing the other symbols, or the symbol column in which the addition or replacement takes place may be randomly determined or determined beforehand. When symbol data is replaced with another set of symbol data, an image based on the overwritten data (replacement data) may be displayed, in place of a symbol 501 having been stopped and displayed.

In the present embodiment, the number of symbols to be added or replaced and the symbol column in which the addition or replacement of the symbols takes place are determined based on the additional wild symbol count determination table of FIG. 12, and a player's selection of selectable images 302 on the wild symbol count increasing screen. Note that the present embodiment deals with a case where it is the wild symbol 104 which is subjected to addition or replacement; however, the present invention is not limited to this. For example, it is possible that the feature symbol 100 is the symbol which is added or replaces another symbol.

For example, in the special game symbol table of the FIGS. 9A and 9B, three wild symbols 104 are added to the first symbol column, one for the second symbol column, and two for each of the third, fourth and fifth symbol columns. Note that the present embodiment may include a symbol column only including the wild symbols 104. In that case, a player is encouraged by having a feeling that a wild symbol 104 is always selected through the random selection in that symbol column.

(Symbol Column Determination Table)

FIG. 10 illustrates a symbol column determination table used at the time of determining a symbol column, out of the symbol columns (L1) to (L5), in which addition of or replacement with the wild symbols 104 takes place. The symbol column determination table stores a symbol column No., and a random number range associated with the column No. The random number range is one of ranges covering random numbers 0 to 65535 sampled by the random number generating circuit 64. The symbol column No. L1 corresponds to the first column of the display blocks 28; the symbol column No. L2 to the second column of the display blocks 28; the symbol column No. L3 to the third column of the display blocks 28; the symbol column No. L4 to the fourth column of the display blocks 28; and the symbol column No. L5 to the fifth column of the display blocks 28.

The present embodiment deals with a case where an increase in the number of wild symbols 104 or the number of wild symbols 104 to replace the other symbols is determined for each symbol column based on the random number sampled and the symbol column determination table. The present invention however is not limited to this. For example, an increase in the number of wild symbols 104 or the number of wild symbols 104 to replace the other symbols may be determined in advance for each symbol column. Further, an increase in the number of wild symbols 104 or the number of wild symbols 104 to replace the other symbols may be determined for each type of the wild symbols 104.

(Code No. Determination Table)

FIG. 11 shows a code No. determination table. The code No. determination table stores a code No., and a random number range associated with the code No. The random number range is one of ranges covering random numbers 0 to 65535 sampled by the random number generating circuit 64. For example, when the random numbers for the first symbol column No. L1 are 40567, 63535, 65323, then "12", "end", and "end" are selected as the code Nos., respectively.

The present embodiment deals with a case where the code Nos. of wild symbols 104 to be increased is determined for each of the symbol columns based on the random numbers sampled by the random number generating circuit 64 and code No. determination table. The present invention however is not limited to this. For example, the code No. of a wild symbol 104 to be increased may be set in advance for each symbol column.

(Additional Wild Symbol Count Determination Table)

FIG. 12 shows an additional wild symbol count determination table. The additional wild symbol count determination table stores a list of increases in the number of the wild symbols and random number ranges respectively associated with the increases. The random number range is one of ranges covering random numbers 0 to 65535 sampled by the random number generating circuit 64. The list of increases in the number of wild symbols includes five numbers: "10", "30", "50", "70", and "90". For example, when the random number sampled by the random number generating circuit 64 is 17235, the additional wild symbol count selected is "30". Note that the list of increases in the number of wild symbols is not particularly limited provided that the list includes more than one integers of 1 or greater. Further, the list of increases may be variable at a predetermined timing; e.g. at every unit game.

(Payout Table)

FIG. 13 is a payout table for managing payout awarded based on the winning combination. This payout table stores information of payouts and the associated winning combinations. For example, a payout corresponding to a winning combination including three "10" on a payline 300 is "100". A payout corresponding to a winning combination including five "BUFFALO" on a payline 300 is "5000". Further, rearrangement of five "FEATURE" on a payline 300 awards a jackpot prize to the player. Further, rearrangement of three or more "FEATURE" on a payline 300 triggers a later-mentioned special game running process. Note that the setting of payouts for the base game is the same as that of the free game; however, the present invention is not limited to this. That is, the setting of payouts may be different between the base game and the free game.

(Free Game Count Determination Table)

FIG. 14 is a diagram showing a free game count determination table for use at the time of determining the number of free games repeated in a special game on the basis of the special game condition indicated by the special game condition signal received from the center server 200. The free game count determination table includes a list of special game conditions. With each condition, a number by which the free game is repeated is associated. For example, when the special game condition is "Grand Chance", the free game is run 30 times. As illustrated in FIG. 14, the number of times the free game is repeated is the greatest when the special game condition is "Grand Chance", followed by "Major Chance", and "Minor Chance". The number of times the free game is repeated is the smallest when the special game condition is "Mini Chance". Likewise, of the special game conditions, "Grand Chance" is associated with the highest average payout, followed by "Major Chance", and "Minor Chance". The average payout associated with "Mini Chance" is the smallest among the special game conditions.

[Data Tables of Center Server 200]

Next, the following describes data tables stored in the center server.

(Special Game Condition Data Table)

FIG. 15 is a diagram illustrating a special game condition data table used at a time of selecting one of the sub ranges each allotted to one of the different special game conditions or "No Special Game". The special game condition data table corresponds to the special game condition data of the present invention. The special game condition data table stores special game conditions and "No Special Game", in association with columns of bet amount ranges each of which covering plural bet amounts that could be placed by a player in the base game, random number ranges, and the number of times each special game condition has been selected. Each of the random number range is one of ranges which cover a range of random numbers 0 to 65535 which are the same range as that sampled by the random number generating circuit 64. For example, when a random number "22000" is sampled and the amount of bet in the base game falls within a range of 0 to 49, "No Special Game" associated with a random number range including "22000" is selected. Similarly, when the amount of bet placed falls within a range of 50 to 149, "Mini Chance" is selected. When the amount of bet placed falls within a range of 150 to 299, "No Special Game" is selected. When the amount of bet placed falls within a range of 300 to 499, "Major Chance" is selected. When the amount of bet placed in the base game is 500 (i.e. MAX bet), "Major Chance" is selected.

In the special game condition data table, the range of random numbers allotted to each special game condition (i.e. a count of random numbers allotted to each special game condition; hereinafter, allocation number) is greater for the bet amount range covering larger bet amounts in the base game. For example, when the special game condition is "Grand Chance" and an amount of bet placed by the player in the base game falls within a bet amount range of 0 to 49, the associated random numbers range from 0 to 299. Therefore, the allocation number is 300. Similarly, when an amount of bet falls within the bet amount range of 50 to 149, the allocation number is 600. When an amount of bet falls within the bet amount range of 150 to 299, the allocation number is 900. When an amount of bet falls within the bet amount range of 300 to 499, the allocation number is 1200. When an amount of bet is the maximum bet (i.e. 500), the allocation number is 1500. As described, the sub ranges each allotted to the special game conditions are varied according to an amount of bet placed by a player in the base game. This draws more attention of the player to the special game.

Further, in the special game condition data, no sub range is allotted to "No Special Game" of the special game, when the maximum bet (i.e. 500) is placed by the player. In other words, placing the maximum bet (i.e. 500) will eliminate the chance of having the sub range allotted to "No Special Game" selected in the process of selecting one of the sub ranges each allotted to one of the different special game conditions or "No Special Game". Thus, when the amount of bet placed by the player in the base game is the maximum bet acceptable in the base game, the sub ranges are varied so that the sub range allotted to "No Special Game" covers no values. Therefore, the sub range allotted to "No Special Game" will not be selected in the process of selecting the sub range. This encourages players to place the maximum bet amount in the base game, increase the profit of the hall, and draws more attention of players to the special game as compared with the case of known gaming systems.

The special game condition data table of the present embodiment includes five columns for five ranges of bet amounts that could be placed by a player in the base game. The present invention however is not limited to this. For example, the table may include columns for respective bet amounts.

Further, in the present embodiment, the ranges of random numbers (i.e. sub ranges) respectively associated with the special game conditions are widened for a bet amount range covering larger bet amounts placed by a player in the base game. The present invention however is not limited to this. For example, it is possible that only the sub range allotted to "Grand Chance" is widened.

Note that the special game condition data table is updated based on the special game condition basic data table of FIG. 16, the counts of special games previously played, the counts of base games previously played, and the allocation number reduction table of FIG. 17. Note that the counts of special games previously played are a value of 0 or greater, which is counted up by every time one of the special game conditions is selected. The value is counted down by one when the total of base games run in the gaming terminals 10 connected to the center server 200 reaches 1000.

(Special Game Condition Basic Data Table)

FIG. 16 shows the special game condition basic data table. The special game condition basic data table stores the special game conditions and "No Special Game", in association with columns of bet amount ranges each of which covering plural bet amounts that could be placed by a player in the base game, random number ranges, and allocation numbers respectively associated with the random number ranges. Each of the random number range is one of ranges covering random numbers 0 to 65535 sampled by the random number generating circuit 64. In the special game condition basic data table, the allocation number is smaller for a special game condition associated with a larger average payout. Take the bet amount range of 0 to 49 bet, for example. The allocation numbers of the "Grand Chance", "Major Chance", "Minor Chance", "Mini Chance", are 1300, 2600, 3900, and 5200, respectively.

(Allocation Number Reduction Table)

FIG. 17 shows allocation number reduction table for use at the time of reducing the allocation number associated with a special game condition (narrowing the associated random number range) in the special game condition basic data table, according to the number of times the special game condition being selected. The allocation number reduction table stores special game conditions, and bet amount ranges covering the possible bet amounts that can be placed by a player in the base game, and allocation number reduction amounts associated with the special game conditions. Each of the allocation number reduction amounts is a number by which the allocation number is reduced according to the number of times the special game condition being selected. For example, when "Major Chance" has been selected only once, and the amount of bet falls within the bet amount range of 0 to 49, the allocation number is reduced by 500. For example, when "Major Chance" has been selected twice, and the amount of bet falls within the bet amount range of 0 to 49, the allocation number is reduced by 1000 (i.e. 2×500).

(Updating of Special Game Condition Data Table)

The following describes updating of the special game condition data table with reference to FIG. 18. Note that the following deals with a case of "Grand Chance". FIG. 18 shows transition of the allocation number associated with "Grand Chance". First, when "Grand Chance" of the special game condition data table has not yet selected, the allocation number for "Grand Chance" is the same as that of the special game condition basic data table. Next, when "Grand Chance" is selected for the first time, the number of times "Grand Chance" being selected is 1, and the allocation number for the "Grand Chance" in the special game condition data table is reduced according to the allocation number reduction table. For example, when a bet amount falls within the bet amount range of 0 to 49, the allocation number 1300 is reduced by 1000 and is 300. Thus, the associated random number range covers 0 to 299 as indicated in the special game condition data table of FIG. 15.

Next, when the "Grand Chance" is selected for the second time and the base game has been played at least 500 times in gaming terminals 10 connected to the center server 200 between the first and second "Grand Chance", the number of times "Grand Chance" being selected is 2, and the allocation number for the "Grand Chance" in the special game condition data table is reduced according to the allocation number reduction table. Note that when the allocation number associated with a special game condition in the special game condition data table is less than the number of allocation number to be subtracted, the allocation number is reduced to 0. For example, when the number of times "Grand Chance" being selected is 2 and an amount of bet falls within the bet amount range of 0 to 49, the allocation number is 0.

Next, when the number of base games played in the plural gaming terminals 10 connected to the center server 200 reaches 1000 after "Grand Chance" is selected, the allocation number of "Grand Chance" in the special game condition data table is count down from 2 to 1 which is the value of when "Grand Chance" has been selected once. For example, when an amount of bet falls within the bet amount range 0 to 49, the allocation number 1300 is reduced by 1000 and is 300. Thus, the associated random number range covers 0 to 299 as indicated in the special game condition data table of FIG. 15.

Next, when the number of base games played in the plural gaming terminals 10 connected to the center server 200 reaches 1000 after "Grand Chance" is selected for the second time, the allocation number of "Grand Chance" of the special game condition data table is count down from 1 to 0 which is the same as the value in the special game condition basic data table.

With the center server 200 collectively managing the special game condition data table of the gaming terminals 10 as mentioned above, the sub ranges each allotted to the special game conditions or "No Special Game" are easily modifiable. This enables adjustment of the amount of game media paid out to a player of any gaming terminal 10 connected to the center server 200.

Note that in the present embodiment, the number of times each sub range allotted to a special game condition being selected is reduced when the number of base games played in the plural gaming terminals 10 connected to the center server 200 reaches 1000. The present invention however is not limited to this, and the number of times may be reduced upon elapse of a predetermined time after one of the special game condition is selected.

(Display States)

The following describes exemplary display states of the lower image display panel 16 during operation of the gaming terminal 10.

(Base Game Screen: During Game)

Figure 19:
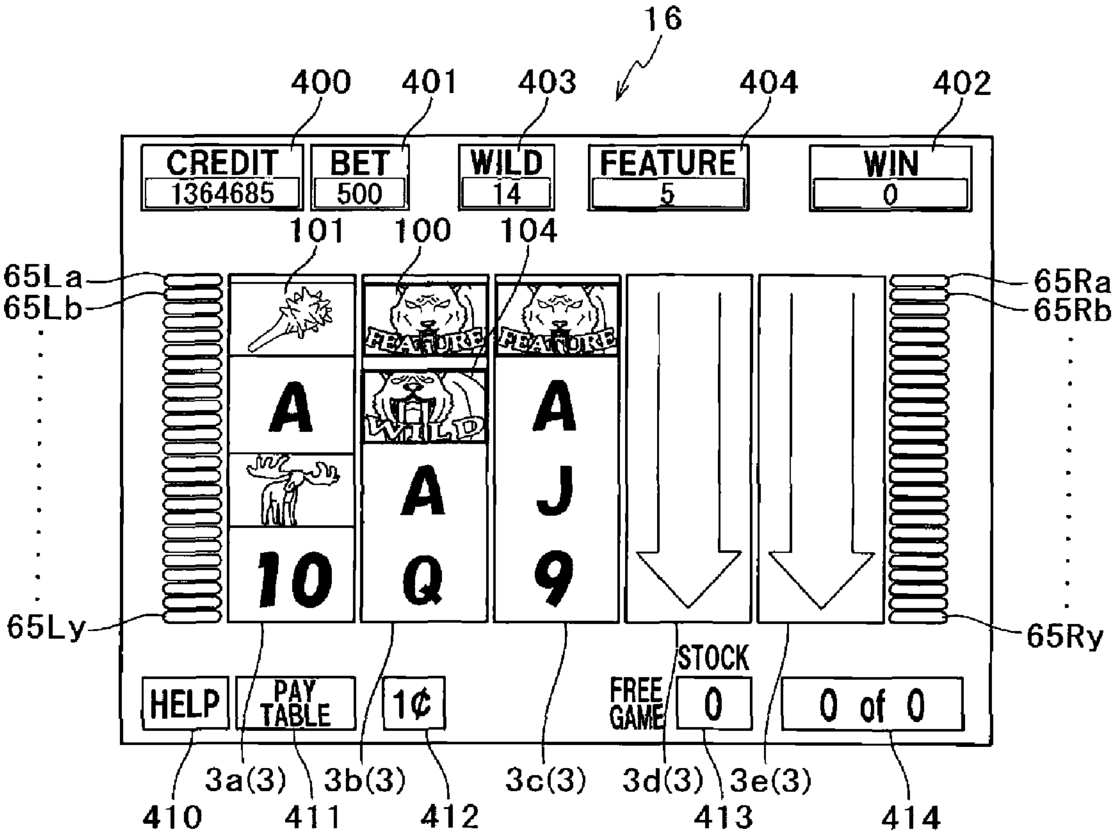
FIG. 19 shows an exemplary screen of the base game displayed on the lower image display panel of the gaming terminal of the Embodiment 1, according to the present invention.

FIG. 19 illustrates an exemplary base game screen which is a screen displayed on the lower image display panel 16 during the base game.

Specifically, the base game screen is arranged in the center of the lower image display panel 16, and includes five video reels, and payline occurrence parts 65 respectively arranged on the left of a video reel 3*a* and the right of the video reel 3*e* so as to be symmetrical to each other. Note that FIG. 19 illustrates a base game screen in which the first to third video reels 3*a* to 3*c* are stopped and the fourth and fifth video reels 3*d* and 3*e* are scrolling.

Above video reels 3 are: credit amount display unit 400, a bet amount display unit 401, a wild symbol count display unit 403, a feature symbol count display unit 404, and a payout display unit 402. These units 400, 401, 403, 404, and 402 are sequentially arranged in this order from the left side to the right side of the player.

The credit amount display unit 400 displays a credit amount. The bet amount display unit 401 displays a bet amount in a unit game in progress. The wild symbol count display unit 415 displays the number of wild symbols 104 in a unit game in progress. With this, it is possible to notify the player beforehand that there are fourteen wild symbols 104 in the base game. The feature symbol count display unit 404 displays the number of feature symbols 100 in a unit game in progress. With this, it is possible to notify the player that there are five feature symbols 100 in the base game. The payout display unit 402 displays the number of coins to be paid out when a winning combination is achieved.

Below the video reels 3 are: a help button 410; a paytable button 411; a bet unit display unit 412; a stock display unit 413; and a free game count display unit 414. These units 410, 411, 412, 413, 414 are sequentially arranged in this order from the left side to the right side of the player.

The help button 410, when pressed by a player, activates a help mode. The help mode provides a player with information to solve his/her problem regarding the game. The paytable button 411, when pressed by a player, activates a payout display mode in which an amount of payout is displayed. The payout display mode displays an explanatory screen indicating relation of a winning combination to the odds.

The bet unit display unit 412 displays a bet unit (payout unit) at the current point. With the bet unit display unit 412, the player is able to know that, for example, the minimum game value required for participating in a unit game is one cent, and that s/he is able to raise his/her bet in increments of one cent.

The stock display unit 413 displays the number of special games carried over (stocked special game count). The "number of special games carried over" indicates the remaining number of times the later-mentioned special game running process is performed after an end of a special game, special game running process selecting one of the sub ranges each allotted to one of the different special game conditions or "No Special Game". That is, when the stock display unit 413 displays "3", the special game running process is performed three times consecutively after the end of the special game in progress. Note that "0" is displayed during the base game.

The free game count display unit 414 displays the total number of times the free game is to be repeated, and the number of free game having already been played. That is, when the free game count display unit 414 displays "0 OF 0", the total number of free games is 0; that is, a free game is not running. Further, when the free game count display unit 414 displays "5 OF 10", the total number of free games in the special game is ten, and the current game in progress is the fifth free game.

(Base Game Screen: Special Game Trigger)

Figure 20:
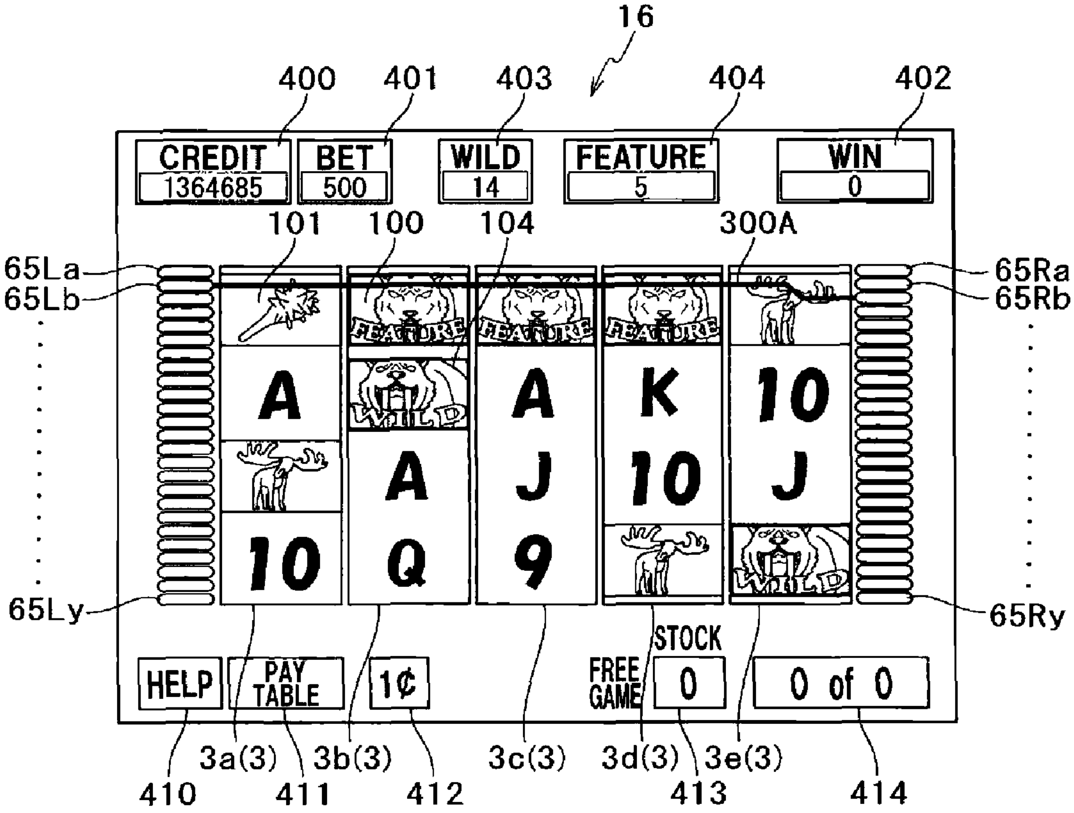
FIG. 20 shows an exemplary screen of the base game displayed on the lower image display panel of the gaming terminal of the Embodiment 1, according to the present invention.

FIG. 20 shows the base game screen indicating there is established a special game trigger for the process of selecting one of the sub ranges each allotted to one of the different special game conditions or "No Special Game". Specifically, in the base game screen, three feature symbols 100 are rearranged on the payline 300, thus establishing the special game trigger. The feature symbol 100 preferably has a readable text such as "FEATURE", so as to have a player clearly understand the symbol relates to a bonus game, a special game trigger, or the like.

(Special Game Notifying Screen Displayed during Base Game)

Figure 21:
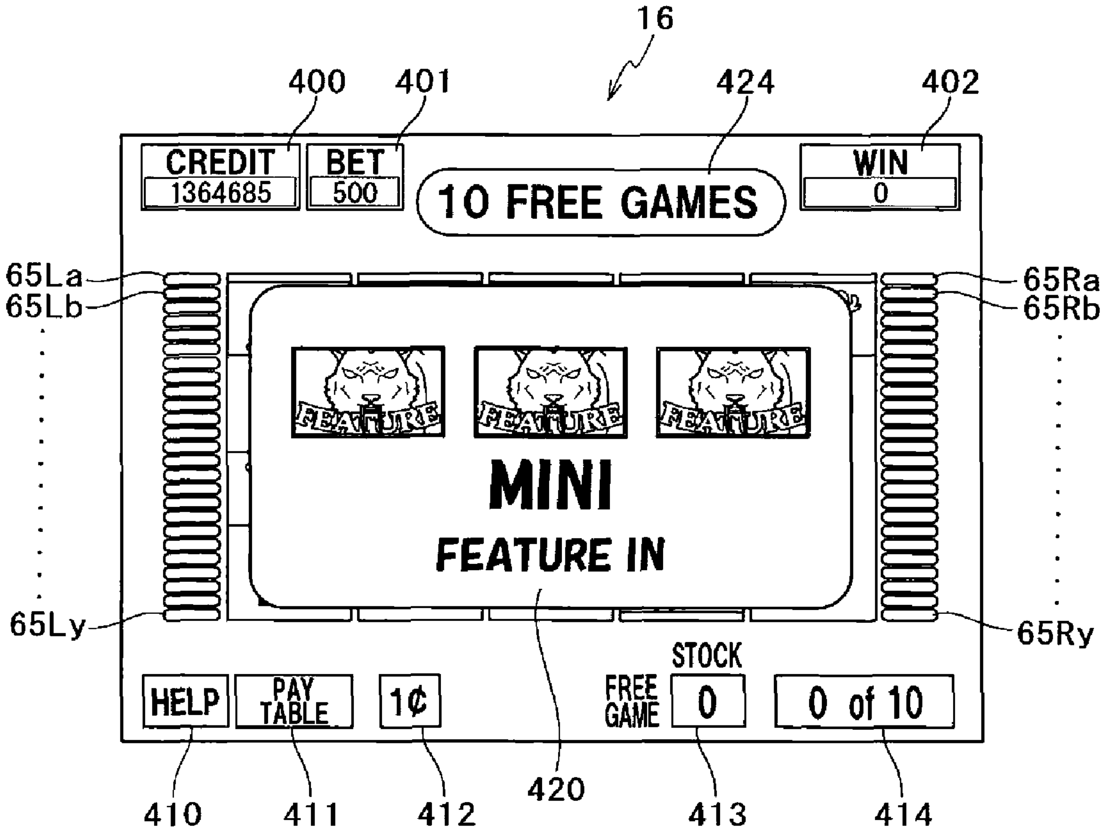
FIG. 21 shows an exemplary screen of the base game displayed on the lower image display panel of the gaming terminal of the Embodiment 1, according to the present invention.

FIG. 21 illustrates the lower image display panel 16 when a special game condition is selected. Specifically, the special game notifying screen 420 and a free game count indicating screen 424 are pop-up displayed. The special game notifying screen 420 notifies that the special game will be run, and notifies which special game condition is selected. The free game count indicating screen 424 indicates the number of free games set for the special game condition selected. Then, at the same time or immediately after the displaying of the special game notifying screen 420, the number on the free game count display unit 414 is changed to the number of free games set for the special game condition selected. In FIG. 21, the "Mini Chance" is selected, and the free game can be run ten times.

Note that, in the present embodiment, the special game condition selected is indicated by the special game notifying screen 420 for notifying that the special game will be run. The present invention however is not limited to this. For example, an effect may be provided so that a player is able to find out the special game condition selected as s/he plays the free game a predetermined number of times.

(Special Game Trigger in Special Game)

Figure 22:
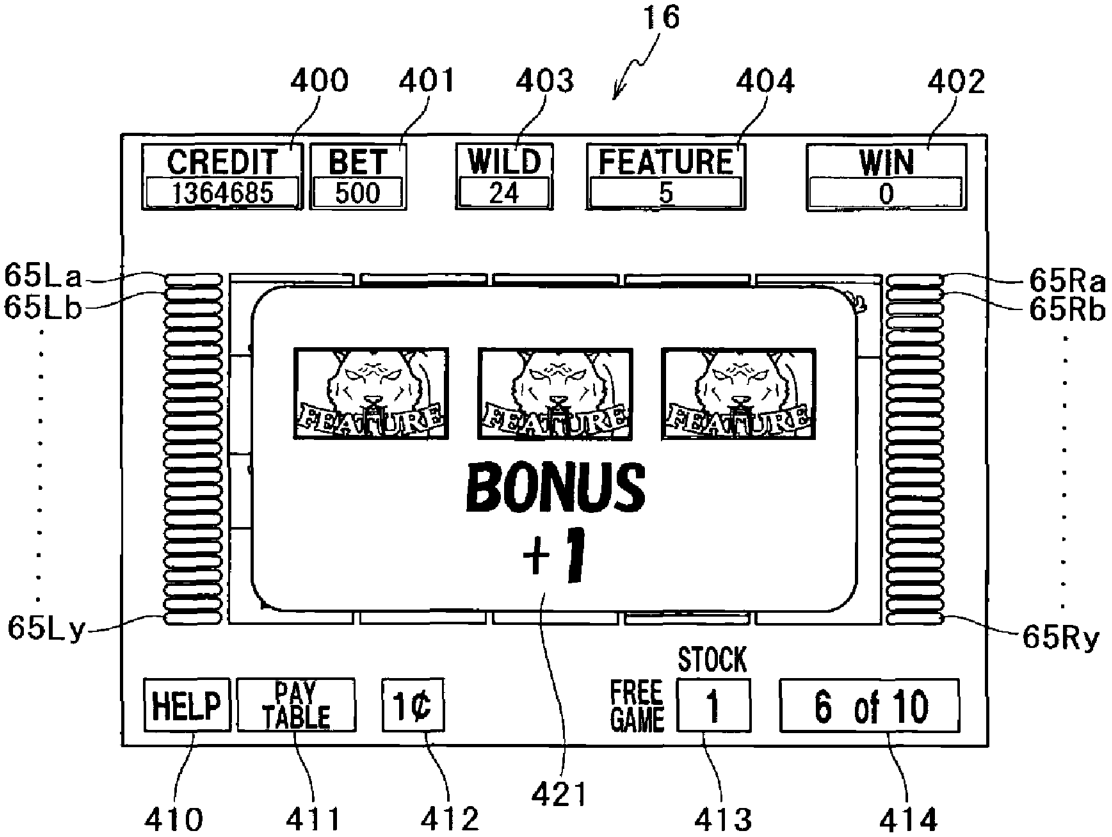
FIG. 22 shows an exemplary screen of the special game displayed on the lower image display panel of the gaming terminal of the Embodiment 1, according to the present invention.

FIG. 22 shows a case where the special game trigger is established during the special game. Specifically, when three or more feature symbols 100 are rearranged on a payline 300 as in the base game, a bonus screen 421 is pop-up displayed to indicate that the process of selecting the sub ranges each allotted to one of the special game conditions or "No Special Game" is executable when the special game currently in progress ends. Then, at the same time or immediately after the displaying of the bonus screen 421, the number on the stock display unit 413 increases by 1.

(Wild Symbol Count Increasing Screens during Special Game)

Figure 23:
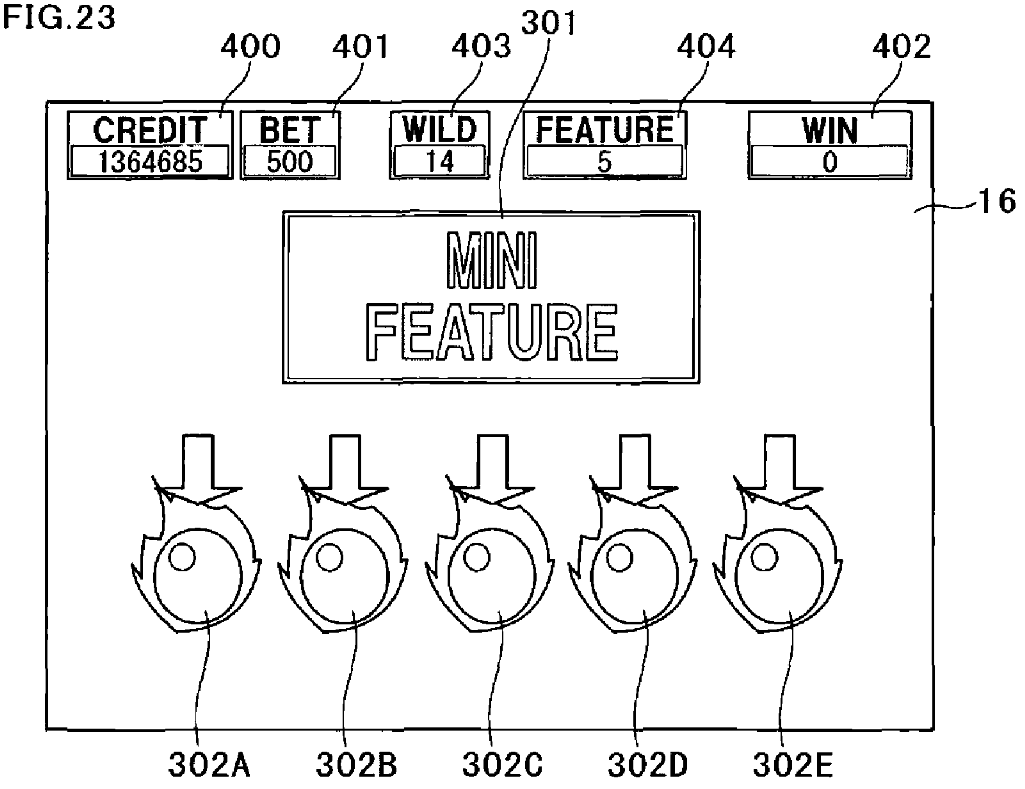
FIG. 23 shows an exemplary screen of the special game displayed on the lower image display panel of the gaming terminal of the Embodiment 1, according to the present invention.
Figure 24:
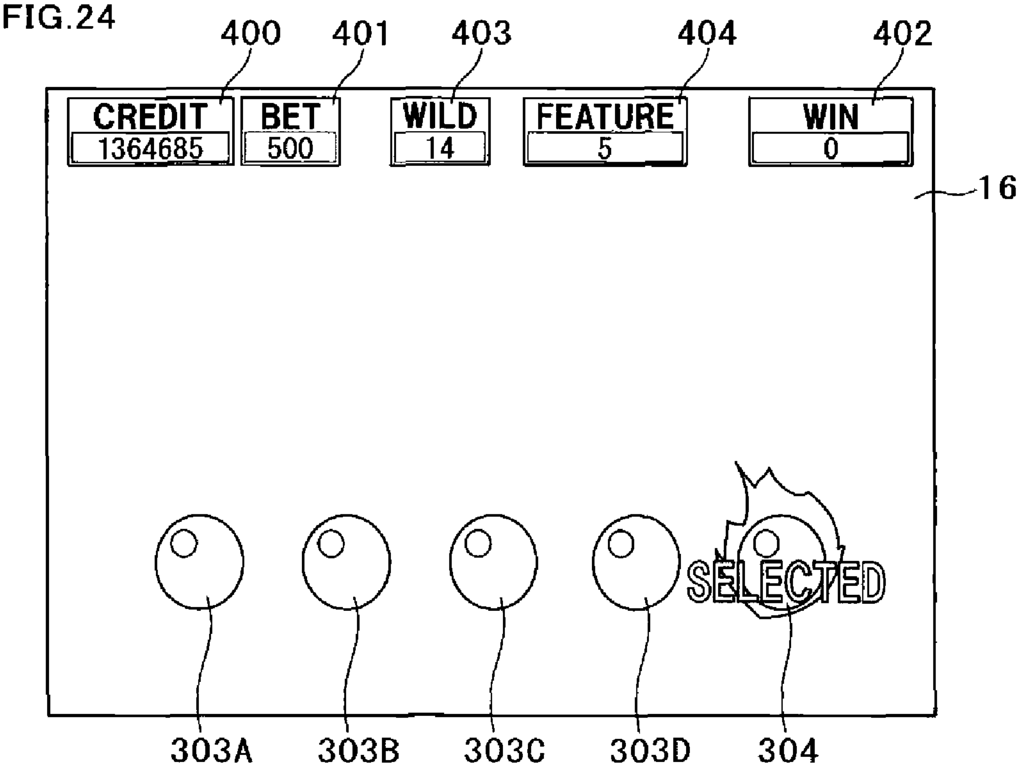
FIG. 24 shows an exemplary screen of the special game displayed on the lower image display panel of the gaming terminal of the Embodiment 1, according to the present invention.
Figure 25:
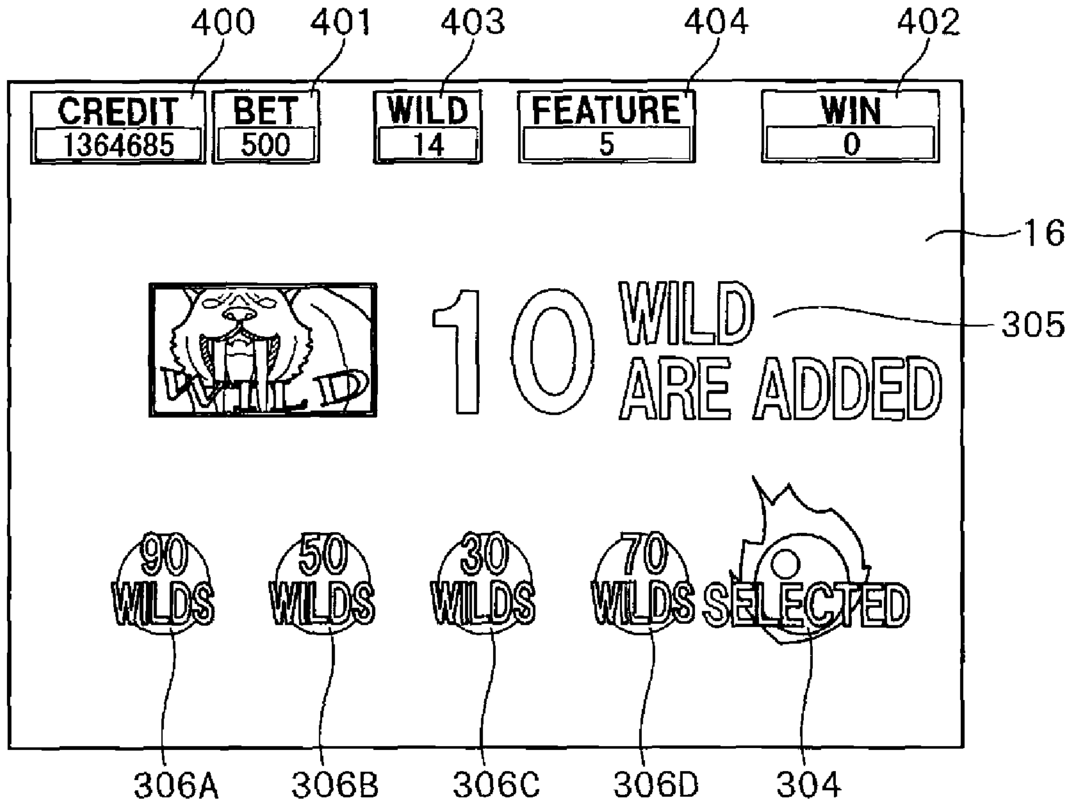
FIG. 25 shows an exemplary screen of the special game displayed on the lower image display panel of the gaming terminal of the Embodiment 1, according to the present invention.

FIGS. 23 to 25 illustrate exemplary wild symbol count increasing screen displayed on the lower image display panel 16, when the number of wild symbols increases during the special game.

FIG. 23 shows a wild symbol increase start screen displayed on the lower image display panel 16 immediately after one of the special game conditions is selected. In the middle of the wild symbol increase start screen on the lower image display panel 16 is displayed a special game start image 301 indicating the start of the special game under "Mini Chance" condition. Further, lower portion of the lower image display panel 16 displays five selectable images 302 (302A to 302E). A player is able to select any of the selectable images 302 by touching the touch panel 69 on the lower image display panel 16 by his/her finger or the like. Based on a selectable image 302 selected by the player, an increase in the number of wild symbols 104 is determined.

For example, as illustrated in FIG. 24, when the player selects the selectable image 302E, a selection image 304 is displayed in place of the selectable image 302E on the lower image display panel. Further, not-selected images 303 (303A to 303D) are respectively displayed in places of the selectable images 302 which were not selected.

After an image shown FIG. 24 is displayed, a determined-increase image 305 which indicates the number of additional wild symbols is displayed at the center portion of the lower image display panel 16, as illustrated in FIG. 25. At the same time or immediately after the displaying of the determined-increase image 305, the total number on the wild symbol count display unit 403 is increased by the number on the determined-increase image 305. In FIG. 25, the determined-increase image 305 indicates that the number of wild symbols is increased by ten. Further, the number of additional wild symbols in cases of selecting other selectable images 302 are indicated in the form of increase images 306 (306A to 306D), which are displayed at the lower portion of the lower image display panel 16. The increase images 306A to 306D respectively indicates that the number of additional wild symbols would have been 90, 50, 30, and 70, if the selection image displayed at the corresponding location had been selected.

(Insurance Screen)

Figure 26:
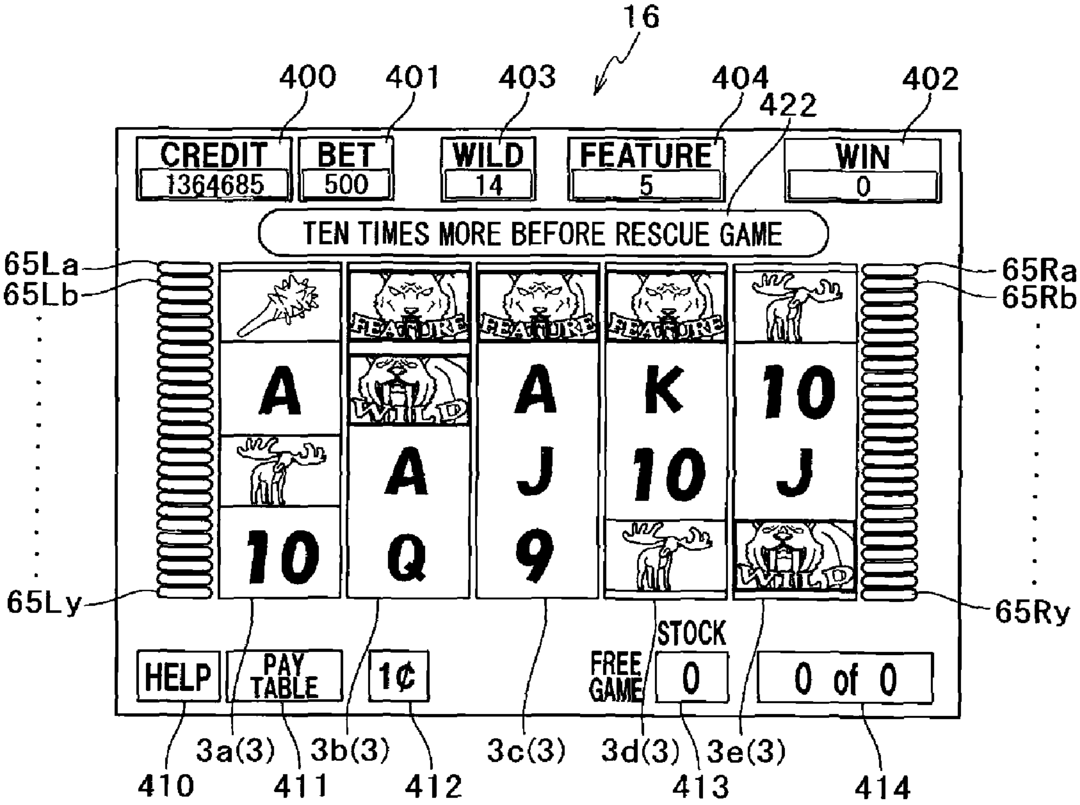
FIG. 26 shows an exemplary insurance screen displayed on the lower image display panel of the gaming terminal of the Embodiment 1, according to the present invention.
Figure 27:
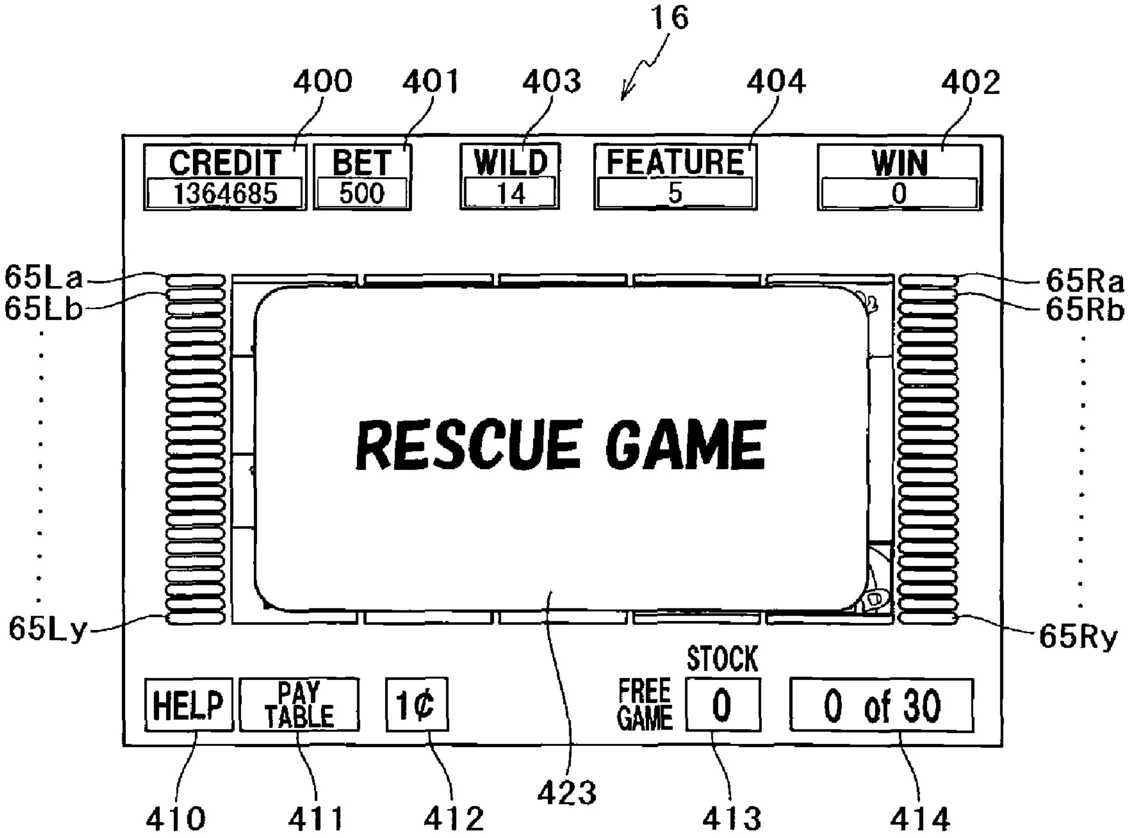
FIG. 27 shows an exemplary insurance screen displayed on the lower image display panel of the gaming terminal of the Embodiment 1, according to the present invention.

FIGS. 26 to 27 illustrate an exemplary insurance screen displayed on the lower image display panel 16, when the insured mode is activated. As illustrated in FIG. 26, a count down image 422 indicating the number of base games before the insurance game is displayed above the video reels 3 on the lower image display panel 16.

When the number of times the base game is repeated is 0 on the count down image 422, a rescue screen 423 indicating transition to a rescue game is pop-up displayed, as illustrated in FIG. 27. Then, at the same time or immediately after the displaying of the rescue screen 423, the number "0" on the free game count display unit 414 is switched to "30". Thus, the player is able to recognize the transition to the rescue game including 30 free games.

Figure 28:
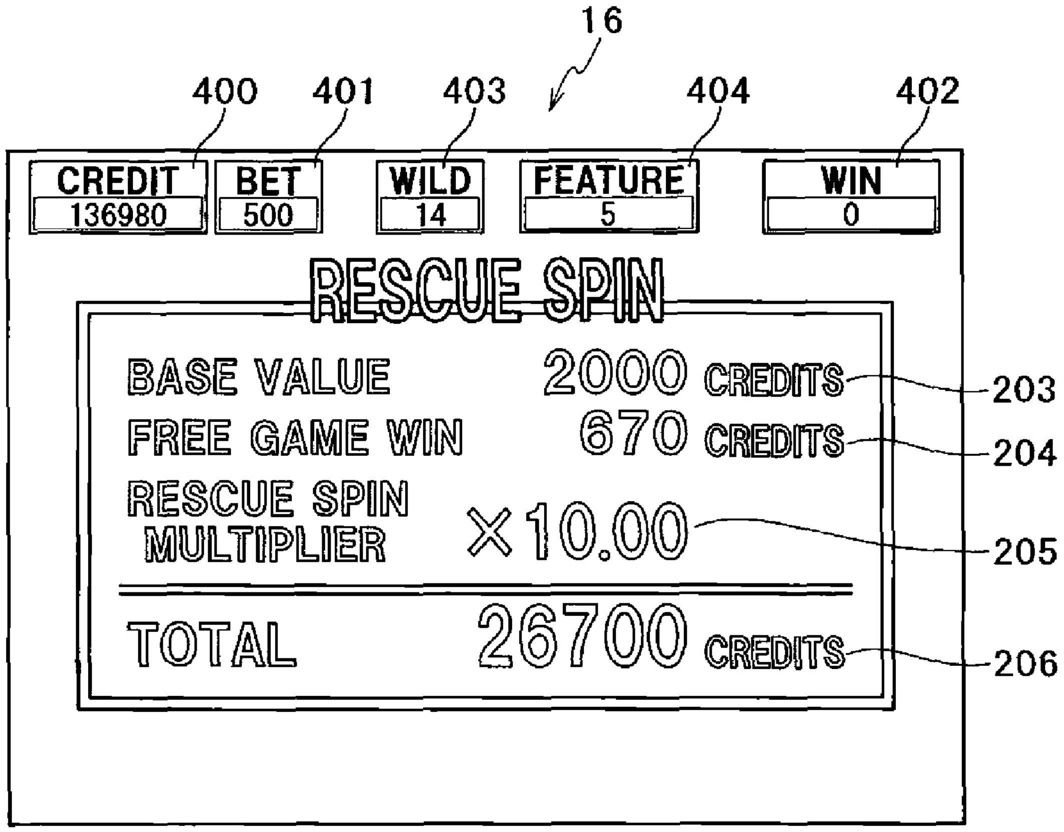
FIG. 28 shows an exemplary insurance screen displayed on the lower image display panel of the gaming terminal of the Embodiment 1, according to the present invention.

When the rescue game ends, an insurance payout report image is displayed on the lower image display panel 16, as illustrated in FIG. 28.

The insurance payout report image includes: a fixed payout image 203, a rescue game payout image 204, a rescue multiplier image 205, and an insurance payout image 206.

The fixed payout image 203 indicates a predetermined number (e.g. 2000). This number is referred to as "BASE VALUE". The rescue game payout image 204 indicates the number of coins corresponding to the rescue game total payout amount. This number is referred to as "FREE GAME WIN". The rescue multiplier image 205 indicates the total number of feature symbols 100 rearranged in the rescue game (feature symbol count). This number is referred to as "RESCUE MULTIPLIER". The insurance payout image 206 indicates the total number of coins to be paid out as insurance when the number of base games played counts a predetermined number (e.g. 1000 times).

In the present embodiment, the number of coins paid out as insurance is calculated by multiplying the sum of "BASE VALUE" and "FREE GAME WIN" by the "RESCUE MULTIPLIER".

In the example illustrated in FIG. 28, the "BASE VALUE" is 2000, the "FREE GAME WIN" is 670, and "RESCUE MULTIPLIER" is 10. Accordingly the insurance is $(2000+670)\times10=26700$.

[Process in Gaming System 1]

Next, the following describes a program run in the gaming system 1.

(Process of Gaming Terminal 10)

First described is a program taking place in the main CPU 41 of the gaming terminal 10.

(Base Game Running Process)

Figure 29:
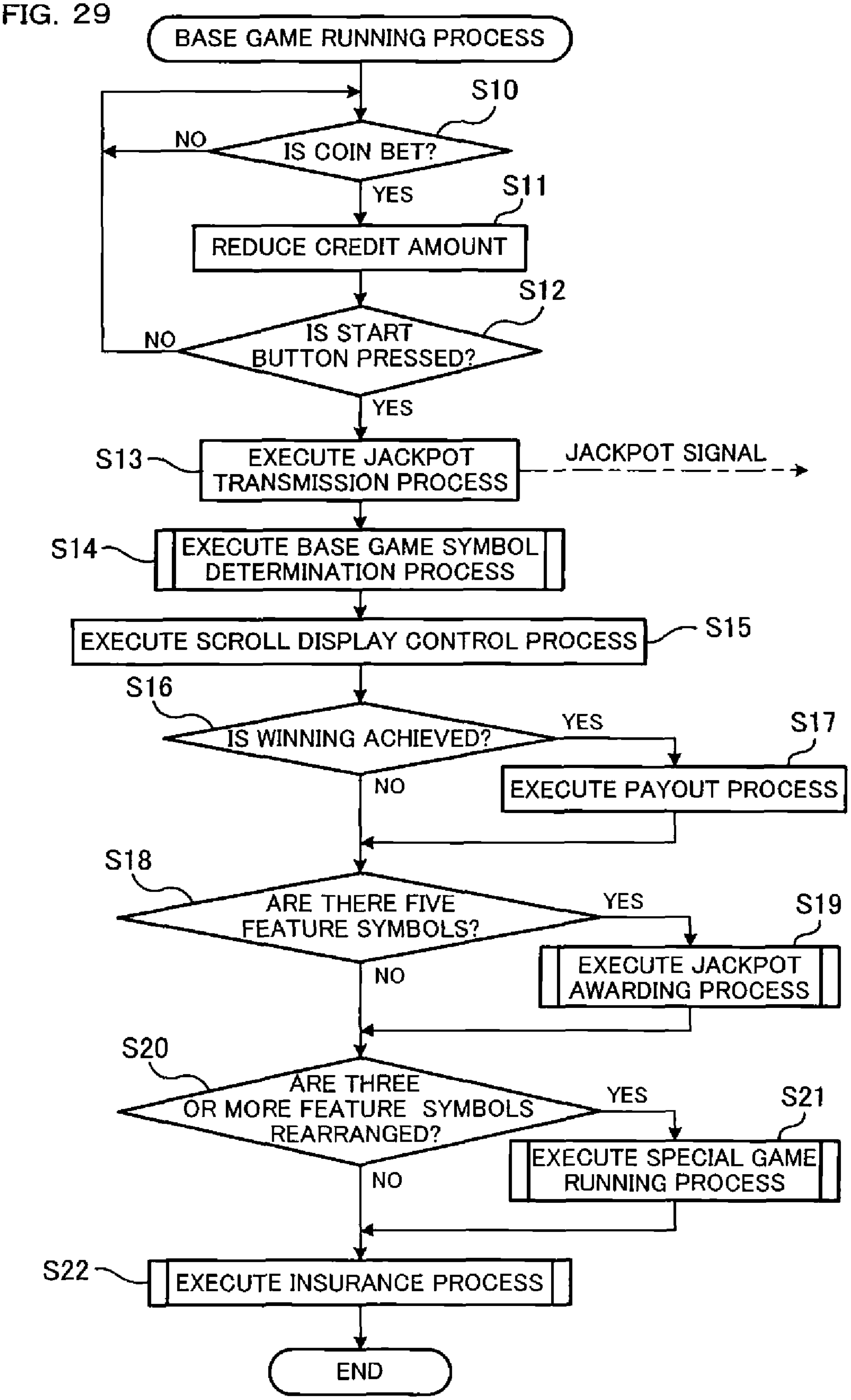
FIG. 29 is a flowchart showing a base game running process executed by the gaming terminal of the Embodiment 1, according to the present invention.

FIG. 29 is a flowchart illustrating a base game running process. First, the main CPU 41 determines whether or not a coin is bet (S10). In this process, the main CPU 41 determines whether an input signal is received. The input signal may be an input signal output from the 1-bet switch 26S when the 1-bet button 26 is operated, or an input signal output from the maximum bet switch 27S when the maximum bet button 27 is operated. When it is determined that no coin is bet (S10: No), the S10 is re-executed.

On the other hand in S10, if it is determined that a coin is bet, the main CPU 41 performs a process of reducing the credit amount stored in the RAM 43, by the amount of coins having been bet (S11). Note that when the number of coins bet surpasses the credit amount stored in the RAM 43, the process of reducing the credit amount in the RAM 43 is not performed and the process goes back to S10. Further, if the number of coins bet surpasses the maximum number of coins bettable in one game (500 coins in this embodiment), the process of reducing the credit amount in the RAM 43 is not performed and the process goes to S12.

Next, the main CPU 41 determines whether the start button 23 is pressed (S12). In this process, the main CPU 41 determines whether an input signal output from the start switch 23S is received, when the start button 23 is pressed. If it is determined that the start button 23 is not pressed (S12: No), the process goes back to S10. Note that when the start button 23 is not pressed (e.g. when the start button 23 is not pressed, and an instruction to end the game is input), the main CPU 41 cancels the result from the reduction in S11.

On the other hand in S12, when it is determined that the start button 23 is pressed (S12: YES), the main CPU 41 performs a jackpot transmission process (S13) in which a jackpot signal indicative of an accumulation amount according to the number of coins bet is transmitted to the center server 200. Next, the main CPU 41 executes a base game symbol determining process (S14). The base game symbol determining process is detailed later with reference to the drawings.

Next, in S15, the main CPU 41 performs a scroll display control process. This process is a display control whereby scrolling of symbols is started and symbols determined in S14 are rearranged thereafter.

Next, the main CPU 41 determines whether a winning is achieved (S16). If it is determined that a winning is achieved (S16:YES), the main CPU 41 performs a process related to coin payout (S17). In this process, the main CPU 41 refers to the odds data stored in the RAM 43, and determines the amount of payout based on the number of certain symbols rearranged along the payline 300.

On the other hand in S16, when it is determined that no winning is achieved (S16: No) or after S17, the main CPU 41 determines whether or not five feature symbols 100 are rearranged on a payline 300 (S18). When it is determined that five feature symbols 100 are rearranged on a payline 300 (S18: YES), a jackpot awarding process is executed. The jackpot awarding process is detailed later with reference to the drawings.

In S18, when it is determined that the five feature symbols 100 are not rearranged (S18: No) or after the S19, whether or not three or more feature symbols 100 are rearranged on a payline 300 is determined (S20).

In S17, when it is determined that three or more feature symbols 100 are rearranged (S20: YES), the main CPU 41 executes a special game running process (S21). The special game running process is detailed later with reference to the drawings.

In S20, when it is determined that three or more feature symbols 100 are not rearranged (S20: NO) or after S21, the main CPU 41 executes an insurance process (S22). The insurance process is detailed later with reference to the drawings. After the process of S22, the main CPU 41 ends this routine.

(Base Game Symbol Determining Process)

Figure 30:
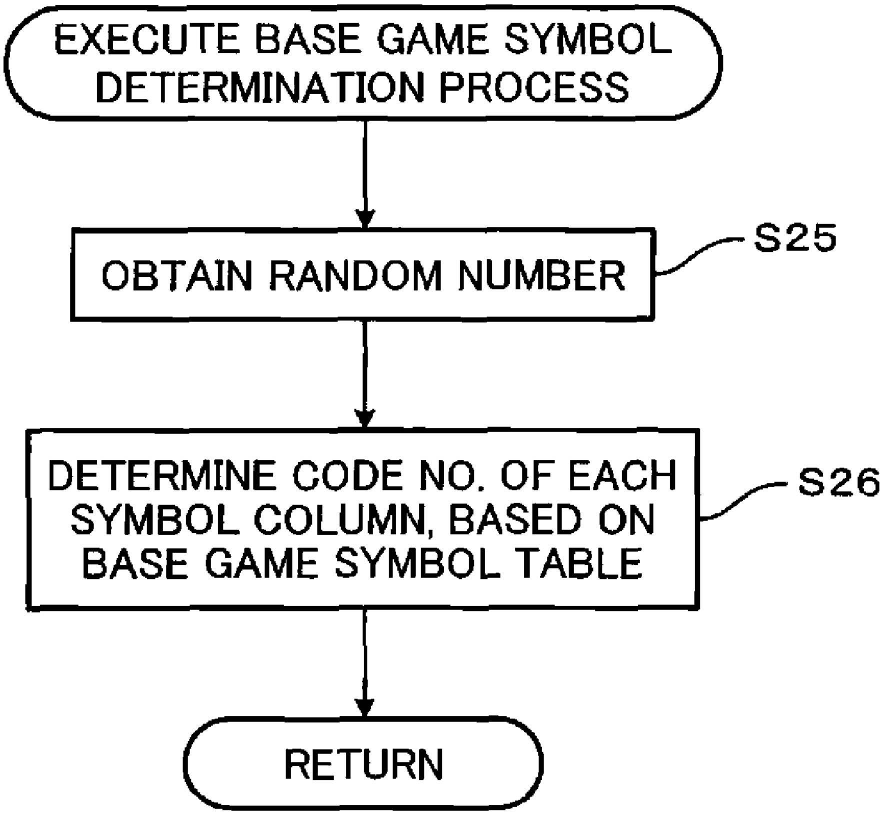
FIG. 30 is a flowchart showing a base game symbol determining process executed by the gaming terminal of the Embodiment 1, according to the present invention.

Next the following describes the base game symbol determining process. FIG. 30 is a flowchart showing a sub routine of the base game symbol determining process. This process is executed by the main CPU 41 running a symbol determination program stored in the RAM 43. First the main CPU 41 obtains the random number from the random number generating circuit 64 (S25). In this process, the main CPU 41 obtains five random numbers for the symbol columns of the display blocks 28.

Next, the main CPU 41 determines the code No. of the symbol column of the display block 28, at the time of stopping the symbols, based on the five random numbers obtained and the base game symbol table (S26). After the process of S26, the main CPU 41 ends this sub routine.

The present embodiment deals with a case where the random number generating circuit 64 is provided and a random number (so-called hardware random number) is sampled from the random number generating circuit. However, the present invention may be adapted so that a random number is generated in a program (so-called software random number).

(Jackpot Awarding Process)

Figure 31:
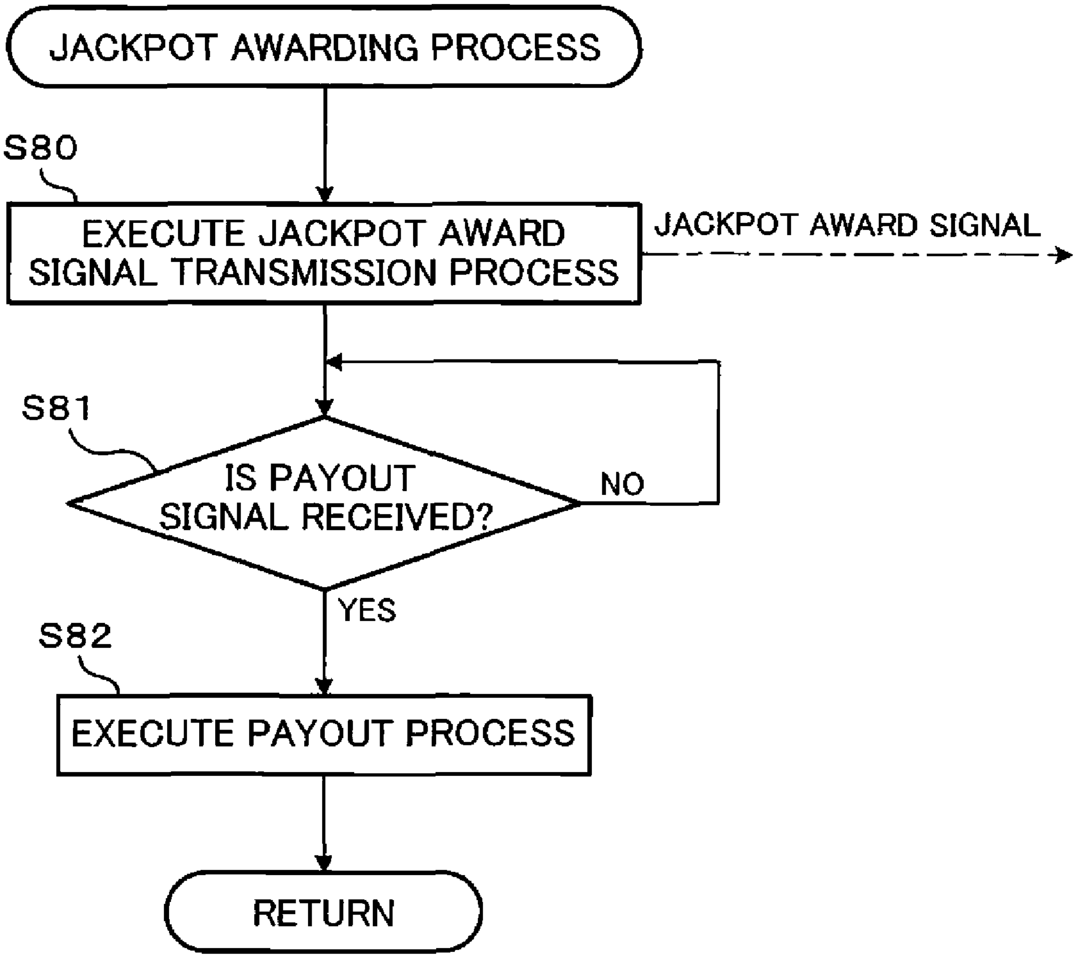
FIG. 31 is a flowchart showing a jackpot awarding process executed by the gaming terminal of the Embodiment 1, according to the present invention.

Next, the following describes the jackpot awarding process. FIG. 31 is a flowchart indicating a sub routine of the jackpot awarding process.

First, the main CPU 41 performs a jackpot awarding signal transmission process which transmits a jackpot awarding signal to the center server 200 (S80). Next, the main CPU 41 determines whether or not a payout signal indicative of the jackpot prize is received from the center server 200 (S81).

When the main CPU 41 determines that the payout signal is not received (S81: No), the process returns to S81. On the other hand, when the main CPU 41 determines that a payout signal is received (S81: YES), coins of a jackpot prize indicated by the payout signal is accumulated or paid out (S82). The sub routine then ends.

(Special Game Running Process)

Figure 32:
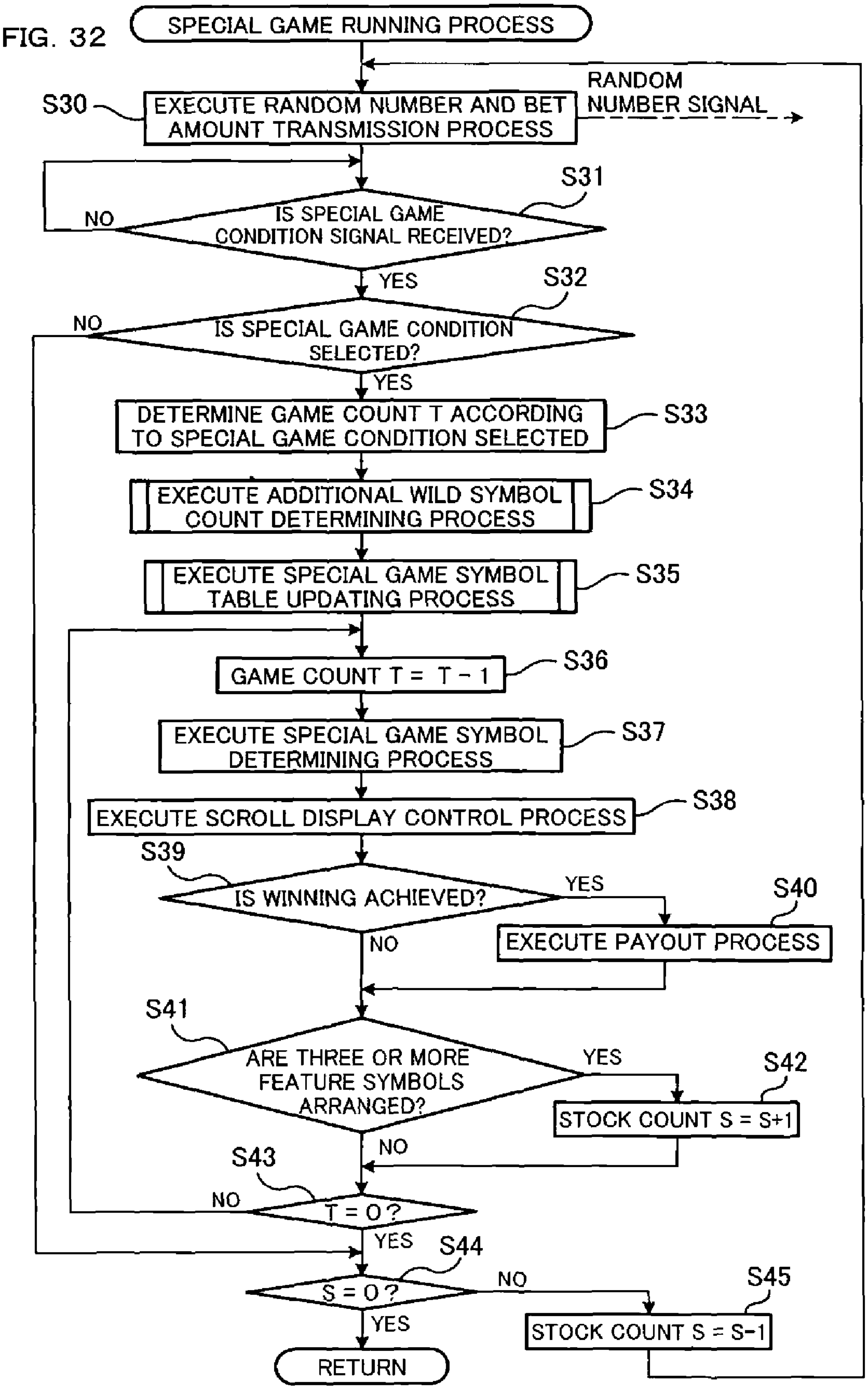
FIG. 32 is a flowchart showing a special game running process executed by the gaming terminal of the Embodiment 1, according to the present invention.

The following describes the special game running process. FIG. 32 is a flowchart showing a sub routine of the special game running process.

First, the main CPU 41 performs a random number transmission process (S30) which transmits to the center server 200 a random number for the first symbol column of the display blocks 28, which number is sampled from the random number generating circuit 64 in the base game symbol determining process (hereinafter, base game condition determination random number), and a signal indicating the number of coins bet by a player in the base game. Note that, when a free game of the special game was running immediately before, the main CPU 41 performs a random number transmission process which transmits to the center server 200 a random number for the first symbol column of the display blocks 28, which number is sampled from the random number generating circuit 64 in the special game symbol determining process (hereinafter, special game condition determination random number), and a signal indicating the number of coins bet by a player in the base game.

Next, the main CPU 41 determines whether or not a special game condition signal related to selected one of sub ranges each allotted to one of the special game conditions or “No Special Game” is received from the center server 200 (S31). When it is determined that no special game condition signal is received (S31: No), S31 is re-executed. On the other hand, when it is determined that a special game condition signal is received (S31: Yes), whether one of the special game conditions is selected (S32).

When it is determined that one of the special game conditions is selected (S32: YES), the remaining free game count T is set based on the special game condition indicated by the special game condition signal from the center server 200 and the free game repeat count determination table (S33). Further, the main CPU 41 displays on the lower image display panel 16 a special game notifying screen 420 according to the special game condition selected, as is illustrated in FIG. 21.

Next, the main CPU 41 executes an additional wild symbol count determining process (S34). The additional wild symbol count determining process is detailed later with reference to the drawings.

Further, the main CPU 41 executes a special game symbol table updating process (S35). In the special game symbol table updating process, the main CPU 41 updates the special game symbol table based on an increase in the number of wild symbols 104 determined in the additional wild symbol count determining process. The special game symbol table updating process is detailed later with reference to the drawings.

Next, in S36, the remaining free game count T in the free game count recording region of the RAM 43 is set to T=T−1.

Next, the main CPU 41 executes a special game symbol determining process (S37). The special game symbol determining process is detailed later with reference to the drawings.

Next, in S38, the main CPU 41 performs a scroll display control process. This process is a display control whereby scrolling of symbols is started and symbols determined in S37 are rearranged thereafter.

Next, the main CPU 41 determines whether winning is achieved (S39). In the special game, the number of wild symbols 104 is increased compared to that of the base game. Therefore, the possibility of winning is higher.

If it is determined that a winning is achieved (S39: YES), the main CPU 41 performs a process related to coin payout (S40). Further explanation is omitted here, since this process is similar to S17.

On the other hand, when it is determined that a winning is not achieved (S39: No) or after S40, the main CPU 41 determines whether three or more feature symbols 100 are rearranged on the payline 300 (S41).

When it is determined that three or more feature symbols 100 are rearranged (S41: Yes), the main CPU 41 increases the stocked special game count S by 1 (S42).

On the other hand, when it is determined that three or more feature symbols 100 are not rearranged (S41: No) or after S42, the main CPU 41 determines whether remaining game count data T in the free game count recording region of the RAM 43 is 0 (S43). When it is determined that T≠0 (S43: No), the main CPU 41 brings the process back to S36.

On the other hand, when it is determined that T=0 (S43: Yes) or when it is determined in S32 that no special game conditions is selected (S32: No), the main CPU 41 determines whether the number S equals 0, which number is stored in the carried-over special game count recording region and indicates the number of times the special game is repeated (S44). When it is determined that S≠0 (S44: No), the number S is set so that S=S−1 (S45), and the process goes back to S30.

On the other hand, when it is determined that S=0, the main CPU 41 ends this sub routine.

(Additional Wild Symbol Count Determining Process)

Figure 33:
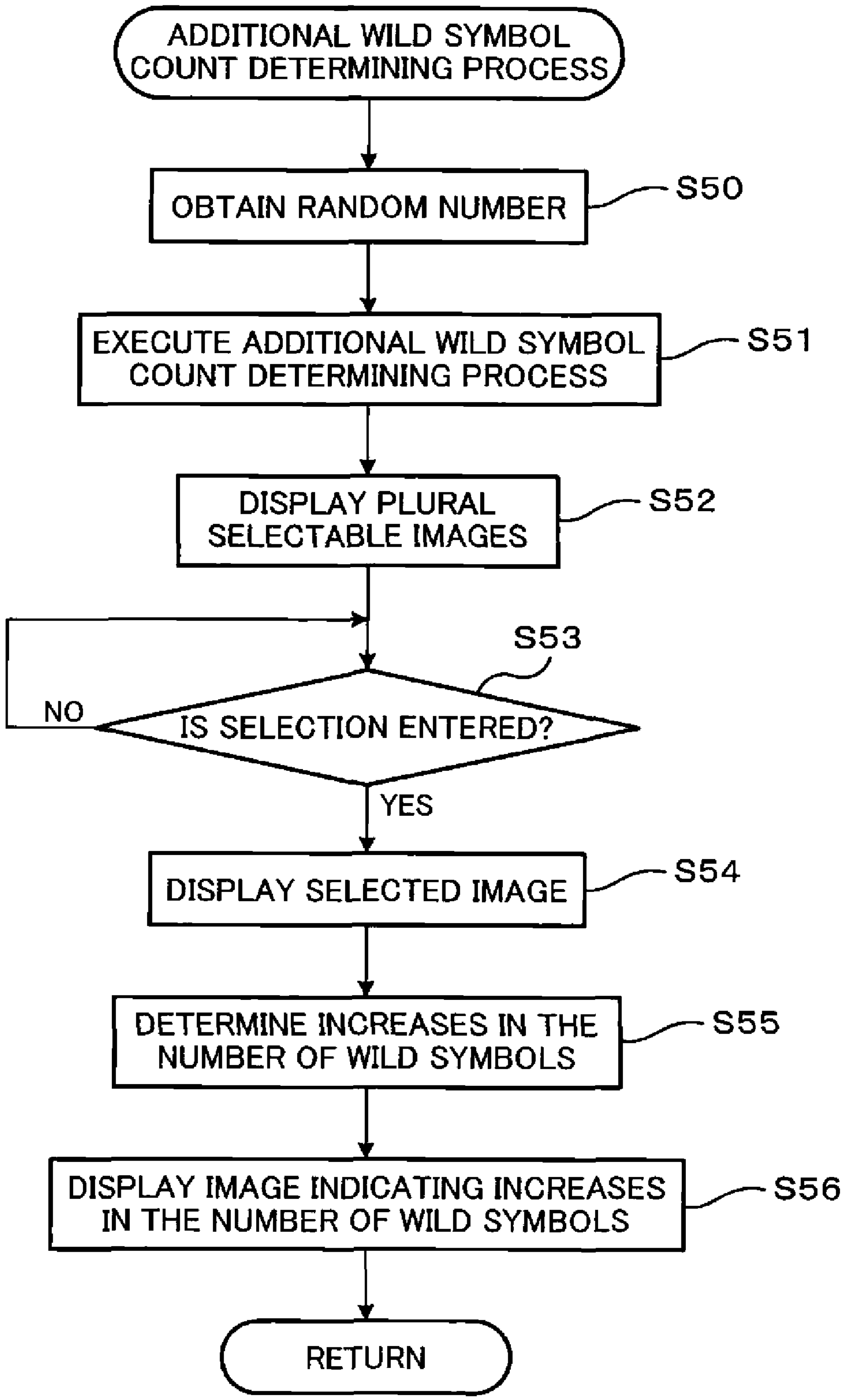
FIG. 33 is a flowchart showing an additional wild symbol count determining process executed by the gaming terminal of the Embodiment 1, according to the present invention.

The additional wild symbol count determining process is detailed later with reference to the drawings. FIG. 33 is a flowchart showing a sub routine of an additional wild symbol count determining process.

First the main CPU 41 obtains random numbers from the random number generating circuit 64 (S50). In this process, the main CPU 41 obtains five random numbers for the selectable images 302 (302A to 302E) of FIG. 23.

Next, the main CPU 41 associates, with each of the selectable images 302, a number by which the number of wild symbols is increased (S51). This number is determined for each of the selectable images 302 illustrated in FIG. 23, based on the random numbers obtained in S50, and the additional wild symbol count determination table.

Next, the main CPU 41 displays selectable images 302 at the lower portion of the lower image display panel 16 (S52).

Next, the main CPU 41 determines whether a player-selection of any of the selectable images 302 is input (S53). In this process, the main CPU 41 determines whether a selection input signal in relation to the selectable images 302 is received from the touch panel 69. When a finger or the like of a player touches a selectable image 302 or the nearby area on the lower image display panel 16, a selection input signal in relation to the selectable images 302 is transmitted from the touch panel 69 to the main CPU 41. When it is determined that there is no input of the player-selection of any of the selectable images 302 (S53: No), the main CPU 41 brings back the process to S53.

On the other hand, when it is determined that a player-selection of any of the selectable images 302 is input (S53: Yes), the main CPU 41 displays a selection image 304 (see FIG. 24) (S54).

Next, the main CPU 41 sets the number associated with the selectable image 302 selected by the player as the number by which the number of the wild symbols 104 increases (S55). Next, the main CPU 41 displays, at the center portion of the lower image display panel 16, a determined-increase image 305 (see FIG. 25) indicating the number by which the number of the wild symbols increases (S56). After the process of S57, the main CPU 41 ends this sub routine.

The present embodiment deals with a case where the number associated with each selectable image 302, by which number the number of wild symbols is increased, is determined based on a random number obtained and the additional wild symbol count determination table of FIG. 12. The present invention however is not limited to this, and the number associated with each selectable image 302 may be determined in advance.

(Special Game Symbol Table Updating Process)

Figure 34:
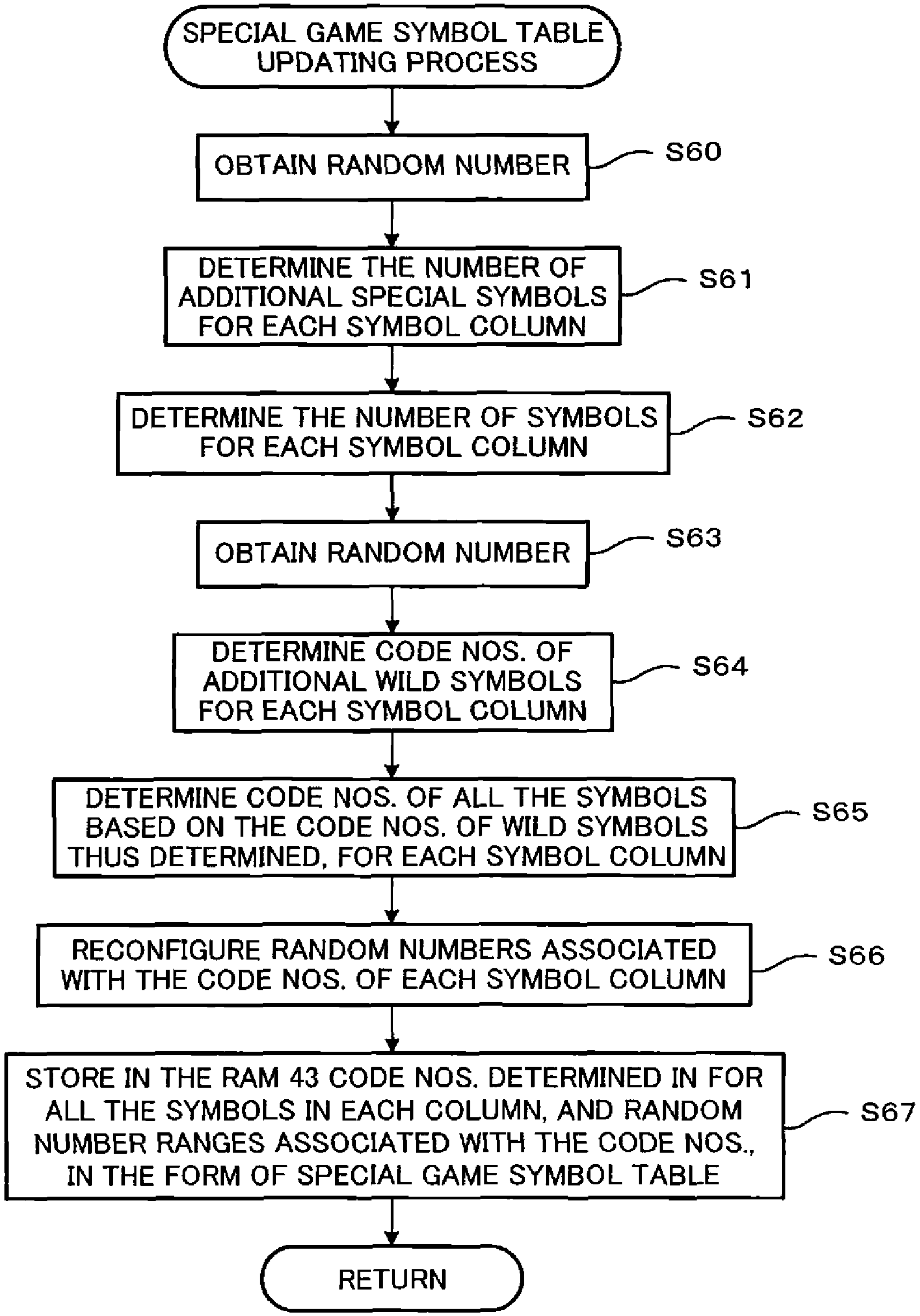
FIG. 34 is a flowchart showing a special game symbol table updating process executed by the gaming terminal of the Embodiment 1, according to the present invention.

FIG. 34 is a flowchart showing a sub routine of special game symbol table updating process.

First, the main CPU 41 obtains random numbers from the random number generating circuit 64 (S60). In this process, the main CPU 41 obtains the same number of random numbers as the number of additional wild symbols determined in S55. For example, if the number of additional wild symbols determined in S55 is 10, ten random numbers are obtained in S60.

Next, the main CPU 41 determines the number of additional wild symbols for each symbol column (S61). In this process, the main CPU 41 determines the number of additional wild symbols for each symbol column based on the random numbers obtained in S60 and the symbol column determination table.

The present embodiment deals with a case where the number of additional wild symbols is determined for each symbol column based on the random numbers obtained and the symbol column determination table. The present invention however is not limited to this. For example, the number of additional wild symbols may be determined in advance for each of the symbol columns, in the additional wild symbol count determining process.

Next, the main CPU 41 determines the number of symbols in each symbol column (S62). In this process, the main CPU 41 determines a total number of symbols in each symbol column based on the number of additional wild symbols 104 determined in S61 for each symbol column. Specifically, the total number of symbols in each symbol column is the sum of the number of additional wild symbols determined in S61 and "20" which is the number of symbols in each symbol column indicated in the base game symbol table.

First, the main CPU 41 obtains random numbers from the random number generating circuit 64 (S63). In this process, the main CPU 41 obtains the same number of random numbers as the number of additional wild symbols 104 determined in S61 for each symbol column. That is, when the number of additional wild symbols 104 for the symbol column No. L1 (first column), three random numbers are obtained for the symbol column No. L1.

Next, for each symbol column, the main CPU 41 determines code No. of each wild symbol to be added to the symbol column, based on the random numbers obtained in S63 and the code No. determination table (S64).

The present embodiment deals with a case where the code No. of each wild symbol to be added is determined for each of the symbol columns based on the random numbers obtained and code No. determination table. The present invention however is not limited to this. For example, the code No. of each wild symbol to be added may be determined in advance for each symbol column.

Next, for each symbol column, the main CPU 41 determines code No. of each symbol based on the code No. of the wild symbol 104 determined in S64 (S65). In this process, to each symbol column indicated by the base game symbol table, addition of wild symbols 104 is performed based on the code No. of the wild symbols 104 determined in S64. For example, when it is determined in S64 that code Nos. of wild symbols 104 to be added to the symbol column No. L1 (first column) are "13", "end", and "end", a wild symbol "WILD" is assigned to code No. 13 of the symbol column No. L1 in the base game symbol table. The symbol "REINDEER" which is originally assigned to code No. 13 is shifted to code No. 14, and the following symbols are shifted likewise. Since there are two wild symbols whose code Nos. are "end", the wild symbol "WILD" is added to the code No. 21 and No. 22 which are ends of the symbol column No. L1. For other symbol columns, code No. of each symbol is determined in the similar manner.

The main CPU 41 reconfigures the random numbers associated with the code Nos. of each symbol column (S66). In this process, the main CPU 41 reconfigures each code No. and the random number range associated therewith, based on the total symbol count of each symbol column determined in S62, the random number range being one of ranges of random numbers covering 0 to 65535.

The main CPU 41 stores in the RAM 43 the code Nos. determined in S65 for all the symbols in each symbol column, and random number ranges associated with the code Nos. which is determined in S66, in the form of special game symbol table (S67). The special game symbol table stored in the RAM 43 is referred to at the time of executing a special game symbol determining process.

After the process of S67, the main CPU 41 ends this sub routine.

(Special Game Symbol Determining Process)

Figure 35:
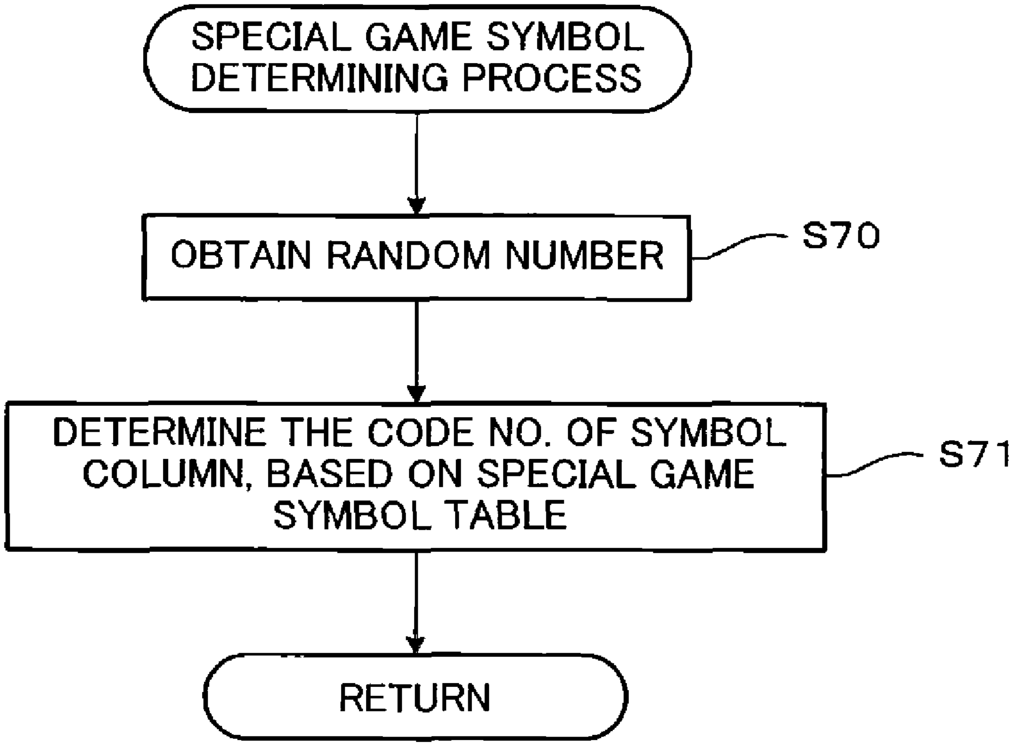
FIG. 35 is a flowchart showing a special game symbol determining process executed by the gaming terminal of the Embodiment 1, according to the present invention.

FIG. 35 is a flowchart showing a sub routine of the special game symbol determining process.

This process is executed by the main CPU 41 running a symbol determination program stored in the RAM 43. First the main CPU 41 obtains random numbers from the random number generating circuit 64 (S70). In this process, the main CPU 41 obtains five random numbers corresponding to the symbol columns of the display blocks 28.

Next, the main CPU 41 determines the code No. of the symbol column of the display block 28, at the time of stopping the symbols, based on the five random numbers obtained and the special game symbol table (S71). For example, when the random number for the first column is 23035, the code No. for the first column is 08. Note that the code No. of a symbol column corresponds to a code No. of a symbol rearranged in the first row of the display blocks 28, amongst those arranged in four rows. After the process of S71, the main CPU 41 ends this sub routine.

(Insurance Process)

Figure 36:
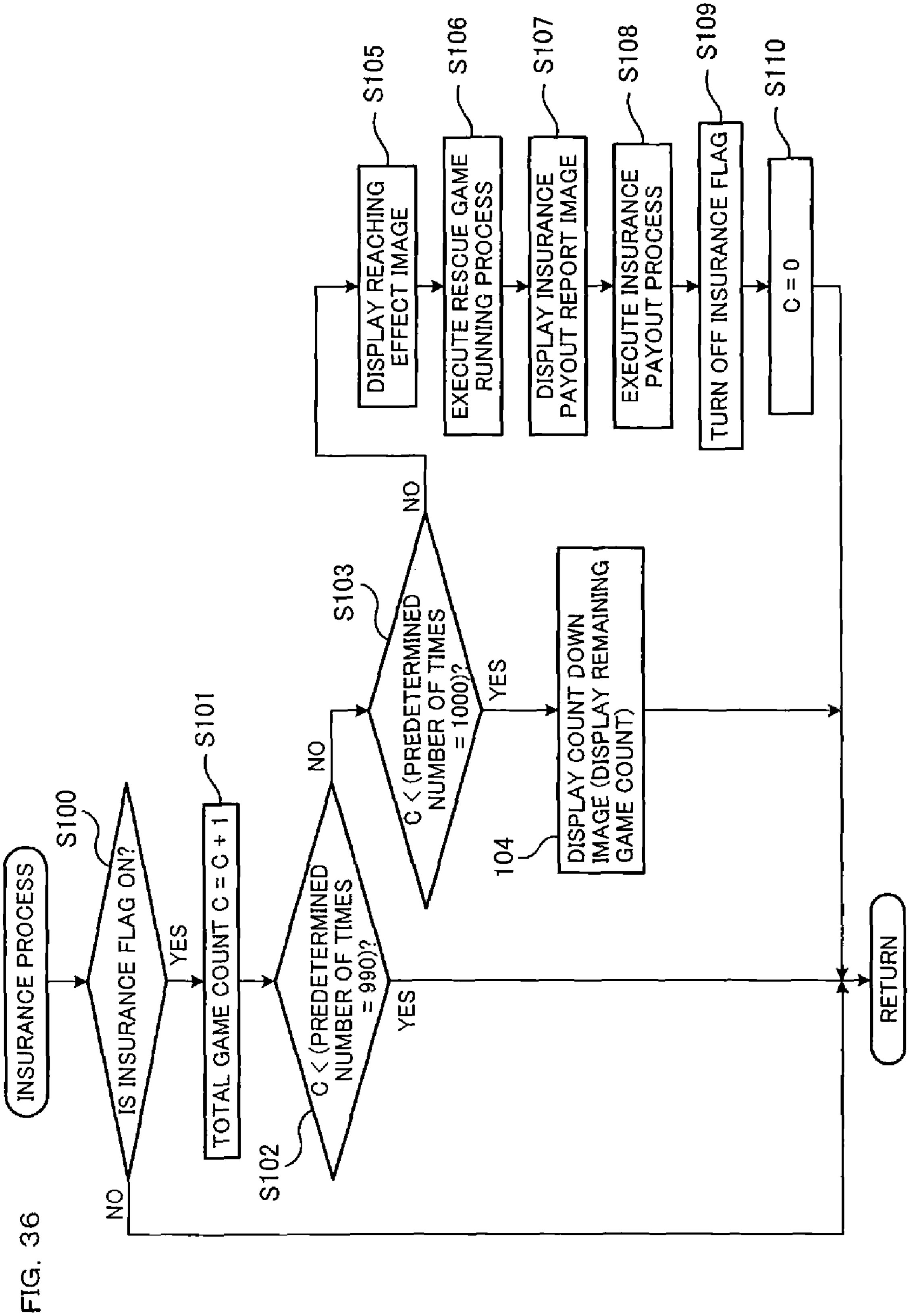
FIG. 36 is a flowchart showing an insurance process executed by the gaming terminal of the Embodiment 1, according to the present invention.

The following describes an insurance process. FIG. 36 is a flowchart indicating a sub routine of the insurance process.

First, the main CPU 41 determines whether an insurance flag is set (S100). Insurance flag is a flag which is set when the insurance BET button 90 is pressed down (see S122 of FIG. 37).

Figure 37:
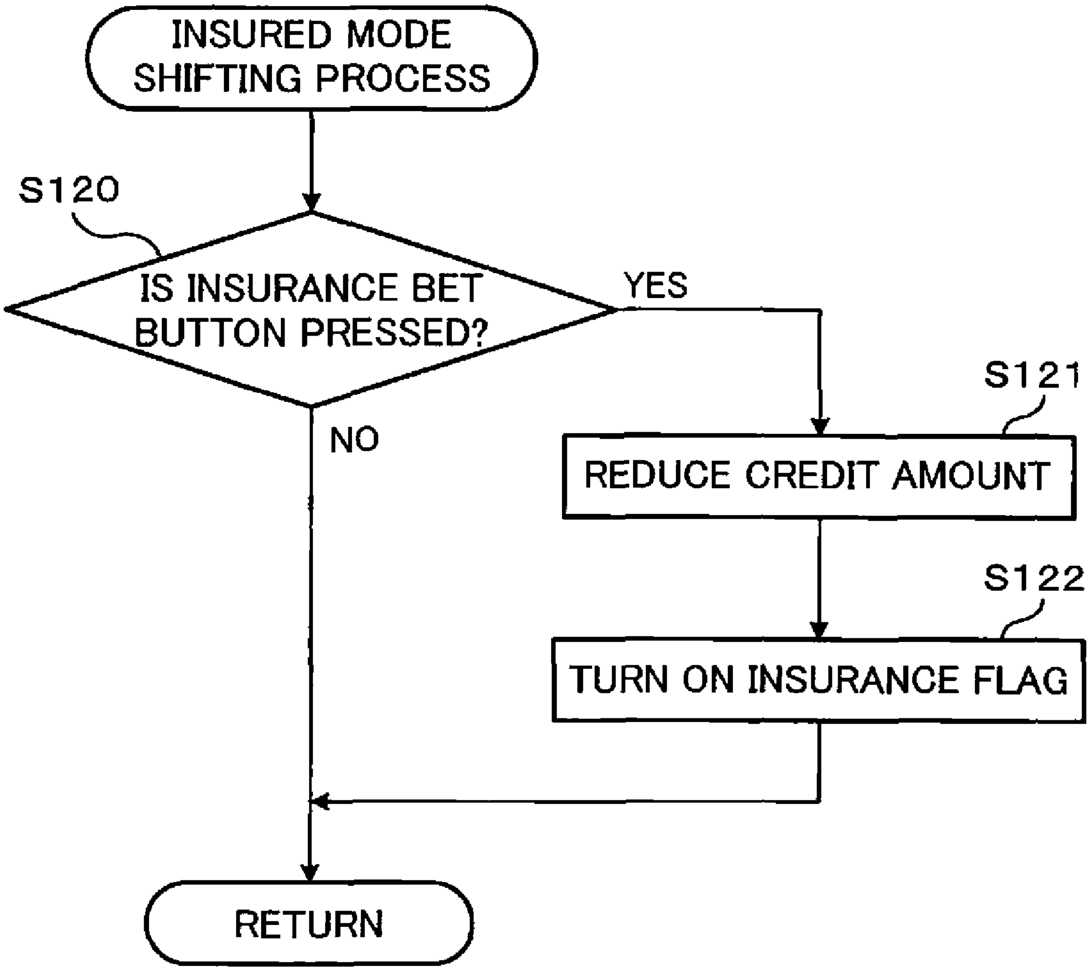
FIG. 37 is a flowchart showing an insured mode shifting process executed by the gaming terminal of the Embodiment 1, according to the present invention.

The following describes the insurance flag with reference to FIG. 37. FIG. 37 is a flowchart indicating a sub routine of insured mode shifting process. First, the main CPU 41 determines whether an insurance bet button 90 is pressed at a predetermined timing (S120). In this process, the main CPU 41 determines whether an input signal output from the insurance bet switch 90S when the insurance bet button 90 is pressed is received. When it is determined that the insurance bet button 90 is not pressed (S120: No), the main CPU 41 ends this sub routine.

On the other hand, when it is determined that the insurance bet button 90 (S120: Yes), the main CPU 41 subtract a predetermined amount (10 dollars in this embodiment) from the credited amount stored in the RAM 43 (S121). Then, the main CPU 41 sets the insurance flag (S122) and ends this sub routine thereafter. Note that, when the above predetermined amount surpasses the credited amount stored in the RAM 43, the main CPU 41 ends this sub routine without performing S121 and S122.

Thus, the insurance flag is described hereinabove with reference to FIG. 37. Return to FIG. 36 now.

In S100, when it is determined that the insurance flag is not set (S100: No), the main CPU 41 ends this sub routine. On the other hand, when it is determined that insurance flag is set (S100: Yes), the main CPU 41 sets the total game count C stored in the total game count recording region of RAM 43 so that C=C+1 (S101).

Next, the main CPU 41 determines whether the total game count C is less than a predetermined number of times (990 times in the present embodiment), based on the total game count data stored in the total game count recording region of the RAM 43 (S102). When the total game count C is less than the predetermined number of times (990 times), the main CPU 41 ends this sub routine (S102: Yes).

On the other hand, when it is determined that the total game count C equals or surpasses the predetermined number of times (S102: No), the main CPU 41 determines whether the total game count C is less than a predetermined number of times (1000 times in the present embodiment) (S103). When it is determined that the total game count C is less than the predetermined number of times (S103: Yes), the main CPU 41 displays a counting down image 422 on the lower image display panel 16. The counting down image 422 is an image indicating the number of games remaining before the number of base games having been played reaches the predetermined number of times (1000 times).

After the process of S104, the main CPU 41 ends this sub routine. When it is determined in S103 that the total game count C is less than the predetermined number of times (1000 times), i.e. when it is determined that the total game count C equals the predetermined number of times (S103: No), the main CPU 41 displays a rescue screen 423 (see FIG. 27) on the lower image display panel 16 (S105).

Next, the main CPU 41 executes a rescue game running process (S106). The rescue game running process is detailed later with reference to the drawings.

Next, the main CPU 41 displays the insurance payout report image (see FIG. 28) on the lower image display panel 16 (S107). The main CPU 41 calculates an insurance payout based on the total payout amount stored in the total payout amount recording region of the RAM 43, and the feature symbol count data stored in the feature symbol count recording region of the RAM 43. Then, the main CPU 41 displays on the lower image display panel 16 an image indicating the insurance payout amount as the insurance payout image 206.

After S107, the main CPU 41 performs a process related to paying out of a predetermined number of coins according to the calculated insurance payout (S108). When accumulating the coins, the main CPU 41 performs a process for adding a credit amount corresponding to the payout amount thus determined. On the other hand, when paying out the coins, the main CPU 41 transmits a control signal to the hopper 66 to pay out a predetermined amount of coins corresponding to the payout amount determined.

Next, the main CPU 41 turn off the insurance flag (S109). Then, the main CPU 41 sets the total game count C in the total game count recording region of the RAM 43 so that C=0 (S110). Then, the main CPU 41 ends this sub routine.

(Rescue Game Running Process)

Figure 38:
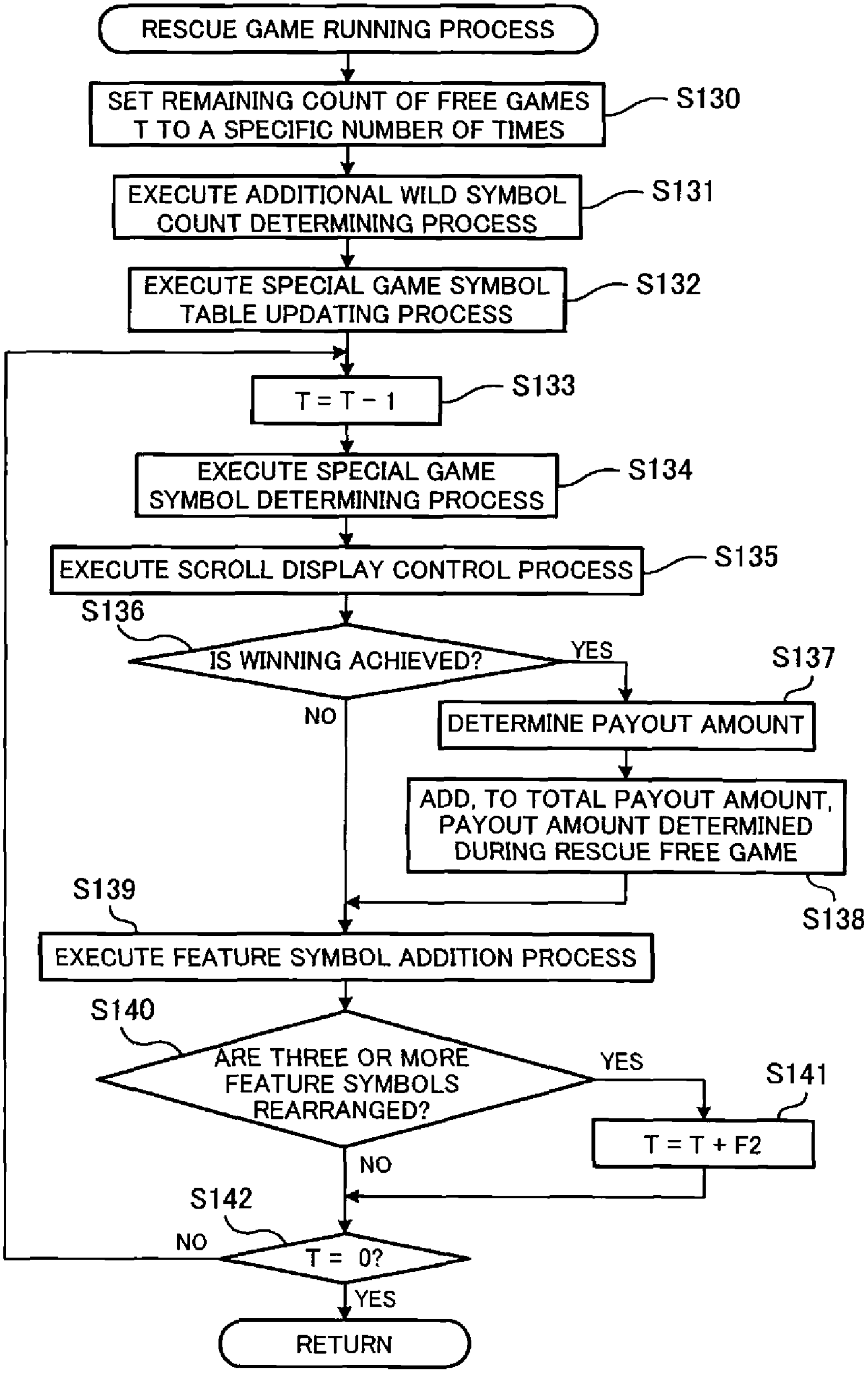
FIG. 38 is a flowchart showing a rescue game running process executed by the gaming terminal of the Embodiment 1, according to the present invention.

FIG. 38 is a flowchart showing a sub routine of the rescue game running process. First, the main CPU 41 sets a remaining free game count T so that T=specific number of times (30 times in the present embodiment) in the free game count recording region of the RAM 43 (S130).

Subsequently, the main CPU 41 executes S131 to S136. These steps are not described here, as they are similar to S34 to S39 of FIG. 32.

When it is determined in S136 that a winning is achieved (S136: Yes), the main CPU 41 determines a payout amount (S137). This process is similar to S17 of FIG. 29 which is already described. Note however that, in the process, the main CPU 41 only determines the amount of payout, and unlike S17 of FIG. 29, the main CPU 41 does not add a credit amount corresponding to the payout amount determined or payout a predetermined number of coins according to the payout amount determined.

Next, the main CPU 41 adds a payout amount determined in S136 to the rescue game total payout amount indicated by the total payout amount data stored in the total payout amount recording region of the RAM 43 (S138).

When it is determined in S136 that no winning has been achieved (S136: No) or after S138, the main CPU 41 executes a feature symbol addition process (S139). In this process, the main CPU 41 adds the number of feature symbols 100 rearranged on the display blocks 28 in the currently running game to the number of feature symbols indicated by the feature symbol count data stored in the feature symbol count recording region of the RAM 43.

Next, the main CPU 41 determines whether three or more feature symbols 100 are rearranged on a payline 300 (S140).

When it is determined that three or more feature symbols 100 are rearranged (S140: Yes), the main CPU 41 sets the remaining free game count stored in the free game count recording region of the RAM 43 so that T=specific number of times (30 times in the present embodiment) (S141).

When it is determined that the number of feature symbols 100 rearranged is less than three (S140: No) or after S141, the main CPU 41 determines whether T=0, based on the remaining game count data stored in the free game count recording region of the RAM 43 (S142). When it is determined that T≠0 (S142: No), the main CPU 41 brings back the process to S133. On the other hand, when it is determined that T=0 (S142: Yes), the main CPU 41 ends this sub routine.

(Processes of Center Server 200)

Figure 39:
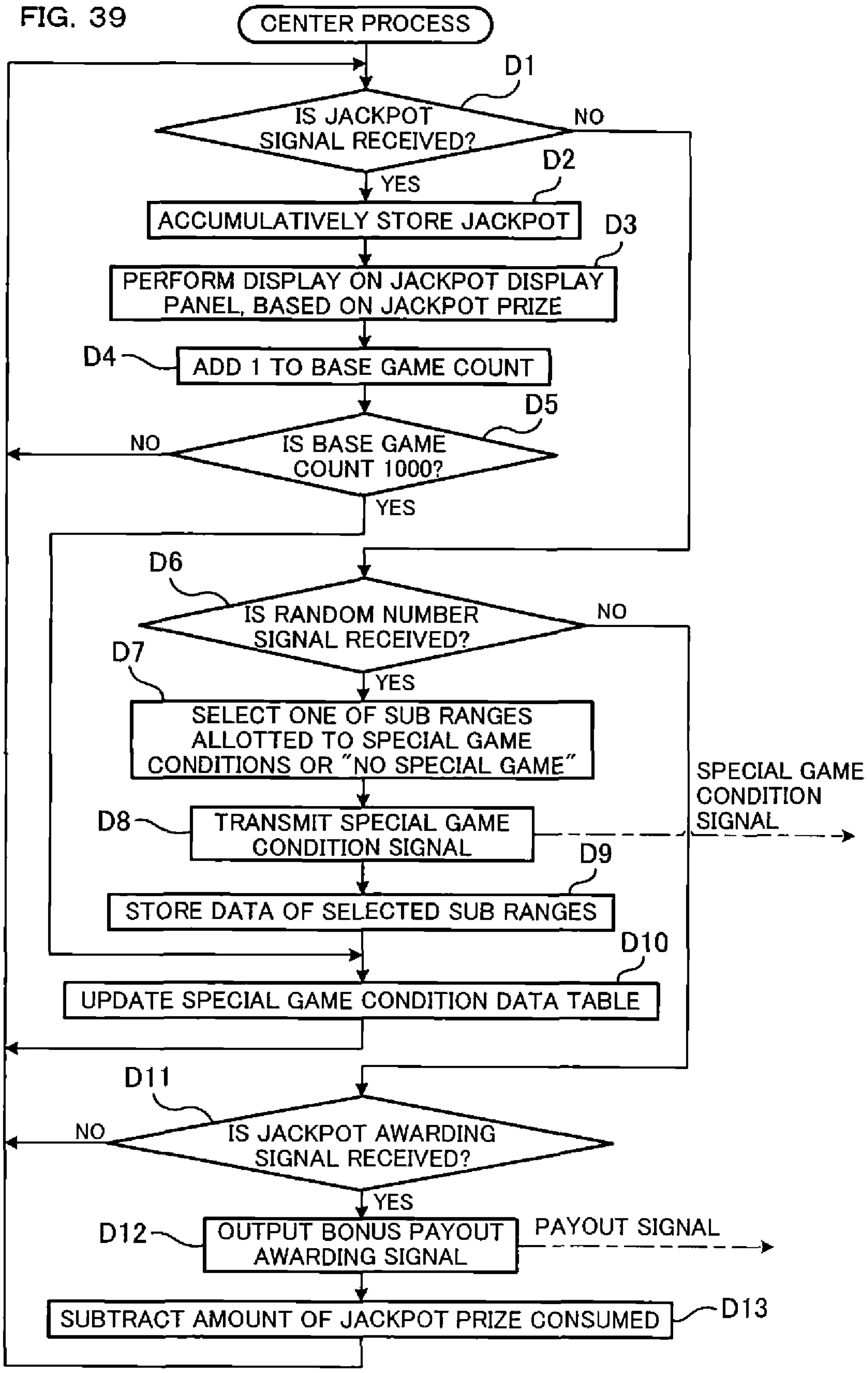
FIG. 39 is a flowchart showing a center process executed by the center server of the Embodiment 1, according to the present invention.

Next, the following describes programs run by the main CPU 241 of the center server. FIG. 39 is a flowchart of a process taking place in the center server (center process).

As illustrated in FIG. 39, the main CPU 241 determines whether a jackpot signal is received from any of the gaming terminal 10, in a routine of the center process (step D1). When it is determined that a jackpot signal is received (step D1: Yes), an accumulation amount indicated by the jackpot signal is added to the accumulated jackpot amount (step D2), and the jackpot prize is displayed on the jackpot display panel 500 (step D3).

After the step D3, the base game count stored in the RAM 243 is counted up by 1 (step D4), and whether the base game count stored in the RAM 243 is 1000 is determined (step D5). When it is determined that the base game count is not 1000 (step D5: No), the process returns to step D1.

When the main CPU 241 determines in step D1 that no jackpot signal is received (step D1: No), the CPU 241 determines whether a random number signal is received (step D6). When it is determined that a random number signal is received (step D6: Yes), the main CPU 241 selects one of the sub ranges each allotted to one of the different special game conditions or "No Special Game", based on a random number indicated by the random number signal, the bet amount placed by a player in the base game, and the special game condition data table (step D7).

After step D4, the main CPU 241 transmits to the gaming terminal 10 a signal indicating the selected sub range (step D8). Next, the main CPU 241 stores in the RAM 243 the selected sub range (step D9).

After step D9 or when it is determined that the base game count is 1000 times (step D5: Yes), the main CPU 241 updates the special game condition data table based on: the special game condition data table stored in the RAM 243; total number of base games run in the plural gaming terminals 10 connected to the center server 200; how many times each sub range allotted to a special game condition has been selected; special game condition basic data table stored in the ROM 242; and the allocation number reduction table (step D10).

On the other hand, when it is determined in step D6 that no random number signal is received (step D6: No), the main CPU 241 determines whether a jackpot awarding signal is received (step D11). When it is determined that no jackpot awarding signal is received (step D11: No), the process returns to step D1.

On the other hand, when it is determined that a jackpot awarding signal is received (step D11: Yes), a payout signal indicating the jackpot prize is transmitted to the gaming terminal 10 having transmitted the jackpot awarding signal (step D12), and reduces the jackpot prize in the RAM 243 by an amount consumed (step D13). The process then returns to step D1.

As described above, the program and control is simplified by using a single random number sampled by the random number generating circuit 64 for running the base game and selecting one of the sub ranges each allotted to one of the special game conditions or "No Special Game". Determining whether to run the special game while selecting the special game condition allows wider variation of effects for the special game.

Further, as described above, the sub ranges each allotted to the special game conditions in the special game condition data table are variable according to the amount of bet placed by the player. These sub ranges variable according to the amount of bet placed by the player in the base game draw more attention of players to the special game.

Further, as described above, the sub ranges each allotted to the special game conditions in the special game condition data table are varied so that the sub range allotted to "No Special Game" covers no values, when the amount of bet placed by the player in the base game is the maximum bet amount that can be placed by the player. Thus, when the amount of bet placed by the player in the base game is the maximum bet acceptable in the base game, the sub ranges are varied so that the sub range allotted to "No Special Game" covers no values. Therefore, the sub range allotted to "No Special Game" will not be selected in the process of selecting the sub range. This encourages players to place the maximum bet amount in the base game, increase the profit of the hall, and draws more attention of players to the special game as compared with the case of known gaming systems.

With the center server 200 collectively managing the special game condition data table of the gaming terminals 10 as mentioned above, the settings of the sub ranges each allotted to one of the special game conditions or "No Special Game" are easily modifiable.

The present embodiment deals with a case where the number of payline 300 is 25; however, the number of paylines is not limited in the present invention. For example, the number of paylines may be 30.

Further, the present embodiment deals with a case where the average payout of each special game condition is varied according to the number of free games. However, the present invention is not limited to this. For example, a payout table with larger amounts of payout may be used for a special game condition associated with a larger average payout, as compared to the payout table used for a special game condition associated with a smaller average payout.

Thus, the Embodiment 1 of the present invention is described above.

Embodiment 2

Figure 40:
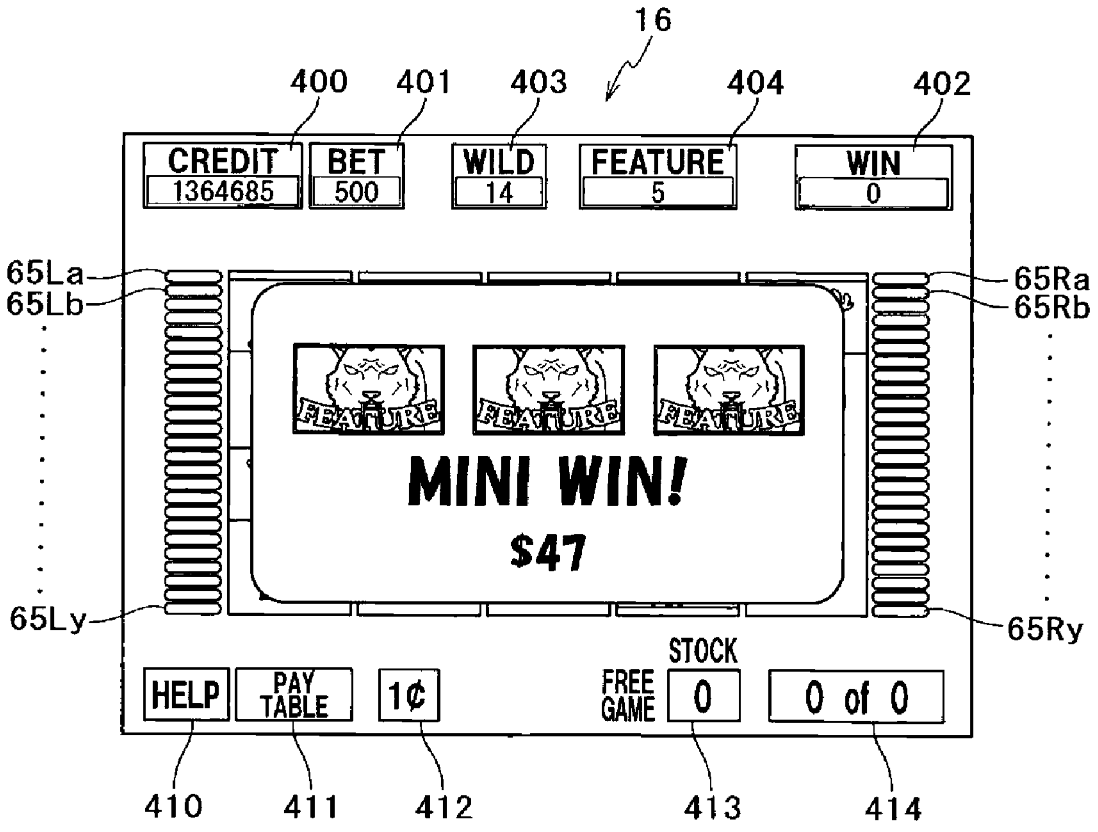
FIG. 40 is an exemplary screen displayed on a lower image display panel of a gaming terminal of an Embodiment 2, according to the present invention.

Next, the following describes a gaming system 1 of an Embodiment 2, according to the present invention, with reference to FIGS. 40 to 45. Note that members that are identical to those described in the Embodiment 1 are given the same reference symbols, and no further explanation is provided for those members. The Embodiment 2 differs from the Embodiment 1 in that Embodiment 2 is configured to award a special award as illustrated in FIG. 40, instead of selecting one of sub ranges each allotted to one of the special game conditions or "No Special Game". The wording "special award" means a benefit awarded to a player aside from a payout of a base game. In the present embodiment, a jackpot prize according to the winning rank is awarded to the player. Further, in the Embodiment 2, random numbers used for selecting one of the sub ranges each allotted to one of the winning ranks (special game condition) of the special award or "Loss" ("No Special Game") are sampled by a center server 200, while those numbers are sampled by the random number generating circuit 64 of the gaming terminal 10 in the Embodiment 1.

Further, for each base game, there are following four different bet amounts can be placed by the player: "1", "2", "100", "1000".

Figures 41, 42:
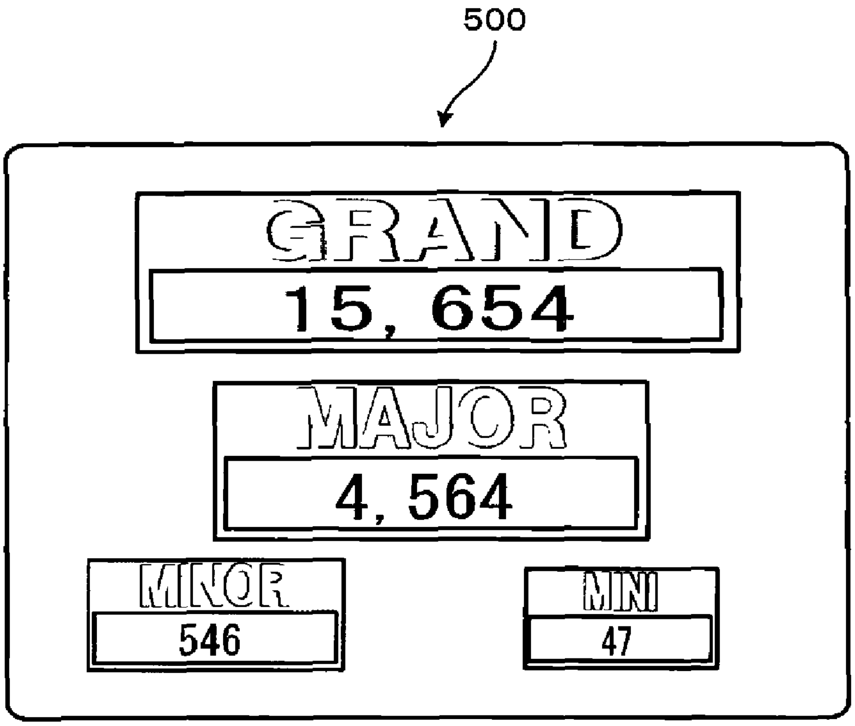
FIG. 41 shows an exemplary screen displayed on a jackpot display panel of the center server of the Embodiment 2, according to the present invention.
FIG. 42 shows a jackpot table stored in the gaming terminal of the Embodiment 2, according to the present invention.

FIG. 41 is a jackpot screen displayed on a jackpot display panel 500 of the center server 200. The jackpot screen displays thereon a jackpot prize according to the winning rank of the special award.

As shown in a jackpot table of FIG. 42, for each winning rank, there is determined an initial value of the jackpot prize and an amount by which the jackpot prize increases for each game medium having been bet in the base game. For example, in cases of "Grand Winning" winning, the initial value is "10,000". This value is increased in increment of "0.05" for each game medium bet in the base game.

When the special award is won, the jackpot prize of the winning rank displayed on the jackpot screen is awarded from the jackpot-award-targeted gaming terminal 10.

(Processes in Gaming System 1)

Next, the following describes programs run in the gaming system 1.

(Processes in Gaming Terminal 10)

Figure 43:
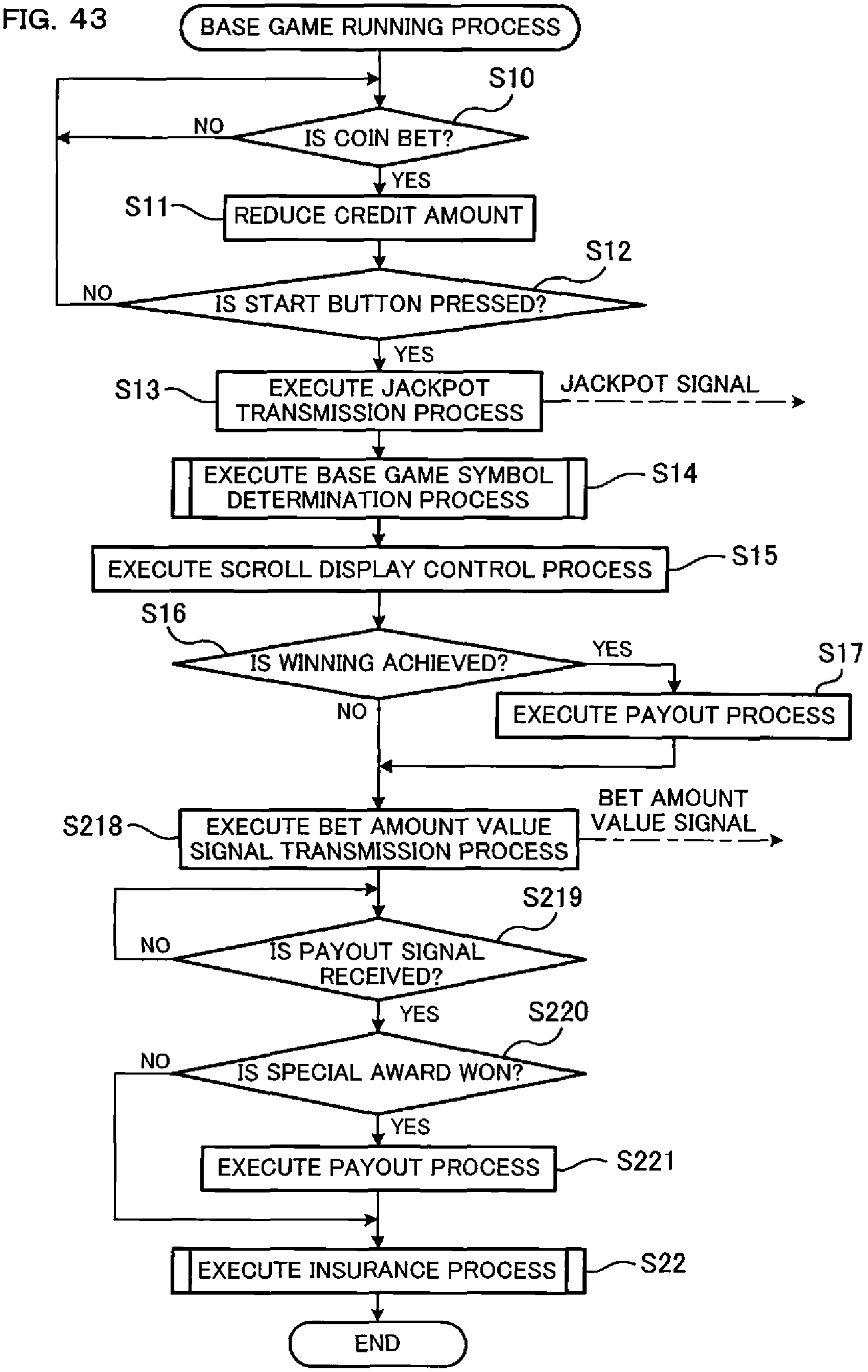
FIG. 43 is a flowchart of a process executed by the gaming terminal of the Embodiment 2, according to the present invention.

FIG. 43 is a flowchart of a process executed in the gaming terminal 10. S10 to S17, and S22 are the same as those described in the Embodiment 1. Therefore, no further explanation is provided here.

After S17, or when it is determined in S16 that no winning has been achieved (S16: No), the main CPU 41 performs abet amount value transmission process which transmits, to the center server 200, a bet amount value signal indicative of the number of coins bet by a player in the base game (S218).

Next, the main CPU 41 determines whether a payout signal is received from the center server 200 (S219). If it is determined that no payout signal is received (S219: No), the process returns to S219. On the other hand, if it is determined that a payout signal is received (S219: Yes), there is determined whether a sub range allotted to one of the winning ranks is selected (S220). If it is determined that a sub range allotted to one of the winning ranks is not selected (S220: No), the process transits to S22 which is an insurance process. On the other hand, if it is determined that a sub range allotted to one of the winning ranks is selected (S220: Yes), the jackpot amount indicated by the payout signal is awarded to the player (S221). The process then transits to S22.

(Process in Center Server 200)

Figure 44:
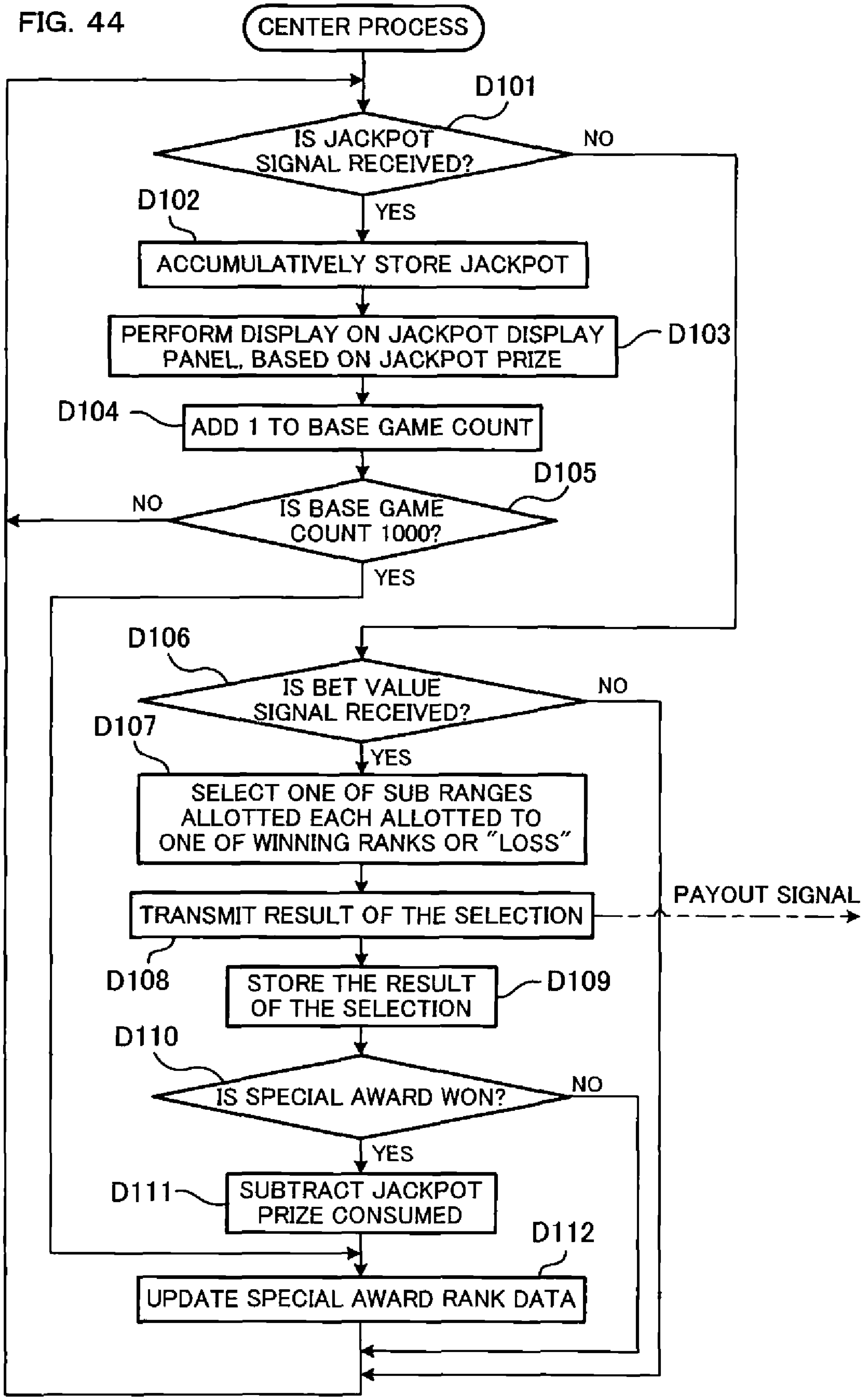
FIG. 44 is a flowchart of a process executed by the center server of the Embodiment 2, according to the present invention.
Figure 46:
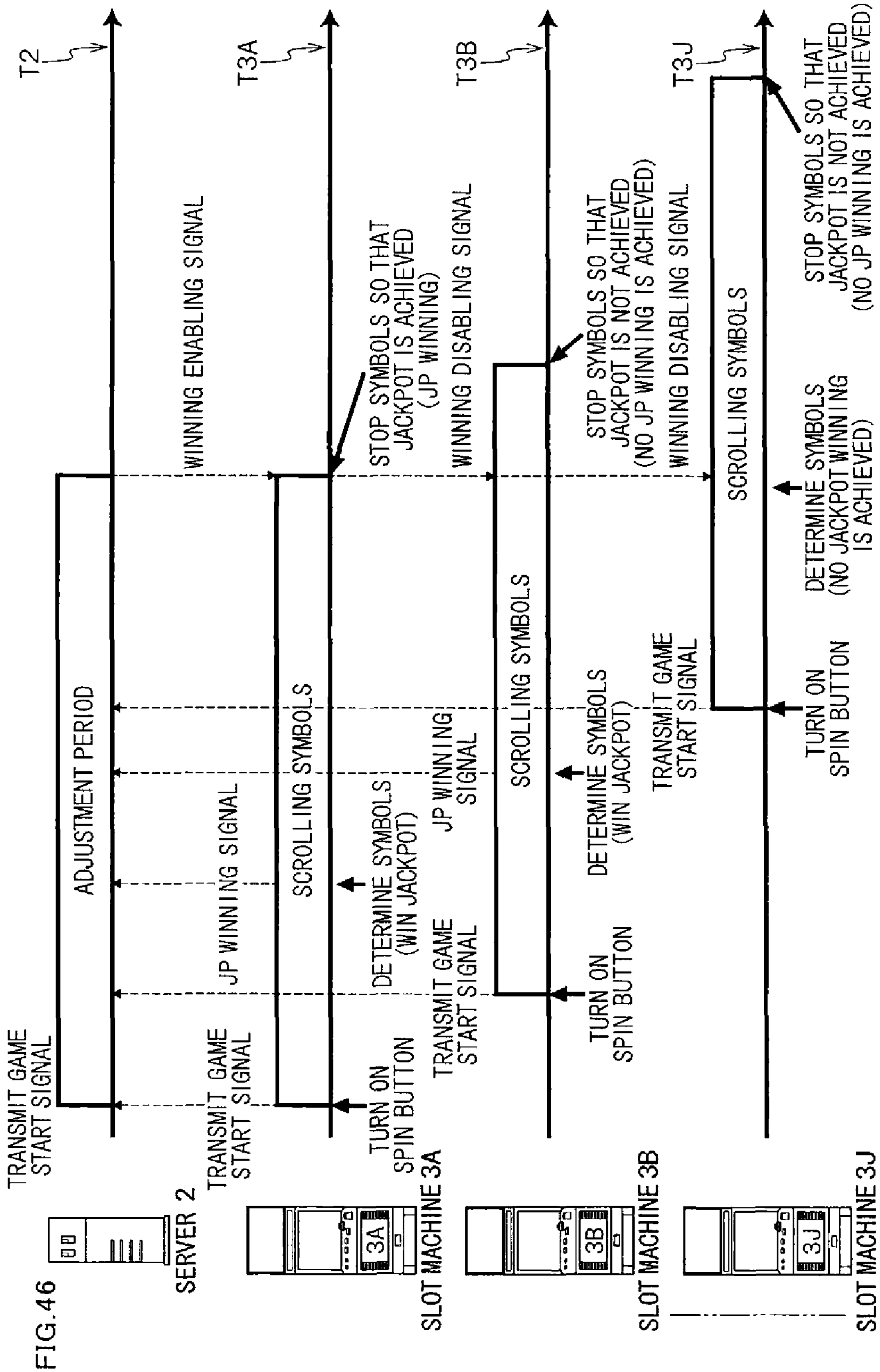
FIG. 46 is an explanatory diagram of a timing chart showing the outline of the operation of a gaming system of an Embodiment 3 of the present invention.

FIG. 44 is a flowchart of a process executed in the center server 200.

First, the main CPU 241 determines whether or not a jackpot signal is received from any gaming terminal 10 (D101). If it is determined that a jackpot signal is received (D101: Yes), the jackpot prize of each winning rank of the special award is increased based on the bet amount indicated by the jackpot signal and the jackpot table and stored (D102). Then, jackpot prizes of all the winning ranks of the special award are displayed on the jackpot display panel 500 (D103).

After D103, the number of base games stored in RAM 243 is increased by 1 (D104). Then, there is determined whether the number of base games stored in the RAM 243 is 1000 (D105). If it is determined that the number of base games stored is not 1000 (D105: No), the process returns to D101.

If, in D101, the main CPU 241 determines that no jackpot signal is received (D101: No), there is judged whether or not a bet amount signal is received (D106). If it is determined that a bet amount value signal is received (D106: Yes), one of the sub ranges each allotted to one of the winning ranks or "Loss" is selected (D107), based on the bet amount placed by the player in the base game, which amount is indicated by the bet amount value signal; a random number sampled by the center server 200 when the bet amount value signal is received; and the special award rank data table (see FIG. 45).

(Special Award Rank Data Table)

The following describes a special award rank data table of the Embodiment 2. FIG. 45 shows a special award rank data table used in the process of selecting one of the sub ranges each allotted to one of the winning ranks or "Loss". The special award rank data table includes various random number ranges, each of which is one of ranges covering a range of random numbers 1 to 20000 which is the same range as a range of random numbers sampled by the center server 200. Each random number range is associated with one of rows each representing one of the winning ranks or "Loss", and one of columns each representing a bet amount placed by a player in the base game. For example, if the center server 200 samples "21" and if the amount of bet placed in the base game is "1", then "Loss" associated with a random number range including that random number sampled by the center server 200 is selected. Similarly, if the bet amount is "2", then "Mini Winning" is selected. If the bet amount is "100", then "Grand Winning" is selected.

The special award rank data table is set so that each range of random numbers associated with a winning rank widens with an increase with an increase in the amount of bet placed by a player in the base game. For example, in cases of "Grand Winning", the bet amount "1" in the base game is associated with a random number range that only covers "1". Therefore, the allocation number for the bet amount "1" is "1". The allocation number increases to "2" for the bet amount "2", and to "100" for the bet amount "100". The allocation number is "1000", when the bet amount is "1000 (MAX)". As described, the sub ranges each allotted to one of the winning ranks are variable according to the amount of bet placed by the player in the base game. These sub ranges draw more attention of players to the special award.

Note that the special award rank data table of the Embodiment 2 is updated based on the special award rank basic data table (not shown), how many times each of the winning ranks has been selected, the number of base games played, and an allocation number reduction table (not shown).

Next, the main CPU 241 transmits, to a gaming terminal 10 from which a random number signal is transmitted, a payout signal which indicates whether the special award is won, and if the special award is won, indicates the winning rank selected and the jackpot prize according to the selected winning rank (D108). Next, the result of selecting one of the sub ranges each allotted to one of the winning ranks or "Loss" is stored (D109). Next, there is determined whether a sub range allotted to one of the winning ranks is selected (D110). If it is determined that a sub range allotted to one of the winning ranks is not selected (D110: No), the process returns to D101.

On the other hand, if it is determined that a sub range allotted to one of the winning ranks is selected (D110: Yes), the jackpot value stored in the RAM 243 is initialized by subtracting therefrom the amount of jackpot value consumed (D111).

After D111 or in D105, if it is determined that the number of base game played is 1000 (D105: Yes), the main CPU 241 updates the special award rank data table based on: special award data stored in the RAM 243; the total number of base games run in the plurality of gaming terminals 10 connected to the center server 200; the number of times each winning rank of the special award being selected; the special award rank basic data table stored in the ROM 242; and the allocation number reduction table (D112). The process then returns to D101.

As described, the program and control are simplified by using a single random number sampled in the center server 200 for selecting one of the sub ranges each allotted to one of the winning ranks of the special award or "Loss". Since the winning rank of the special award is already determined when determining whether to award the special award, the effects for the special game can be diversified.

Further, as described, the sub ranges respectively allotted to the winning ranks of the special award in the special award rank data table are variable according to the amount of bet placed by a player. These sub ranges variable according to the amount of bet placed by a player in the base game draws more attention of players to the special award.

Note that the present embodiment deals with a case where the special award is awarded to the player in the form of the Jackpot prize. The present invention however is not limited to this and the special award may be a fixed amount of payout which is determined for each rank of the special award.

Further, in the present embodiment, the payout of the special award is paid out from a gaming terminal 10 having transmitted the bet amount value used in selecting one of the sub ranges each allotted to one of the winning ranks or "Loss". However, the present invention is not limited to this. For example, when a sub range allotted to one of the winning ranks is selected, a bonus game may be run in gaming terminals 10 connected to the center server 200 to have players compete against one another to win the special award of the winning rank.

Thus, the Embodiment 2 of the present invention is described above.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Embodiment 3

The following describes an Embodiment 3 of a gaming system and a control method to operate the gaming system according to the present invention. Note that reference numbers and symbols given to members and steps of flowcharts are only applicable to those described within the present embodiment, and do not represent the members or the steps of the other embodiments.

The present invention is realized as a control method for operating a gaming system which includes: two or more terminal devices each of which executes a base game and a bonus game with a game value being bet and awards a prize according to a predetermined winning; and a server which includes a storage device and a controller for controlling the operation, the control method causing the gaming system to execute the steps of: accumulatively storing in the storage device a percentage of the game value being bet, in each base game executed in each terminal device; causing each terminal device to independently run a bonus game when the game value accumulated in the storage device reaches a predetermined value; in a bonus game run by each terminal device, awarding a game value equivalent to the predetermined value to a terminal device in which a predetermined winning is met first; and performing adjustment so that the predetermined winning is not met in terminal devices other than the terminal device in which the predetermined winning has been met first.

In the embodiment, the aforesaid "bonus game" is "jackpot game", and "jackpot game" is a game played for the purpose of obtaining coins corresponding to an accumulated value. The accumulated value is a value resulting from accumulative calculation of a percentage of an amount bet at each terminal device. A jackpot game is played independently of or in parallel to a main plot of a base game.

Figure 47:
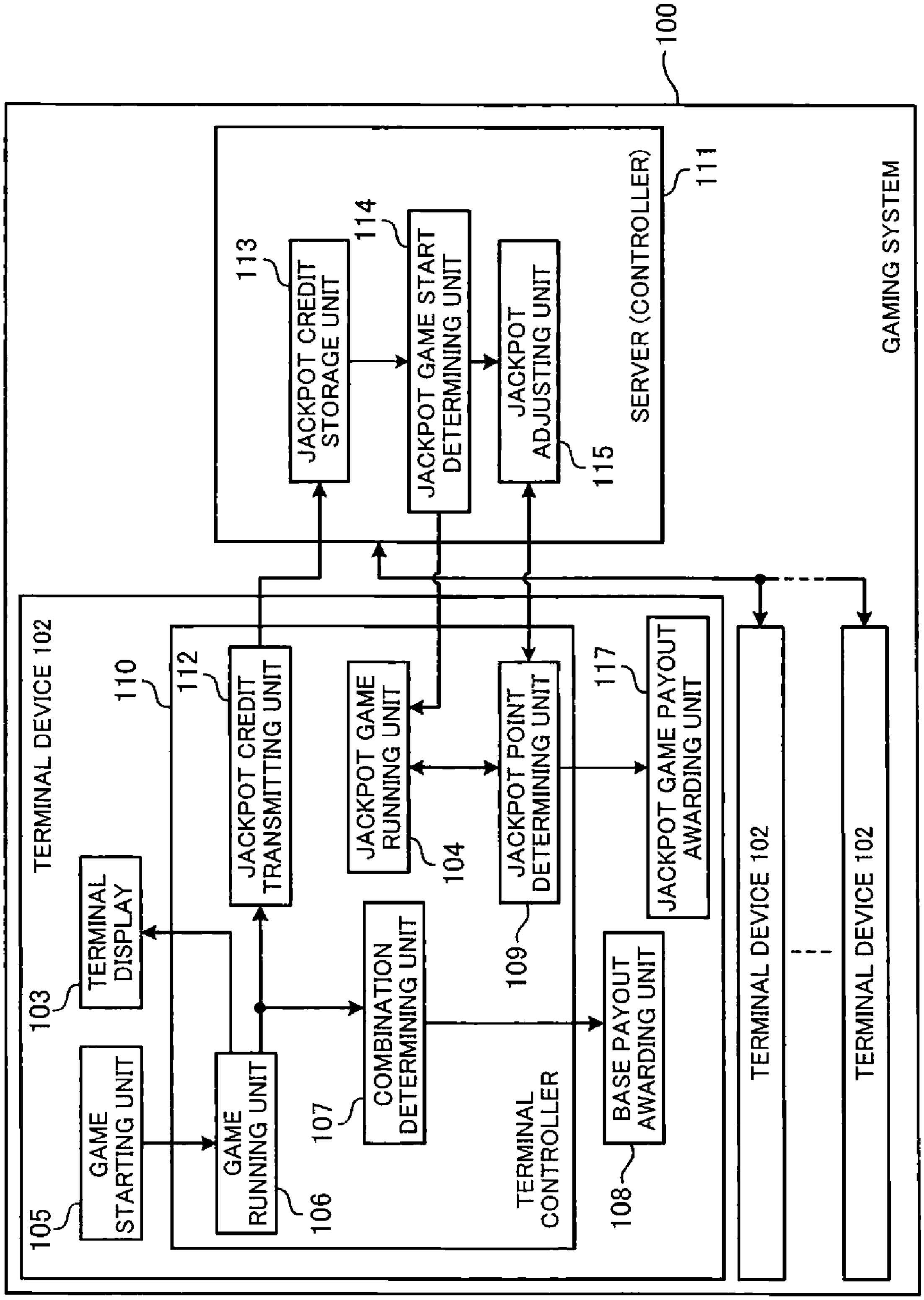
FIG. 47 is a block diagram of the gaming system of the Embodiment 3 of the present invention.

A gaming system 100 which runs the above game includes a server (controller) 111, and two or more terminal devices 102, as shown in FIG. 47.

The server (controller) 111 has a jackpot credit storage unit 113, a jackpot game start determining unit 114, and a jackpot adjusting unit 115. Each of the terminal devices 102 has a game starting unit 105, a terminal controller 110, a terminal display 103, a base payout awarding unit 108, and a jackpot game payout awarding unit 117.

Further, the terminal controller 110 has a game running unit 106, a jackpot credit transmitting unit 112, a combination determining unit 107, a jackpot game running unit 104, and a jackpot processing unit 109.

The terminal display 103 may have a mechanical structure adopting a reel device which rotates a reel to arrange symbols 180. Alternatively, the terminal display 103 may have an electrical structure in which a video reel is displayed as an image to arrange symbols 180. Further, a combination of the mechanical structure (reel) and the electric structure (video reel) may also be possible. Examples of the electrical structure include a liquid crystal display device, a CRT (cathode-ray tube), a plasma display device, and the like. A specific structure of the terminal display 103 will be detailed later.

(Controller 111 and Terminal Controller 110)

Each of the controller 111 and the terminal controller 110 is configured to execute: a first process of accumulatively storing in the jackpot credit storage unit 113 a percentage of a game value which is bet in a base game run in each terminal device 102; a second process of causing each terminal device 102 to independently run a jackpot game when the game value accumulated in the jackpot credit storage unit 113 reaches a predetermined value; a third process of awarding a game value equivalent to the predetermined value to the terminal device 102 in which a predetermined winning has been met first, in a jackpot game run by each terminal device 102; and a fourth process of performing adjustment so that the predetermined winning is not met in the terminal devices 102 other than the terminal device 102 in which a predetermined winning has been met first. In other words, the controller 111 and the terminal controller 110 include four process stages.

(Operations of Controller 111 and Terminal Controller 110)

A description will be given to operations of the controller 111 and the terminal controller 110 having the above-described structure. First, after a game value is bet, triggered by a base game start signal from the game starting unit 105, the game running unit 106 starts to variably display the symbols 180 which have been arranged on the terminal display 103. That is, a base game is executed at each terminal device 102.

When the game running unit 106 executes a base game, the jackpot credit transmitting unit 112 transmits, to the controller 111, information of a percentage of a game value which has been bet (i.e. jackpot credit information).

Then, the jackpot credit storage unit 113 accumulates that percentage of game value transmitted and stores the accumulation as an accumulated value In short, the terminal controller 110 and the controller 111 execute the first process.

Next, the jackpot game start determining unit 114 determines whether the amount of accumulated game values stored as accumulated value in the jackpot credit storage unit 113 reaches a predetermined value. When the amount of accumulated game values as accumulated value reaches the predetermined value, the jackpot game start determining unit 114 transmits a jackpot game start signal to the jackpot game running unit 104 of each terminal device 102. Then, triggered by the jackpot game start signal, the jackpot game running unit 104 runs a jackpot game. In short, the terminal controller 110 and the controller 111 execute the second process.

Thereafter the jackpot processing unit 109 transmits a jackpot winning signal to the server (controller) when a result of a jackpot game run by the jackpot game running unit 104 indicates that a jackpot as a predetermined winning has been met. Receiving the jackpot winning signal, the jackpot adjusting unit 115 transmits a winning enabling signal to the terminal device 102 in which the jackpot has been met first. In the terminal device 102 which has received the winning enabling signal, the jackpot processing unit 109 stops variably displayed symbols 180 on the terminal display 103 in such a way that the jackpot is met. Thereafter, in the terminal device 102 in which the jackpot has been met, the jackpot game payout awarding unit 117 awards the game value which is accumulatively stored as an accumulated value in the jackpot credit storage unit 113. In short, the terminal controller 110 and the controller 111 execute the third process.

In addition to the above, receiving the jackpot winning signal, the jackpot adjusting unit 115 transmits a winning disabling signal to the terminal devices 102 other than the terminal device 102 to which the jackpot winning signal is transmitted first. In each terminal device 102 receiving the winning disabling signal, the jackpot processing unit 109 stops variably displayed symbols 180 on the terminal display 103 in such a way that the jackpot is not met. In short, the terminal controller 110 and the controller 111 execute the fourth process.

Each block of the controller 111 and the terminal controller 110 may be formed by hardware or by software as needed.

As discussed above, the present invention is realized as a control method of a gaming system 100 which includes: two or more terminal devices 102 each of which runs a base game and a bonus game (jackpot game) with a game value being bet and awards a prize according to a predetermined winning; a server 111 which includes a storage device (jackpot credit storage unit 113) and a controller which controls the operation, the gaming system including the steps of: accumulatively storing in the storage device a percentage of the game value being bet, in each base game run by each terminal device 102; causing each terminal device 102 to independently run a bonus game when the game values accumulated in the storage device reach a predetermined value; awarding a game value equivalent to the predetermined value to the terminal device 102 in which a predetermined winning is met first, in the bonus game run by each terminal device 102; and performing adjustment so that the predetermined winning is not met in the terminal devices 102 other than the terminal device 102 in which the predetermined winning is met first.

According to the structure above, in a jackpot game independently run in each terminal device 102, the server (controller) 111 awards a game value equivalent to a predetermined value accumulated in the storage device (jackpot credit storage unit 113) to the terminal device 102 in which a predetermined winning (wining of a jackpot) is met first, and performs adjustment so that the predetermined winning is not met in the terminal devices 102 other than the terminal device 102 in which the predetermined winning is met first. This prevents two or more terminal devices 102 from simultaneously receiving a predetermined winning (jackpot). Therefore only a player who meets a jackpot first is awarded a game value accumulatively stored as an accumulated value in the jackpot credit storage unit 113.

Embodiment 3-1

The following describes an Embodiment 3-1 where the gaming system 100 having the above-described structure is applied to a gaming system 1 constituted by a server 2 and slot machines 3A to 3J, and specifically structured in mechanical, electrical, and operational senses.

(Structure of Gaming System 1)

The gaming system 1 is placed in a gaming facility or the like. The slot machines 3A to 3J constituting the gaming system 1 run a unit game with a game value. The game value is a coin, a bill, or a value in the form of electronic information. However, the game value in the present invention is not particularly limited. For example, a medal, token, electronic money, a ticket and the like are also possible. Further, the ticket is not particularly limited and may be a barcoded ticket which will be described later, and the like.

Figure 48:
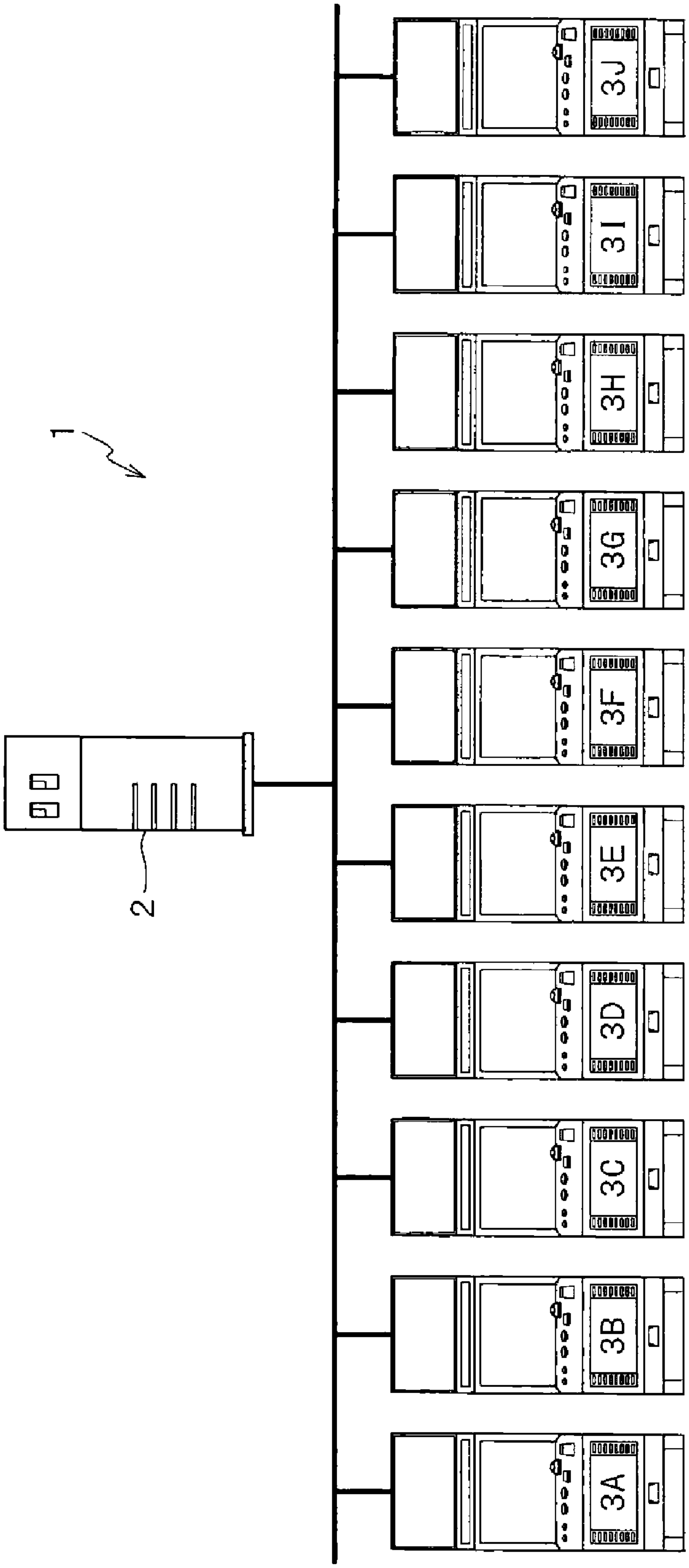
FIG. 48 is a schematic drawing of the gaming system of the Embodiment 3.

The gaming system 1 of the Embodiment 3-1 is outlined first, with reference to FIG. 48. FIG. 48 is a schematic drawing of the gaming system 1 of the Embodiment 3-1 of the present invention.

As shown in FIG. 48, the gaming system 1 includes 10 slot machines 3A to 3J and a server 2 which are interconnected with one another over a network.

In the gaming system 1 according to this embodiment, a percentage of coins bet at each of the slot machines 3A to 3J is accumulatively calculated, so that an accumulated value is obtained. The accumulated value which has been accumulatively calculated is stored in the RAM 243 of the server 2. When the accumulated value reaches a predetermined value, a jackpot game is run at each of the slot machines 3A to 3J, for the purpose of obtaining coins corresponding to the accumulated value.

(Structure of Slot Machine)

Figure 49:
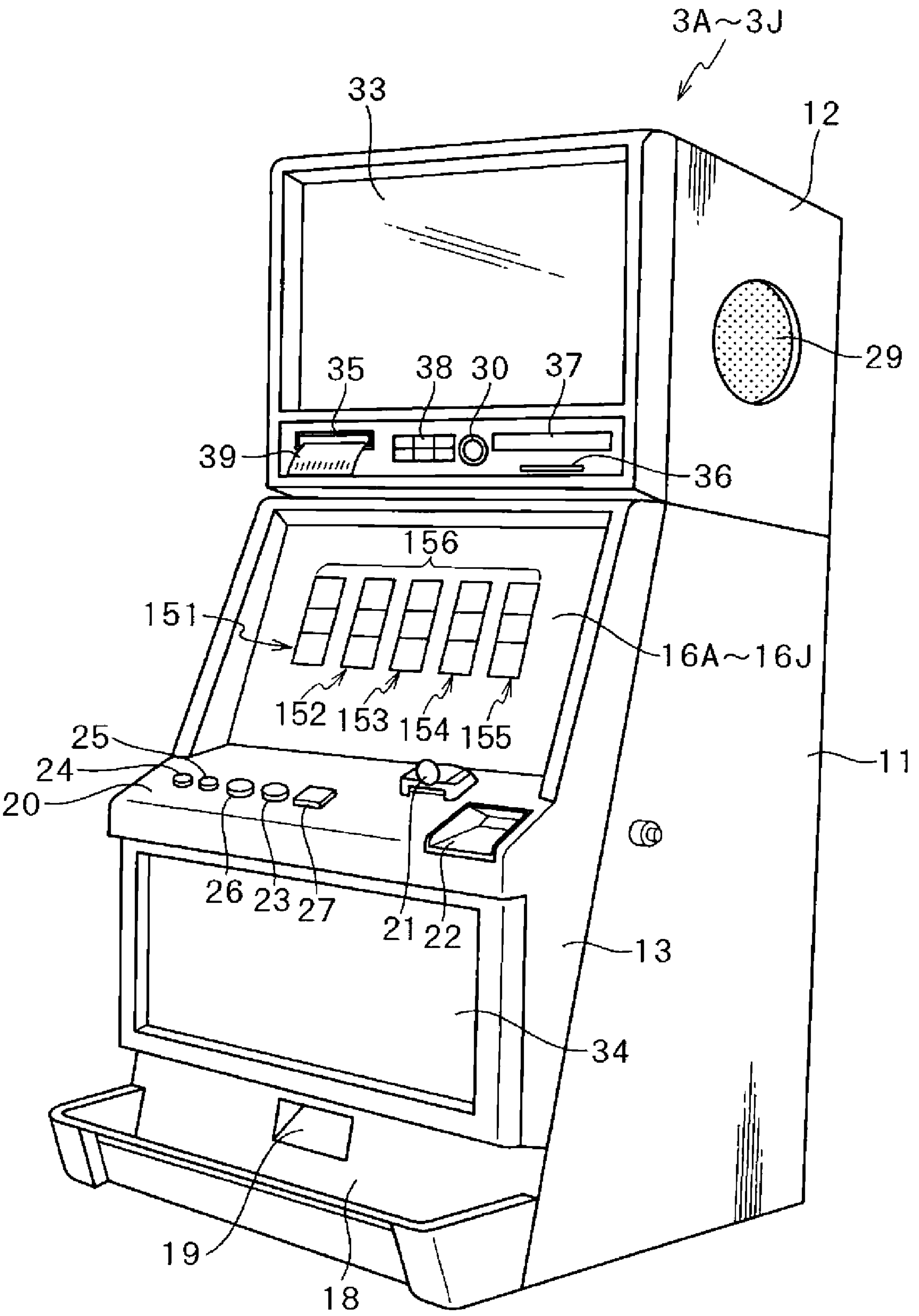
FIG. 49 is a perspective view showing an external appearance of a slot machine.

As shown in FIG. 49, the slot machine (3A to 3J) has a cabinet 11, a top box 12 placed on an upper side of the cabinet 11, and a main door 13 provided on a front surface of the cabinet 11. To the main door 13, a lower image display panel (16A to 16J) is provided. The lower image display panel (16A to 16J) has a transparent liquid crystal panel which displays various information. In addition, the lower image display panel (16A to 16J) displays thereon display windows 151 to 155 (a matrix 156) where more than one symbols 180 are arranged, and displays game-related various information, an effect image, and the like, as needed. Note that the slot machine (3A to 3J) corresponds to the terminal device 102 of FIG. 47. The lower image display panel (16A to 16J) serving as a terminal display corresponds to the terminal display 103 of FIG. 47.

Here, "arranging symbols" means making a state where symbols 180 are visibly identifiable by a player. For example, in FIG. 56, it means making a state where symbols 180 are displayed in the display windows 151 to 155. Arranging symbols 180 again after dismissing symbols 180 is called "rearranging".

This embodiment deals with, as an example, a case where the lower image display panel (16A to 16J) electrically displays symbols 180 to thereby displaying five columns and three rows of symbols. However, the present invention is not limited thereto. For example, three columns and three rows of symbols, or five columns and five rows of symbols, may be acceptable.

In this example, symbols 180 arranged in the display windows 151 to 155 are scatter symbols. Here, scatter symbols means such symbols that activation occurs (i.e., a payout is awarded, a bonus game is given, or the like) when a predetermined number of them stop in the matrix of arrangement areas made up of the five columns and three rows of the display windows 151 to 155. For example, in a base game where scatter symbols are adopted, a payout is awarded when a predetermined number (e.g., five or more) of scatter symbols are displayed in the display windows 151 to 155 (fifteen arrangement regions). That is, when a predetermined number of scatter symbols are displayed in the display windows 151 to 155, a payout is awarded regardless of display positions or an arrangement way of the scatter symbols.

Note that the lower image display panel (16A to 16J) may have a credit value indicator and a payout value indicator. The credit value indicator displays a total value (hereinafter also referred to as total credit value) which the slot machine (3A to 3J) can pay out to a player. The payout value indicator displays the number of coins to be paid out.

Below the lower image display panel (16A to 16J), provided are a control panel 20, a coin receiving slot 21, and a bill validator 22. The control panel 20 is provided with buttons 23 to 27. These buttons 23 to 27 allow a player to input commands relating to a game progress. The coin receiving slot 21 enables coins to be received into the cabinet 11.

The control panel 20 includes a spin button 23, a change button 24, a cashout button 25, a 1-BET button 26, and a MAX-BET button 27. The spin button 23 is for inputting a command to start scrolling the symbols 180. The change button 24 is used to ask a staff person of the gaming facility for money exchange. The cashout button 25 is for inputting a command to pay out coins corresponding to the total credit-value into a coin tray 18. Note that the control panel 20 corresponds to the game starting unit 105 of FIG. 47, which starts a base game.

The 1-BET button 26 is for inputting a command to bet, on a game, one coin among coins corresponding to the total credit value. The MAX-BET button 27 is for inputting a command to bet, on a game, the maximum number of coins bettable on one game (e.g., fifty coins) among coins corresponding to the total credit value.

The bill validator 22 validates whether a bill is genuine or not and receives the genuine bill into the cabinet 11. Note that the bill validator 22 is capable of reading a barcoded ticket 39 which will be described later. When the bill validator 22 reads the barcoded ticket 39, the bill validator 22 outputs to the main CPU 41 a read signal relating to what has been read.

On a front surface of a lower part of the main door 13, that is, below the control panel 20, a belly glass 34 is provided. On the belly glass 34, a character of the slot machine (3A to 3J), or the like is drawn. On a front surface of the top box 12 is provided an upper image display panel 33. The upper image display panel 33 has a liquid crystal panel, and displays an effect image, an image representing game introduction or game rules, or the like.

Further, the top box 12 has a lamp 30 for presenting an effect, and a speaker 29 for performing an audio output. Below the upper image display panel 33 are provided a ticket printer 35, a card reader 36, a data displayer 37, and a keypad 38. The ticket printer 35 prints, on to a ticket, a barcode which is an encoded form of data such as a credit-value, time and date, identification number of the slot machine (3A to 3J), and the like. As a result, the ticket printer 35 issues a barcoded ticket 39. A player can play a game in another slot machine (3A to 3J) using the barcoded ticket 39 having the barcode, or can exchange the barcoded ticket 39 having the barcode with a bill or the like at a change booth of the game arcade.

The card reader 36 reads and writes data from and into a smart card. The smart card is carried by a players and stores therein data for identifying the player and data relating to a history of games played by the player, for example.

The data displayer 37 includes a fluorescent display or the like, and displays the data read by the card reader 36 and the data input by the player through the keypad 38, for example. The keypad 38 is for entering a command or data relating to issuing of a ticket.

(Electrical Structure of Gaming System)

Figure 50:
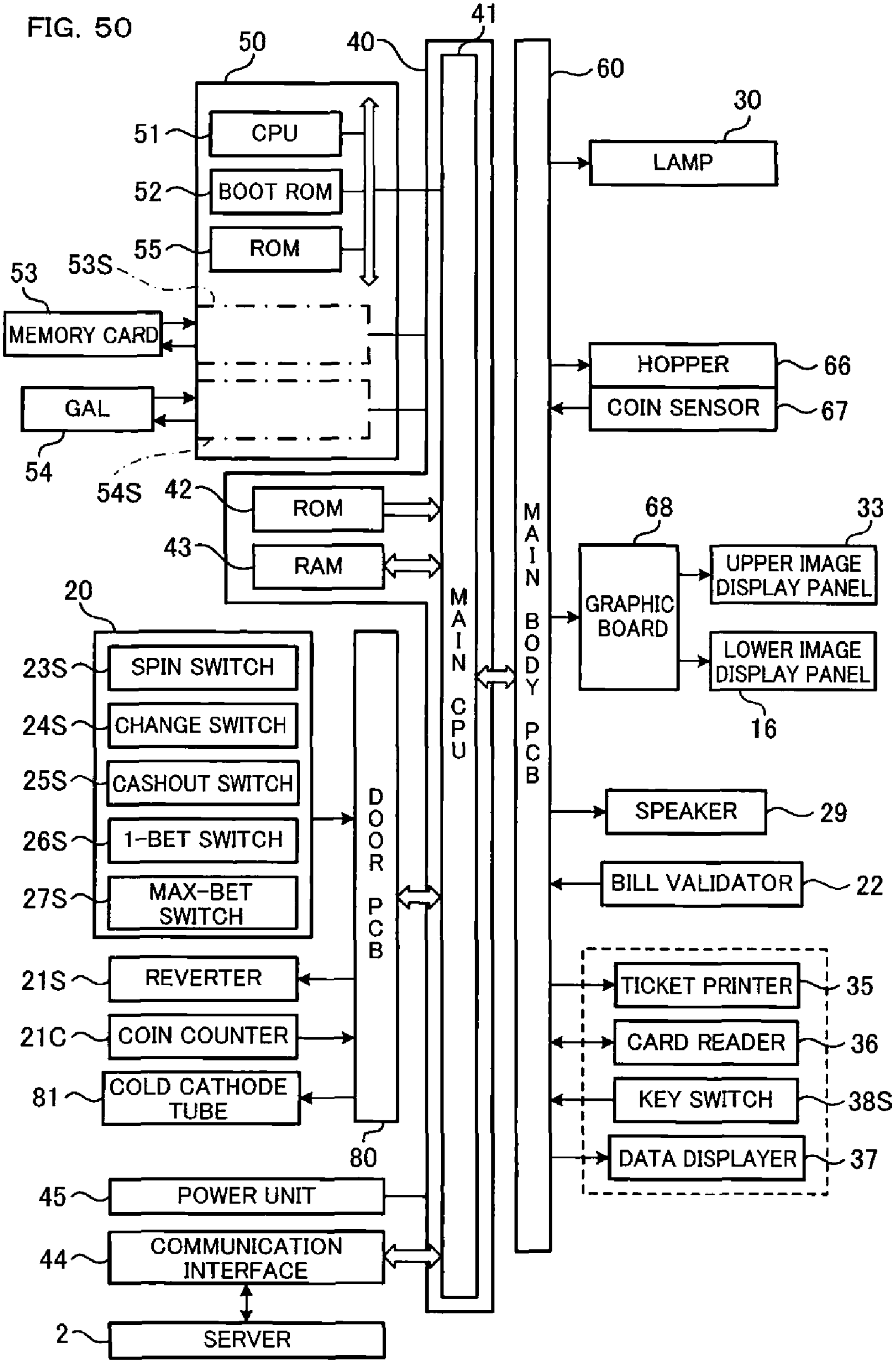
FIG. 50 is a block diagram illustrating an electrical structure of the slot machine.
Figure 55:
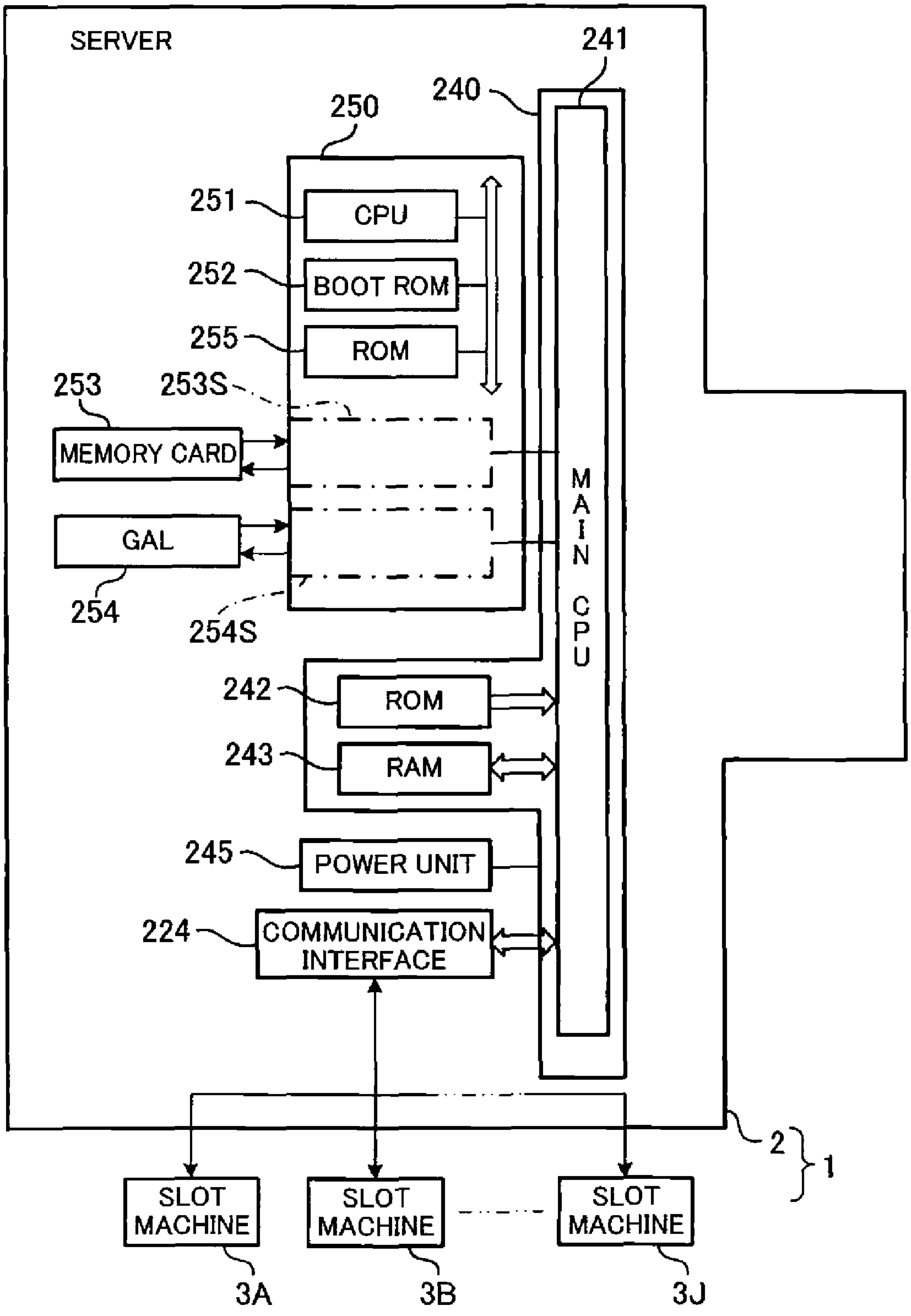
FIG. 55 is a block diagram showing an electrical structure of a server.

FIG. 50 and FIG. 55 are block diagrams showing an electrical structure of the entire gaming system 1.

(Electrical Structure of Slot Machine)

FIG. 50 is a block diagram illustrating an electrical structure of each of the slot machines 3A to 3J. As illustrated in FIG. 50, a control unit is provided within the cabinet 11. As illustrated in FIG. 50, the control unit includes a motherboard 40, a main body PCB (Printed Circuit Board) 60, a gaming board 50, a door PCB 80, various switches, sensors, or the like.

The gaming board 50 has a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 stores therein a game program and a game system program. The game program contains a stop symbol determining program. The stop symbol determining program determines symbols (code numbers corresponding to the symbols) to be stopped on the matrix 156.

This stop symbol determining program may contain sets of symbol weighting data respectively corresponding to various payout rates (e.g., 80%, 84%, and 88%). Each set of the symbol weighting data indicates, for each of the display windows 151 to 155, correspondence between a code number of each symbol column (symbol lines A to E) and at least one random number value belonging to a predetermined range. The payout rate is determined based on payout rate setting data output from the GAL 54. Based on a set of the symbol weighting data corresponding to the payout rate determined, symbols to be stopped are determined.

The memory card 53 stores therein various types of data for use in the game program and the game system program. For example, the memory card 53 stores data indicating correspondence between each of symbols 180 displayed in the display windows 151 to 155 and a range of random number values, in the form of a base game winning combination lottery table 130 (see FIG. 51). The memory card 53 also stores payout data which are based on a lottery result obtained from the base game winning combination lottery table 130, in the form of a base game payout table 131 (see FIG. 52). In addition, the memory card 53 stores, in the form of jackpot game lottery table 132 (see FIG. 53), data indicating correspondence between the symbols of "SUN" 181 which are displayed in the display windows 151 to 155 in a jackpot game and the ranges of random number values. In addition, the memory card 53 stores payout data based on a lottery result in the jackpot game lottery table 132, in the form of a jackpot game payout table 133 (see FIG. 54). These sets of data are transferred to a RAM 43 of the motherboard 40, at the time of running a base game.

The card slot 53S is structured so as to allow the memory card 53 to be attached and detached to and from the card slot 53S. This card slot 53S is connected to the motherboard 40 through an IDE bus. Thus, a type and contents of a game run at the slot machine (3A to 3J) can be changed by detaching the memory card 53 from the card slot 53S, writing a different game program and a different game system program into the memory card 53, and inserting the memory card 53 back into the card slot 53S.

The game program includes a program relating to a game progress. The game program also includes data of images and sounds to be output during a game.

The GAL 54 has input and output ports. When the GAL 54 receives data via the input port, it outputs, from its output port, data corresponding to the input data.

The IC socket 54S is structured so as to allow the GAL 54 to be attached and detached to and from the IC socket 54S. The IC socket 54S is connected to the motherboard 40, via a PCI bus. Thus, data to be output from the GAL 54 can be changed by detaching the GAL 54 from the IC socket 54S, overwriting the program stored in the GAL 54, and then attaching the GAL 54 back to the IC socket 54S.

The CPU 51, the ROM 55, and the boot ROM 52 connected to one another through the internal bus are connected to the motherboard 40 through a PCI bus. The PCI bus communicates signals between the motherboard 40 and the gaming board 50, and supplies power from the motherboard 40 to the gaming board 50. The ROM 55 stores country identification information and an authentication program. The boot ROM 52 stores a preliminary authentication program, a program (boot code) for enabling the CPU 51 to run the preliminary authentication program, and the like.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified, that is, for authenticating the authentication program.

The motherboard 40 has the main CPU 41, a ROM (Read Only Memory) 42, a RAM (Random Access Memory) 43, and a communication interface 44. Note that the motherboard 40 corresponds to the terminal controller 110 of FIG. 47.

The main CPU 41 has a function of entirely controlling the slot machine (3A to 3J). In particular, the main CPU 41 controls the following operations of: outputting a command signal for making the graphic board 68 variably display symbols 180, at a time when the spin button 23 is pressed after betting of credit; determining symbols 180 to be stopped after the variable-displaying of symbols 180; and stopping the symbols 180 thus determined in the display windows 151 to 155. Note that the main CPU 41 corresponds to the game running unit 106, the combination determining unit 107, the jackpot credit transmitting unit 112, the jackpot game running unit 104, and the jackpot processing unit 109 of FIG. 47.

In other words, the main CPU 41 serves to control arrangement, by scrolling symbols 180 displayed on the lower image display panel (16A to 16J), then selecting and determining symbols 180 to be rearranged from various kinds of symbols, to rearrange new symbols, and stopping scrolling of the symbols 180 to present the symbols thus determined.

The ROM 42 stores a program such as BIOS (Basic Input/Output System) run by the main CPU 41, and permanently-used data. When the BIOS is run by the main CPU 41, each of peripheral devices is initialized, and the game program and the game system program stored in the memory card 53 are read out through the gaming board 50. The RAM 43 stores data or a program used for the main CPU 41 to perform a process. For example, the base game winning combination lottery table 130, the base game payout table 131, the jackpot game lottery table 132, the jackpot game payout table 133, various types of game running processing programs, and various types of slot machine jackpot game running processing programs are stored in the RAM 43. In addition, a credit value is stored in the RAM 43.

The communication interface 44 communicates with a server 2 through a communication line. Further, a main body PCB (Printed Circuit Board) 60 and a door PCB 80 are connected to the motherboard 40, respectively through USBs (Universal Serial buses). Further, a power unit 45 is connected to the motherboard 40. When the power unit 45 supplies power to the motherboard 40, the main CPU 41 of the motherboard 40 is booted and in addition power is supplied to the gaming board 50 through the PCI bus so that the CPU 51 is booted.

Various devices or units which generate signals to be input to the main CPU 41, and various devices or units whose operations are controlled by signals output from the main CPU 41 are connected to the main body PCB 60 and the door PCB 80. Based on a signal input to the main CPU 41, the main CPU 41 runs the game program and the game system program stored in the RAM 43, to perform an arithmetic process. Then, the main CPU 41 stores a result of the arithmetic process in the RAM 43, or performs a control process on various devices and units by transmitting a control signal to the various devices and units.

A lamp 30, a hopper 66, a coin sensor 67, a graphic board 68, a speaker 29, a bill validator 22, a ticket printer 35, a card reader 36, a key switch 38S, and a data displayer 37 are connected to the main body PCB 60.

The lamp 30 is turned on/off based on a control signal output from the main CPU 41.

The hopper 66 is mounted within the cabinet 11 and pays out a predetermined number of coins through a coin outlet 19 into the coin tray 18, based on a control signal output from the main CPU 41. The coin sensor 67 is provided inside the coin outlet 19. When the coin sensor 67 senses that a predetermined number of coins have been delivered from the coin outlet 19, the coin sensor 67 outputs a signal to be input to the main CPU 41. Note that the hopper 66 corresponds to the base payout awarding unit 108 and the jackpot game payout awarding unit 117 of FIG. 47.

The graphic board 68 controls image display on the upper image display panel 33 and the lower image display panel (16A to 16J), based on a control signal from the main CPU 41. Further, the graphic board 68 is provided with a VDP (Video Display Processor) for generating image data based on a control signal output from the main CPU 41, a video RAM for temporarily storing the image data generated by the VDP, and the like. Note that image data used at the time when the VDP generates the image data are included in the game program which has been read out from the memory card 53 and stored into the RAM 43.

The bill validator 22 reads an image on a bill and takes only one recognized to be genuine into the cabinet 11. When taking in a genuine bill, the bill validator 22 outputs, to the main CPU 41, an input signal based on a value of the bill. The main CPU 41 stores into the RAM 43 a credit value equivalent to the value of the bill indicated by the signal.

Based on a control signal output from the main CPU 41, the ticket printer 35 prints a barcode on a ticket, and outputs it as a barcoded ticket 39. The barcode contains encoded data of the credit value stored in the RAM 43, time and date, an identification number of the slot machine (3A to 3J), and the like.

The card reader 36 reads out data from the smart card and transmits the data to the main CPU 41. Further, the card reader 36 writes data into the smart card based on a control signal output from the main CPU 41. The key switch 38S is mounted to the keypad 38, and outputs a signal to the main CPU 41 in response to a player's operation on the keypad 38. The data displayer 37 displays, based on a control signal output from the main CPU 41, data read by the card reader 36 or data input by the player through the keypad 38.

The door PCB 80 is connected to a control panel 20, a reverter 21S, a coin counter 21C, and a cold cathode tube 81. The control panel 20 is provided with: a spin switch 23S associated with the spin button 23; a change switch 24S associated with the change button 24; a cashout switch 25S associated with the cashout button 25; a 1-BET switch 26S associated with the 1-BET button 26; and a MAX-BET switch 27S associated with the MAX-BET button 27. Each of the switches 23S to 27S outputs an input signal to the main CPU 41, when a player presses the associated button.

The coin counter 21C is provided within the coin receiving slot 21, and identifies whether a coin inserted into the coin receiving slot 21 by the player is genuine. A coin other than a genuine coin is discharged from the coin outlet 19. The coin counter 21C outputs an input signal to the main CPU 41 upon detection of a genuine coin.

The reverter 21S is operated based on a control signal output from the main CPU 41. The reverter 21S distributes a coin, which the coin counter 21C has recognized as a genuine coin, to the hopper 66 or a cash box (not shown) mounted in the slot machine (3A to 3J). In other words, when the hopper 66 is full of coins, a genuine coin is distributed into the cash box by the reverter 21S. On the other hand, when the hopper 66 is not yet full of coins, a genuine coin is distributed into the hopper 66. The cold cathode tube 81 functions as a backlight mounted to the rear side of the lower image display panel (16A to 16J) and the rear side of the upper image display panel 33. The cold cathode tube 81 turns on based on a control signal output from the main CPU 41.

(Base Game Winning Combination Lottery Table)

A base game winning combination lottery table 130 which is used in a game running process executed by the slot machine (3A to 3J) will be described with reference to FIG. 51. FIG. 51 is an explanatory diagram showing a base game winning combination lottery table. The base game winning combination lottery table 130 is stored in the RAM 43, and read during a symbol determining process of the game running process which will be described later.

As shown in FIG. 51, random number values used in the base game winning combination lottery table 130 range from 0 to 5998. When a random number value sampled by the main CPU 41 is 0 to 29, a winning combination of "SUN" 181 is made. Then, five symbols 180 of "SUN" 181 are stopped in the display windows 151 to 155. When a random number value sampled by the main CPU 41 is 30 to 51, a winning combination of "HEART" 182 is made. Then, five symbols 180 of "HEART" 182 are stopped in the display windows 151 to 155. When a random number value sampled by the main CPU 41 is 52 to 107, a winning combination of "MOON" 183 is made. Then, five symbols 180 of "MOON" 183 are stopped in the display windows 151 to 155. Likewise, when a random number value is 108 to 207, a winning combination of "K" 186 is made. When a random number value is 208 to 407, a winning combination of "A" 184 is made. When a random number value is 408 to 807, a winning combination of "Q" 187 is made. When a random number value is 808 to 1477, a winning combination of "J" 185 is made. When a random number value is 1478 to 1807, a winning combination of "10" 188 is made. When a random number value sampled by the main CPU 41 is 1808 to 5998, it means a loss, and a losing combination of symbols 180, which is different from any of the above-mentioned winning combinations, is stopped in the display windows 151 to 155. Here, making any of these winning combinations means that a winning combination is achieved.

(Base Game Payout Table)

Next, a base game payout table 131 will be described with reference to FIG. 52. The base game payout table 131 indicates the number of coins to be paid out for a winning combination determined using the base game winning combination lottery table 130 shown in FIG. 51. FIG. 52 shows a base game payout table. The base game payout table 131 is stored in the RAM 43, and is read during a base game payout process of various game running processes which will be described later.

For a result of sampling using the base game winning combination lottery table 130, zero or more coins are paid out in accordance with a winning combination displayed in the display windows 151 to 155 based on the base game payout table 131.

More specifically, when five symbols 180 of "SUN" 181 are stopped in the display windows 151 to 155, seventy coins are paid out. When five symbols 180 of "HEART" 182 are stopped in the display windows 151 to 155, fifty coins are paid out. When five symbols 180 of "MOON" 183 are stopped in the display windows 151 to 155, thirty coins are paid out as a payout. Likewise, when five symbols 180 of "K" 186 are stopped in the display windows 151 to 155, twenty-five coins are paid out as a payout. When five symbols 180 of "A" 184 are stopped in the display windows 151 to 155, twenty coins are paid out as a payout. When five symbols 180 of "Q" 187 are stopped in the display windows 151 to 155, fifteen coins are paid out as a payout. When five symbols 180 of "J" 185 are stopped in the display windows 151 to 155, ten coins are paid out as a payout. When five symbols 180 of "10" 188 are stopped in the display windows 151 to 155, five coins are paid out as a payout. When a lottery results in losing, and a losing combination of symbols 180, which is different from any of the above-mentioned winning combinations, is stopped in the display windows 151 to 155, zero coin is paid out as a payout. Note that, when one coin is inserted for a game, the above-mentioned number of coins is paid out as a payout. When two or more coins are inserted for one game, the number of coins actually paid out is calculated by multiplying the number of inserted coins by each of the above-mentioned numbers of coins paid out.

(Jackpot Game Lottery Table)

Referring to FIG. 53, the following describes a jackpot game lottery table 132 which is used in various slot machine jackpot game running processes run in a slot machine (3A to 3J). FIG. 53 is an explanatory diagram of the jackpot game lottery table 132. The jackpot game lottery table 132 is stored in the RAM 43 and is data which is read in various slot machine jackpot game running processes and jackpot symbol determining processes.

As shown in FIG. 53, random number values used in the jackpot game lottery table 132 range from 0 to 5998. When a random number value sampled by the main CPU 41 falls within the range of 0 to 51, it is determined that five out of 15 symbols 180 stopped in the display windows 151 to 155 are symbols of "SUN" 181. When a random number value sampled by the main CPU 41 falls within the range of 52 to 207, it is determined that four out of 15 symbols 180 stopped in the display windows 151 to 155 are symbols of "SUN" 181. When a random number value sampled by the main CPU 41 falls within the range of 208 to 807, it is determined that three out of 15 symbols 180 stopped in the display windows 151 to 155 are symbols of "SUN" 181. When a random number value sampled by the main CPU 41 falls within the range of 808 to 1807, it is determined that two out of 15 symbols 180 stopped in the display windows 151 to 155 are symbols of "SUN" 181. When a random number value sampled by the main CPU 41 falls within the range of 1808 to 2998, it is determined that one out of 15 symbols 180 stopped in the display windows 151 to 155 is a symbol of "SUN" 181. When a random number value sampled by the main CPU 41 falls within the range of 2999 to 5998, it is determined that none of 15 symbols 180 stopped in the display windows 151 to 155 is a symbol of "SUN" 181. It is noted that a state where five out of 15 symbols 180 stopped in the display windows 151 to 155 are symbols of "SUN" 181 is considered as "winning a jackpot (JP winning)".

(Jackpot Game Payout Table)

Now, with reference to FIG. 54, the following describes the jackpot game payout table 133 which shows the content of a payout awarded according to the number of symbols of "SUN" 181 which is determined based on the jackpot game lottery table 132 shown in FIG. 53. FIG. 54 shows the jackpot game payout table 133. The jackpot game payout table 133 is stored in the RAM 43 and is data which is read in a payout process of a jackpot game in later-detailed various slot machine jackpot game running processes.

In response to a result sampled by using the jackpot game lottery table 132, a payout is awarded according to the number of symbols "SUN" 181 displayed in the display windows 151 to 155 based on the jackpot game payout table 133.

Specifically, when five symbols 180 of "SUN" 181 are stopped in the display windows 151 to 155 (i.e. when JP winning is achieved), a payout to be awarded is coins corresponding to the accumulated value accumulatively stored as jackpot credit information in the RAM 243 of the server 2. For example, when jackpot credit information stored in the RAM 243 of the server 2 indicates an accumulated value of $12.34, coins corresponding to the accumulated value "$12.34" are paid out. On the other hand, when 0 to 4 symbols 180 of "SUN" 181 are stopped in the display windows 151 to 155 (i.e. when no JP winning is achieved), it turns out to be a loss and no payout is awarded.

(Electrical Structure of Server)

FIG. 55 is a block diagram of an electrical structure of the server 2. A control unit is provided within the server 2. As shown in FIG. 55, the control unit includes a motherboard 240, a gaming board 250, an actuator, and the like. It is noted that the server 2 as a controller is equivalent to the server (controller) 111 shown in FIG. 47.

The gaming board 250 has a CPU (Central Processing Unit) 251, a ROM 255, a boot ROM 252, a card slot 253S corresponding to a memory card 253, and an IC socket 254S corresponding to a GAL (Generic Array Logic) 254. The CPU 251, the ROM 255, and the boot ROM 252 are connected to one another through an internal bus. In other words, the gaming board 250 has the same structure and the same functions as those of the gaming board 50.

The motherboard 240 has the main CPU 241, a ROM (Read Only Memory) 242, a RAM (Random Access Memory) 243, a power supply unit 245, and a communication interface 224. The RAM 243 stores therein a server jackpot game running processing program. The RAM 243 also stores therein an accumulated value resulting from accumulative calculation of a percentage of coins bet at the slot machine (3A to 3J) (jackpot credit information). Note that the RAM 243 corresponds to the jackpot credit storage unit 113 of FIG. 47.

The main CPU 241 controls the entire server 2. In particular, the main CPU 241 controls the operation of exchanging signals with each of the slot machines 3A to 3J, when a jackpot game is run. Note that, the main CPU 241 corresponds to the jackpot game start determining unit 114 and the jackpot adjusting unit 115 of FIG. 47.

The communication interface 224 communicates with the communication interfaces 44 of the slot machines (3A to 3J) through a communication line.

Although not adopted by the present embodiment, the server 2 may be connected with a display so that various types of information are displayed on the display. Also, the display may display a numerical value image which indicates an accumulated value resulting from accumulative calculation of a percentage of coins bet at each slot machine (3A to 3J). For example, the display may display a numerical value image of $12.34 which indicates an accumulated value.

(Display State of Display Windows 151 to 155 of Slot Machine)

Figure 56:
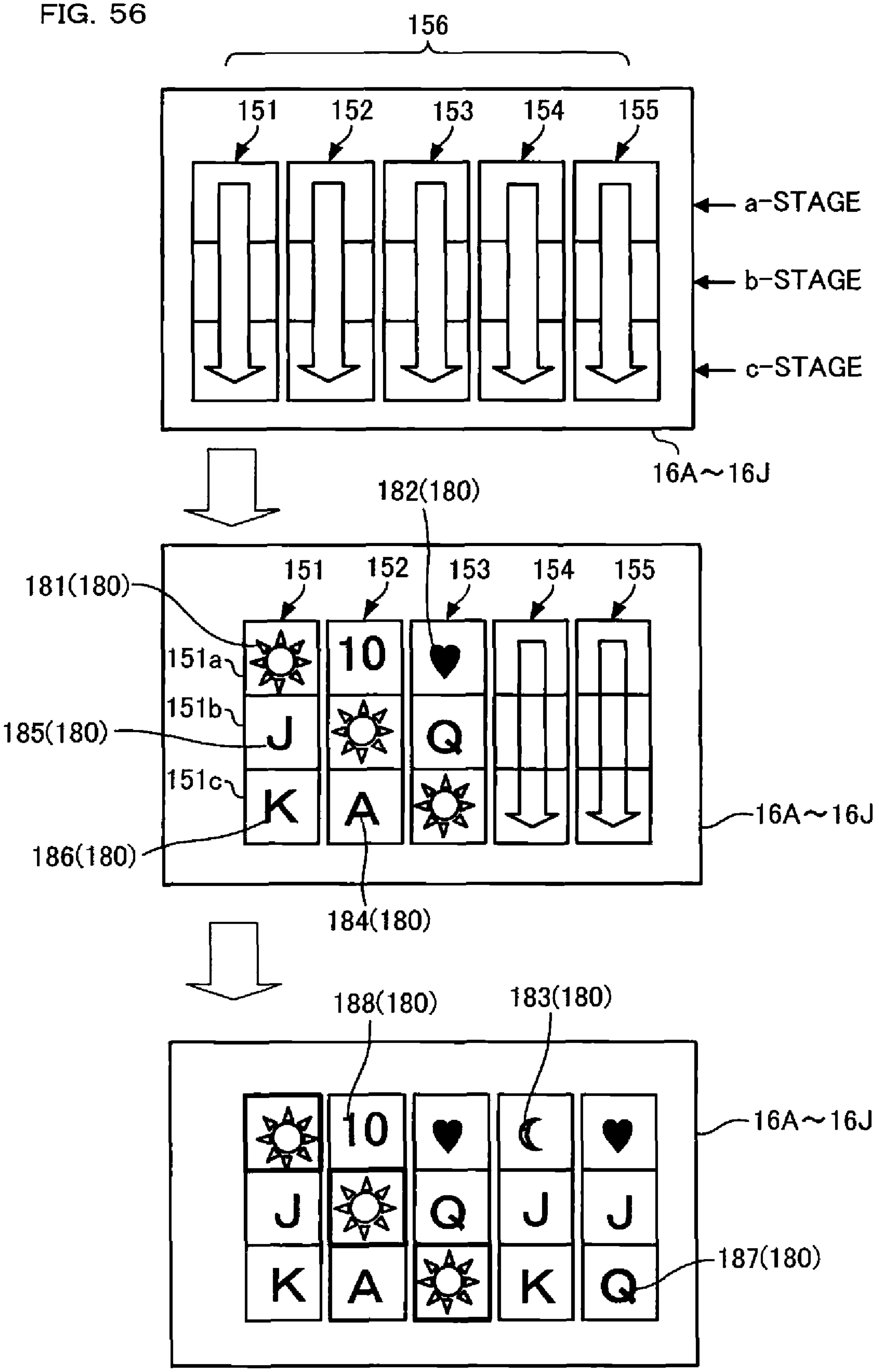
FIG. 56 is an explanatory diagram for a display screen.

The following details an exemplary display state of the lower image display panel (16A to 16J) of the slot machine (3A to 3J) during operations of the gaming system 1 and the control method thereof. Note that the following example regarding the display state deals with a case where symbols 180 are arranged in the display windows 151 to 155 by means of a video reel method, as shown in FIGS. 56 and 57.

The lower image display panel (16A to 16J) has display windows 151 to 155 where symbols 180 are arranged. The display windows 151 to 155 are disposed at a center part of the lower image display panel (16A to 16J). In the display windows 151 to 155, symbol columns (symbol lines A to E: see FIG. 57) each made up of symbols 180 are scroll-displayed (see FIG. 56). The display windows 151 to 155 are respectively divided into a-stages 151*a* to 155*a*, b-stages 151*b* to 155*b*, and c-stages 151*c* to 155*c*. The symbols 180 are stopped (arranged) in the stages 151*a* to 155*a*, 151*b* to 155*b*, and 151*c* to 155*c*, respectively. For example, in FIG. 56, a symbol of "SUN" 181 is stopped in 151*a* which is a-stage of the display window 151, a symbol of "J" 185 is stopped in 151*b* which is the central stage of the display window 151, and a symbol of "SUN" 181 is stopped in 153*c* which is the lower stage of the display window 153. In short, the display windows 151 to 155 display a matrix 156 as arrangement regions made up of five columns and three rows. The matrix 156 however is not limited to the matrix of five columns and three rows.

In a base game, a payout awarding process such as paying out coins is executed when a predetermined number of symbols 181 to 188 called scatter symbols are displayed on the lower image display panel (16A to 16J) as a winning combination. Scatter symbols are symbols which provide an effective result (such as awarding a payout, giving a bonus game, or the like) merely when a predetermined number of them are stopped on any of the display areas of the arrangement regions made up of five columns and three rows of the display windows 151 to 155. For example, when five symbols of "J" 185, which is one of the scatter symbols shown in FIG. 56, are rearranged (displayed) in the display windows 151 to 155, ten coins are paid out as a payout. When five symbols of "HEART" 182, which is one of the scatter symbols, are rearranged (displayed) in the display windows 151 to 155, fifty coins are paid out as a payout.

Although in this embodiment the symbols 181 to 188 are defined as scatter symbols, this is not limitative and only a specific symbol may be defined as a scatter symbol. Alternatively, a player may select a scatter symbol. It may also be possible that a coin payout process or the like is executed when a predetermined combination of symbols is stopped on a payline L extending horizontally through the b-stages (151*b* to 155*b*) of the display windows 151 to 155. That is, the payline L is for determining a combination of symbols 180. When symbols 180 are rearranged on the payline L and outside the payline L, only the symbols 180 rearranged on the payline are judged for a combination. It may be possible that, when a winning combination is met as a result of the determination of a combination, a coin payout process or the like is executed.

(Symbol Column, etc.)

Symbols 180 displayed in the display windows 151 to 155 of the lower image display panel (16A to 16J) of the slot machine (3A to 3J) form five symbol columns (symbol lines A to E) each including twenty-two symbols, as shown in FIG. 57. To each of the symbols 180 constituting each symbol column is given one of code numbers 00 to 21. Each of the symbol columns has a combination of picture symbols of "SUN" 181, "HEART" 182, and "MOON" 183, and letter symbols of "A" 184, "J" 185, "K" 186, "Q" 187, and "10" 188.

Three successive symbols in the symbol columns are displayed (arranged) in the upper stages 151*a*, 152*a*, 153*a*, 154*a*, 155*a*, the central stages 151*b*, 152*b*, 153*b*, 154*b*, 155*b* and the lower stages 151*c*, 152*c*, 153*c*, 154*c*, 155*c* of the display windows 151 to 155, respectively, to form a matrix of five columns and three rows in the display windows 151 to 155. When the 1-BET button 26 or the MAX-BET button 27 is pushed and then the spin button 23 is pushed to start a game, the symbols 180 forming the matrix are started to scroll. When the symbols 180 are scrolled for a predetermined period of time, the scroll of the symbols 180 is stopped (rearranged).

The symbols 181 to 188 are set as scatter symbols. Scatter symbols are such symbols that a player is put into an advantageous position when a predetermined number or more of them are displayed in the display windows 151 to 155. The advantageous position is a state where coins corresponding to the scatter symbols are paid out, a state where the number of coins to be paid out is added to a credit value, or the like.

For example, when five or more symbols of "MOON" 183 are stopped in the display windows 151 to 155, thirty coins (game value) per bet are paid out.

In this embodiment, a game value is paid out when a predetermined number of predetermined symbols are stopped in the display windows 151 to 155. However, a bonus game may be given instead. The bonus game is a gaming state which is more advantageous than a basic game. For example, the bonus game is a free game. The free game is a game allowing a player to play a game a predetermined number of times without betting a coin. No particular limitation is put on the bonus game, as long as it is a gaming state advantageous to the player, that is, it is more advantageous than the basic game. For example, the bonus game may include a state where more game value are obtainable than in the basic game, a state where a game value is obtainable with higher probability than in the basic game, a state where a game value is less consumed than in the basic game, and the like. Specifically, a free game, a second game, a feature game, and the like may be mentioned as examples of the bonus game.

In a jackpot game, a symbol of "SUN" 181 is considered as a jackpot symbol, and whether a jackpot is made or not is determined according to the number of jackpot symbols displayed in the display windows 151 to 155. In the present embodiment, coins equivalent to the accumulated value accumulatively stored in the RAM 243 of the server 2 are paid out to a player when 5 jackpot symbols of "SUN" 181 are displayed in the display windows 151 to 155. For example, coins to be paid out are equivalent to $12.34 when the jackpot credit information stored in the RAM 243 of the server 2 indicates an accumulated value of $12.34.

(Operation of Gaming System)

Next, various processes executed in the gaming system 1 will be described. As the main CPU 41 and the main CPU 241 read out and execute programs stored in the ROM 42, the RAM 43, the ROM 242, and the RAM 243, processes relating to various games are run.

(Operation of Gaming System: Boot Process)

The following describes a boot process which takes place in the gaming system 1. Upon powering on the gaming system 1, a boot process routine shown in FIG. 58 starts in the motherboard 240 and the gaming board 250 in the server 2, and in the motherboard 40 and the gaming board 50 in the slot machine (3A to 3J). The memory cards 53 and 253 are assumed to be inserted into the card slots 53S and 253S of the gaming boards 50 and 250, respectively. Further, the GALs 54 and 254 are assumed to be attached to the IC sockets 54S and 254S, respectively.

First, turning on the power switch of (powering on) the power supply units 45 and 245 boots the motherboards 40 and 240 and the gaming boards 50 and 250. Booting the motherboards 40 and 240 and the gaming boards 50 and 250 starts separate processes in parallel. Specifically, in the gaming board 50 and 250, the CPUs 51 and 251 read out preliminary authentication programs stored in the boot ROMs 52 and 252, respectively. Then, preliminary authentication is performed according to the read out programs so as to confirm and authenticate that no modification is made to authentication programs, before reading them into the motherboards 40 and 240, respectively (S1). Meanwhile, the main CPUs 41 and 241 of the motherboards 40 and 240 run BIOS stored in the ROMs 42 and 242 to load into the RAMs 43 and 243 compressed data built in the BIOS, respectively (S2). Then, the main CPUs 41 and 241 run a procedure of the BIOS according to the data loaded into the RAMs 43 and 243 so as to diagnose and initialize various peripheral devices (S3).

The main CPUs 41 and 241, which are respectively connected to the ROMs 55 and 255 of the gaming boards 50 and 250 via PCI buses, read out authentication programs stored in the ROMs 55 and 255 and store them into the RAMs 43 and 243 (S4). During this step, the main CPUs 41 and 241 each derives a checksum through ADDSUM method (a standard check function) which is adopted in a standard BIOS, and store the authentication programs into the RAMs 43 and 243 while confirming if the operation of storing is carried out without an error.

Next, the main CPUs 41 and 241 each checks what is connected to the IDE bus. Then, the main CPUs 41 and 241 access, via the IDE buses, to the memory cards 53 and 253 inserted into the card slots 53S and 253S, and read out game programs and game system programs from the memory cards 53 and 253, respectively. In this case, the main CPUs 41 and 241 each reads out four bytes of data constituting the game program and the game system program at one time. Next, in accordance with the authentication programs stored in the RAMs 43 and 243, the main CPUs 41 and 241 authenticate the game programs and the game system programs read out to confirm and prove that these programs are not modified (S5).

When the authentication process properly ends, the main CPUs 41 and 241 write and store the authenticated game programs and game system programs into RAMs 43 and 243 (S6).

Next, the main CPUs 41 and 241 access, via the PCI buses, to the GALs 54 and 254 attached to the IC sockets 54S and 254S, and read out data from the GALs 54 and 254, respectively. The data read out is then written and stored in the RAMs 43 and 243 (S7).

Next, the main CPUs 41 and 241 read out, via the PCI buses, country identification information stored in the ROMs 55 and 255 of the gaming boards 50 and 250, respectively. The country identification information read out is then written and stored in the RAMs 43 and 243 (S8).

Figure 59:
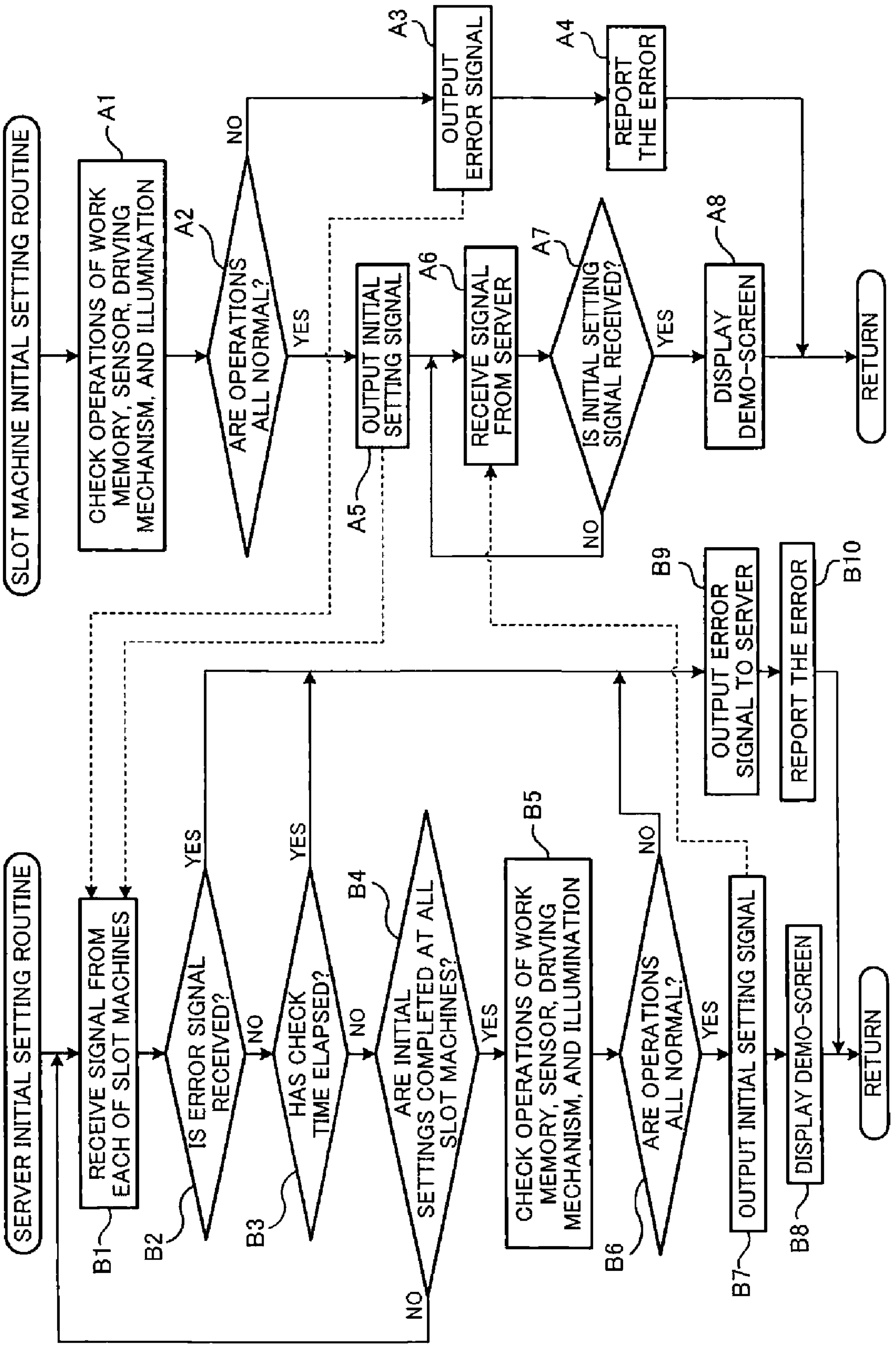
FIG. 59 is a flowchart of an initial process executed in the gaming system.

After this, the main CPUs 41 and 241 each performs an initial process shown in FIG. 59.

(Operation of Gaming System: Initial Process)

Figure 58:
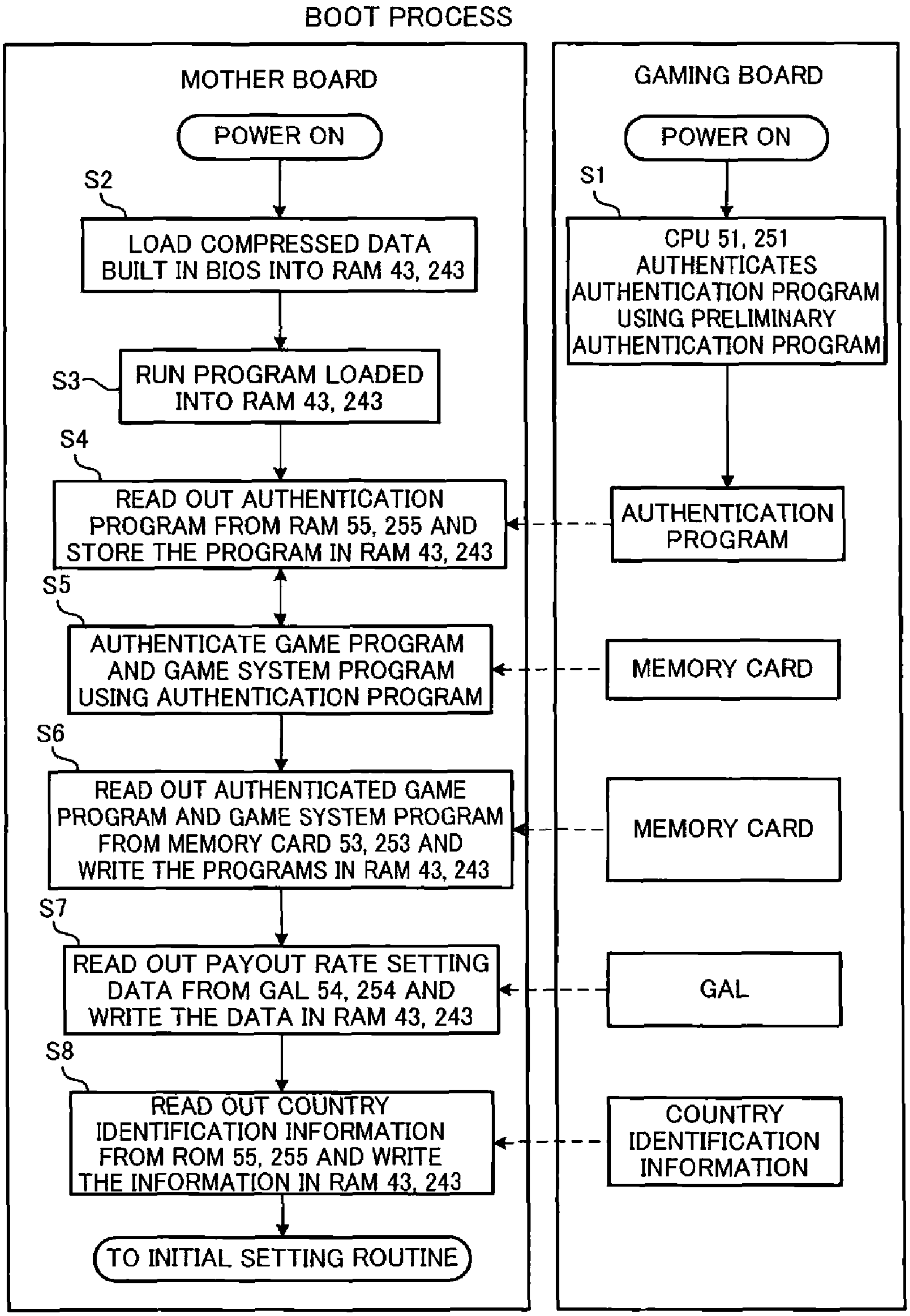
FIG. 58 is a flowchart of a boot process executed in the gaming system.

The following describes an initial process which takes place in the gaming system 1. After the boot process shown in FIG. 58 is completed, the server 2 reads out from the RAM 243 a server initial setting routine illustrated in FIG. 59 and executes the routine. Meanwhile, after the boot process shown in FIG. 58 is completed, the slot machine (3A to 3J) reads out from the RAM 43 a slot machine initial setting routine illustrated in FIG. 59 and executes the routine. The server and slot machine initial setting routines are executed in parallel.

First, the main CPU 41 of the slot machine (3A to 3J) checks operations of work memories such as the RAM 43, various sensors, various driving mechanisms, and various decorative illuminations (A1). Then, the main CPU 41 determines if all the check results are normal (A2). When the main CPU 41 determines that the check results are not all normal (A2: NO), the main CPU 41 outputs an error signal to the server 2 (A3), reports the error in the form of illuminating the lamp 30 or the like (A4), and then ends the routine.

On the other hand, in A2, when the main CPU 41 determines that all the check results are normal (A2: YES), an initial setting signal is output to the server 2 (A5). Then, an initial setting signal is waited from the server 2 (A6, A7: NO).

The main CPU 241 of the server 2 is configured to receive a signal from each of the slot machines 3A to 3J (B1). Then, the main CPU 241 determines whether a signal received is an error signal (B2). When the main CPU 241 determines that the signal is an error signal (B2:YES), the main CPU 241 outputs an error signal to a management server such as a not-shown host computer (B9) to report the error (B10), and ends the routine.

On the other hand, in B2, when the main CPU 241 determines that the signal is not an error signal (B2: NO), the main CPU 241 determines whether a predetermined time (check time) has elapsed from the time of powering on (B3). When the main CPU 241 determines that the check time has elapsed (B3: YES), the step B9 is executed. On the other hand, when the main CPU 241 determines that the check time has not yet elapsed (B3: NO), the main CPU 241 determines whether initial setting signals are received from all of the slot machines 3A to 3J (B4). When the main CPU 241 determines that initial setting signals are not received from all the slot machines 3A to 3J (B4: NO), the process returns to the step B1. On the other hand, when it is determined that initial setting signals are received from all the slot machines 3A to 3J (B4: YES), the main CPU 241 checks operations of work memories such as RAM 243 or the like, various sensors, various driving mechanisms, and various decorative illuminations (B5). Then, the main CPU 241 determines whether all the check results are normal (B6). When the main CPU 241 determines the check results contains an error (B6: NO), the main CPU 241 executes the step B9.

On the other hand, in the step B6, when the main CPU 241 determines that all the check results are normal (B6:YES), the main CPU 241 outputs an initial setting signal to all the slot machines 3A to 3J (B7), and arranges a demo-screen to be displayed (B8). Then, the main CPU 241 ends this routine.

In the step A7, the main CPU 41 of each of the slot machines 3A to 3J determines that an initial setting signal is received from the server 2 (A7: YES), and causes the upper image display panel 33 to display a demo-screen (A8). The main CPU 41 then ends the routine.

(Operation of Slot Machine: First Game Running Process)

Figure 60:
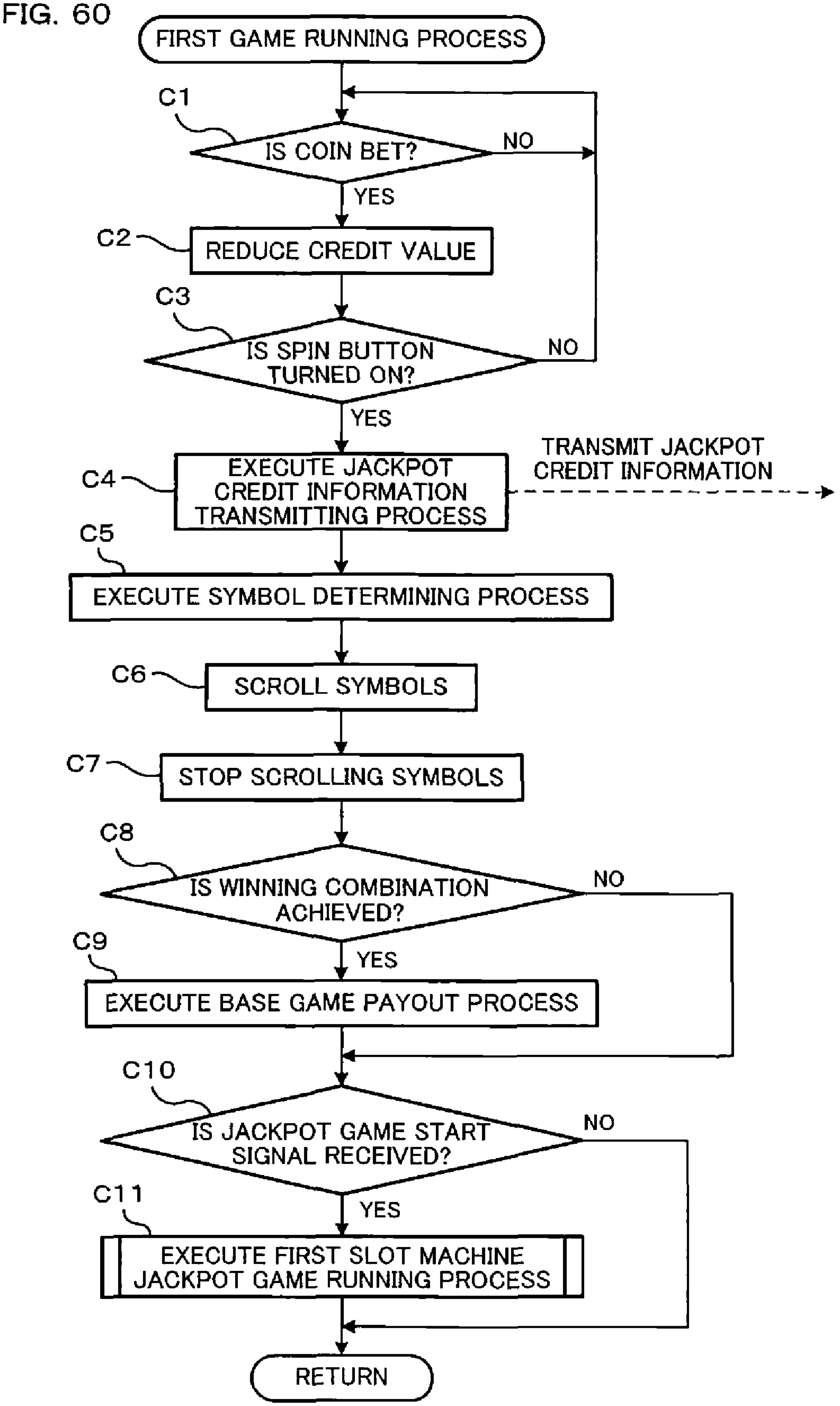
FIG. 60 is a flowchart of a first game running process executed in a slot machine of an Embodiment 3-1.

After the slot machine initial setting routine of FIG. 59 is completed, the main CPU 41 of each of the slot machines 3A to 3J reads out and executes the game program and the game system program sequentially, thereby executing a first game running process shown in FIG. 60. A first game running processing program is stored in the RAM 43.

The main CPU 41 of each of the slot machines 3A to 3J executes the first game running process shown in FIG. 60. When the first game running process is run, first, the main CPU 41 determines whether a coin is bet or not (C1). In this step, whether an input signal from the 1-BET switch 26S entered by pressing of the 1-BET button 26 is received or not is determined. Meanwhile, whether an input signal from the MAX-BET switch 27S entered by pressing of the MAX-BET button 27 is received or not is determined. When no coin is bet (C1: NO), C1 is repeated so that a standby state continues until a coin is bet.

On the other hand, when it is determined that a coin is bet (C1: YES), the credit value stored in the RAM 43 is reduced according to the number of coins bet (C2). When the number of coins bet surpasses the number of coins equivalent to the credit value stored in the RAM 43, the credit value is reduced to zero and the step C3 is performed. When the number of coins bet exceeds the maximum number of coins bettable on one game (50 pieces in this embodiment), the credit value is reduced by fifty and the step C3 is performed.

Then, whether a spin button 23 is turned on or not is determined (C3). When the spin button 23 is not turned on (C3: NO), the process returns to C1. Here, if the spin button 23 is not turned on (for example, the spin button 23 is not turned on but a command to end the game is input), the reduction of the credit value in the step C2 is canceled.

On the other hand, when it is determined that the spin button 23 is turned on (C3: YES), executed is a jackpot credit information transmitting process (C4). In other words, the main CPU 41 transmits, to the server 2, a percentage (5% in this embodiment) of one or more coins bet in the step C1, as jackpot credit information.

Then, a symbol determining process is executed (C5). In other words, a stop symbol determining program is executed based on the base game winning combination lottery table 130 stored in the RAM 43, to determine fifteen symbols 180 to be stopped in the display windows 151 to 155.

Then, symbols 180 in the symbol columns (symbol lines A to E) in the display windows 151 to 155 are scrolled (C6). When a predetermined period of time (base time) has elapsed after the scroll of the symbols 180 is started, the symbols 180 determined in the step C5 are stopped (rearranged) in the display windows 151 to 155 (C7).

Then, whether a winning combination is achieved or not, that is, whether a combination of symbols 180 stopped in the display windows 151 to 155 corresponds to a winning combination listed in the base game payout table 131 or not, is determined (C8). When it is determined that a winning combination is not achieved (C8: NO), the process proceeds to the step C10. On the other hand, when it is determined that a winning combination is achieved (C8: YES), a base game payout process is executed (C9). More specifically, the number of coins to be paid out which corresponds to the kind of the winning combination is calculated based on the base game payout table 131 shown in FIG. 52. When coins to be paid out are reserved, a credit value equivalent to the coins to be paid out is added to the credit value stored in the RAM 43. When the coins are paid out, a control signal is transmitted to the hopper 66 so that a predetermined number of coins are paid out to the coin tray 18. That is, a base payout is awarded in accordance with the winning combination.

Then, it is determined whether a jackpot game start signal which is transmitted in a later-mentioned first server jackpot game running process is received or not (C10). When the jackpot game start signal is not received (C10: NO), this process ends. On the other hand, when the jackpot game start signal is received (C10: YES), a later-mentioned first slot machine jackpot game running process is executed (C11). Then, this process once ends.

(Operation of Slot Machine: First Slot Machine Jackpot Game Running Process)

Figure 61:
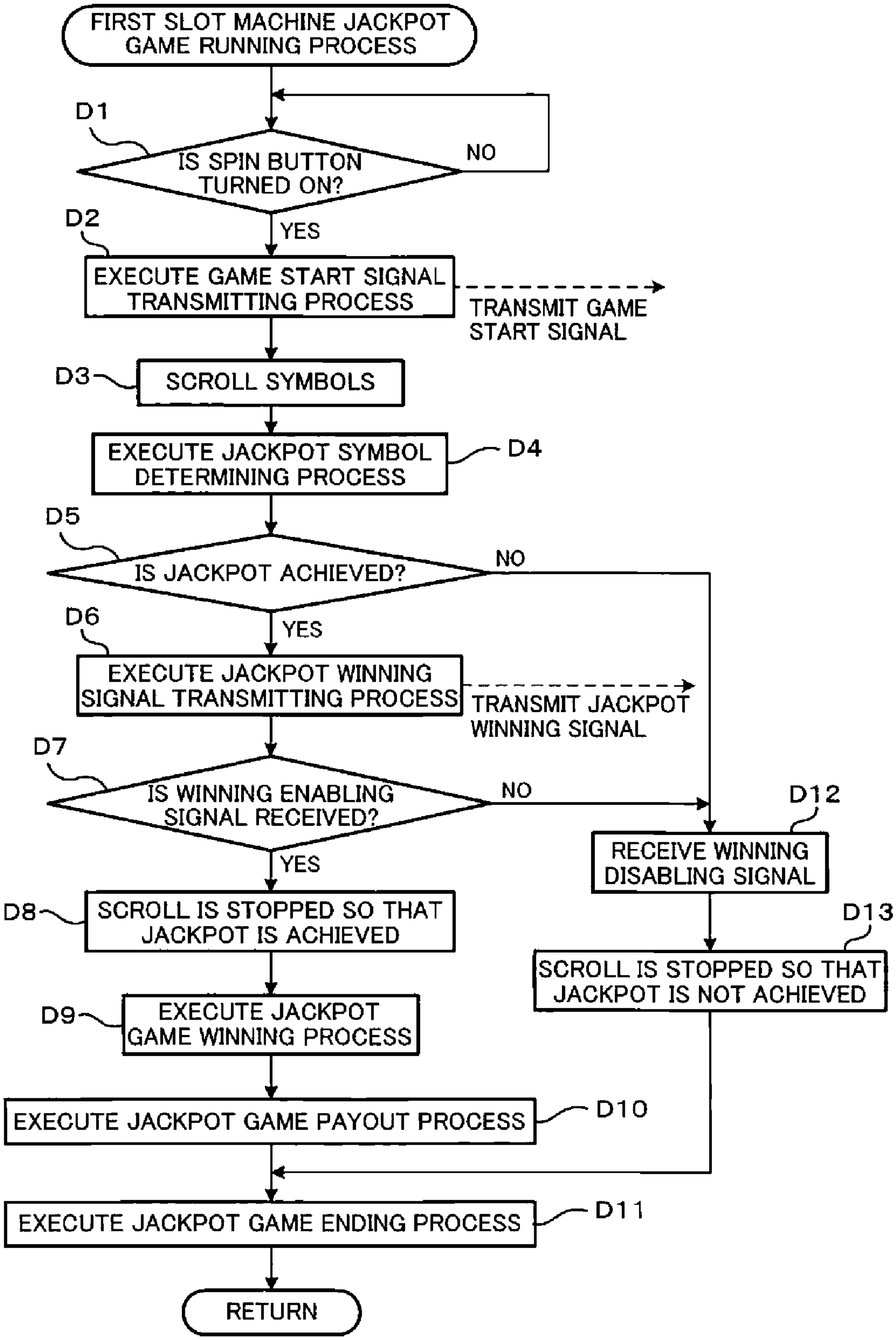
FIG. 61 is a flowchart showing a first slot machine jackpot game running process executed in the slot machine of the Embodiment 3-1.

When the first slot machine jackpot game running process is executed in the step C11 of FIG. 60, the main CPU 41 of the slot machine (3A to 3J) executes the first slot machine jackpot game running process shown in FIG. 61. A first slot machine jackpot game running processing program is stored in the RAM 43.

When the first slot machine jackpot game running process is executed, first, whether the spin button 23 is turned on or not is determined (D1). When it is determined that the spin button 23 is not turned on (D1: NO), the process returns to D1.

On the other hand, if it is determined that the spin button 23 is turned on (D1: YES), a game start signal transmitting process is executed (D2). In other words, the main CPU 41 sends a game start signal to the server 2 so as to notify the server 2 in which slot machine a jackpot game is started. Then symbols 180 are scroll-displayed in the display windows 151 to 155 (D3).

Subsequently, a jackpot symbol determining process is executed (D4). In other words, a stop symbol determining program is executed based on the jackpot game lottery table 132 stored in the RAM 43, to determine fifteen symbols 180 to be stopped in the display windows 151 to 155.

Then whether a jackpot is achieved or not as a result of the jackpot symbol determining process in D4 is determined (D5). Specifically, determined is how many jackpot symbol of "SUN" 181 is included in the symbols 180 determined in the jackpot symbol determining process in D4. It is determined that a jackpot is achieved if five jackpot symbols of "SUN" 181 are included. If no jackpot is achieved (D5: NO), the process proceeds to D12.

On the other hand, if a jackpot is achieved (D5: YES), a jackpot winning signal transmitting process is executed (D6). This is a process to transport to the server 2 information indicating that a jackpot is achieved and identification information of the slot machine (3A to 3J) which has achieved the jackpot.

Then whether a winning enabling signal is received from the server 2 is determined (D7). If no winning enabling signal is received (D7: NO), a winning disabling signal is waited for. If the winning disabling signal is received (D12), the scroll is stopped so that no jackpot is achieved (D13). In other words, symbols 180 are stopped (arranged) in the display windows 151 to 155 in such a way that five jackpot symbols of "SUN" 181 are not stopped (arranged) in the display windows 151 to 155. Thereafter the process proceeds to D11.

In the meanwhile, if a winning enabling signal is received in D7 (D7: YES), the scroll is stopped so that a jackpot is achieved (D8). In other words, symbols 180 are stopped (arranged) in the display windows 151 to 155 in such a way that five jackpot symbols of "SUN" 181 are stopped (arranged) in the display windows 151 to 155. Thereafter a jackpot game winning process is executed (D9). This is a process to notify a player of the winning of a jackpot. In this process, various types of effect processes such as image effects on the upper image display panel 33 and the lower image display panels 16A to 16J and sound effects by a speaker 29.

Thereafter a jackpot game payout process is executed based on the jackpot game payout table 133 of FIG. 54 (D10). This is a process to pay out coins equivalent to the accumulated value accumulatively stored as jackpot credit information in the RAM 243 of the server 2 in C4. For example, when the jackpot credit information stored in the RAM 243 of the server 2 indicates an accumulated value of $12.34, coins equivalent to this accumulated value of $12.34 are paid out. When coins to be paid out are reserved, a credit value equivalent to the accumulated value is added to the credit value stored in the RAM 43. When coins are paid out, a control signal is transmitted to the hopper 66 so that coins equivalent to the accumulated value are paid out to the coin tray 18.

Then a jackpot game ending process is executed (D11) and the entire process once ends.

(Operation of Server: First Server Jackpot Game Running Process)

Figure 62:
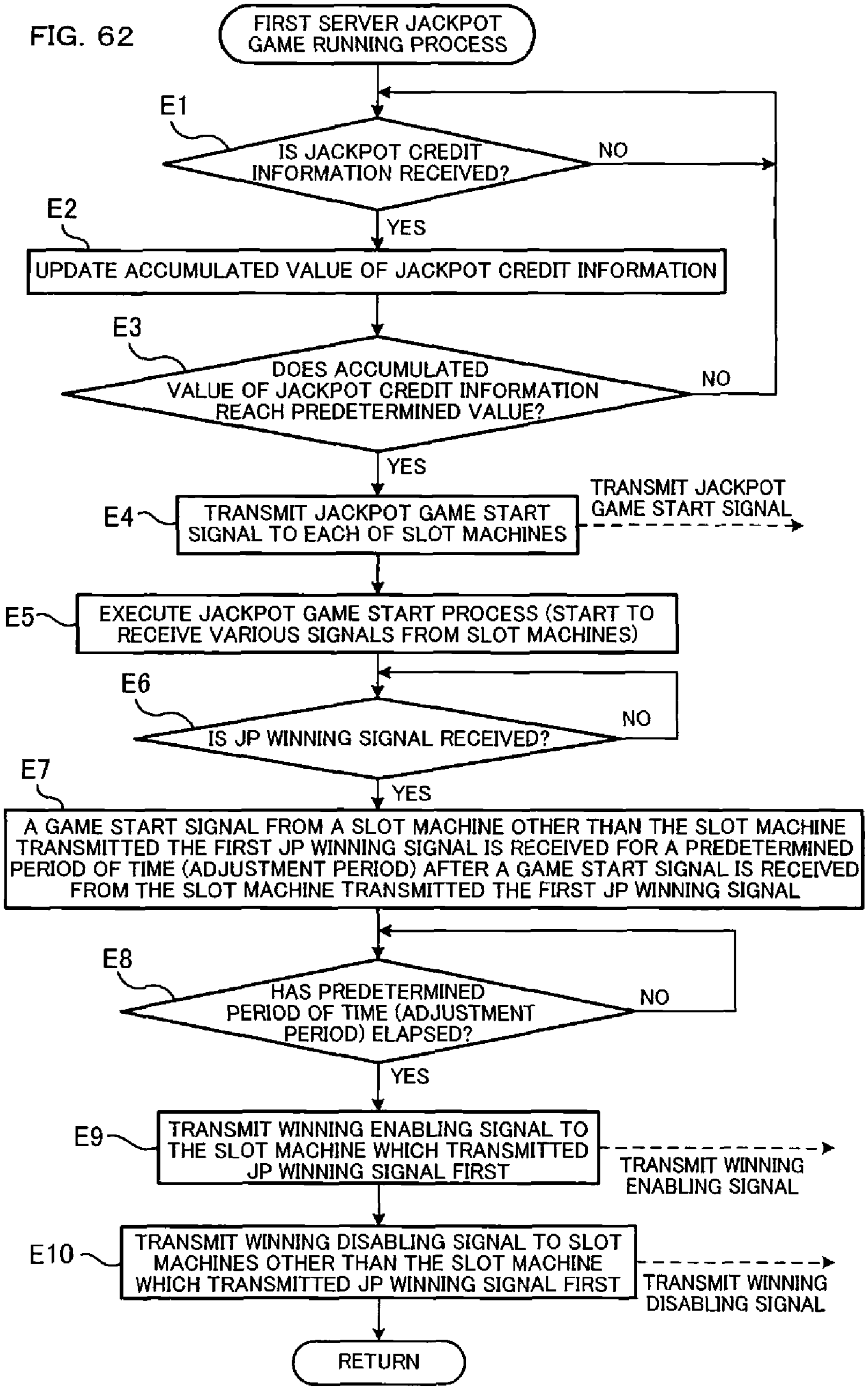
FIG. 62 is a flowchart of a first server jackpot game running process executed in the server of the Embodiment 3-1.

After the server initial setting routine shown in FIG. 59 ends, the main CPU 241 of the server 2 reads out and executes the game program and the game system program sequentially, thereby running the first server jackpot game running process shown in FIG. 62. A first server jackpot game running processing program is stored in the RAM 243.

When the first server jackpot game running process is executed, first, the main CPU 241 determines whether the jackpot credit information transmitted in the before-mentioned first game running process is received or not (E1). When the jackpot credit information is not received (E1: NO), the step E1 is repeated. On the other hand, when the jackpot credit information is received (E1: YES), the accumulated value of the jackpot credit information is updated (E2). In other words, based on the jackpot credit information transmitted from each of the slot machines 3A to 3J, the main CPU 241 adds a percentage (5% in this embodiment) of coins bet at each of the slot machines 3A to 3J to the accumulated value of jackpot credit information stored in the RAM 243, and stores the thus obtained value.

Next, the main CPU 241 determines whether the accumulated value of jackpot credit information stored in the RAM 243 reaches a predetermined value ("$12.34" in this embodiment) (E3). When the accumulated value does not reach the predetermined value (E3: NO), the process returns to the step E1. On the other hand, when the accumulated value reaches the predetermined value (E3: YES), a jackpot game start signal which triggers a jackpot game is transmitted to each of the slot machines 3A to 3J (E4).

In this embodiment, a jackpot game is started when the accumulated value of jackpot credit information exceeds a predetermined value (e.g., a fixed value of "$12.34"), however, this embodiment is not limited thereto. For example, it is possible to adopt a structure that a threshold value, for triggering a jackpot game, of the accumulated value of jackpot credit information is randomly varied in each jackpot game within a predetermined range (e.g., $200 to $300).

After E4, a jackpot game start process is executed (E5). As a result of this various types of signals regarding the jackpot game is received from the slot machines 3A to 3J. Specifically, received signals are a game start signal transmitted from the slot machines 3A to 3J in D2 and a jackpot winning signal transmitted from the slot machines 3A to 3J in D6.

Then whether a jackpot winning signal (JP winning signal) is received is determined (E6). If no JP winning signal is received (E6: NO), a JP winning signal is waited for.

On the other hand, when a JP winning signal is received (E6: YES), if the main CPU 241 determines that this JP winning signal is the first JP winning signal received since the start of the jackpot game, a game start signal from a slot machine other than the slot machine transmitted the aforesaid first JP winning signal is received for a predetermined period of time (adjustment period) after a game start signal is received from the slot machine transmitted the aforesaid first JP winning signal (E7).

Then whether the predetermined period of time (adjustment period) has elapsed or not is determined (E8). If the predetermined period of time (adjustment period) has not elapsed (E8: NO), elapse of the predetermined period of time is waited for.

On the other hand, if the predetermined period of time (adjustment period) has elapsed (E8: YES), a winning enabling signal is transmitted to the slot machine that transmitted the JP winning signal first (E9). To the slot machines other than the slot machine that transmitted the JP winning signal first, a winning disabling is transmitted (E10). Then, this process once ends.

(Timing Chart of Gaming System 1)

Figure 63:
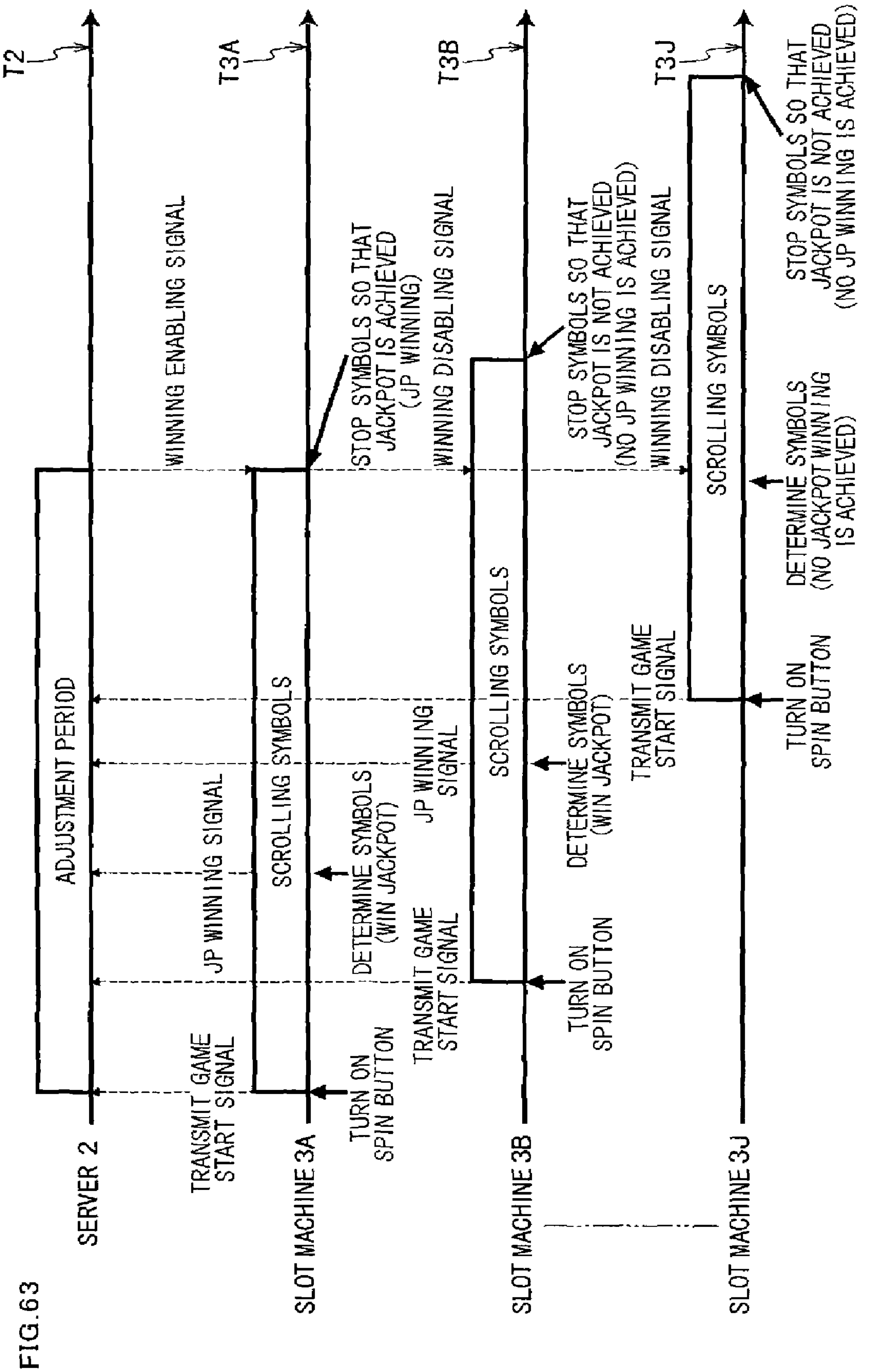
FIG. 63 is an explanatory diagram of a timing chart showing the outline of the operation of a gaming system of the Embodiment 3-1.

Now, the following describes a timing chart in which processes executed by the server 2 and the slot machines 3A to 3J constituting the gaming system 1 are illustrated in time series, with reference to the aforesaid operation of the gaming system 1 and FIG. 63. As shown in FIG. 63, a time line T2 and time lines T3A to T3J indicate the process stages of the server 2 and the slot machines 3A to 3J on the time frame. The dotted arrows extending from the time line T2 and the time lines T3A to T3J indicate signals transmitted from the server 2 and the slot machines 3A to 3J.

When the spin button 23 of the slot machine 3A is turned on, the main CPU 41 of the slot machine 3A transmits a game start signal to the server 2 so as to notify the server 2 of information indicating in which slot machine a jackpot game is started (see D2). Then the symbols 180 are scroll-displayed in the display windows 151 to 155 (see D3). It is noted that similar processes are executed also in the slot machines 3B to 3J.

Thereafter, if a jackpot is achieved in the slot machine 3A as a result of the jackpot symbol determining process in D4, a jackpot winning signal (JP winning signal) is transmitted to the server 2 (see D6). This means that information indicating that a jackpot is achieved and identification information of the slot machine (3A to 3J) which has achieved the jackpot are transmitted to the server 2. It is noted that a similar process is executed also in the slot machines 3B to 3J.

Thereafter, when the server 2 receives a JP winning signal from the slot machine 3A and it is determined that this JP winning signal is the first JP winning signal received since the jackpot game starts, game start signals are received from the slot machines 3B to 3J for a predetermined period of time (adjustment period) after the game start signal is received from the slot machine 3A (see E7).

After the predetermined period of time (adjustment period) elapses, the server 2 transmits a winning enabling signal to the slot machine 3A which transmits the JP winning signal first (see E9). This causes the slot machine 3A to stop the scrolling symbols 180 in such a way that a jackpot is achieved (see D8). In other words, the slot machine 3A is arranged so that five jackpot symbols of "SUN" 181 are stopped (arranged) in the display windows 151 to 155.

On the other hand, to the slot machines 3B to 3J which are not the slot machine 3A which transmits the JP winning signal first, the server 2 transmits a winning disabling signal (see E10). This causes the slot machines 3B to 3J to stop the scrolling symbols 180 in such a way that a jackpot is not achieved (see D13). In other words, the slot machines 3B to 3J are arranged so that five jackpot symbols of "SUN" 181 are not stopped (arranged) in the display windows 151 to 155.

According to the aforesaid structure, in a jackpot game independently run in each of the slot machines 3A to 3J, the server 2 allows the slot machine 3A which achieves a jackpot first to achieve a jackpot, and awards to that slot machine 3A coins equivalent to the accumulated value ($12.34 in this embodiment) of the jackpot credit information stored in the RAM 243. In the meanwhile, the slot machines 3B to 3J which are not the slot machine 3A which achieves a jackpot first are adjusted so as not to achieve a jackpot. This prevents two or more of the slot machines 3A to 3J from simultaneously achieving a jackpot in a jackpot game, and coins accumulated for a jackpot game are awarded only to a player who achieves a jackpot first.

In the structure above, each of the slot machines 3A to 3J is arranged so that the scroll is stopped in such a way as not to achieve a jackpot and no payout is awarded, when a winning disabling signal is supplied thereto. Alternatively, a slot machine (3A to 3J) which is adjusted so as not to achieve a jackpot may receive a special prize (such as payout).

In this case, the server 2 may award, to a slot machine (3A to 3J) which is adjusted so as not to achieve a jackpot, a special prize which is different from a game value equivalent to a predetermined value accumulated in the RAM 243. With this, a slot machine, which is disadvantageously adjusted so as not to achieve a jackpot for the purpose of preventing two or more of the slot machines 3A to 3J from simultaneously achieving a jackpot, can receive a prize (such as payout) as a consolation prize.

According to the structure above, furthermore, a slot machine (3A to 3J) which has received a winning disabling signal is arranged so that the scroll is stopped in such a way as not to achieve a jackpot and no payout is awarded thereto. Alternatively, in a jackpot game independently run in each of the slot machines 3A to 3J, the server 2 awards a share of the game value equivalent to the accumulated value to each of a predetermined number of slot machines among those having achieved a jackpot, and the slot machines which have achieved the jackpot but are not included in said predetermined number of slot machines are adjusted by the server 2 so as not to achieve the jackpot.

In this case, the number of slot machines achieving a jackpot does not exceed a planned number of winning, and each of players corresponding to the planned number of winning receives a share of coins equivalent to an accumulated value accumulatively stored in the RAM 243.

(Operation of Slot Machine: Effect Operation)

When the above-described various processes are executed in the gaming system 1, results or contents corresponding to the processes are, in the form of commands or data, input to respective actuators. For example, when a slot machine (3A to 3J) achieves a jackpot, the main CPU 41 controls the lamp 30 so as to blink. Furthermore, the upper image display panel 33 of the slot machine (3A to 3J) displays an effect image when a jackpot is achieved. Moreover, an effect is presented through audio output from the speaker 29, together with or independently of the above-described effects.

Embodiment 3-2

Note that the present invention is not limited to the above-described Embodiment 3-1. The below-described Embodiment 3-2 may also be possible. The following describes a gaming system 1 of the Embodiment 3-2 of the present invention. It is noted that the mechanical structure of the gaming system, the electrical structure of the gaming system, the boot process, the initial process and the like in the Embodiment 3-2 are identical with those in the above-described embodiment and hence the descriptions thereof are not repeated here. Described in the Embodiment 3-2 are a second game running process, a second slot machine jackpot game running process, and a second server jackpot game running process which are provided in place of the first game running process, the first slot machine jackpot game running process, and the first server jackpot game running process of the Embodiment 3-1.

(Operation of Slot Machine: Second Game Running Process)

Figure 64:
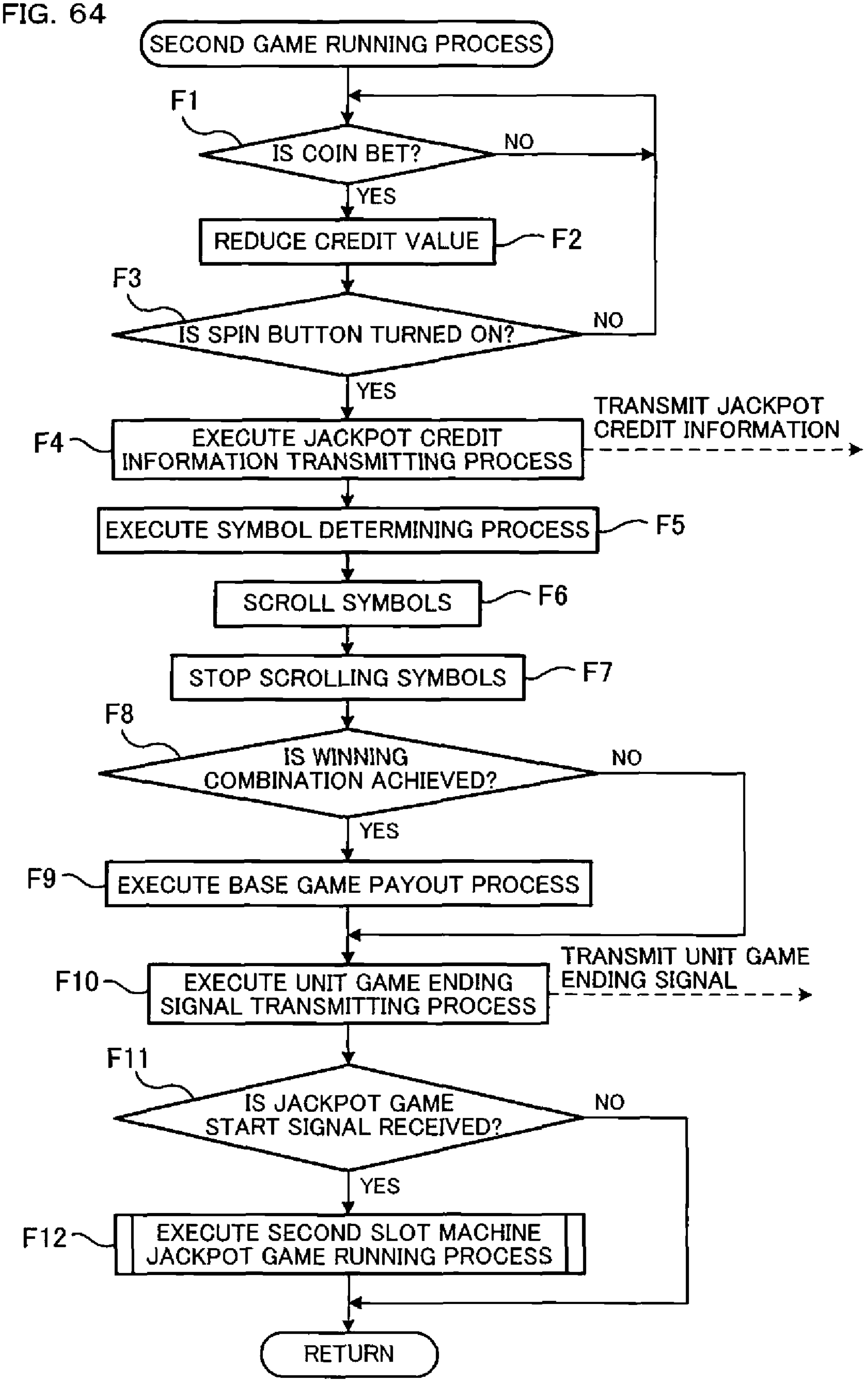
FIG. 64 is a flowchart of a second game running process executed in a slot machine of an Embodiment 3-2.

In the Embodiment 3-2, after the slot machine initial setting routine of FIG. 59 is completed, the main CPU 41 of each of the slot machines 3A to 3J reads out and executes the game program and the game system program sequentially, thereby executing a second game running process shown in FIG. 64. A second game running processing program is stored in the RAM 43.

The main CPU 41 of each of the slot machines 3A to 3J executes the second game running process shown in FIG. 64. When the second game running process is run, first, the main CPU 41 determines whether a coin is bet or not (F1). In this step, whether an input signal from the 1-BET switch 26S entered by pressing of the 1-BET button 26 is received or not is determined. Meanwhile, whether an input signal from the MAX-BET switch 27S entered by pressing of the MAX-BET button 27 is received or not is determined. When no coin is bet (F1: NO), F1 is repeated so that a standby state continues until a coin is bet.

On the other hand, when it is determined that a coin is bet (F1: YES), the credit value stored in the RAM 43 is reduced according to the number of coins bet (F2). When the number of coins bet surpasses the number of coins equivalent to the credit value stored in the RAM 43, the credit value is reduced to zero and the step F3 is performed. When the number of coins bet exceeds the maximum number of coins bettable on one game (50 pieces in this embodiment), the credit value is reduced by fifty and the step F3 is performed.

Then, whether a spin button 23 is turned on or not is determined (F3). When the spin button 23 is not turned on (F3: NO), the process returns to F1. Here, if the spin button 23 is not turned on (for example, the spin button 23 is not turned on but a command to end the game is input), the reduction of the credit value in the step F2 is canceled.

On the other hand, when it is determined that the spin button 23 is turned on (F3: YES), executed is a jackpot credit information transmitting process (F4). In other words, the main CPU 41 transmits, to the server 2, a percentage (5% in this embodiment) of one or more coins bet in the step F1, as jackpot credit information.

Then, a symbol determining process is executed (F5). In other words, a stop symbol determining program is executed based on the base game winning combination lottery table 130 stored in the RAM 43, to determine fifteen symbols 180 to be stopped in the display windows 151 to 155.

Then, symbols 180 in the symbol columns (symbol lines A to E) in the display windows 151 to 155 are scrolled (F6). When a predetermined period of time (base time) has elapsed after the scroll of the symbols 180 is started, the symbols 180 determined in the step F5 are stopped (rearranged) in the display windows 151 to 155 (F7).

Then, whether a winning combination is achieved or not, that is, whether a combination of symbols 180 stopped in the display windows 151 to 155 corresponds to a winning combination listed in the base game payout table 131 or not, is determined (F8). When it is determined that a winning combination is not achieved (F8: NO), the process proceeds to the step F10. On the other hand, when it is determined that a winning combination is achieved (F8: YES), a base game payout process is executed (F9). More specifically, the number of coins to be paid out which corresponds to the kind of the winning combination is calculated based on the base game payout table 131 shown in FIG. 52. When coins to be paid out are reserved, a credit value equivalent to the coins to be paid out is added to the credit value stored in the RAM 43. When the coins are paid out, a control signal is transmitted to the hopper 66 so that a predetermined number of coins are paid out to the coin tray 18. That is, a base payout is awarded in accordance with the winning combination.

Thereafter a unit game ending signal transmitting process is executed (F10). In other words, the main CPU 41 transmits to the server 2 information indicating that a unit game has ended once.

Then, it is determined whether a jackpot game start signal which is transmitted in a later-mentioned second server jackpot game running process is received or not (F11). When the jackpot game start signal is not received (F11: NO), this process ends. On the other hand, when the jackpot game start signal is received (F11: YES), the later-mentioned second slot machine jackpot game running process is executed (F12). Then, this process once ends.

(Operation of Slot Machine: Second Slot Machine Jackpot Game Running Process)

Figure 65:
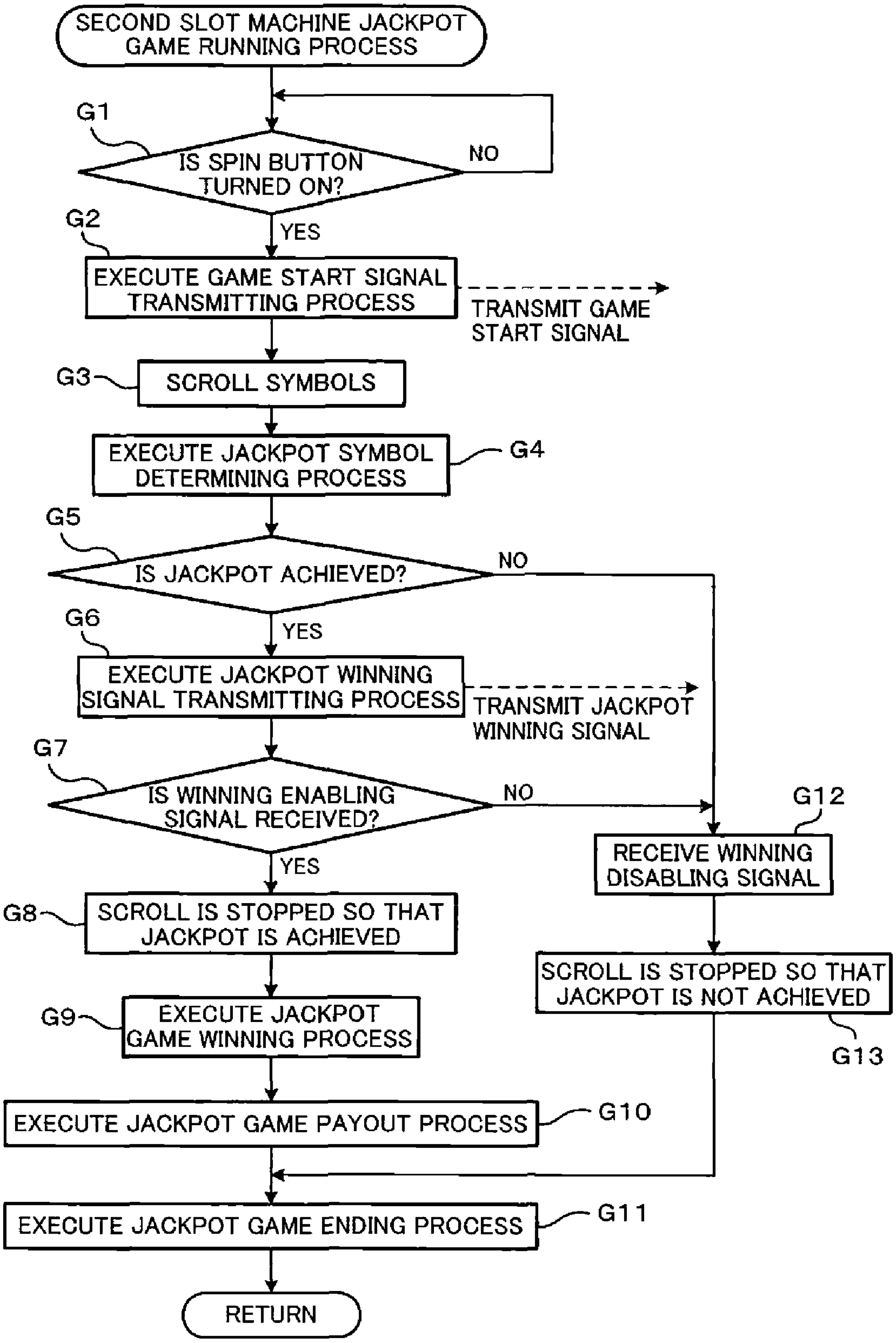
FIG. 65 is a flowchart of a second slot machine jackpot game running process executed in the slot machine of the Embodiment 3-2.

When the second slot machine jackpot game running process is executed in the step F12 of FIG. 64, the main CPU 41 of the slot machine (3A to 3J) executes the second slot machine jackpot game running process shown in FIG. 65. A second slot machine jackpot game running processing program is stored in the RAM 43.

When the second slot machine jackpot game running process is executed, first, whether the spin button 23 is turned on or not is determined (G1). When it is determined that the spin button 23 is not turned on (G1: NO), the process returns to G1.

On the other hand, when it is determined that the spin button 23 is turned on (G1: YES), the game start signal transmitting process is executed (G2). In other words, the main CPU 41 transmits a game start signal to the server 2 so as to notify the server 2 of information indicating in which slot machine a jackpot game has started. Then the symbols 180 are scrolled in the display windows 151 to 155 (G3).

After this, a jackpot symbol determining process is executed (G4). In other words, a stop symbol determining program is executed based on the jackpot game lottery table 132 stored in the RAM 43, to determine fifteen symbols 180 to be stopped in the display windows 151 to 155.

Then it is determined whether a jackpot is achieved as a result of the jackpot symbol determining process of G4 (G5). Specifically, it is determined how many jackpot symbols of "SUN" 181 are included in the symbols 180 determined in the jackpot symbol determining process of G4. It is determined that a jackpot is achieved if there are five jackpot symbols of "SUN" 181. If no jackpot is achieved (G5: NO), the process proceeds to G12.

On the other hand, if a jackpot is achieved (G5: YES), the jackpot winning signal transmitting process is executed (G6). This is a process to transmit to the server information indicating that a jackpot is achieved and identification information of a slot machine (3A to 3J) which has achieved the jackpot.

It is then determined whether a winning enabling signal is received from the server 2 (G7). If no winning enabling signal is received (G7: NO), a winning disabling signal is waited for. If a winning disabling signal is received (G12), the scroll is stopped in such a way that a jackpot is not achieved (G13). That is to say, the symbols 180 are stopped (arranged) in the display windows 151 to 155 in such a way that five jackpot symbols of "SUN" 181 are not stopped (arranged) in the display windows 151 to 155. The process then proceeds to G11.

On the other hand, if a winning enabling signal is received in G7 (G7: YES), the scroll is stopped in such a way that a jackpot is achieved (G8). That is to say, the symbols 180 are stopped (arranged) in the display windows 151 to 155 in such a way that five jackpot symbols of "SUN" 181 are stopped (arranged) in the display windows 151 to 155. Thereafter a jackpot game winning process is executed (G9). This is a process to notify a player of the winning of a jackpot. In this process, various types of effect processes such as image effects on the upper image display panel 33 and the lower image display panels 16A to 16J and sound effects by a speaker 29.

Then a jackpot game payout process is executed based on the jackpot game payout table 133 of FIG. 54 (G10). This is a process to pay out coins equivalent to the accumulated value accumulatively stored as jackpot credit information in the RAM 243 of the server 2 in G4. For example, when the jackpot credit information stored in the RAM 243 of the server 2 indicates an accumulated value of $12.34, coins equivalent to this accumulated value of $12.34 are paid out. When coins to be paid out are reserved, a credit value equivalent to the accumulated value is added to the credit value stored in the RAM 43. When the coins are paid out, a control signal is transmitted to the hopper 66 so that coins equivalent to the accumulated value are paid out to the coin tray 18.

Then a jackpot game ending process is executed (G11) and the entire process once ends.

(Operation of Server: Second Server Jackpot Game Running Process)

Figure 66:
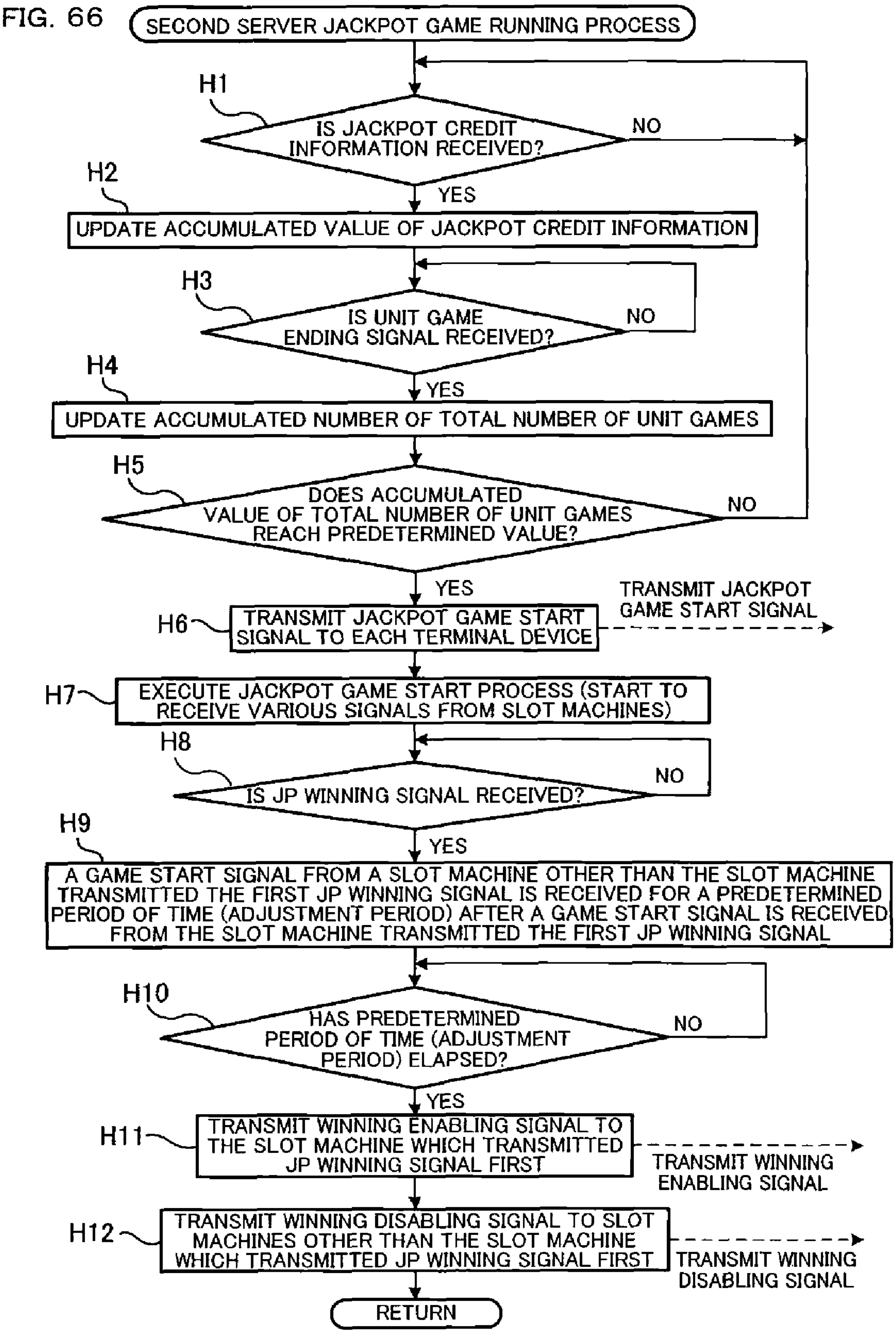
FIG. 66 is a flowchart of a second server jackpot game running process executed in a server of the Embodiment 3-2.

After the server initial setting routine shown in FIG. 59 ends, the main CPU 241 of the server 2 reads out and executes the game program and the game system program sequentially, thereby running the second server jackpot game running process shown in FIG. 66. This second server jackpot game running processing program is stored in the RAM 243.

When the second server jackpot game running process is executed, first, the main CPU 241 determines whether the jackpot credit information transmitted in the before-mentioned second game running process is received or not (H1). When the jackpot credit information is not received (H1: NO), the step H1 is repeated. On the other hand, when the jackpot credit information is received (H1: YES), the accumulated value of the jackpot credit information is updated (H2). In other words, based on the jackpot credit information transmitted from each of the slot machines 3A to 3J, the main CPU 241 adds a percentage (5% in this embodiment) of coins bet at each of the slot machines 3A to 3J to the accumulated value of jackpot credit information stored in the RAM 243, and stores the thus obtained value.

Then the main CPU 241 determines whether a unit game ending signal having been transmitted in the aforesaid second game running process is received or not (H3). When the signal is not received (H1: NO), the step H3 is repeated. On the other hand, if the signal is received (H3: YES), an accumulated value of the total number of unit games is updated (H4). That is to say, based on information which is transmitted from a slot machine (3A to 3J) and indicates that a unit game has ended, the main CPU 241 adds 1 to the accumulated value of the total number of unit games stored in the RAM 243, each time a unit game ending signal is received from a slot machine (3A to 3J), and the main CPU 241 causes the RAM 243 to store the value after the addition.

Then the main CPU 241 determines whether the accumulated value of the total number of unit games stored the RAM 243 reaches a predetermined value (100 in the present embodiment) (H5). When the accumulated value does not reach the predetermined value (H5: NO), the process returns to the step H1. On the other hand, when the accumulated value reaches the predetermined value (H5: YES), a jackpot game start signal which triggers a jackpot game is transmitted to each of the slot machines 3A to 3J (H6).

In this embodiment, a jackpot game is started when the accumulated value of the total number of unit games exceeds a predetermined value (e.g., a fixed value of "100"), however, this embodiment is not limited thereto. For example, the predetermined value (accumulated value of the total number of unit games) which triggers the start of a jackpot game may be randomly varied within a predetermined range (e.g. between 50 and 300).

After the finish of H6, a jackpot game start process is executed (H7). As a result of this various types of signals regarding the jackpot game is received from the slot machines 3A to 3J. Specifically, received signals are a game start signal transmitted from the slot machines 3A to 3J in G2 and a jackpot winning signal transmitted from the slot machines 3A to 3J in G6.

Then whether a jackpot winning signal (JP winning signal) is received is determined (H8). If no JP winning signal is received (H8: NO), a JP winning signal is waited for.

On the other hand, when a JP winning signal is received (H8: YES), if the main CPU 241 determines that this JP winning signal is the first JP winning signal received since the start of the jackpot game, a game start signal from a slot machine other than the slot machine transmitted the aforesaid first JP winning signal is received for a predetermined period of time (adjustment period) after a game start signal is received from the slot machine transmitted the aforesaid first JP winning signal (H9).

Then whether the predetermined period of time (adjustment period) has elapsed or not is determined (H10). If the predetermined period of time (adjustment period) has not elapsed (H10: NO), elapse of the predetermined period of time is waited for.

On the other hand, if the predetermined period of time (adjustment period) has elapsed (H10: YES), a winning enabling signal is transmitted to the slot machine that transmitted the JP winning signal first (H11). To the slot machines other than the slot machine that transmitted the JP winning signal first, a winning disabling signal is transmitted (H12). Then, this process once ends.

According to the structure above, in a jackpot game independently run in each of the slot machines 3A to 3J, when the total number of unit games stored in the RAM 243 reaches a predetermined value, the server 2 awards an accumulated game value to a slot machine which has achieved a jackpot first, and adjusts slot machines other than the slot machine which has achieved a jackpot first so that no jackpot is achieved in these other slot machines. Because of this arrangement, it is possible to arrange that the running of a jackpot game is triggered by the total number of unit games run in all of the slot machines. This makes it possible to prevent two or more slot machines from simultaneously achieving a jackpot and to award coins accumulated for a jackpot game only to a player who has achieved a jackpot first.

Embodiment 3-3

Note that the present invention is not limited to the above-described Embodiments 3-1 and 3-2. The below-described Embodiment 3-3 may also be possible. The following will describe a gaming system 1 of the Embodiment 3-3 of the present invention. It is noted that the mechanical structure of the gaming system, the electrical structure of the gaming system, the boot process, the initial process and the like in the Embodiment 3-2 are identical with those in the above-described embodiments and hence the descriptions thereof are not repeated here. Described in the Embodiment 3-3 are a third base game winning combination lottery table 330, a third base game payout table 331, a third game running process, and a third server jackpot game running process which are provided in place of the base game winning combination lottery table 130, the base game payout table 131, the first game running process, the first slot machine jackpot game running process, and the first server jackpot game running process of the Embodiment 3-1.

(Third Base Game Winning Combination Lottery Table)

A third base game winning combination lottery table 330 which is used in a third game running process executed by the slot machine (3A to 3J) will be described with reference to FIG. 67. FIG. 67 is an explanatory diagram showing a third base game winning combination lottery table 330. The third base game winning combination lottery table 330 is stored in the RAM 43, and is read during a symbol determining process of the third game running process which will be described later.

As shown in FIG. 67, random number values used in the third base game winning combination lottery table 330 range from 0 to 5998. When a random number value sampled by the main CPU 41 is 0 to 29, a winning combination of "SUN" 181 is made. Then, four symbols 180 of "SUN" 181 are stopped in the display windows 151 to 155. When a random number value sampled by the main CPU 41 is 30 to 51, a winning combination of "HEART" 182 is made. Then, five symbols 180 of "HEART" 182 are stopped in the display windows 151 to 155. When a random number value sampled by the main CPU 41 is 52 to 107, a winning combination of "MOON" 183 is made. Then, five symbols 180 of "MOON" 183 are stopped in the display windows 151 to 155. Likewise, when a random number value is 108 to 207, a winning combination of "K" 186 is made. When a random number value is 208 to 407, a winning combination of "A" 184 is made. When a random number value is 408 to 807, a winning combination of "Q" 187 is made. When a random number value is 808 to 1477, a winning combination of "J" 185 is made. When a random number value is 1478 to 1807, a winning combination of "10" 188 is made. When a random number value sampled by the main CPU 41 is 1808 to 5809, it means a loss, and a losing combination of symbols 180, which is different from any of the above-mentioned winning combinations, is stopped in the display windows 151 to 155. When a random number value sampled by the main CPU 41 is 5810 to 5998, a jackpot is made and five symbols of "SUN" 181 are stopped in the display windows 151 to 155. It is assumed in this case that a jackpot is achieved (JP winning is made) when five out of 15 symbols 180 stopped in the display windows 151 to 155 are "SUN" 181. Here, making any of these winning combinations means that a winning combination is achieved.

(Third Base Game Payout Table)

Next, a third base game payout table 331 will be described with reference to FIG. 68. The third base game payout table 331 indicates the number of coins to be paid out for a winning combination determined using the third base game winning combination lottery table 330 shown in FIG. 67. FIG. 68 shows the third base game payout table 331. The third base game payout table 331 is stored in the RAM 43, and is read during a base game payout process of the third game running process which will be described later.

For a result of sampling using the third base game winning combination lottery table 330, zero or more coins are paid out in accordance with a winning combination displayed in the display windows 151 to 155 based on the third base game payout table 331.

More specifically, when four symbols 180 of "SUN" 181 are stopped in the display windows 151 to 155, seventy coins are paid out. When five symbols 180 of "HEART" 182 are stopped in the display windows 151 to 155, fifty coins are paid out. When five symbols 180 of "MOON" 183 are stopped in the display windows 151 to 155, thirty coins are paid out as a payout. Likewise, when five symbols 180 of "K" 186 are stopped in the display windows 151 to 155, twenty-five coins are paid out as a payout. When five symbols 180 of "A" 184 are stopped in the display windows 151 to 155, twenty coins are paid out as a payout. When five symbols 180 of "Q" 187 are stopped in the display windows 151 to 155, fifteen coins are paid out as a payout. When five symbols 180 of "J" 185 are stopped in the display windows 151 to 155, ten coins are paid out as a payout. When five symbols 180 of "10" 188 are stopped in the display windows 151 to 155, five coins are paid out as a payout. When a lottery results in losing, and a losing combination of symbols 180, which is different from any of the above-mentioned winning combinations, is stopped in the display windows 151 to 155, zero coin is paid out as a payout. In the meanwhile, a jackpot is achieved (JP winning is made) when five symbols of "SUN" 181 are stopped in the display windows 151 to 155. A payout awarded in this case is coins equivalent to an accumulated value accumulated as jackpot credit information in the RAM 243 of the server 2. For example, when the RAM 243 of the server 2 stores jackpot credit information indicating an accumulated value of $12.34, coins equivalent to the accumulated value of $12.34 are paid out.

(Operation of Slot Machine: Third Game Running Process)

Figure 69:
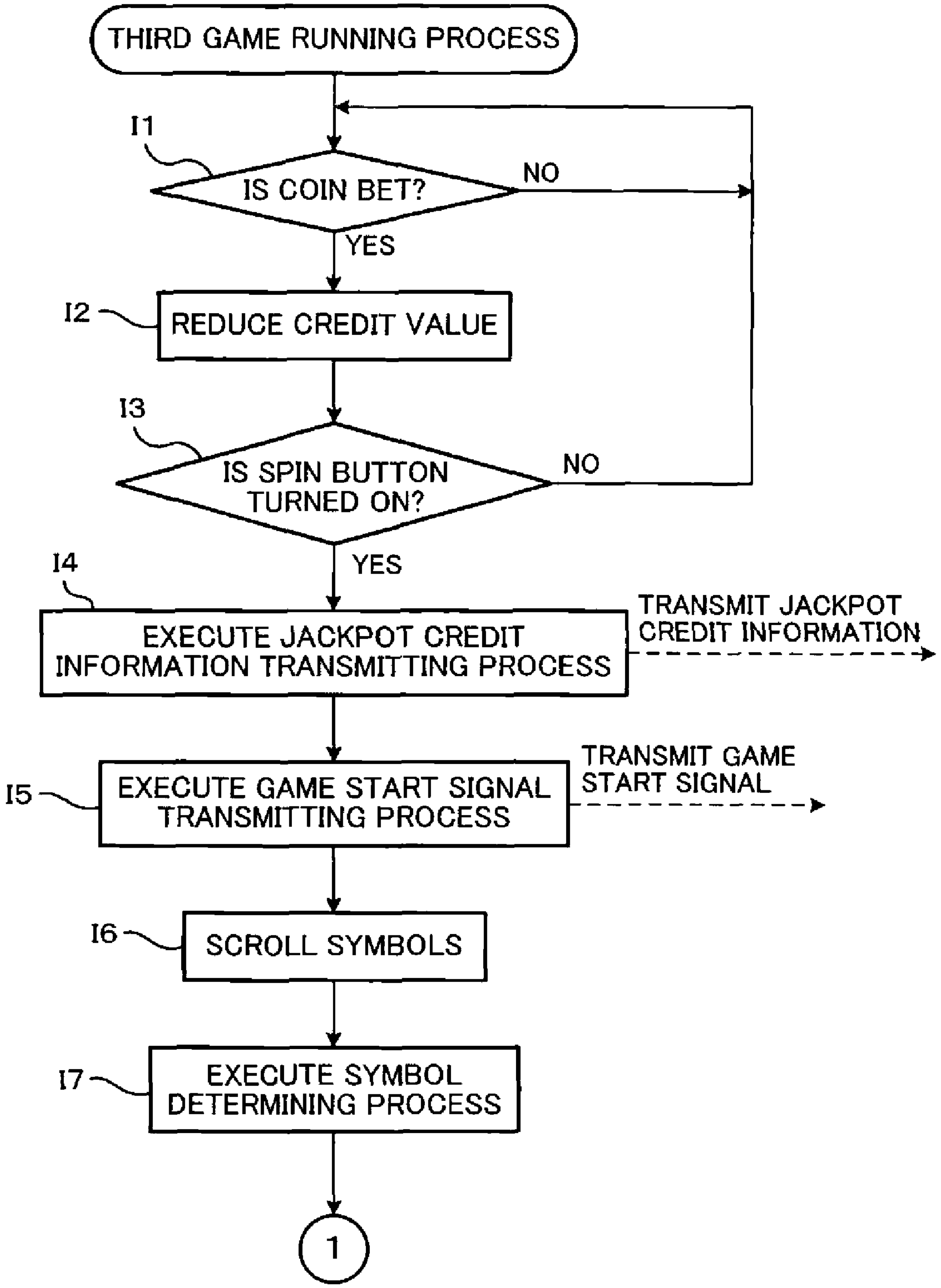
FIG. 69 is a flowchart of a third game running process executed in a slot machine of the Embodiment 3-3.
Figure 70:
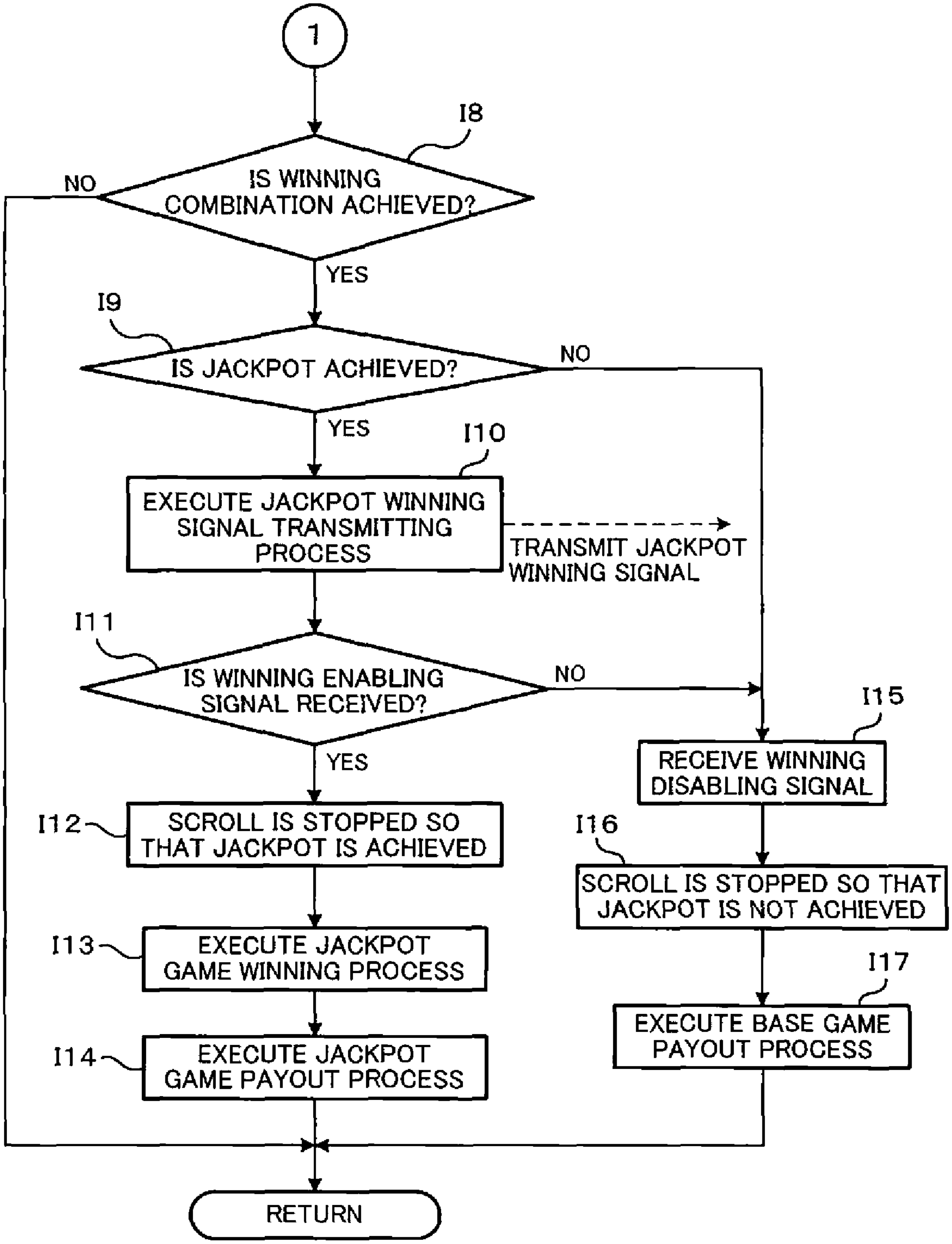
FIG. 70 is a flowchart of a third game running process executed in the slot machine of the Embodiment 3-3.

In the Embodiment 3-3, after the slot machine initial setting routine of FIG. 59 is completed, the main CPU 41 of each of the slot machines 3A to 3J reads out and executes the game program and the game system program sequentially, thereby executing a third game running process shown in FIGS. 69 and 70. A third game running processing program is stored in the RAM 43.

The main CPU 41 of each of the slot machines 3A to 3J executes a third game running process shown in FIGS. 69 and 70. When the third game running process is run, first, the main CPU 41 determines whether a coin is bet or not (I1). In this step, whether an input signal from the 1-BET switch 26S entered by pressing of the 1-BET button 26 is received or not is determined. Meanwhile, whether an input signal from the MAX-BET switch 27S entered by pressing of the MAX-BET button 27 is received or not is determined. When no coin is bet (I1: NO), I1 is repeated so that a standby state continues until a coin is bet.

On the other hand, when it is determined that a coin is bet (I1: YES), the credit value stored in the RAM 43 is reduced according to the number of coins bet (I2). When the number of coins bet surpasses the number of coins equivalent to the credit value stored in the RAM 43, the credit value is reduced to zero and the step I3 is performed. When the number of coins bet exceeds the maximum number of coins bettable on one game (50 pieces in this embodiment), the credit value is reduced by fifty and the step I3 is performed.

Then, whether a spin button 23 is turned on or not is determined (I3). When the spin button 23 is not turned on (I3: NO), the process returns to I1. Here, if the spin button 23 is not turned on (for example, the spin button 23 is not turned on but a command to end the game is input), the reduction of the credit value in the step I2 is canceled.

On the other hand, when it is determined that the spin button 23 is turned on (I3: YES), executed is a jackpot credit information transmitting process (I4). In other words, the main CPU 41 transmits, to the server 2, a percentage (5% in this embodiment) of one or more coins bet in the step I1, as jackpot credit information.

Then a game start signal transmitting process is executed (I5). In other words, the main CPU 41 transmits a game start signal to the server 2 so as to notify the server 2 of information indicating in which slot machine a base game has started. Then the symbols 180 are scrolled in the display windows 151 to 155 (I6).

Then, a symbol determining process is executed (I7). In other words, a stop symbol determining program is executed based on the third base game winning combination lottery table 330 stored in the RAM 43, to determine fifteen symbols 180 to be stopped in the display windows 151 to 155.

Then, whether a winning combination is achieved or not, that is, whether a combination of symbols 180 determined in the symbol determining process corresponds to a winning combination listed in the third base game payout table 331 or not, is determined (I8). When it is determined that a winning combination is not achieved (I8: NO), the process ends. On the other hand, when it is determined that a winning combination is achieved (I8: YES), whether a jackpot is achieved is determined (I9). Specifically, it is determined that a jackpot is achieved when the symbols 180 determined in the symbol determining process of I7 includes five jackpot symbols of "SUN" 181. When no jackpot is achieved (I9: NO), the process proceeds to I15.

On the other hand, when a jackpot is achieved (I9: YES), a jackpot winning signal transmitting process is executed (I10). This is a process to transmit to the server 2 information indicating that a jackpot is achieved and identification information of a slot machine (3A to 3J) which has achieved the jackpot.

It is then determined whether a winning enabling signal is received from the server 2 (I11). If no winning enabling signal is received (I11: NO), a winning disabling signal is waited for. If a winning disabling signal is received (I15), the scroll is stopped in such a way that a jackpot is not achieved (I16). That is to say, the symbols 180 are stopped (arranged) in the display windows 151 to 155 in such a way that five jackpot symbols of "SUN" 181 are not stopped (arranged) in the display windows 151 to 155.

Then a payout process based on abase game is executed (I17). More specifically, the number of coins to be paid out which corresponds to the kind of the winning combination is calculated based on the third base game payout table 331 shown in FIG. 68. When coins to be paid out are reserved, a credit value equivalent to the coins to be paid out is added to the credit value stored in the RAM 43. When the coins are paid out, a control signal is transmitted to the hopper 66 so that a predetermined number of coins are paid out to the coin tray 18. That is, a base payout is awarded in accordance with the winning combination. Then, this process ends.

In the meanwhile, if a winning enabling signal is received in I11 (I11: YES), the scroll is stopped so that a jackpot is achieved (I12). That is to say, the symbols 180 are stopped (arranged) in the display windows 151 to 155 in such a way that five jackpot symbols of "SUN" 181 are stopped (arranged) in the display windows 151 to 155. Thereafter a jackpot game winning process is executed (I13). This is a process to notify a player of the winning of a jackpot. In this process, various types of effect processes such as image effects on the upper image display panel 33 and the lower image display panels 16A to 16J and sound effects by a speaker 29.

Thereafter a jackpot payout process is executed based on the third base game payout table 331 shown in FIG. 68 (I14). This is a process to pay out coins equivalent to the accumulated value accumulatively stored as jackpot credit information in the RAM 243 of the server 2 in I4. For example, when the RAM 243 of the server 2 stores jackpot credit information indicating an accumulated value of $12.34, coins equivalent to the accumulated value of $12.34 are paid out. When coins to be paid out are reserved, a credit value equivalent to the accumulated value is added to the credit value stored in the RAM 43. When the coins are paid out, a control signal is transmitted to the hopper 66 so that coins equivalent to the accumulated value are paid out to the coin tray 18. Then, this process once ends.

(Operation of Server: Third Server Jackpot Game Running Process)

Figure 71:
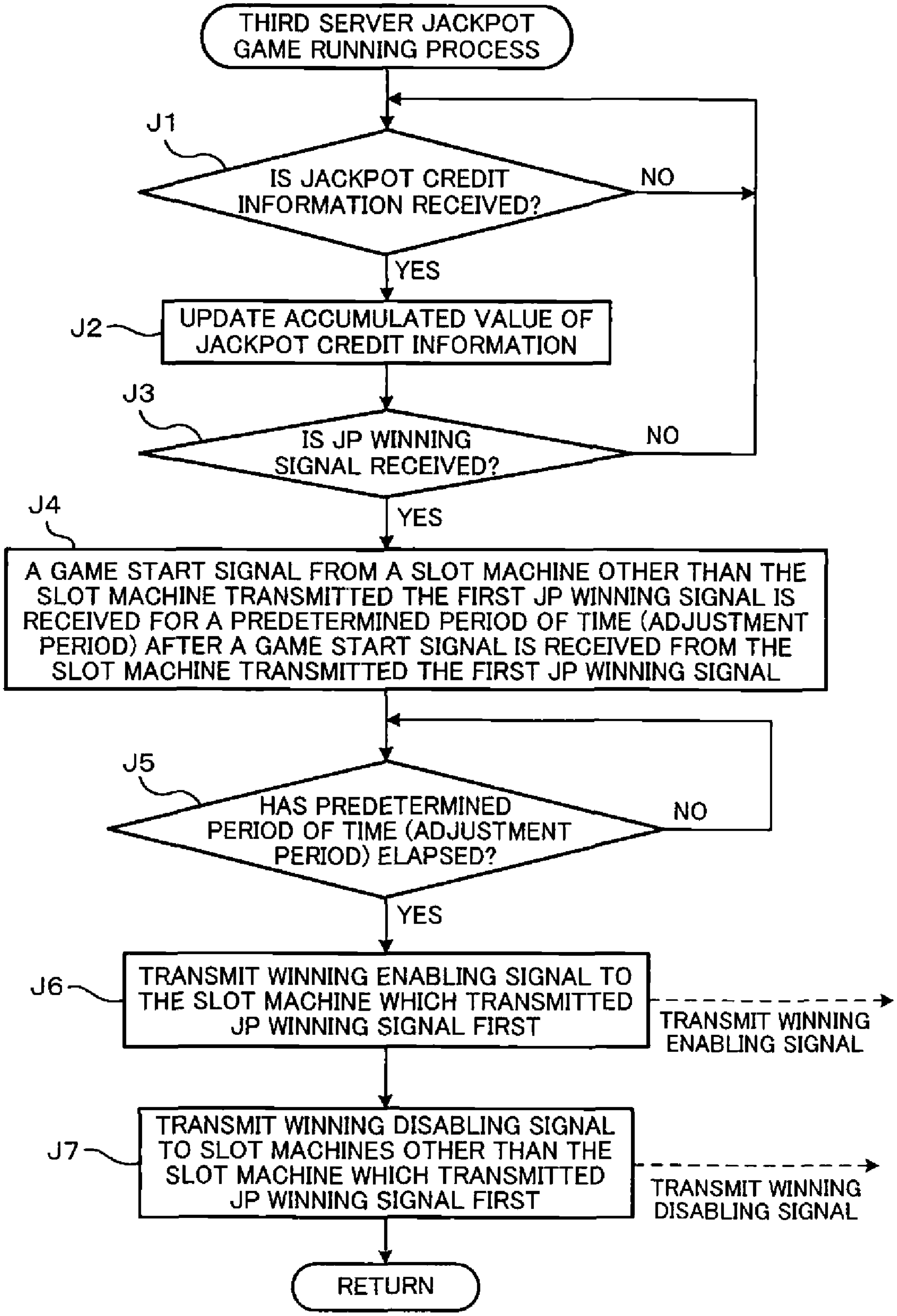
FIG. 71 is a flowchart of a third server jackpot game running process executed in a server of the Embodiment 3-3.

After the server initial setting routine shown in FIG. 59 ends, the main CPU 241 of the server 2 reads out and executes the game program and the game system program sequentially, thereby running the third server jackpot game running process shown in FIG. 71. A third server jackpot game running processing program is stored in the RAM 243.

When the third server jackpot game running process is executed, first, the main CPU 241 determines whether the jackpot credit information transmitted in the before-mentioned third game running process is received or not (J1). When the jackpot credit information is not received (J1: NO), the step J1 is repeated. On the other hand, when the jackpot credit information is received (J1: YES), the accumulated value of the jackpot credit information is updated (J2). In other words, based on the jackpot credit information transmitted from each of the slot machines 3A to 3J, the main CPU 241 adds a percentage (5% in this embodiment) of coins bet at each of the slot machines 3A to 3J to the accumulated value of jackpot credit information stored in the RAM 243, and stores the thus obtained value.

Then whether a jackpot winning signal (JP winning signal) is received is determined by the main CPU 241 (J3). If no JP winning signal is received (J3: NO), the process returns to J1.

On the other hand, if a JP winning signal is received (J3: YES), a game start signal is received for a predetermined period of time (adjustment period) from slot machines other than a slot machine which has transmitted the JP winning signal first, after a game start signal is received from that slot machine having transmitted the JP winning signal first (J4).

Then whether the predetermined period of time (adjustment period) has elapsed or not is determined (J5). If the predetermined period of time (adjustment period) has not elapsed (J5: NO), elapse of the predetermined period of time is waited for.

On the other hand, if the predetermined period of time (adjustment period) has elapsed (J5: YES), a winning enabling signal is transmitted to the slot machine that transmitted the JP winning signal first (J6). To the slot machines other than the slot machine that transmitted the JP winning signal first, a winning disabling signal is transmitted (J7). Then, this process once ends.

According to the structure above, when a jackpot is achieved as a result of a base game run independently by each slot machine, the server 2 awards an accumulated game value to a slot machine which has achieved a jackpot first, and adjusts slot machines other than the slot machine which has achieved a jackpot first so that no jackpot is achieved in these other slot machines. This makes it possible to prevent two or more slot machines from simultaneously achieving a jackpot and to award an accumulated game value only to a player who has achieved a jackpot first.

Embodiment 4

Note that the present invention is not limited to the above-described embodiment. The present invention may be structured as described in the following Embodiment 4.

The invention pertaining to the Embodiment 4 is a gaming system which comprises:

a plurality of terminal devices each of which executes a base game and a bonus game with a game value being bet and awards a prize according to a predetermined winning;

each of the terminal devices comprising:

a storage device; and a controller which is programmed to perform the steps (e1) to (e5) below, and the terminal devices are interconnected over a network. (e1) A master device is specified among the terminal devices. (e2) The master device accumulatively stores a percentage of a betted game value in the storage device of the master device, in each base game run by each terminal device. (e3) The master device causes each terminal device to independently run a bonus game, when the game value accumulated in the storage device of the master device reaches a predetermined value. (e4) In the bonus game run by each terminal device, the master device awards a game value equivalent to the predetermined value to the terminal device which achieves a predetermined winning first. (e5) The master device adjusts the terminal devices other than the terminal device which achieves the predetermined winning first not to achieve the predetermined winning.

According to the structure above, in a bonus game independently run in each terminal device, a master terminal device awards a game value equivalent to a predetermined value accumulated in the storage device to the terminal device in which a predetermined winning is met first, and performs adjustment so that the predetermined winning is not met in the terminal devices other than the terminal device in which the predetermined winning is met first. This makes it possible to prevent two or more terminal devices from simultaneously achieving a winning in a bonus game and to award a game value accumulated for a bonus game only to a player who has achieved a winning first.

The invention pertaining to the Embodiment 4 is the aforesaid gaming system which is arranged so that:

the controller awards a special prize to the terminal devices which are adjusted so as not to achieve the predetermined winning.

According to this structure, the master terminal device awards, to the terminal devices which are adjusted so as not to achieve the predetermined winning, a special prize which is different from the game value equivalent to the predetermined value accumulated in the storage device. With this, a terminal device, which is disadvantageously adjusted so as not to achieve the predetermined winning for the purpose of preventing two or more of the terminal devices from simultaneously achieving a winning in a bonus game, can receive a prize (such as payout) as a consolation prize.

The invention pertaining to the Embodiment 4 is a gaming system which comprises:

a plurality of terminal devices each of which executes a base game and a bonus game with a game value being bet and awards a prize according to a predetermined winning, each of the terminal devices comprising:

a storage device; and a controller which is programmed to perform the following steps (f1) to (f5) below, and the terminal devices are interconnected over a network. (f1) A master device is specified among the terminal devices. (f2) The master device accumulatively stores a percentage of a betted game value in the storage device of the master device, in each base game run by each terminal device. (f3) The master device causes each terminal device to independently run a bonus game, when the game value accumulated in the storage device of the master device reaches a predetermined value. (f4) The master device awards a share of the game value equivalent to the predetermined value to each of a predetermined number of terminal devices among those having achieved a predetermined winning, in the bonus game run by each terminal device. (f5) The master device performs adjustment so that the predetermined winning is not achieved in the terminal devices other than the predetermined number of terminal devices among those having achieved a predetermined winning.

According to the structure above, it is possible to arrange the system so that, in a bonus game independently run in each of the terminal devices, the master terminal device awards a share of the game value equivalent to the predetermined value to each of a predetermined number of terminal devices among those having achieved a jackpot, and performs adjustment so that the predetermined winning is not achieved in the terminal devices other than the predetermined number of terminal devices among those having achieved a predetermined winning. In this case, the number of terminal devices achieving a winning in a bonus game does not exceed a planned number of winning, and each of players corresponding to the planned number of winning receives a share of the game value pooled for the bonus game.

The invention pertaining to the Embodiment 4 is the aforesaid gaming system which is arranged so that:

the controller awards a special prize to the terminal devices which are adjusted so as not to achieve the predetermined winning.

According to this structure, the master terminal device awards, to the terminal devices which are adjusted so as not to achieve the predetermined winning, a special prize which is different from the game value equivalent to the predetermined value accumulated in the storage device. With this, a terminal device, which is disadvantageously adjusted so as not to achieve the predetermined winning for the purpose of preventing two or more of the terminal devices from simultaneously achieving a winning in a bonus game, can receive a prize (such as payout) as a consolation prize.

The invention pertaining to the Embodiment 4 is a gaming system which comprises:

a plurality of terminal devices each of which executes a base game and a bonus game with a game value being bet and awards a prize according to a predetermined winning, each of the terminal devices comprising:

a storage device;

a counter device performing counting; and a controller which is programmed to perform the steps (g1) to (g6) below, and the terminal devices are interconnected over a network. (g1) A master device is specified among the terminal devices. (g2) The master device accumulatively stores a percentage of a betted game value in the storage device of the master device, in each base game run by each terminal device. (g3) The master device changes the count of the counter device in each base game run by each terminal device. (g4) The master device causes each terminal device to independently run a bonus game when the count of the counter device reaches a predetermined value. (g5) In the bonus game run by each terminal device, the master device awards the accumulated game value to the terminal device which achieves a predetermined winning first. (g6) The master device adjusts the terminal devices other than the terminal device which achieves the predetermined winning first not to achieve the predetermined winning.

According to the structure above, in a bonus game independently run in each terminal device, a master terminal device awards an accumulated game value to the terminal device in which a predetermined winning is met first, and performs adjustment so that the predetermined winning is not met in the terminal devices other than the terminal device in which the predetermined winning is met first, when the count of the counter device reaches a predetermined value. With this, the total number of base games run by all of the terminal devices can be used as a trigger of the running of a bonus game. This makes it possible to prevent two or more terminal devices from simultaneously achieving a winning in a bonus game and to award a game value accumulated for a bonus game only to a player who has achieved a winning first.

The invention pertaining to the Embodiment 4 is the aforesaid gaming system which is arranged so that:

the controller awards a special prize to the terminal devices which are adjusted so as not to achieve the predetermined winning.

According to this structure, the master terminal device awards, to the terminal devices which are adjusted so as not to achieve the predetermined winning, a special prize which is different from the game value equivalent to the predetermined value accumulated in the storage device. With this, a terminal device, which is disadvantageously adjusted so as not to achieve the predetermined winning for the purpose of preventing two or more of the terminal devices from simultaneously achieving a winning in a bonus game, can receive a prize (such as payout) as a consolation prize.

The invention pertaining to the Embodiment 4 is a gaming system which comprises:

a plurality of terminal devices each of which executes a base game and a bonus game with a game value being bet and awards a prize according to a predetermined winning, each of the terminal devices comprising:

a storage device;

a controller which is programmed to perform the steps (h1) to (h6) below, and the terminal devices are interconnected over a network. (h1) A master device is specified among the terminal devices. (h2) The master device accumulatively stores a percentage of a betted game value in the storage device of the master device, in each base game run by each terminal device. (h3) When a predetermined winning is achieved as a result of the base game run by each terminal device, the master device awards the accumulated game value to the terminal device which achieves the predetermined winning first. (h4) The master device performs adjustment so that the terminal devices other than the terminal device which achieves the predetermined winning first not to achieve the predetermined winning.

According to the structure above, when a predetermined winning is achieved as a result of the base game run by each terminal device, the master device awards the accumulated game value to the terminal device which achieves the predetermined winning first, and performs adjustment so that the terminal devices other than the terminal device which achieves the predetermined winning first not to achieve the predetermined winning. This makes it possible to prevent two or more terminal devices from simultaneously achieving a predetermined winning and to award a game value accumulated for a bonus game only to a player who has achieved a winning first.

The invention pertaining to the Embodiment 4 is the aforesaid gaming system which is arranged so that:

the controller awards a special prize to the terminal devices which are adjusted so as not to achieve the predetermined winning.

According to this structure, the master terminal device awards, to the terminal devices which are adjusted so as not to achieve the predetermined winning, a special prize which is different from the game value equivalent to the predetermined value accumulated in the storage device. With this, a terminal device, which is disadvantageously adjusted so as not to achieve the predetermined winning for the purpose of preventing two or more of the terminal devices from simultaneously achieving a winning, can receive a prize (such as payout) as a consolation prize.

A playing method of a gaming system of the Embodiment 4, which system includes a plurality of terminal devices each of which executes a base game and a bonus game with a game value being bet and awards a prize according to a predetermined winning, each of the terminal devices comprising:

a storage device; and a controller which controls the steps below, and the terminal devices are interconnected over a network.

The playing method includes the steps of: specifying a master device among the terminal devices:

the master device accumulatively storing a percentage of a betted game value in the storage device of the master device, in each base game run by each terminal device;

the master device causing each terminal device to independently run a bonus game, when the game value accumulated in the storage device of the master device reaches a predetermined value;

in the bonus game run by each terminal device, the master device awarding a game value equivalent to the predetermined value to the terminal device which achieves a predetermined winning first; and the master device adjusting the terminal devices other than the terminal device which achieves the predetermined winning first not to achieve the predetermined winning.

According to the structure above, in a bonus game independently run in each terminal device, a master terminal device awards a game value equivalent to a predetermined value accumulated in the storage device to the terminal device in which a predetermined winning is met first, and performs adjustment so that the predetermined winning is not met in the terminal devices other than the terminal device in which the predetermined winning is met first. This makes it possible to prevent two or more terminal devices from simultaneously achieving a winning in a bonus game and to award a game value accumulated for a bonus game only to a player who has achieved a winning first.

(Structure of Gaming System 500)

Now, the following describes the Embodiment 4 where the gaming system of the Embodiment 4 having the above-described structure is applied to a gaming system 500 constituted by slot machines 3A to 3J, and specifically structured. Discussed below is a gaming system 500 of the Embodiment 4. It is noted that mechanical and electrical structures and the like of the gaming system 500 are not described here because they are structured in the same manner as those in the Embodiment 3-1. The Embodiment 4 deals with the structure of the gaming system 500, a client-type game running process, a client-type jackpot game running process, and an adjustment process.

(Structure of Gaming System 500)

Figure 73:
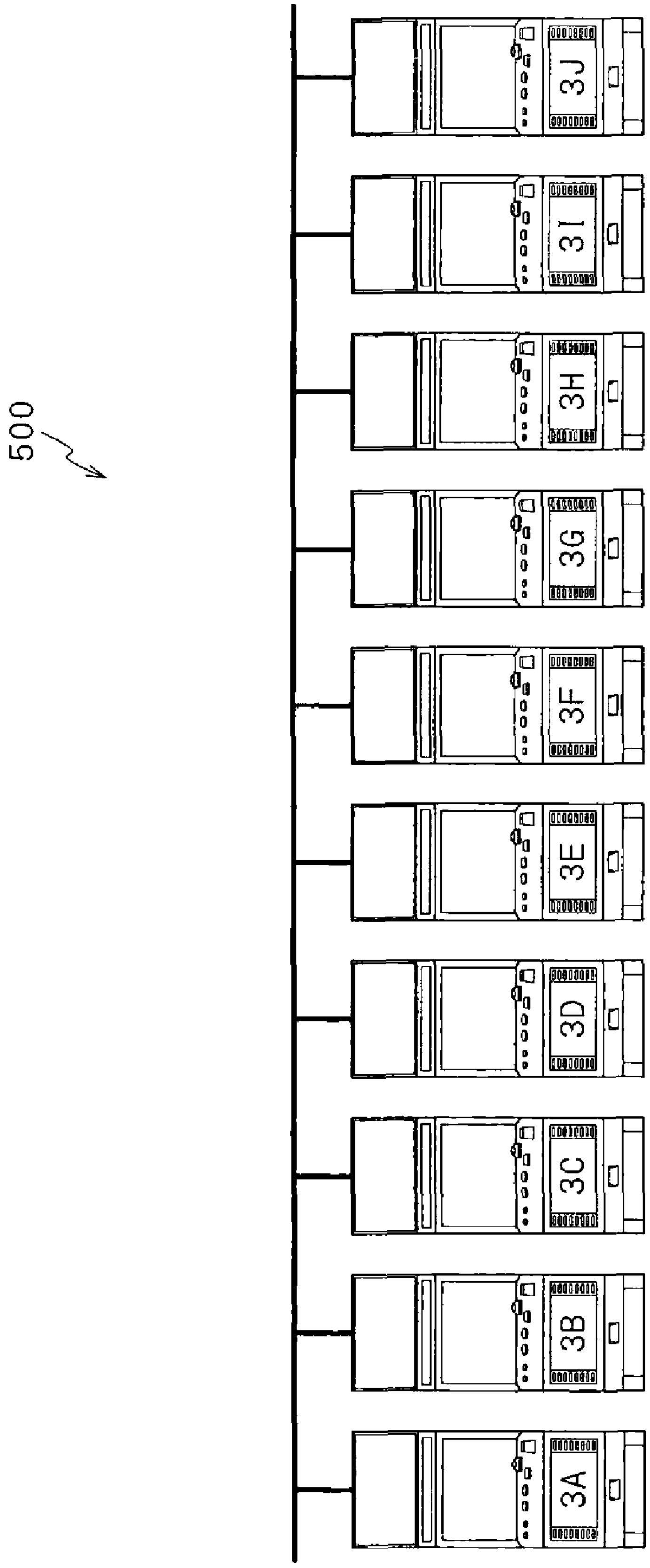
FIG. 73 is a schematic drawing of the gaming system of the Embodiment 4.
Figure 74:
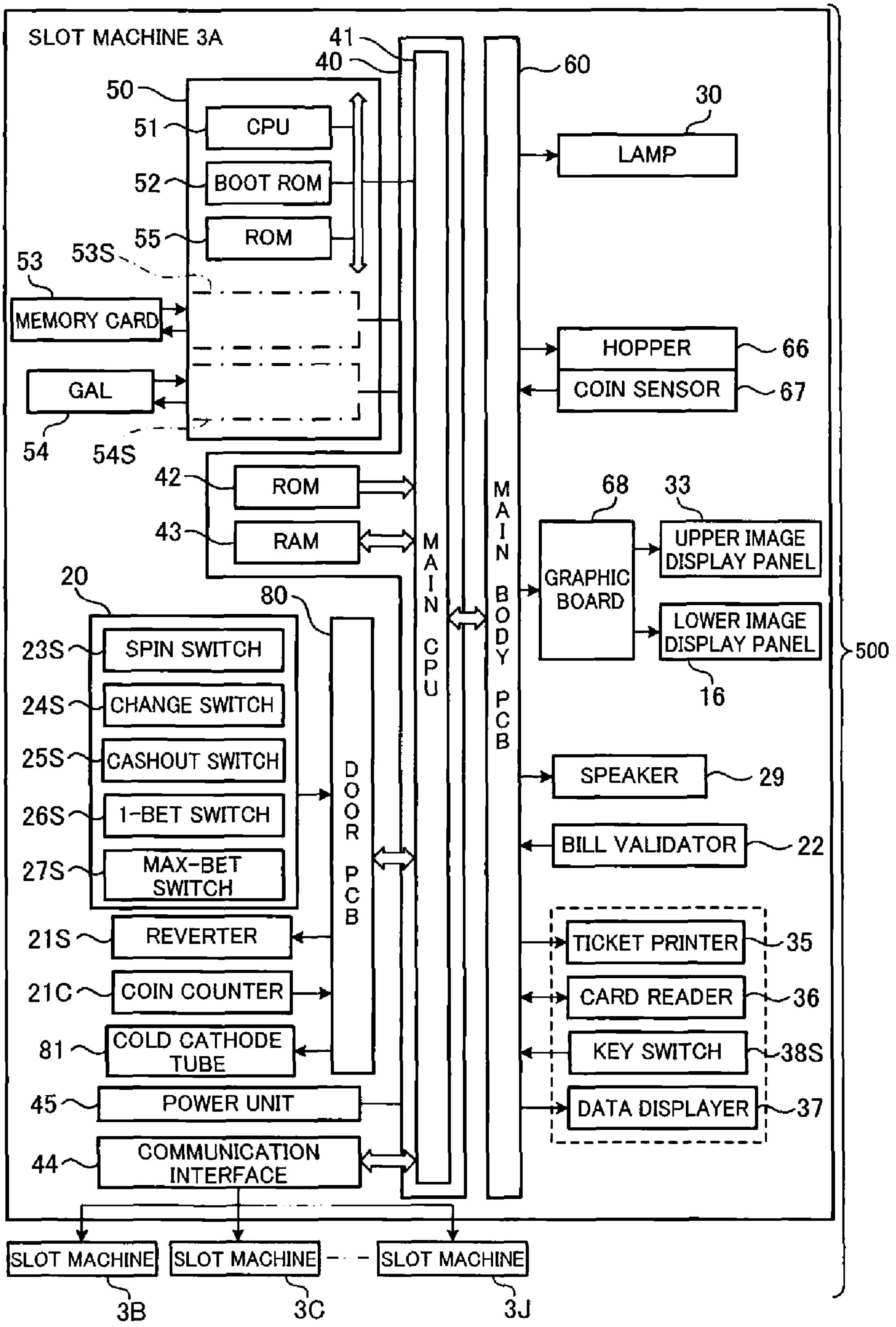
FIG. 74 is a block diagram showing an electrical structure of the gaming system of the Embodiment 4.

First, the structure of the gaming system 500 of the Embodiment 4 is described with reference to FIGS. 73 and 74. FIG. 73 is a schematic drawing of the gaming system 500 of the Embodiment 4. FIG. 74 is a block diagram of an electrical structure of the gaming system 500 of the Embodiment 4.

As shown in FIG. 73, the gaming system 500 is structured so that 10 slot machines 3A to 3J are interconnected over a network. The slot machines 3A to 3J are structured in the same manner as those in the Embodiment 3-1. As shown in FIG. 74, an electrical structure of the slot machine of the Embodiment 4 is such that a communication interface 44 is interconnected with each of the slot machines 3B to 3J, in place of the structure of the Embodiment 3-1 in which the communication interface 44 of the slot machine is connected to the server 2. Other than this, the electrical structure of the Embodiment 4 is identical with that of the Embodiment 3-1.

(Operation of Slot Machine: Client-Type Game Running Process)

Figure 75:
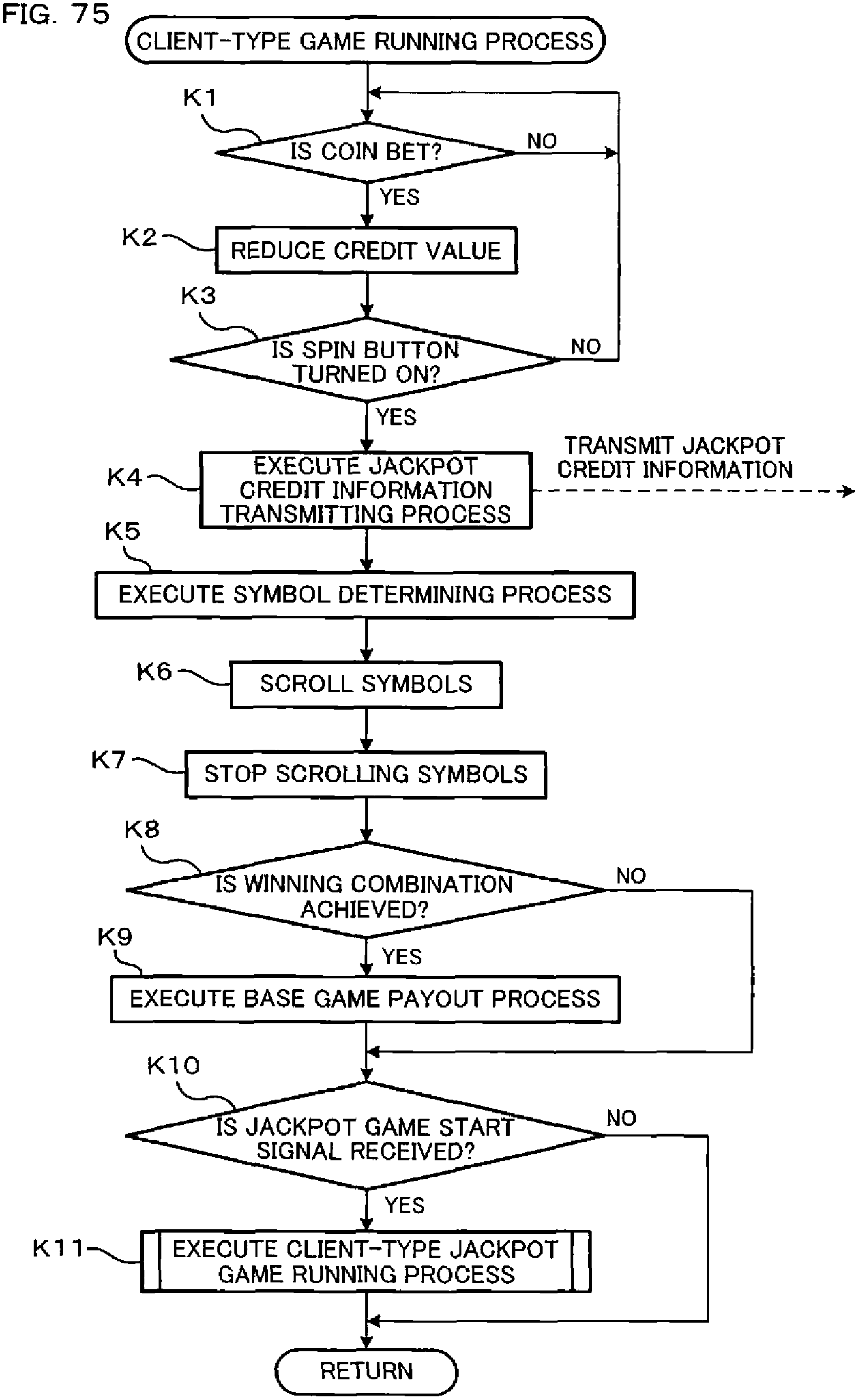
FIG. 75 is a flowchart of a client-type game running process executed in a slot machine of the Embodiment 4.

In the Embodiment 4, the main CPU 41 of each of the slot machines 3A to 3J executes a client-type game running process shown in FIG. 75 by sequentially reading and running a game program and a game system program. A client-type game running processing program is stored in the RAM 43.

The main CPU 41 of each of the slot machines 3A to 3J executes a client-type game running process shown in FIG. 75. When the client-type game running process is run, first, the main CPU 41 determines whether a coin is bet or not (K1). In this step, whether an input signal from the 1-BET switch 26S entered by pressing of the 1-BET button 26 is received or not is determined. Meanwhile, whether an input signal from the MAX-BET switch 27S entered by pressing of the MAX-BET button 27 is received or not is determined. When no coin is bet (K1: NO), K1 is repeated so that a standby state continues until a coin is bet.

On the other hand, when it is determined that a coin is bet (K1: YES), the credit value stored in the RAM 43 is reduced according to the number of coins bet (K2). When the number of coins bet surpasses the number of coins equivalent to the credit value stored in the RAM 43, the credit value is reduced to zero and the step K3 is performed. When the number of coins bet exceeds the maximum number of coins bettable on one game (50 pieces in this embodiment), the credit value is reduced by fifty and the step K3 is performed.

Then, whether a spin button 23 is turned on or not is determined (K3). When the spin button 23 is not turned on (K3: NO), the process returns to K1. Here, if the spin button 23 is not turned on (for example, the spin button 23 is not turned on but a command to end the game is input), the reduction of the credit value in the step K2 is canceled.

On the other hand, when it is determined that the spin button 23 is turned on (K3: YES), executed is a jackpot credit information transmitting process (K4). In other words, the main CPU 41 transmits, to each of the slot machines 3A to 3J, a percentage (5% in this embodiment) of one or more coins bet in the step K1, as jackpot credit information.

Then, a symbol determining process is executed (K5). In other words, a stop symbol determining program is executed based on the base game winning combination lottery table 130 stored in the RAM 43, to determine fifteen symbols 180 to be stopped in the display windows 151 to 155.

Then, symbols 180 in the symbol columns (symbol lines A to E) in the display windows 151 to 155 are scrolled (K6). When a predetermined period of time (base time) has elapsed after the scroll of the symbols 180 is started, the symbols 180 determined in the step K5 are stopped (rearranged) in the display windows 151 to 155 (K7).

Then, whether a winning combination is achieved or not, that is, whether a combination of symbols 180 stopped in the display windows 151 to 155 corresponds to a winning combination listed in the base game payout table 131 or not, is determined (K8). When it is determined that a winning combination is not achieved (K8: NO), the process proceeds to the step K10. On the other hand, when it is determined that a winning combination is achieved (K8: YES), a base game payout process is executed (K9). More specifically, the number of coins to be paid out which corresponds to the kind of the winning combination is calculated based on the base game payout table 131 shown in FIG. 52. When coins to be paid out are reserved, a credit value equivalent to the coins to be paid out is added to the credit value stored in the RAM 43. When the coins are paid out, a control signal is transmitted to the hopper 66 so that a predetermined number of coins are paid out to the coin tray 18. That is, a base payout is awarded in accordance with the winning combination.

Then, it is determined whether a jackpot game start signal which is transmitted in a later-mentioned adjustment process is received or not (K10). When the jackpot game start signal is not received (K10: NO), this process ends. On the other hand, when the jackpot game start signal is received (K10: YES), a later-mentioned client-type jackpot game running process is executed (K11). Then, this process once ends.

(Operation of Slot Machine: Client-Type Jackpot Game Running Process)

Figure 76:
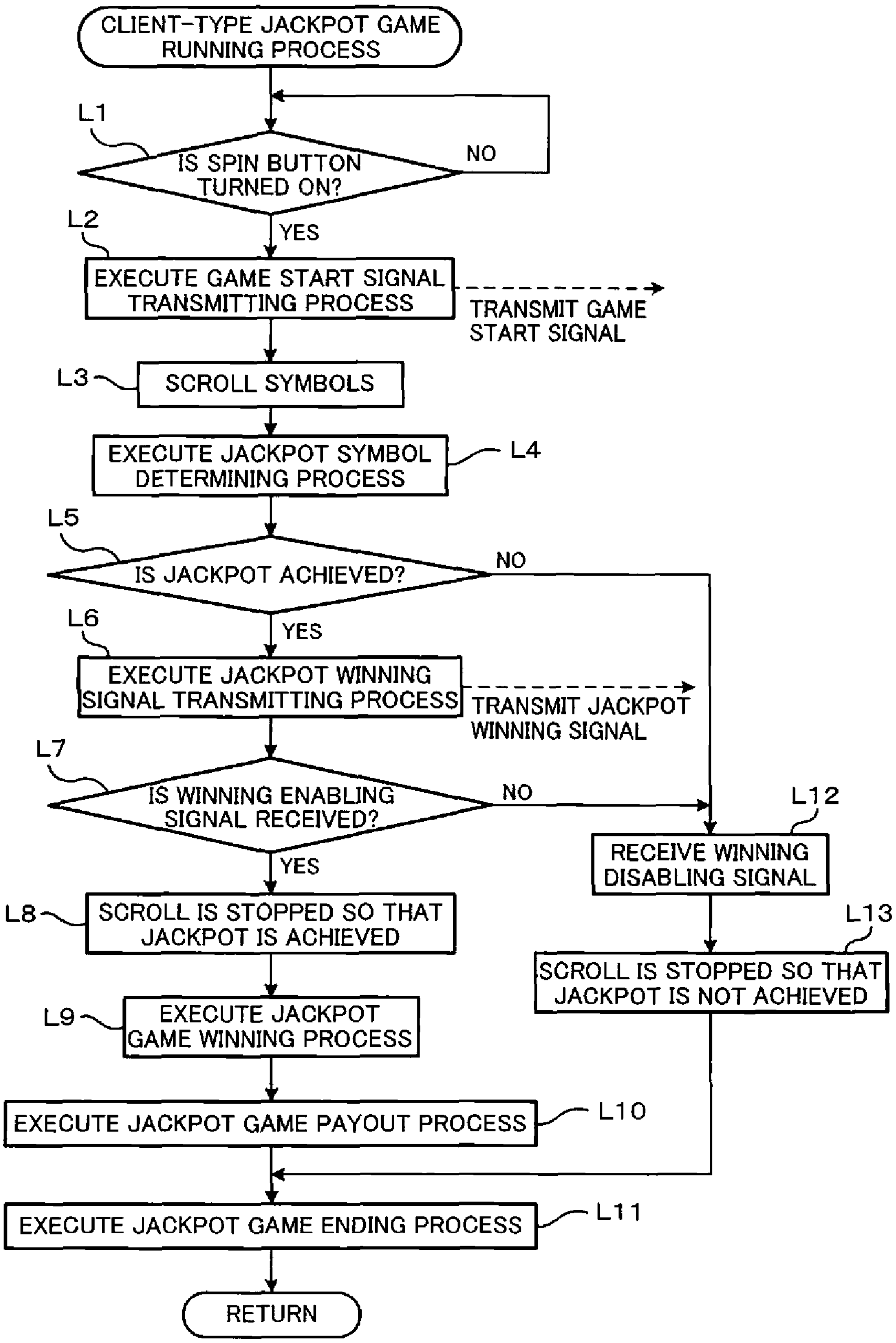
FIG. 76 is a flowchart of a client-type jackpot game running process executed in the slot machine of the Embodiment 4.

When the client-type jackpot game running process is executed in the step K11 of FIG. 75, the main CPU 41 of the slot machine (3A to 3J) executes the client-type jackpot game running process shown in FIG. 76. A client-type jackpot game running processing program is stored in the RAM 43.

When the client-type jackpot game running process is executed, first, whether the spin button 23 is turned on or not is determined (L1). When it is determined that the spin button 23 is not turned on (L1: NO), the process returns to L1.

On the other hand, when it is determined that the spin button 23 is turned on (L1: YES), the game start signal transmitting process is executed (L2). In other words, the main CPU 41 transmits a game start signal to each of the slot machines 3A to 3J so as to notify each slot machine of information indicating in which slot machine a jackpot game has started. Then the symbols 180 are scrolled in the display windows 151 to 155 (L3).

After this, a jackpot symbol determining process is executed (L4). In other words, a stop symbol determining program is executed based on the jackpot game lottery table 132 stored in the RAM 43, to determine fifteen symbols 180 to be stopped in the display windows 151 to 155.

Then it is determined whether a jackpot is achieved as a result of the jackpot symbol determining process of L4 (L5). Specifically, it is determined how many jackpot symbols of "SUN" 181 are included in the symbols 180 determined in the jackpot symbol determining process of L4. It is determined that a jackpot is achieved if there are five jackpot symbols of "SUN" 181. When no jackpot is achieved (L5: NO), the process proceeds to L12.

On the other hand, when a jackpot is achieved (L5: YES), a jackpot winning signal transmitting process is executed (L6). This is a process to transmit to each slot machine (3A to 3J) information indicating that a jackpot is achieved and identification information of a slot machine (3A to 3J) which has achieved the jackpot.

It is then determined whether a winning enabling signal is received from a slot machine which functions as a later-detailed master machine (L7). If no winning enabling signal is received (L7: NO), a winning disabling signal is waited for. If a winning disabling signal is received (L12), the scroll is stopped in such a way that a jackpot is not achieved (L13). That is to say, the symbols 180 are stopped (arranged) in the display windows 151 to 155 in such a way that five jackpot symbols of "SUN" 181 are not stopped (arranged) in the display windows 151 to 155. The process then proceeds to L11.

In the meanwhile, if a winning enabling signal is received in L7 (L7: YES), the scroll is stopped so that a jackpot is achieved (L8). That is to say, the symbols 180 are stopped (arranged) in the display windows 151 to 155 in such a way that five jackpot symbols of "SUN" 181 are stopped (arranged) in the display windows 151 to 155. Thereafter a jackpot game winning process is executed (L9). This is a process to notify a player of the winning of a jackpot. In this process, various types of effect processes such as image effects on the upper image display panel 33 and the lower image display panels 16A to 16J and sound effects by a speaker 29.

Then a jackpot game payout process is executed based on the jackpot game payout table 133 of FIG. 54 (L10). This is a process to payout coins equivalent to an accumulated value accumulatively stored in M4 as jackpot credit information in the RAM 43 of the slot machine which is the master machine. For example, when the RAM 43 of the slot machine which is the master machine stores jackpot credit information indicating an accumulated value of $12.34, coins equivalent to the accumulated value of $12.34 are paid out. When coins to be paid out are reserved, a credit value equivalent to the accumulated value is added to the credit value stored in the RAM 43. When the coins are paid out, a control signal is transmitted to the hopper 66 so that coins equivalent to the accumulated value are paid out to the coin tray 18.

Then a jackpot game ending process is executed (L11) and the entire process once ends.

(Operation of Slot Machine: Adjustment Process)

Figure 77:
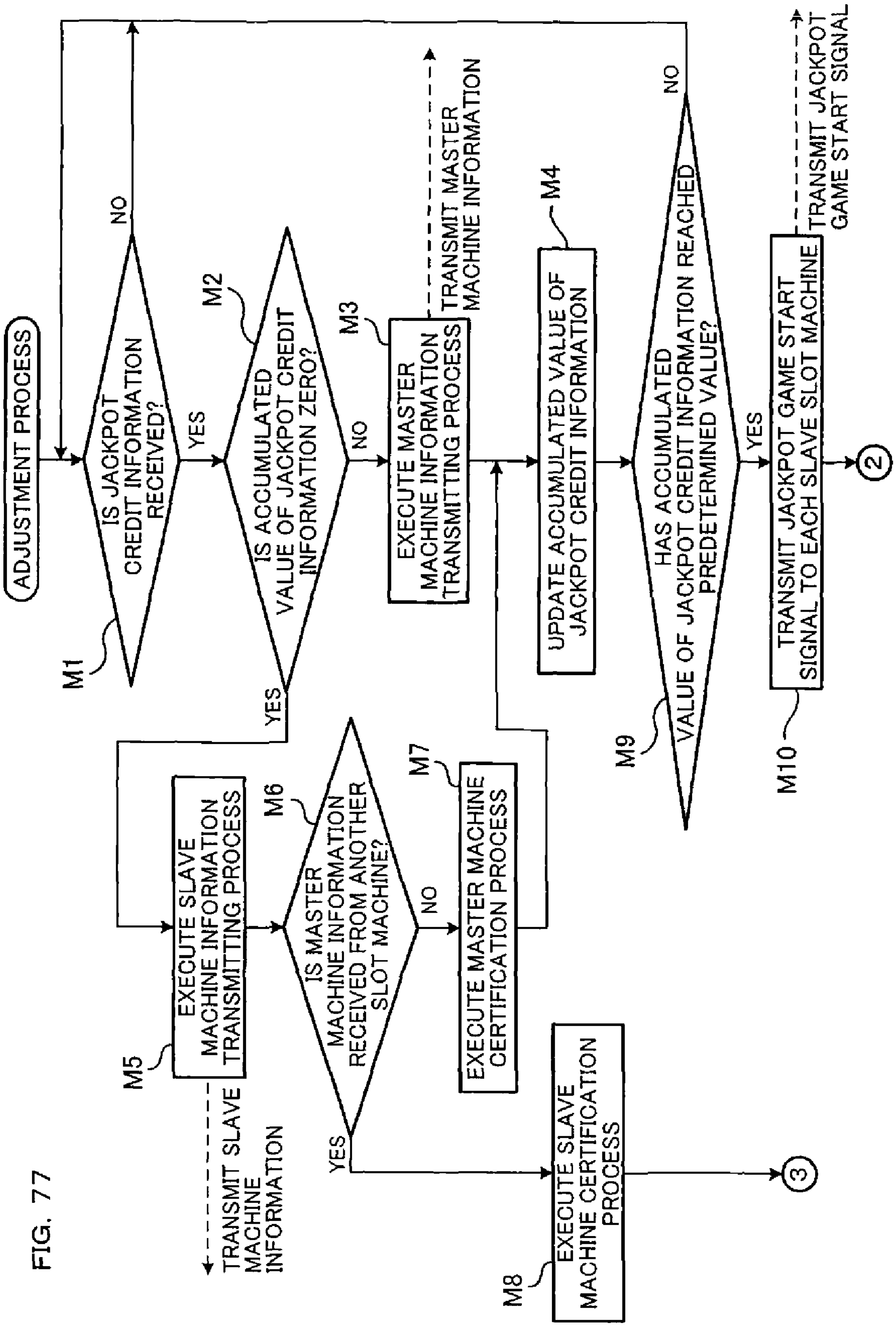
FIG. 77 is a flowchart of an adjustment process executed in the slot machine of the Embodiment 4.
Figure 78:
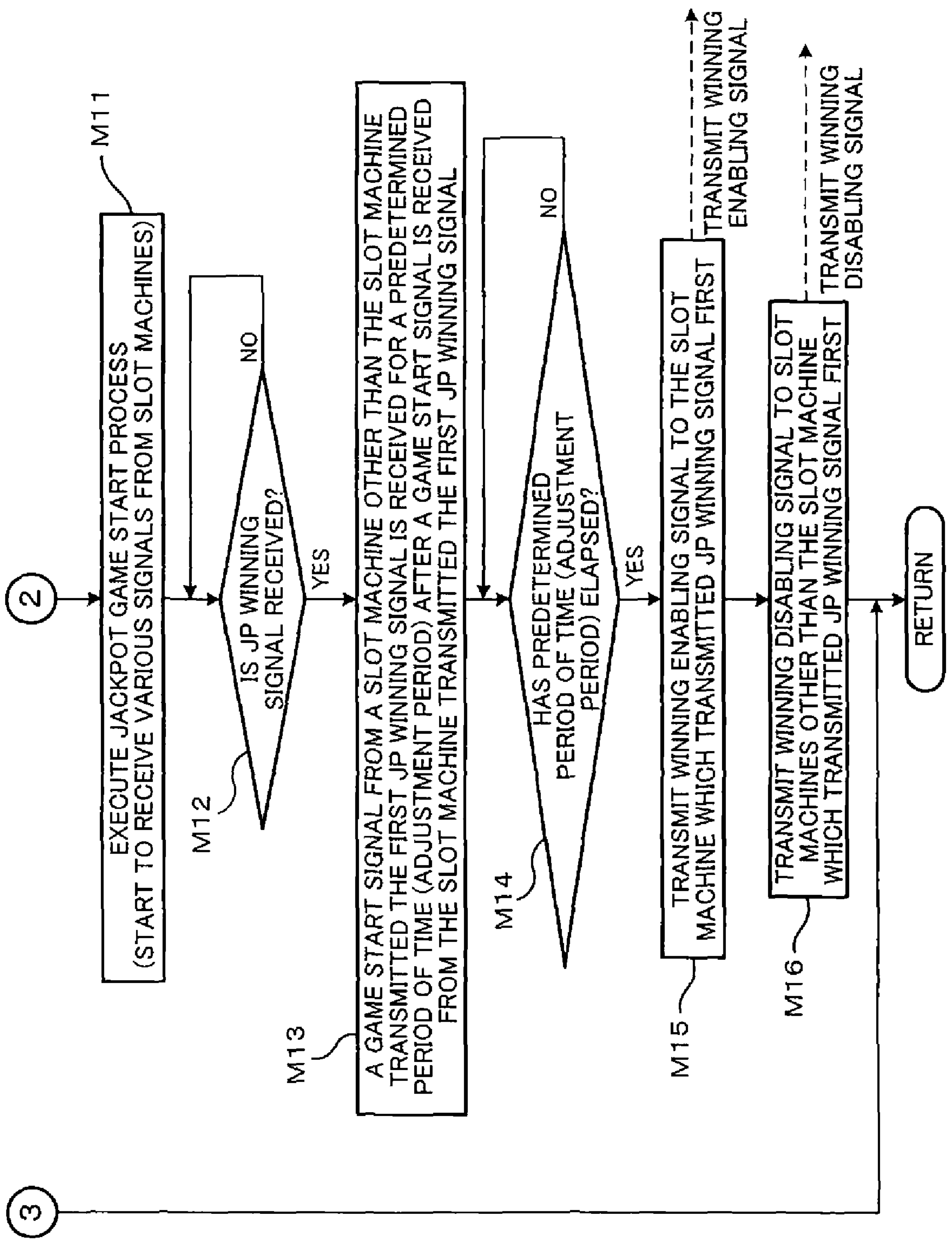
FIG. 78 is a flowchart of an adjustment process executed in the slot machine of the Embodiment 4.

The main CPU 41 of each of the slot machines 3A to 3J executes an adjustment process shown in FIGS. 77 and 78 by sequentially reading and executing a game program and a game system program. An adjustment processing program is stored in the RAM 43.

When the adjustment process is executed, first, the CPU 41 determines whether the jackpot credit information transmitted in the before-mentioned client-type game running process is received or not (M1). When the jackpot credit information is not received (M1: NO), the step M1 is repeated.

On the other hand, if the jackpot credit information is received (M1: YES), there is determined whether an accumulated value of the jackpot credit information stored in the RAM 43 is zero (M2). If the accumulated value of the jackpot credit information is not zero (M2: NO), a master machine information transmitting process is executed (M3). This is a process to notify slot machines other than the slot machine having executed the master machine information transmitting process that the slot machine having executed the master machine information transmitting process is the master machine. The process then proceeds to M4.

In the meanwhile, if it is determined in M2 that the accumulated value of the jackpot credit information is zero (M2: YES), a slave machine information transmitting process is executed (M5). This is a process to notify slot machines other than the slot machine executed the slave machine information transmitting process that the slot machine executed the slave machine information transmitting process is a slave machine.

The main CPU 41 then determines whether master machine information is received from another slot machine (M6). If the master machine information is received (M6: YES), a slave machine certification process is executed (M8). This is a process to certify that the slot machine executed the slave machine certification process functions as a slave machine. The adjustment process ends after M8.

In the meanwhile, if the master machine information is not received (M6: NO), a master machine certification process is executed (M7). This is a process to certify that the slot machine executed the master machine certification process functions as a master machine.

After M7, the accumulated value of the jackpot credit information is updated (M4). In other words, based on the jackpot credit information transmitted from each of the slot machines 3A to 3J, the main CPU 41 adds a percentage (5% in this embodiment) of coins bet at each of the slot machines 3A to 3J to the accumulated value of jackpot credit information stored in the RAM 43, and stores the thus obtained value.

Next, the main CPU 41 determines whether the accumulated value of jackpot credit information stored in the RAM 43 reaches a predetermined value ("$12.34" in this embodiment) (M9). When the accumulated value does not reach the predetermined value (M9: NO), the process returns to the step M1. On the other hand, when the accumulated value reaches the predetermined value (M9: YES), a jackpot game start signal which triggers a jackpot game is transmitted to each of the slave slot machines (M10).

In this embodiment, a jackpot game is started when the accumulated value of jackpot credit information exceeds a predetermined value (e.g., a fixed value of "$12.34"), however, this embodiment is not limited thereto. For example, it is possible to configure the gaming system such that a threshold value, for triggering a jackpot game, of the accumulated value of jackpot credit information is randomly varied in each jackpot game within a predetermined range (e.g., $200 to $300).

After M10, a jackpot game start process is executed (M11). As a result various signals regarding the jackpot game are supplied from the slot machines 3A to 3J. Specifically, received signals are a game start signal transmitted from the slot machines 3A to 3J in L2 and a jackpot winning signal transmitted from the slot machines 3A to 3J in L6.

Then whether a jackpot winning signal (JP winning signal) is received is determined (M12). If no JP winning signal is received (M12: NO), a JP winning signal is waited for.

On the other hand, when a JP winning signal is received (M12: YES), if the main CPU 41 determines that this JP winning signal is the first JP winning signal received since the start of the jackpot game, a game start signal from a slot machine other than the slot machine transmitted the aforesaid first JP winning signal is received for a predetermined period of time (adjustment period) after a game start signal is received from the slot machine transmitted the aforesaid first JP winning signal (M13).

Then whether the predetermined period of time (adjustment period) has elapsed or not is determined (M14). If the predetermined period of time (adjustment period) has not elapsed (M14: NO), elapse of the predetermined period of time is waited for.

On the other hand, if the predetermined period of time (adjustment period) has elapsed (M14: YES), a winning enabling signal is transmitted to the slot machine that transmitted the JP winning signal first (M15). To the slot machines other than the slot machine that transmitted the JP winning signal first, a winning disabling signal is transmitted (M16). Then, this process once ends.

(Timing Chart for Gaming System 500)

Figure 72:
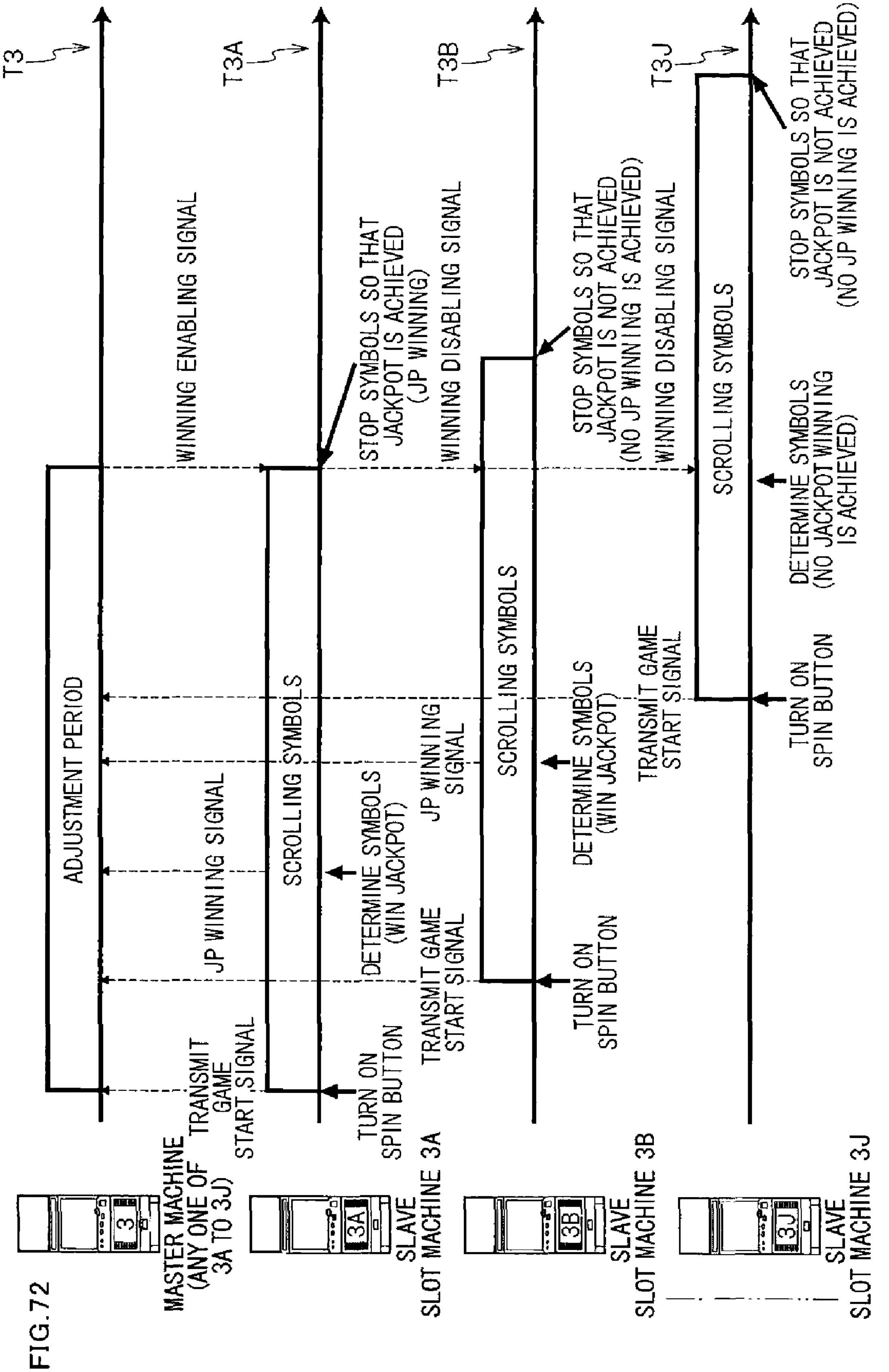
FIG. 72 is an explanatory diagram of a timing chart showing the outline of the operation of a gaming system of an Embodiment 4.

Now, the following describes a timing chart in which processes executed by the slot machines 3A to 3J constituting the gaming system 500 are illustrated in time series, with reference to the aforesaid operation of the gaming system 500 and FIG. 72. As shown in FIG. 72, a time line T3 and time lines T3A to T3J indicate the process stages of a master slot machine and slave slot machines on the time frame. The dotted arrows extending from the time line T3 and the time lines T3A to T3J indicate signals transmitted from the slot machines 3A to 3J.

First, when the spin button 23 is turned on in a slave slot machine 3A, the main CPU 41 of the slave slot machine 3A transmits a game start signal to a master slot machine so as to notify the master slot machine of information indicating in which slot machine a jackpot game is started (see L2). Then the symbols 180 are scrolled in the display windows 151 to 155 (see L3). A similar process is executed also in the slave slot machines 3B to 3J.

Thereafter, if a jackpot is achieved in the slave slot machine 3A as a result of the jackpot symbol determining process in L4, a jackpot winning signal (JP winning signal) is transmitted to the master slot machine (see L6). This is a process to transmit, to the master slot machine, information indicating that a jackpot is achieved and identification information of a slot machine (3A to 3J) which has achieved the jackpot. A similar process is executed also in the slave slot machines 3B to 3J.

If the master slot machine receives a JP winning signal from the slave slot machine 3A and determines that this JP winning signal is the first JP winning signal received since the start of the jackpot game, a game start signal is received from the slot machines 3B to 3J for a predetermined period of time (adjustment period) after a game start signal is received from the slave slot machine 3A (see M13).

After the predetermined period of time (adjustment period) elapses, the master slot machine transmits a winning enabling signal to the slave slot machine 3A which transmits the JP winning signal first (see M15). This causes the slot machine 3A to stop the scrolling symbols 180 in such a way that a jackpot is achieved (see L8). In other words, the slot machine 3A is arranged so that five jackpot symbols of "SUN" 181 are stopped (arranged) in the display windows 151 to 155.

On the other hand, to the slot machines 3B to 3J other than the slave slot machine 3A that transmitted the JP winning signal first, the master slot machine transmits a winning disabling signal (see M16). This causes the slot machines 3B to 3J to stop the scrolling symbols 180 in such a way that a jackpot is not achieved (see L13). In other words, the slot machines 3B to 3J are arranged so that five jackpot symbols of "SUN" 181 are not stopped (arranged) in the display windows 151 to 155.

According to the aforesaid structure, in a jackpot game independently run in each of the slot machines 3A to 3J, the master slot machine allows the slot machine which achieves a jackpot first to receive coins equivalent to the accumulated value stored in the RAM 43, and adjusts the slot machines which are not the slot machine which achieves a jackpot first not to achieve a jackpot. This prevents two or more of the slot machines 3A to 3J from simultaneously achieving a jackpot in a jackpot game, and coins equivalent to the accumulated value stored in the RAM 43 is awarded only to a player who achieves a jackpot first.

In the same manner as the Embodiment 3-1, the Embodiment 4 may be arranged so that, in a jackpot game independently run in each slot machine, a master slot machine awards a share of the game value equivalent to the accumulated value to each of a predetermined number of slot machines among those having achieved a jackpot, and the slot machines which have achieved the jackpot but are not included in said predetermined number of slot machines are adjusted by the master slot machine so as not to achieve the jackpot.

Also, in the same manner as the Embodiment 3-2, the Embodiment 4 may be arranged so that, in a jackpot game independently run in each of the slot machines, when the total number of unit games stored in the RAM 43 reaches a predetermined value, a master slot machine awards an accumulated game value to a slot machine which has achieved a jackpot first, and adjusts slot machines other than the slot machine which has achieved a jackpot first so that no jackpot is achieved in these other slot machines.

Also, in the same manner as the Embodiment 3-3, the Embodiment 4 may be arranged so that, when a jackpot is achieved as a result of a base game run independently by each slot machine, a master slot machine awards an accumulated game value to a slot machine which has achieved a jackpot first, and adjusts slot machines other than the slot machine which has achieved a jackpot first so that no jackpot is achieved in these other slot machines.

Embodiment 5

The following will describe a gaming system and a playing method thereof according to an Embodiment 5 of the present invention. Note that reference numbers and symbols given to members and steps of flowcharts are only applicable to those described within the present embodiment, and do not represent the members or the steps of the other embodiments.

Figure 79:
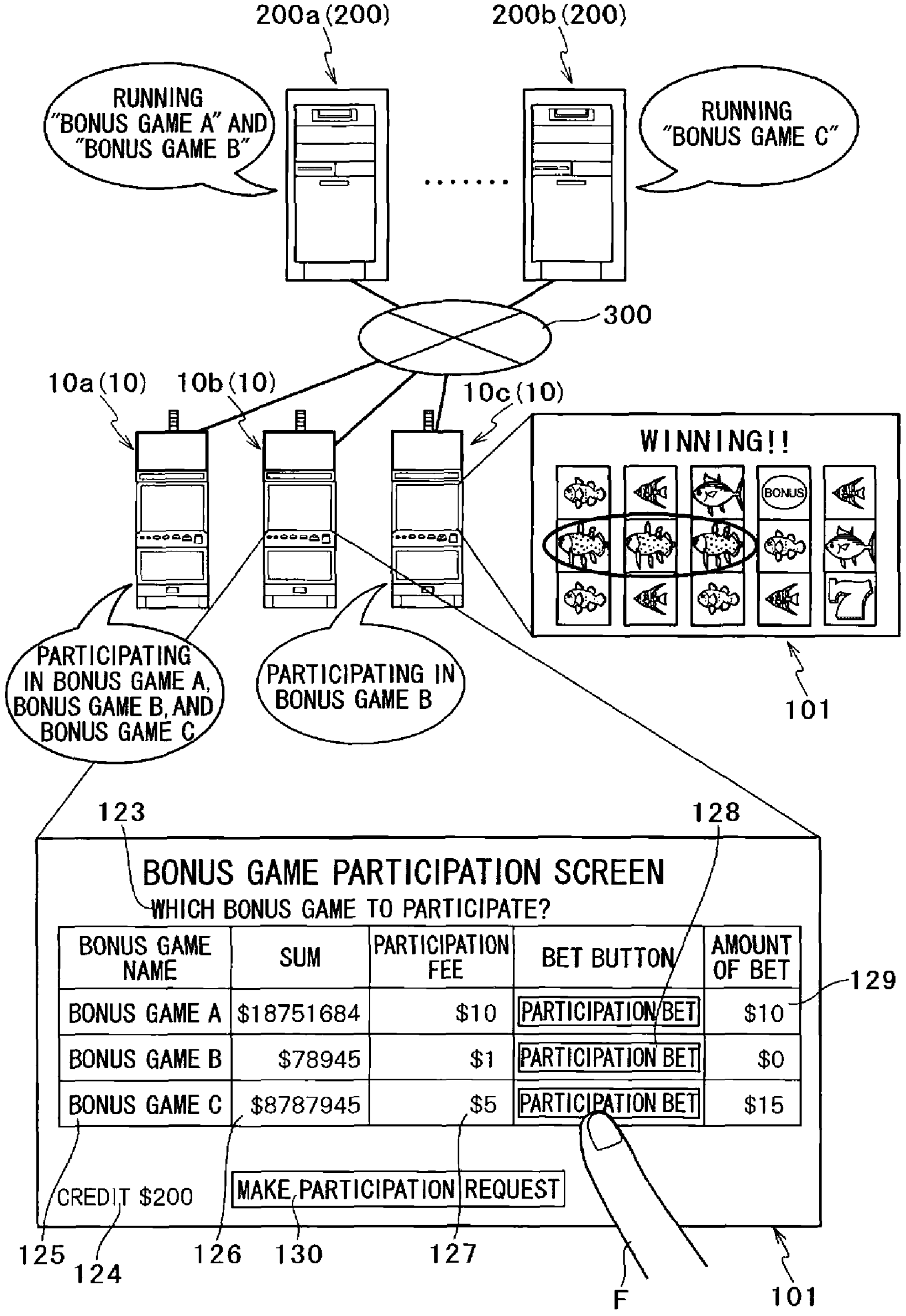
FIG. 79 is a schematic diagram illustrating a gaming system and a playing method thereof, according to an Embodiment 5 of the present invention.
Figure 80:
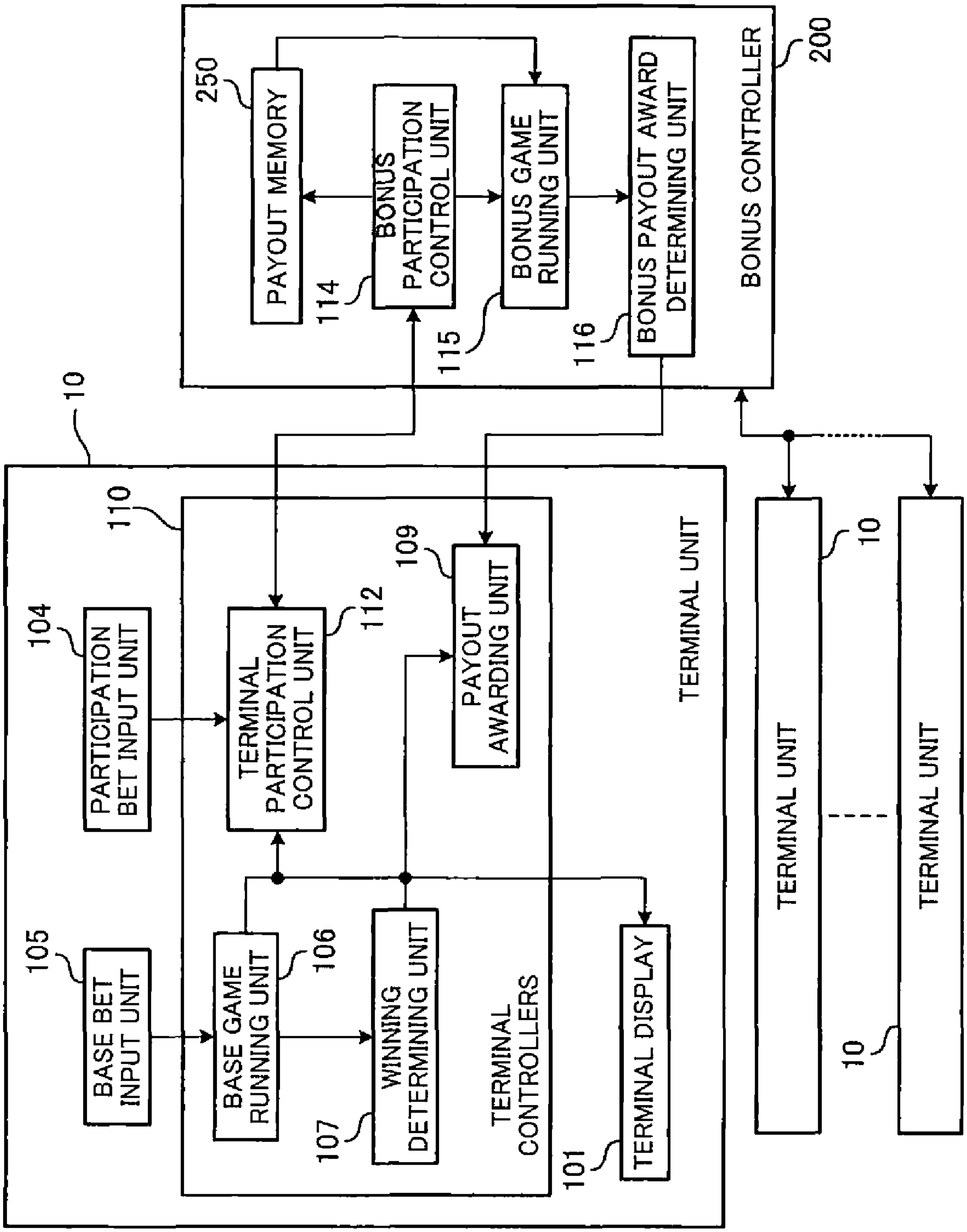
FIG. 80 is a block diagram of the gaming system.

As shown in FIG. 79 and FIG. 80, the gaming system includes terminals 10, bonus controllers 200, and a network 300 connecting the terminals 10 and the bonus controllers 200 with each other to enable communications therebetween.

the terminals 10 each include a terminal controller 110 for running a base game, a base bet input unit 105 for receiving a base bet, a participation bet input unit 104 for receiving a participation bet made to participate in a multiplayer bonus game (described later), and a terminal display 101.

Figure 81:
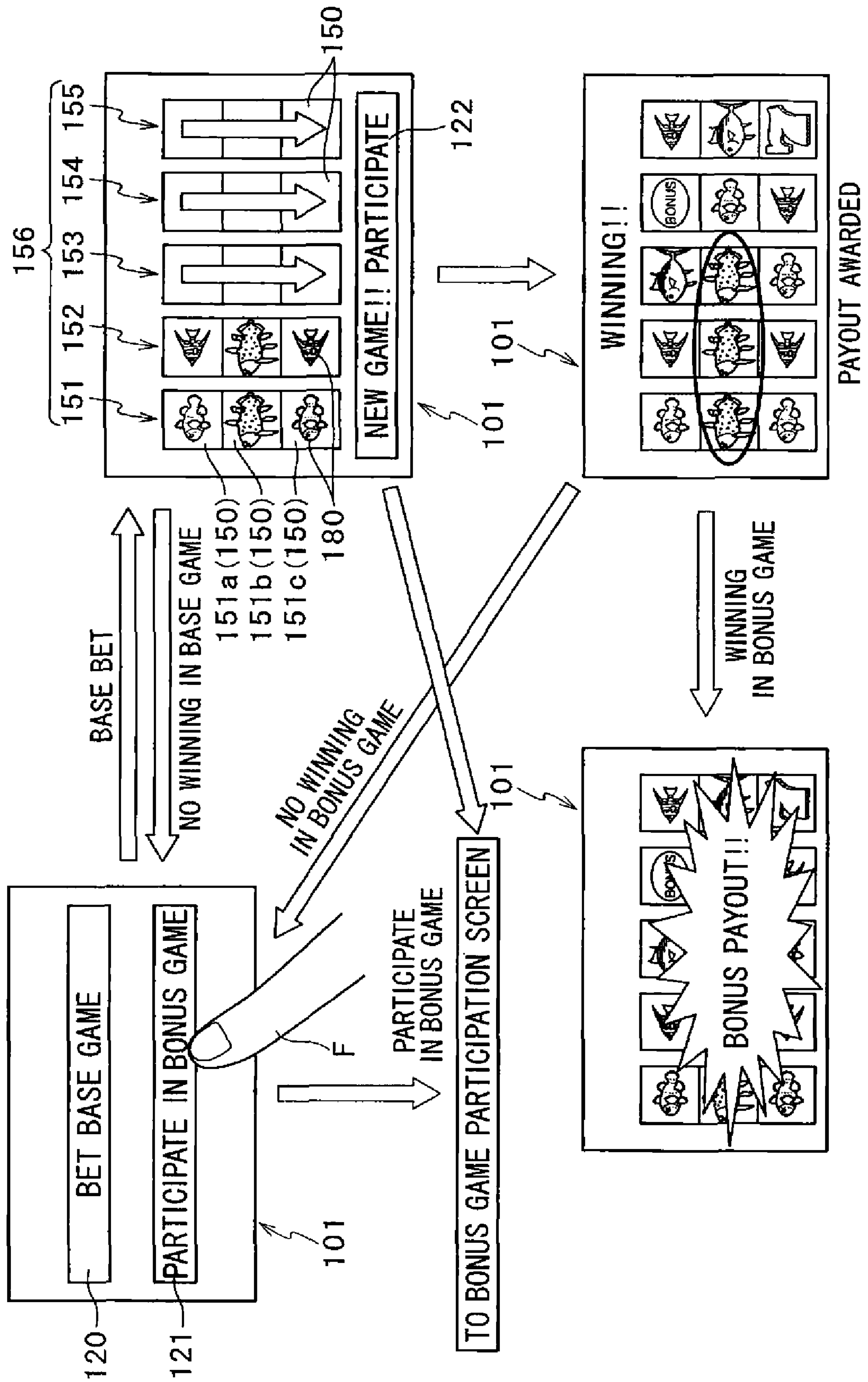
FIG. 81 is an explanatory diagram illustrating a flow of the entire operation of the gaming system.

As illustrated in FIG. 81, the terminal display 101 has the arrangement areas 150, and symbols 180 are arranged in the arrangement areas 150.

The "arranging" in this specification means a state where the symbols 180 can be visually observed by a player. That is, the wording means a state where the symbols 180 are displayed in the arrangement areas 150, in FIG. 81. Arranging the symbols 180 again after dismissing the symbols 180 is referred to as "rearranging".

The terminal display 101 may have a mechanical structure adopting a reel device which rotates a reel to arrange the symbols 180. Alternatively, the terminal display 101 may have an electrical structure in which a video reel is displayed as an image and symbols 180 on a video reel are arranged in the form of an image. Further, the terminal display 101 may adopt a combination of the mechanical structure (reel) and the electrical structure (video reel). Examples of the electrical structure include a liquid crystal display device, a CRT (cathode-ray tube), a plasma display device, or the like. Further, the number of arrangement areas 150 is not limited. A specific structure of the terminal display 101 will be detailed later.

As shown in FIG. 81, the terminal display 101 also displays information concerning availability of a participable bonus game, by displaying an availability information image 122 reading "New Game!!".

(Terminal Controller 110)

The terminal controller 110 each include: a base game running unit 106, connected to the base bet input unit 105, for running a base game that awards a payout according to a predetermined winning; a terminal participation control unit 112, connected to the participation bet input unit 104 and the base game running unit 106, for controlling participation to a bonus game; a winning determining unit 107 for determining whether a base game has been won, based on the result of running a base game; and a payout awarding unit 109 for awarding a payout, based on the determination by the winning determining unit 107.

The terminal controller 110 is connected to the bonus controller 200 (described later) and is in communication with the bonus controller 200.

The base bet input unit 105 has a function of outputting a game start signal, in response to an operation by the player. The game start signal output is then input to the later-described base game running unit 106.

The base game running unit 106 runs a base game, triggered by a game start signal from the base bet input unit 105. In the base game, symbols 180 are rearranged in the arrangement areas 150 of the terminal display 101.

The winning determining unit 107 determines whether to award a payout, based on a relation among the symbols 180 rearranged in the arrangement areas 150 of the terminal display 101. That is, the winning determining unit 107 determines whether a predetermined winning has been met. In other words, the winning determining unit 107 determines whether a base game has been won.

The payout awarding unit 109 awards a payout based on the determination by the winning determining unit 107. The payout awarding unit 109 also awards a bonus payout based on an instruction from the bonus controller 200.

The terminal participation control unit 112 makes an inquiry to each bonus controller 200 to check for availability of a participable bonus game, and detects a participable bonus game in a reply from the bonus controller 200. Further, the terminal participation control unit 112 causes the participation bet input unit 104 to receive a participation bet for a participable bonus game, and, when received a signal indicative of a participation bet having been received by the participation bet input unit 104, sends a participation request to the bonus controller 200 running the bonus game. The terminal participation control unit 112 also performs processes concerning participation to a bonus game. Specifically, the terminal participation control unit 112 sends a participation request and a participation cancellation request to the bonus controllers 200, gives notice concerning a participation bet, and, when received a notification concerning availability of a participable bonus game from the bonus controllers 200 (bonus game notification signal), causes the terminal display 101 to perform display to inform the reception of the notification, and causes the participation bet input unit 104 to receive a participation bet.

Meanwhile, each block of the terminal controller 110 may be realized with hardware, or with software as needed.

(Operation of Terminal Controller 110)

The following describes an operation of the terminal controller 110 in the above structure. First, the base bet input unit 105 receives a base bet made by a player, and outputs a game start signal to the base game running unit 106, which then starts a base game. When the base game is started, the base game running unit 106 determines symbols 180 to be rearranged in the arrangement areas 150. The symbols 180 to be rearranged are determined at every base game. The symbols 180 determined by the base game running unit 106 are used in an imaging process, and displayed on the terminal display 101 by being rearranged in the arrangement areas 150 according to the arrangement determined by the base game running unit 106.

The winning determining unit 107 determines whether a predetermined winning has been met, based on the relation between the symbols 180 rearranged in the arrangement areas 150. If it is determined that a predetermined winning has been met (base game has been won), the payout awarding unit 109 awards a payout. In this manner, the terminal controller 110 runs a base game when a base bet is received by the base bet input unit 105, and performs a first process that awards a payout when a base game is won.

The terminal participation control unit 112 makes an inquiry to each bonus controller 200 to check for availability of a participable bonus game, and detects a participable bonus game in a reply from the bonus controller 200. That is, the terminal controller 110 performs a second process that detects a participable bonus game.

The terminal participation control unit 112 causes the participation bet input unit 104 to receive a participation bet for the participable bonus game detected by running the second process. In this manner, the terminal controller 110 performs a third process that causes the participation bet input unit 104 to receive a participation bet for the detected bonus game.

Upon receipt of a participation bet made by a player, the participation bet input unit 104 sends a signal, indicative of the participation bet being received, to the terminal participation control unit 112. In response, the terminal participation control unit 112 sends a participation request signal to the bonus controller 200 running the bonus game bet by the participation bet. The participation request signal contains information indicative of the amount of the participation bet received. In this manner, the terminal controller 110, when a participation bet is received by the participation bet input unit 104, performs a fourth process in which a participation request is sent to the bonus controller 200 running the bonus game of interest, and in which the amount of participation bet received is notified to the bonus controller 200.

The terminal participation control unit 112 receives a notification of acceptance of the request from the bonus controller 200 of interest. The terminal participation control unit 112, when received a notification of acceptance of the request from all of the bonus controllers 200 to which the request was sent, finalizes the entry of the participation bet. As used herein, "finalizing the entry of the participation bet" means finalization of the deduction process in which the entered participation bet is deducted from the credit. On the other hand, when a notification of acceptance of the request was not received from all of the bonus controllers 200 to which the request was sent, the terminal participation control unit 112 cancels the entry of the participation bet, and sends a participation cancellation notification to all the bonus controllers 200 to which the request was sent. As used herein, the "cancellation of the entry of the participation bet" means that the entry of the participation bet is not finalized. When the participation bet received has been deducted from the credit, it means resetting the deduction. In this manner, the terminal controller 110 performs a fifth process in which the entry of the participation bet is finalized when a notification of acceptance of the request is received from all of the bonus controllers 200 to which the request was sent, and in which the entry of the participation bet is cancelled and sends a participation cancellation notification to the bonus controllers 200 to which the request was sent, when a notification of acceptance of the request is not received from all of the bonus controllers 200 to which the request was sent.

The payout awarding unit 109 awards a bonus payout when instructed by the bonus controller 200 to award a bonus payout. In this manner, the terminal controller 110 executes a sixth process, in which a bonus payout is awarded based on an instruction from the bonus controller 200.

(Bonus Controller 200)

As illustrated in FIG. 80, the bonus controller 200 is connected to the terminal controller 110 and is in communication with the terminal controller 110.

The bonus controller 200 includes: a bonus participation control unit 114 for controlling participation to a bonus game; a payout memory 250 for storing a bonus payout corresponding to the sum of participation bets; a bonus game running unit 115 for running simultaneously occurring multiplayer bonus games, independently from a base game; and a bonus payout award determining unit 116 for determining whether to award a bonus payout to the terminal participating in a bonus game.

The bonus participation control unit 114, when received a request to participate in a bonus game from the terminal controller 110, stores the request and sends a notification of acceptance of the request to the terminal controller 110 sending the request. Further, the bonus participation control unit 114, when received a notification concerning the amount of participation bet from the terminal controller 110 in addition to a participation request, accumulatively stores a bonus payout, equivalent of the amount of participation bet, in the payout memory 250. Further, the bonus participation control unit 114, when received an inquiry for availability of a participable bonus game from the terminal controller 110, sends back information concerning a participable bonus game. The bonus participation control unit 114, when the requesting terminal is ready to participate in a bonus game, notifies the corresponding terminal controller 110 as such.

The payout memory 250 accumulatively stores a game value (bonus payout) corresponding to the amount of participation bet sent from the terminal controller 110.

The bonus game running unit 115 runs a bonus game based on predetermined conditions, i.e., when the bonus payout stored in the payout memory 250 reaches a predetermined amount.

The bonus payout award determining unit 116 determines whether to award a bonus payout, with respect to each terminal participating in the bonus game run by the bonus game running unit 115. When it is determined that a bonus payout is to be paid, the bonus payout award determining unit 116 sends an instruction to award a bonus payout to the terminal controller 110 of the terminal 10 so qualified to receive a bonus payout.

Meanwhile, each block of the bonus controller 200 may be realized with hardware, or with software as needed.

(Operation of Bonus Controller 200)

The following describes an operation of the bonus controller 200 in the above structure. The bonus participation control unit 114, when received a request to participate in a bonus game from the terminal controller 110, stores the request and sends a notification of acceptance of the request to the terminal controller 110 sending the request. Further, the bonus participation control unit 114, when received a notification concerning the amount of participation bet from the terminal controller 110 in addition to a participation request, accumulatively stores a bonus payout, equivalent of the amount of participation bet, in the payout memory 250. In this manner, the bonus controller 200, when received a participation request and a notification concerning the amount of participation bet from the terminal controller 110, performs a seventh process in which a bonus payout corresponding to the sum of participation bets is stored in the payout memory 250, and in which a notification of acceptance of the request is sent to the terminal controller 110 sending the request.

The bonus game running unit 115 runs a bonus game when the bonus payout stored in the payout memory 250 reaches a predetermined amount. In this manner, based on a predetermined condition, the bonus controller 200 executes an eighth process that runs a bonus game.

With the bonus game run by the bonus game running unit 115 the bonus payout award determining unit 116 determines whether to award a bonus payout, with respect to each terminal participating in the bonus game run by the bonus game running unit 115. In this manner, the bonus controller 200 executes a ninth process in which whether to award a bonus payout is determined for each terminal 10 participating in the bonus game being run.

When it is determined that a bonus payout is to be paid, the bonus payout award determining unit 116 sends an instruction to award a bonus payout to the terminal controller 110 of the terminal 10 so qualified to receive a bonus payout. In this manner, the bonus controller 200, when it decides to award a bonus payout to a terminal 10, executes a tenth process in which an instruction to award a bonus payout is sent to the terminal controller 110 of the terminal 10 so qualified to receive a bonus payout.

As is clear from the description of the foregoing operations, the gaming system realizes a playing method of a gaming system including terminals 10 that run a base game, and a bonus controller 200 that runs a multiplayer bonus game, the method including the steps of: detecting a participable bonus game; receiving a participation bet for the bonus game detected; making a request to participate in a bonus game upon receipt of the participation bet; and finalizing the entry of participation bet upon acceptance of the participation request for the bonus game With this playing method, the entry of participation bet is finalized upon receipt of a notification of acceptance of the request from all of the bonus controllers 200 to which the request was made. In this way, there will be no trouble, such as not being able to participate in a bonus game despite spending the participation bet, which may occur when there is a network error or other failures in bonus games simultaneously participated by one terminal.

(Overall Flow of Gaming System Operation)

The following specifically describes an overall flow of the gaming system operation. First, the terminal display 101 displays a base bet button 120 reading "Bet Base Game", and a participation screen button 121 reading "Participate in Bonus Game". In the following, this screen will be referred to as an initial screen. The base bet button 120 is used to make a base bet for a base game, and it corresponds to the base bet input unit 105 for receiving a base bet. The participation screen button 121 is used to display a screen through which a participation bet is made to participate in a bonus game.

A touch panel 138 is provided in front of the terminal display 101. The buttons displayed on the terminal display 101 can be pressed down by touching the touch panel 138 in front of these buttons.

Pressing the participation screen button 121 displays a bonus game participation screen, through which a participation bet is made to participate in a bonus game. The bonus game participation screen corresponds to the participation bet input unit 104, as will be described later. Pressing the base bet button 120 places a base bet on a base game, and a base game is started.

As illustrated in FIG. 81, a matrix 156 is in the center of the terminal display 101. The matrix 156 includes symbols 180, which are scroll displayed. The display windows 151 to 155 are respectively divided into upper stages 151*a* to 155*a*, central stages 151*b* to 155*b*, and lower stages 151*c* to 155*c*. The symbols 180 are stopped (arranged) in the stages 151*a* to 155*a*, 151*b* to 155*b*, and 151*c* to 155*c*, respectively. The matrix 156 is a symbol matrix including five columns/three rows. The matrix 156 however is not limited to the one with the five-columns/three-rows.

As illustrated in FIG. 81, the terminal display 101 variably displays symbols 180 when a base game is started in the terminal 10. When this variable-displaying of symbols 180 stops, symbols 180 are rearranged in the arrangement areas 150. Then, when a winning is met according to a relation among the rearranged symbols 180, a payout according to this winning is awarded.

In a bonus game participated by making a participation bet, a bonus payout is awarded following the indication on the terminal display 101 that a bonus payout will be made, when it is determined that a bonus payout is to be awarded, i.e., when there is a winning is the bonus game being participated. On the other hand, the initial screen is displayed when it is determined that a bonus payout will not be awarded in the bonus game being participated, i.e., when there is no winning is the bonus game.

When a notification concerning availability of a participable bonus game is received from the bonus controller 200 during the variable-display of the symbols 180 in a base game, the terminal display 101 shows the availability information image 122, indicating availability of a participable bonus game. The availability information image 122 serves as a button, which is pressed down to display a bonus game participation screen through which a participation bet is made to participate in a bonus game.

Figure 82:
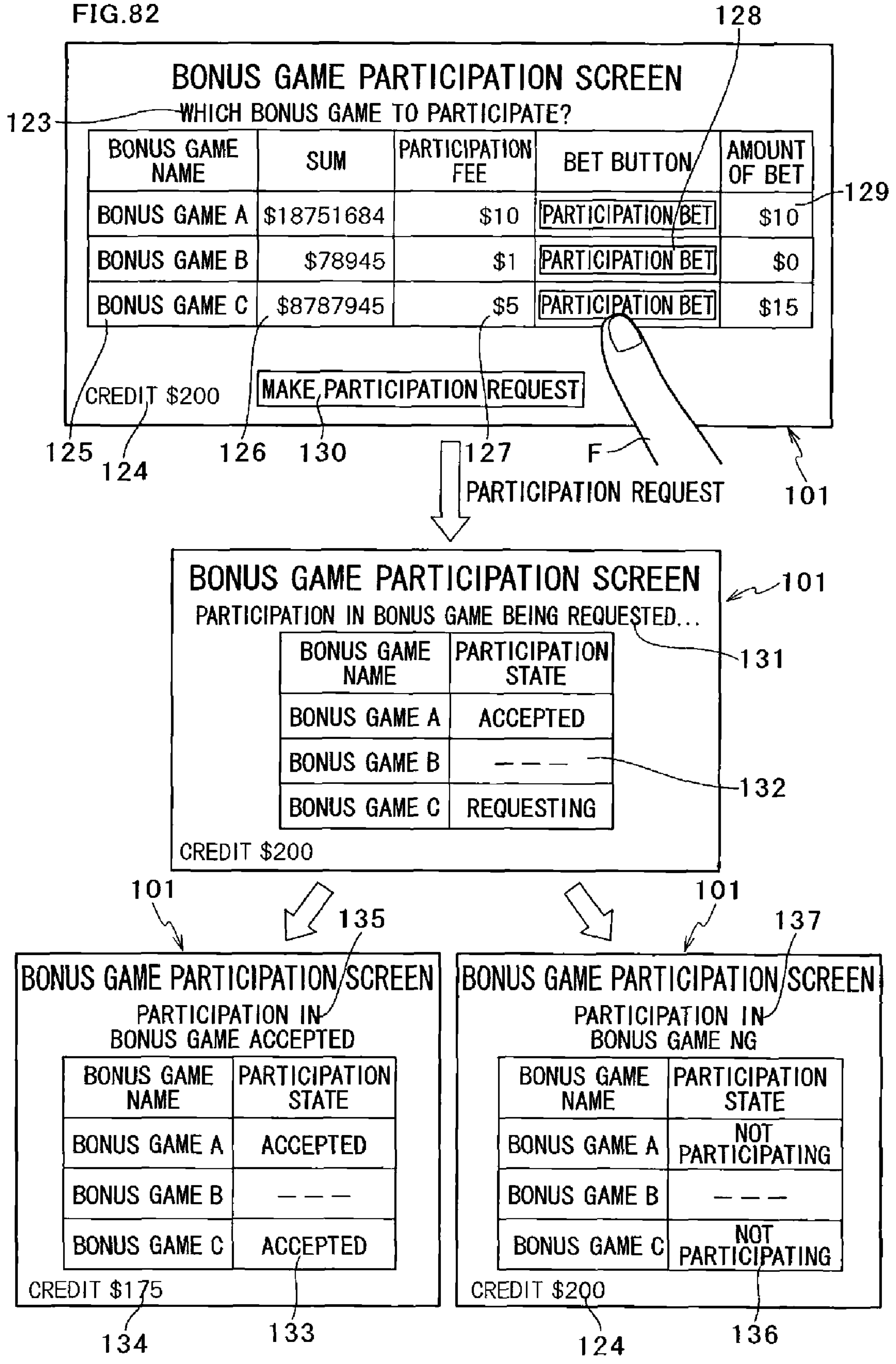
FIG. 82 is an explanatory diagram illustrating a flow of participation in the bonus game.

The following describes the bonus game participation screen, with reference to FIG. 82. The bonus screen includes a message image 123, a list of information concerning participable bonus games, a credit image 124 indicating the credit available to a player to made a participation bet, a participation bet button 128 used to specify the bonus game to be bet by a participation bet, and a participation request button 130 used to make a request to participate in the bonus game specified by a participation bet.

The message image 123 is a character image reading "Which Bonus Game to Participate?". The list of information concerning participable bonus games includes: a bonus game name column 125 indicating the names of bonus games; a sum column 126 indicating the amount of bonus payout of each bonus game; a participation fee column 127 indicating the amount of participation bet needed to participate in each bonus game; a participation bet button 128, provided for each bonus game, used to place a participation bet on the bonus game; and a bet amount column 129 displaying the amount of participation bet placed on the bonus game.

In the bonus game participation screen shown in FIG. 82, three participable bonus games are displayed under the names "Bonus Game A", "Bonus Game B", and "Bonus Game C". The sum values are "$18,751,684", "$78,945", "$8,787,945", the participation fees are "$10", "$1", "$5", and the amounts bet are "$10", "$0", and "$15", respectively. That is, the participation bet is made once for Bonus game A, and three times for Bonus Game C. No participation bet is made for Bonus Game B. The credit available for making a participation bet is $200.

Pressing the participation request button 130 sends a bonus game participation request to the bonus controllers 200 running the Bonus Game A and Bonus Game C, and the terminal display 101 displays a screen indicating the participation state of each bonus game. In the example shown in FIG. 82, a message image 131 is displayed that indicates that a request for participating in a bonus game is being made, and a participation state display image 132 is displayed that indicates a participation state of each bonus game. The message image 131 shows the characters "Making a Bonus Game Participation Request." The participation state display image 132 indicates that the request has been accepted in Bonus Game A, and that the request is being made in Bonus Game C.

When the participation request is accepted in all of the participation-requested bonus games before the variable-display of the symbols 180 comes to rest, the terminal display 101 displays a message image 135, indicating that the participation request has been accepted in all of the bonus games to which the request was made, and a participation acceptance state image 133, indicating that the request to participate in the bonus game has been accepted, as shown at the bottom left of FIG. 82. The terminal display 101 also displays a final credit image 134, which indicates the amount of credit remaining after the deduction of the accepted participation bet. In this manner, the credit after deduction is not displayed until the participation request is accepted in all of the bonus games to which the request was made. Instead, the credit is displayed in the deducted amount only after finalization of the entry of the participation bet, after the participation request is accepted in all of the bonus games to which the request was made.

On the other hand, when the participation request is not accepted in all of the participation-requested bonus games before the variable-display of the symbols 180 comes to rest, the terminal display 101 displays a message image 137, indicating that the participation request was not accepted in all of the bonus games to which the request was made, and a participation nonacceptance state image 136, indicating that the participation request to the bonus games was not accepted, as shown at the bottom right of FIG. 82. Here, the credit image 124 is also displayed that indicates the amount of credit before deduction of the accepted participation bet.

Figure 84:
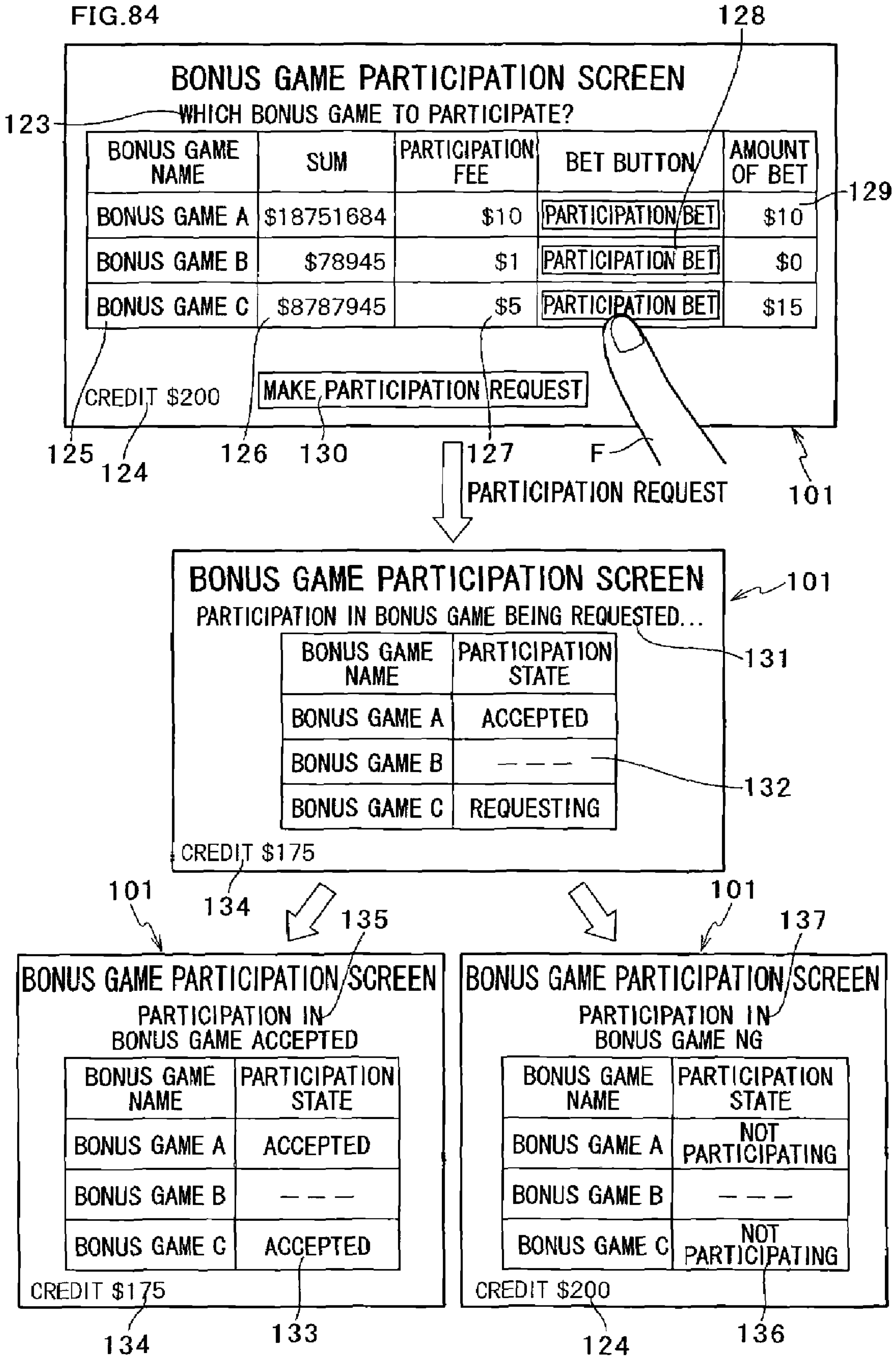
FIG. 84 illustrates a modification example of the flow of participation in the bonus game.

FIG. 84 shows a modification example of the bonus game participation screen. The bonus game participation screen is essentially as in the example shown in FIG. 82 until the pressing of the participation request button 130. Pressing the participation request button 130 makes a bonus game participation request, and the terminal display 101 displays a screen indicating the participation state of each bonus game, as in the example shown in FIG. 82. However, unlike the example of FIG. 82, the final credit image 134 displays the credit amount after deduction of the accepted participation bet, before the participation request is accepted in all of the bonus games to which the request was made, i.e., before the entry of participation bet is finalized. When the participation request is not accepted in all of the bonus games to which the request was made, canceling the entry of participation bet causes the credit image 124 to show the amount of credit before deduction of the accepted participation bet.

Figure 83:
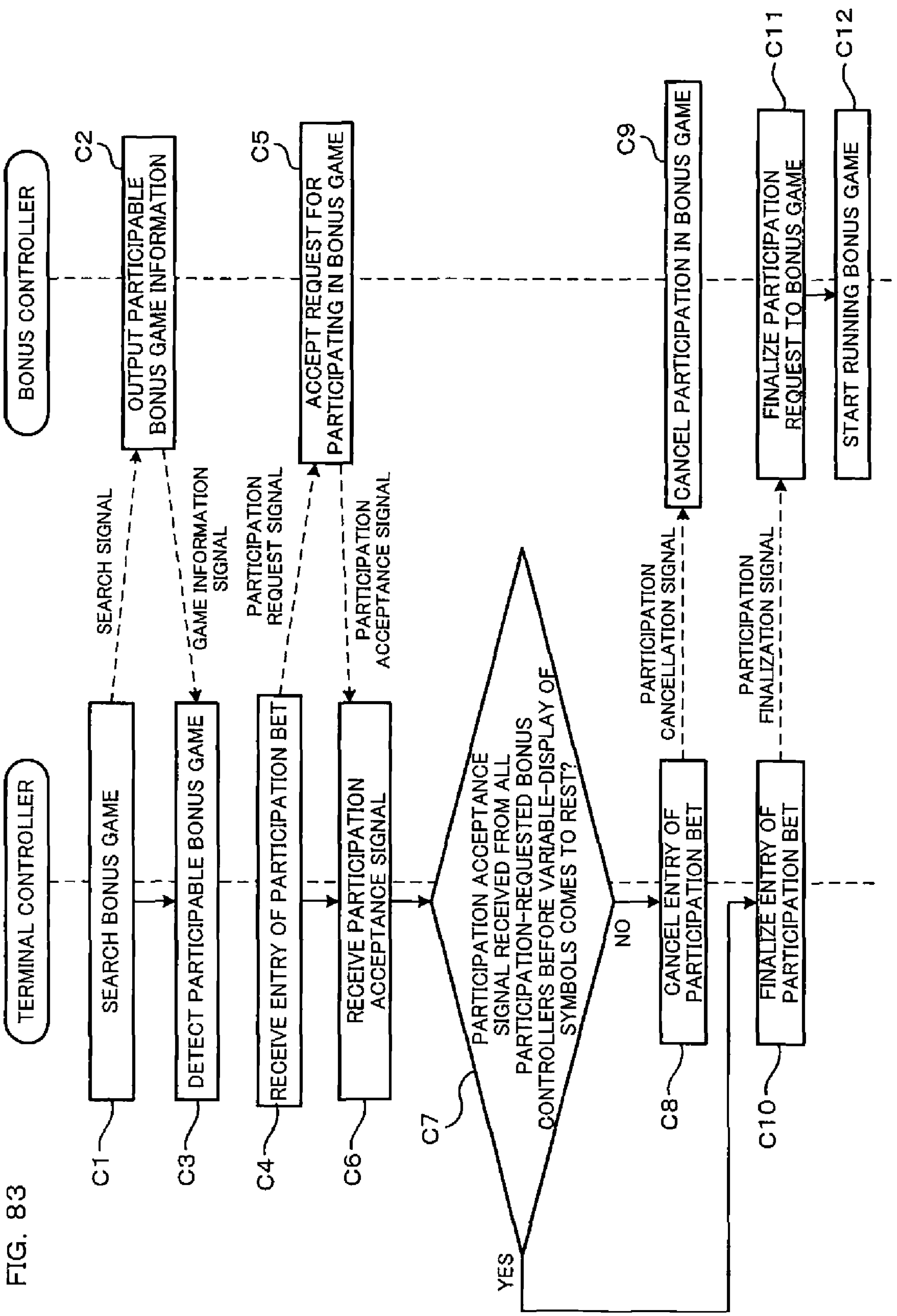
FIG. 83 is a sequence diagram illustrating an operation of a terminal controller and a bonus controller.

Concerning the foregoing terminal display 101 of the terminal 10 provided in the gaming system, the following description deals with operations of the terminal controller 110 and the bonus controller 200, with reference to the sequence diagram shown in FIG. 83.

First, in order to detect a participable bonus game, the terminal controller 110 sends a search signal, used to make an inquiry for availability of a participable bonus game, to each bonus controller 200 (C1). In receipt of the search signal, the bonus controller 200 sends a game information signal, indicative of information concerning a bonus game, to the terminal controller 110 when the bonus game it runs is available for participation (C2). In receipt of the game information signal, the terminal controller 110 detects that the bonus game indicated by the game information signal is available for participation, and causes the participation bet input unit 104 to receive a participation bet (C3).

When a participation bet is received by the participation bet input unit 104 (i.e., with the pressing of the participation request button 130), the terminal controller 110 sends a participation request signal to the bonus controller 200 running the bonus game bet by the participation bet (C4). The participation request signal contains information indicative of the terminal 10 making the participation request, and of the amount of the participation bet. In receipt of the participation request signal, the bonus controller 200 stores the information contained in the signal, and causes the payout memory 250 to store the amount of participation bet indicated by the signal, before sending a participation acceptance signal, indicative to acceptance of the participation request, to the terminal controller 110 (C5). The terminal controller 110 receives the participation acceptance signal (C6).

When the participation acceptance signal is not received from all of the participation-requested, bonus controllers 200 before the variable-display of the symbols 180 comes to rest, (C7: NO), the entry of participation bet is cancelled, and a participation cancellation signal is output to all the bonus controllers 200 to which the participation request was made (C8). In receipt of the participation cancellation signal, the bonus controller 200 cancels the participation request of the terminal 10 canceling the participation request to the bonus game (C9).

When the participation acceptance signal is received from all of the participation-requested, bonus controllers 200 before the variable-display of the symbols 180 comes to rest, (C7: YES), the entry of participation bet is finalized, and a participation finalization signal is output that indicates finalization of the participation request (C10). In receipt of the participation finalization signal, the bonus controller 200 finalizes the participation request to the bonus game (C11), and starts running the bonus game (C12).

(Symbol, Combination, or the Like)

The terminal display 101 has the matrix 156 including symbol columns each having twenty two symbols 180 as illustrated in FIG. 87. To each of the symbols constituting the columns is given one of code numbers 0 to 21. Each symbol column is made from a combination of "Angelfish", "Clownfish", "7", "Tuna", "Coelacanth", and "Bonus".

Of the symbols in the symbol columns, the display windows 151 to 155 each displays (arranges) three successive symbols. The symbols arranged in the upper stages 151*a* to 155*a*, the central stages 151*b* to 155*b*, and the lower stages 151*c* to 155*c* form a symbol matrix having five columns and three rows. When a BET button and a start button are sequentially pressed in this order to start a game, symbols constituting the symbol matrix start to scroll. This scrolling of the symbols stops (rearrangement) after a predetermined period from the beginning of the scrolling.

Further, for each symbol, a predetermined scatter symbol is determined in advance. Scatter symbols are such symbols that a player is put in an advantageous position when a predetermined number or more of them are displayed in the matrix 156. For example, the advantages includes: a state where coins corresponding to the scatter symbols are paid out, a state where the number of coins to be paid out is added to a credit, a state where a bonus game is started.

Here, a bonus game is a gaming state which provides a larger advantage than a base game. In this embodiment, the bonus game is a jackpot game. No particular limitation is put on the bonus game, as long as it is a gaming state advantageous to the player, that is, it is more advantageous than the base game. For example, the bonus game may include a state where more game media are obtainable than in the base game, a state where a game medium is obtainable with higher probability than in the base game, a state where a game medium is less consumed than in the base game, and the like. Specifically, a free game, a second game, a feature game, and the like may be mentioned as examples of the bonus game.

(Mechanical Structure of Gaming System)

Next, the following describes a specific example of mechanical and electrical structures of the gaming system thus structured.

A gaming system is placed in a gaming facility such as a casino. This gaming system runs a unit game which involves a game medium. The game medium is a coin, bill, or a value in the form of electronic information. However, the game medium in the present invention is not particularly limited. For example, a medal, token, electronic money, ticket or the like are also possible. Further, the ticket is not particularly limited and may be a later-described ticket with a barcode or the like ticket.

Figure 85:
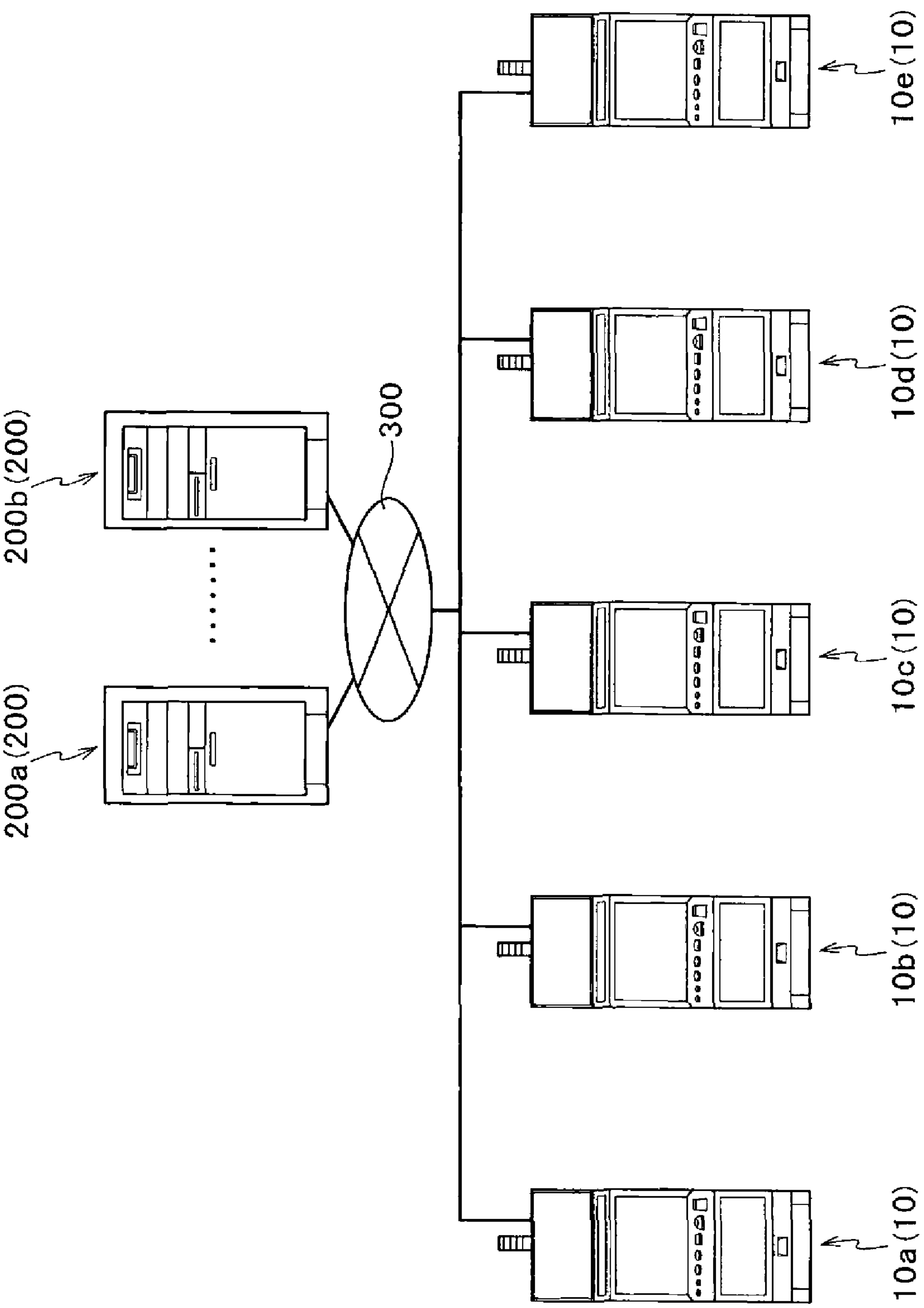
FIG. 85 is a diagram illustrating a mechanical structure of the gaming system.

As shown in FIG. 85, the gaming system includes terminals 10 that independently run a base game, bonus controllers 200 that run a bonus game, and a network 300 connecting the terminals 10 and the bonus controllers 200 with each other to enable communications therebetween.

Figure 86:
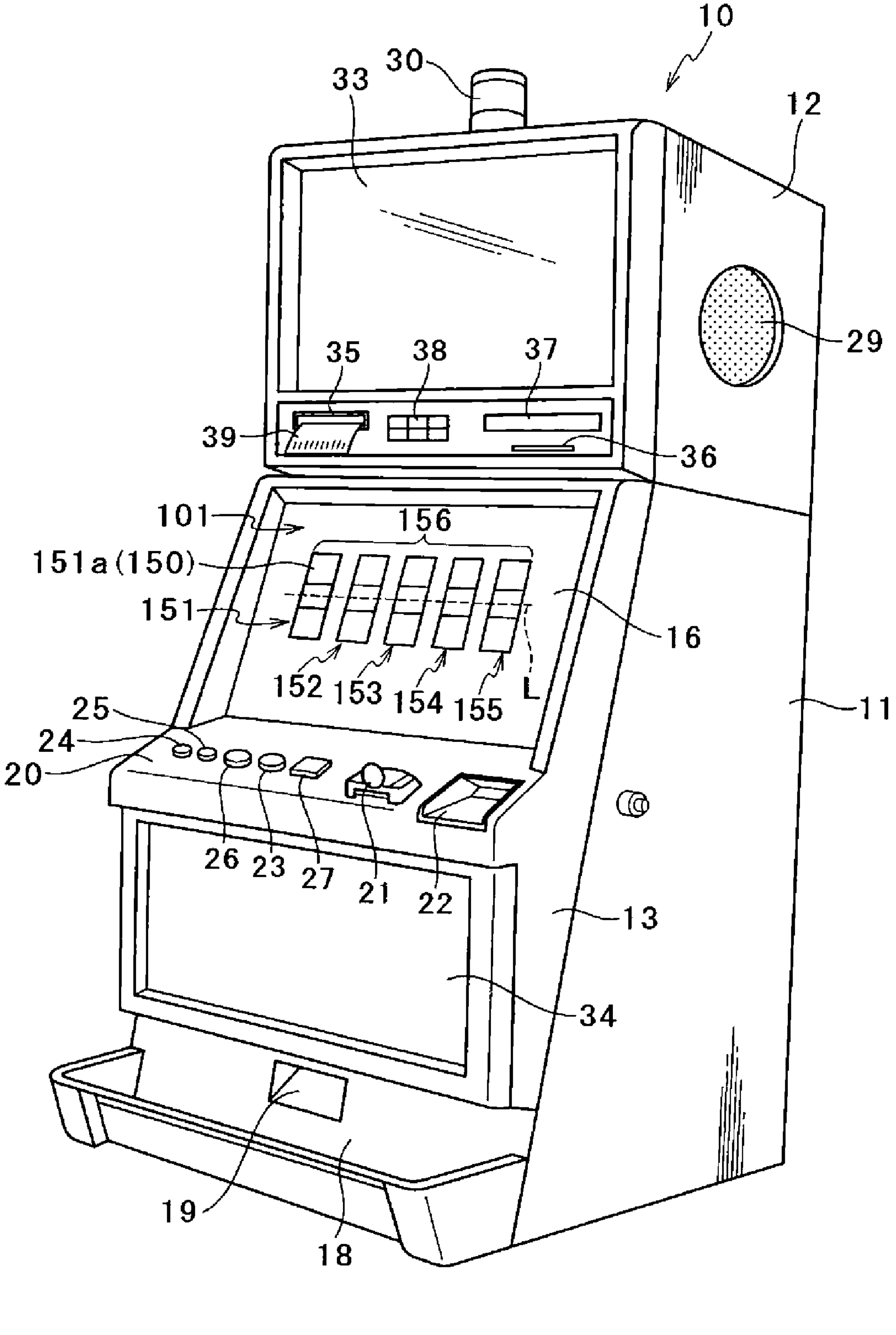
FIG. 86 is a perspective view of an exterior appearance of the terminal.

As illustrated in FIG. 86, the terminal 10 includes: a cabinet 11, a top box 12 provided above the cabinet 11, and a main door 13 provided on the front surface of the cabinet 11. The main door 13 has a lower image display panel 16. The lower image display panel 16 has a transparent liquid crystal panel for displaying various information. The lower image display panel 16 displays display windows 151 to 155 (matrix 156) for arranging therein symbols 180. Further, the lower image display panel 16 displays as needed various information and effect images related to a game.

The present embodiment deals with a case where the lower image display panel 16 electrically displays symbols 180 arranged in five rows/three columns. However, the present invention is not limited to this.

The lower image display panel 16 displays a single activated payline L. Note that the number of pay lines L may be two or more. When the number of pay lines L is two or more, the number of pay lines L activated may be determined according to a predetermined condition, such as the number of coins placed as a BET.

Note that the lower image display panel 16 may have a credit value indicator and a payout value indicator. The credit value indicator displays a total value (hereinafter also referred to as total credit value) which a terminal 10 can pay out to a player. When symbols stopped along a pay line L form a winning combination, the payout value indicator displays the number of coins to be paid out.

A translucent touch panel 138 is provided in front of the lower image display panel 16 (terminal display 101). A player manipulates the terminal 10 by touching and pressing the touch panel 138.

Further, scatter symbols may be adopted, and the number of coins to be paid out may be determined, according to the number of scatter symbols displayed on the matrix 156. Note that the pay line L does not necessarily have to be displayed.

Below the lower image display panel 16 provided are a control panel 20, a coin insertion slot 21, and a bill validator 22. The control panel 20 is provided with various buttons 23 to 27. These buttons 23 to 27 allow a player to input instructions related to a game played by the player. Through the coin insertion slot 21, a coin is received in the cabinet 11.

The control panel 20 includes: a spin button 23, a change button 24, a cashout button 25, a 1-BET button 26, and a maximum BET button 27. The spin button 23 is for inputting an instruction to start symbol scrolling. The change button 24 is used to ask a staff person in the gaming facility for exchange of money. The cash out button 25 is for inputting an instruction to pay out coins corresponding to the total credit-value into the coin tray 18.

The 1-BET button 26 is used for betting one coin out of those corresponding to the total credit value. The maximum BET button 27 is used for betting, out of those corresponding to the total credit value, a maximum number of coins (e.g., fifty coins) which can be bet in one game.

The bill validator 22 validates whether bill is genuine or not and receives the genuine bill into the cabinet 11. Note that the bill validator 22 is capable of reading a barcode attached to a later-mentioned ticket 39 having a barcode (hereinafter simply referred to as ticket 39). When the bill validator 22 reads the ticket 39, it outputs to the main CPU 41 a read signal representing information having read from the barcode.

On the lower front surface of the main door 13, that is, below the control panel 20, a belly glass 34 is provided. On the belly glass 34, a character of a terminal 10 or the like is drawn. On the front surface of top box 12 is provided an upper image display panel 33. The upper image display panel 33 has a liquid crystal panel and displays an effect image, introduction to the game, rules of the game, or the like.

Further, the top box 12 has a speaker 29 for performing an audio output. Below the upper image display panel 33 are provided a ticket printer 35, a card reader 36, a data displayer 37, and a keypad 38. The ticket printer 35 prints, onto a ticket, a barcode having encoded data containing credit-value, date and time, identification number of a terminal 10 or the like, thereby issuing a ticket 39 having a barcode attached thereto. A player can play a game in another terminal 10 with the ticket 39 having the barcode, or exchange the ticket 39 having the barcode with bill or the like at a change booth or the like of the game arcade.

The card reader 36 reads/writes data from/into a smart card. The smart card is carried by a player, and stores therein data for identifying the player, data relating to a history of games played by the player, or the like.

The data displayer 37 includes a fluorescent display or the like, and displays the data read by the card reader 36 and the data input by the player through the keypad 38. The keypad 38 is for entering instructions or data relating to issuing of a ticket or the like.

(Electrical Structure of Gaming System)

Figure 91:
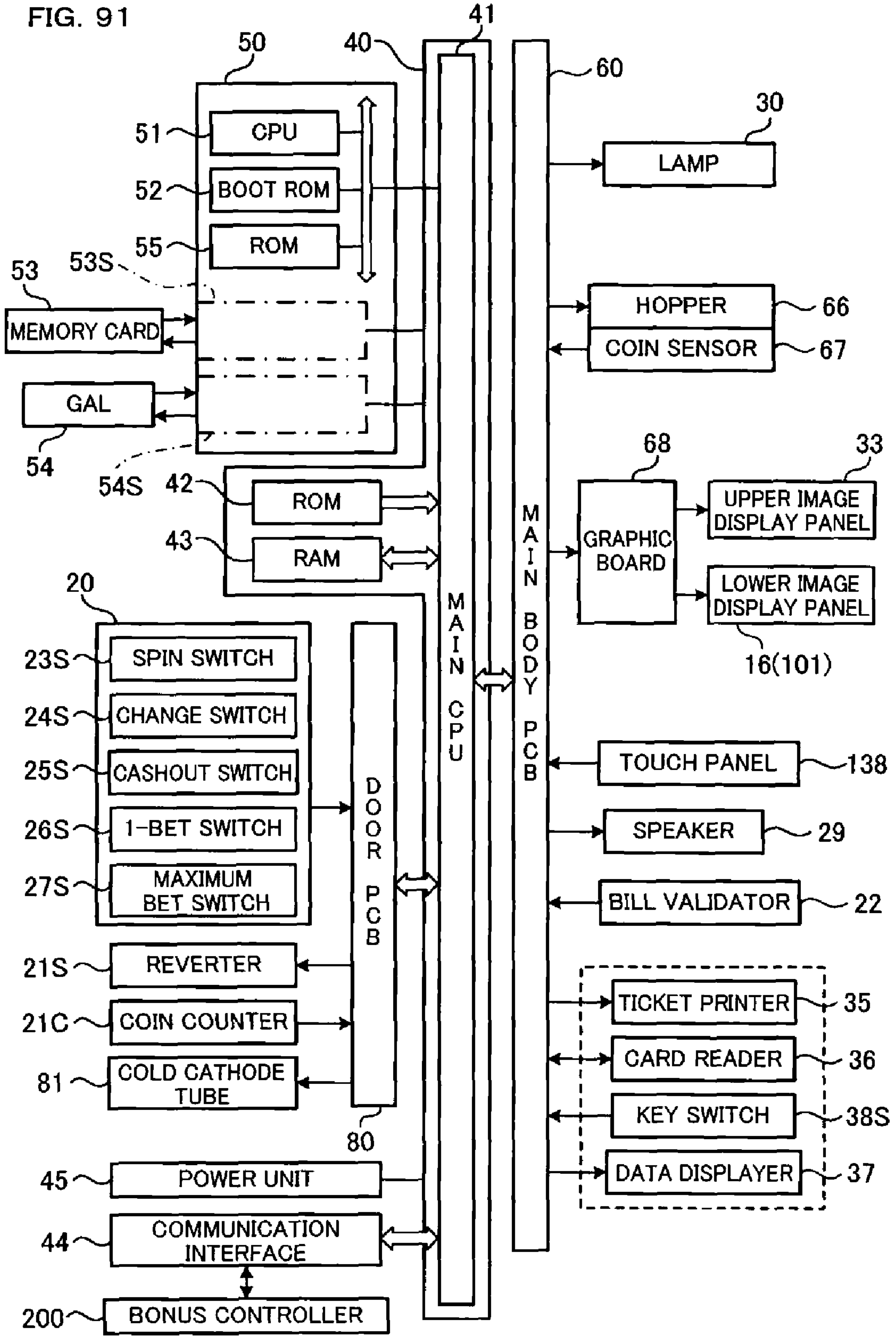
FIG. 91 is a block diagram illustrating an electrical structure of the gaming terminal.
Figure 92:
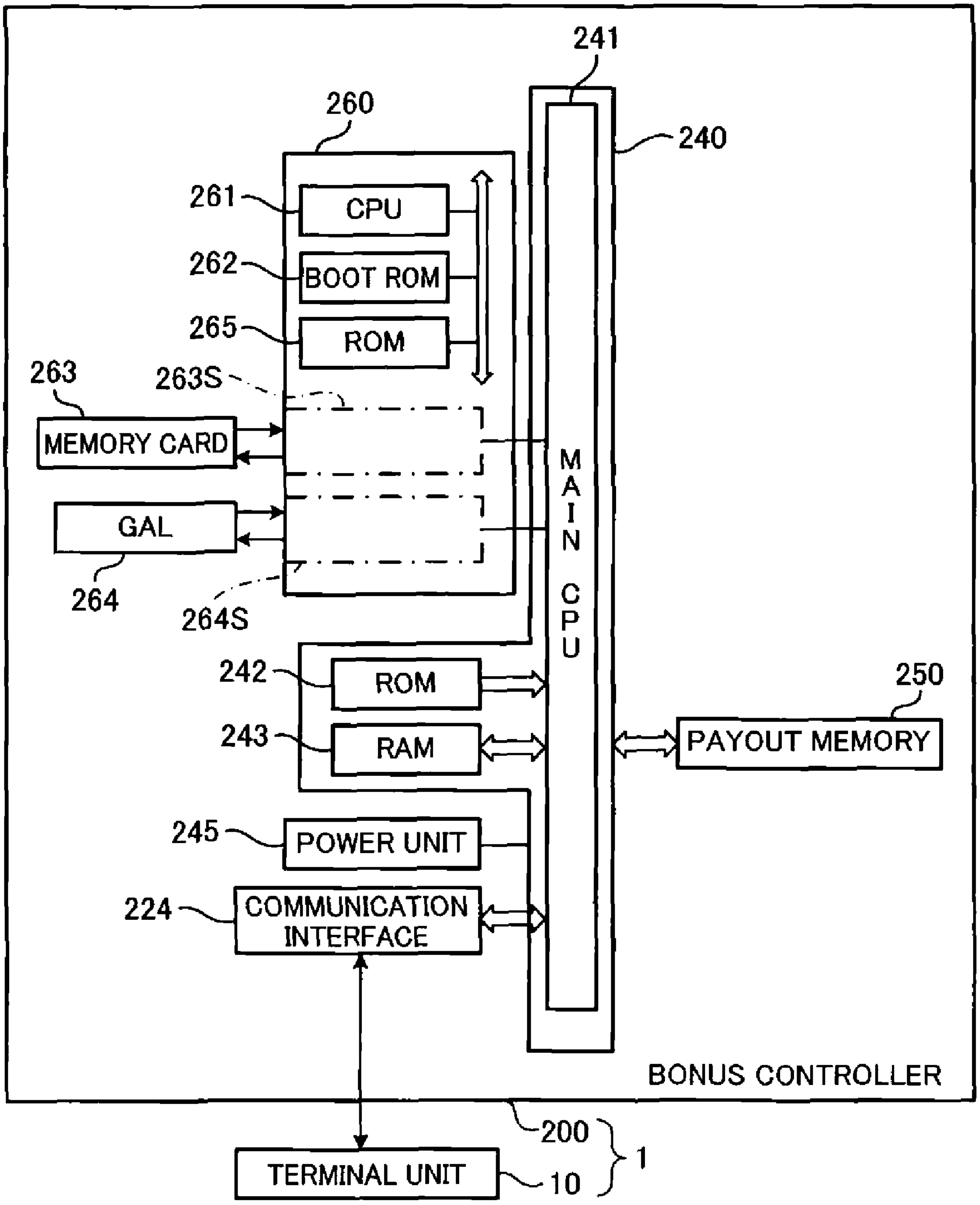
FIG. 92 is a block diagram illustrating an electrical structure of a bonus controller.

FIG. 91 and FIG. 92 are block diagrams showing the entire electrical structure of the gaming system.

(Electrical Structure of Terminal 10)

FIG. 91 is a block diagram showing an electrical structure of the terminal 10. The cabinet 11 includes a control unit having a terminal controller 100. The control unit includes a motherboard 40, a main body PCB (Printed Circuit Board) 60, a gaming board 50, a door PCB 80, various switches, sensors, or the like.

The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 stores therein a game program and a gaming system program. The game program contains a stop symbol determining program. The stop symbol determining program determines symbols (code number corresponding to the symbol) to be stopped in the arrangement areas 150. This stop symbol determining program contains sets of symbol weighting data respectively corresponding to various payout rates (e.g., 80%, 84%, 88%). Each set of the symbol weighting data indicates, for each of the display windows 151 to 155, a code number of each symbol and at least one random numerical value allotted to the code number. The numerical value is a value within a predetermined range of 0 to 256 for example.

The payout rate is determined based on payout rate setting data output from the GAL 54. Based on a set of the symbol weighting data corresponding to the payout rate determined, a symbol to be stopped is determined.

The memory card 53 stores therein various types of data for use in the game programs and the gaming system programs. For example, the memory card 53 stores a table listing combinations of a symbol 180 to be displayed on the display windows 151 to 155 of FIG. 81 and an associated range of random numerical values. This data is transferred to the RAM 43 of the motherboard 40, at the time of running a game program.

The card slot 53S is structured so as to allow the memory card 53 to be attached/detached to/from the card slot 53S. This card slot 53S is connected to the motherboard 40 through an IDE bus. Thus, the type and content of a game run by a terminal 10 can be modified by detaching the memory card 53 from the card slot 53S, writing a different game program and a different gaming system program into the memory card 53, and inserting the memory card 53 back into the card slot 53S.

Each of the game programs includes a program related to the progress of the game and/or a program for causing a transition to a bonus game. Each of the game programs includes image data and audio data output during the game.

The GAL 54 has input and output ports. When the GAL 54 receives data via the input port, it outputs data corresponding to the input data from its output port. This data from the output port is the payout rate setting data described above.

IC socket 54S is structured so as to allow the GAL 54 to be attached/detached to/from the IC socket 54S. The IC socket 54S is connected to the motherboard 40, via a PCI bus. Thus, the payout rate setting data to be output from GAL 54 can be modified by: detaching the GAL 54 from the IC socket 54S, overwriting the program stored in the GAL 54, and attaching the GAL 54 back to the IC socket 54S.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50. The ROM 55 stores country identification information and an authentication program. The boot ROM 52 stores a preliminary authentication program and a program (boot code) for enabling the CPU 51 to run the preliminary authentication program.

The authentication program is a program (falsification check program) for authenticating the game program and the gaming system program. The authentication program is a program for confirming and verifying that the game program and the gaming system program are not falsified. In other words, the authentication program is described in accordance with a procedure for authenticating the game program and the gaming system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (terminal controller 100), a ROM (Read Only Memory) 42, a RAM (Random Access Memory) 43, and a communication interface 44.

The main CPU 41 serves as a terminal controller 110 and has a function of controlling the entire terminal 10. In particular, the main CPU 41 controls the following operations: an operation of outputting a signal instructing variable-displaying of symbols 180 to the graphic board 68, which is performed in response to pressing of the spin button 23 after betting of credit; an operation of determining symbols 180 to be stopped after the variable-displaying of symbols 180; and an operation of stopping the symbols 180 thus determined in the display window 151 to 155.

In other words, the main CPU 41 serves as an arrangement controller which arranges symbols to form a new symbol matrix through scrolling of symbols displayed on the lower image display panel 16. This main CPU 41 therefore determines symbols to be arranged in a symbol matrix by selecting symbols to be arranged from various kinds of symbols. Then, the main CPU 41 executes arrangement control to stop scrolling the symbols to present the symbols thus determined.

The ROM 42 stores a program such as BIOS (Basic Input/Output System) run by the main CPU 41, and permanently-used data. When the BIOS is run by the main CPU 41, each of peripheral devices is initialized and the game program and the gaming system program stored in the memory card 53 are read out through the gaming board 50. The RAM 43 stores data or a program used for the main CPU 41 to perform a process.

The communication interface 44 is provided to communicate with a host computer and the like equipped in the gaming facility, through the network (communication line). The communication interface 44 is also for communicating with the bonus controller 200 through a communication line. Further, a main body PCB (Printed Circuit Board) 60 and a door PCB 80 are connected to the motherboard 40, through USB (Universal Serial Bus). Further, the motherboard 40 is connected to a power unit 45. The power unit 45 supplies power to the motherboard 40 to boot the main CPU 41 thereof. Meanwhile, the power unit 45 supplies power to the gaming board 50 through the PCI bus to boot the CPU 51 thereof.

The main body PCB 60 and door PCB 80 are connected to various devices or units which generate signals to be input to the main CPU 41, and various devices or units whose operations are controlled by signals from the main CPU 41. Based on a signal input to the main CPU 41, the main CPU 41 runs the game program and the gaming system program stored in the RAM 43, to perform an arithmetic process. Then, the CPU 41 stores the result of the arithmetic process in the RAM 43, or transmits a control signal to the various devices and units to control them based on the result.

The main body PCB 60 is connected with a lamp 30, a hopper 66, a coin sensor 67, a graphic board 68, the speaker 29, a bill validator 22, a ticket printer 35, a card reader 36, a key switch 38S, a data displayer 37, and the touch panel 138.

The touch panel 138 is structured to include a switcher, which is formed in a matrix by horizontally (X direction) and vertically (Y direction) disposed signal lines.

The lamp 30 is turned on/off on the basis of a control signal from the main CPU 41.

The hopper 66 is mounted in the cabinet 11 and pays out a predetermined number of coins from a coin outlet 19 to the coin tray 18, based on a control signal from the main CPU 41. The coin sensor 67 is provided inside the coin outlet 19, and outputs a signal to be input to the main CPU 41 upon sensing that a predetermined number of coins have been delivered from the coin outlet 19.

The graphic board 68 controls image displaying of upper image display panel 33 and the lower image display panel 16, based on a control signal from the main CPU 41. Further, the graphic board 68 is provided with a VDP (Video Display Processor) for generating image data on the basis of a control signal from the main CPU 41, a video RAM for temporarily storing the image data generated by the VDP, or the like. Note that image data used at the time of generating the image data by the VDP is in a game program which is read out from the memory card 53 and stored in the RAM 43.

The bill validator 22 reads an image on the bill and takes only those recognized as to be genuine into the cabinet 11. When taking in a genuine bill, the bill validator 22 outputs an input signal indicating the value of the bill to the main CPU 41. The main CPU 41 stores into the RAM 43 a credit-value corresponding to the value of the bill indicated by the signal.

The ticket printer 35 prints a barcode onto a ticket to issue a ticket 39 having the barcode. The barcode contains encoded data such as credit-value stored in the RAM 43, date and time, identification number of the terminal 10, or the like, based on a control signal from the main CPU 41.

The card reader 36 reads out data from the smart card and transmits the data to the main CPU 41. Further, the card reader 36 writes data into the smart card based on the control signal output from the main CPU 41. The key switch 38S is mounted to the keypad 38, and outputs a signal to the main CPU 41 in response to an operation of the keypad 38 by the player. The data displayer 37 displays, based on a control signal from the main CPU 41, the data read by the card reader 36 or the data input by the player through the key pad 38.

The door PCB 80 is connected to a control panel 20, a reverter 21S, a coin counter 21C, and a cold cathode tube 81. The control panel 20 is provided with: a spin switch 23S associated with the spin button 23; a change switch 24S associated with the change button 24; a cashout switch 25S associated with the cashout button 25; a 1-BET switch 26S associated with the 1-BET button 26; and a maximum BET switch 27S associated with the maximum BET button 27. Each of the switches 23S to 27S outputs a signal to the main CPU 41, when a player presses the associated button.

The coin counter 21C is provided within the coin insertion slot 21, and identifies whether the coin inserted into the coin insertion slot 12 by the player is genuine. A coin except the genuine coin is discharged from the coin outlet 19. In addition, the coin counter 21C outputs an input signal to the main CPU 41 upon detection of a genuine coin.

The reverter 21S is operated on the basis of the control signal output from the main CPU 41 and distributes a coin, which is recognized as a genuine coin by the coin counter 21C, to a not-shown cash box or hopper 66 mounted in the terminal 10. In other words, when the hopper 66 is full of the coins, the genuine coin is distributed into the cash box by the reverter 21S. On the other hand, when the hopper 66 is not yet full with the coins, the genuine coin is distributed into the hopper 66. The cold cathode tube 81 functions as a backlight mounted to rear sides of the lower image display panel 16 and the upper image display panel 33. This cold cathode tube 81 turns on according to a control signal from the main CPU 41.

(Electrical Structure of Bonus Controller 200)

FIG. 92 is a block diagram illustrating an electrical structure of the bonus controller 200. The bonus controller 200 is provided therein with a control unit. The control unit includes a motherboard 240, a gaming board 260, an actuator, or the like.

The gaming board 260 has the same structure as that of the gaming board 50. The motherboard 240 has the same structure as that of the motherboard 40. The communication interface 244 communicates with the terminal controller 110 through a communication line.

The payout memory 250 is connected to the motherboard 240, and stores the sum of bonus payouts, corresponding to the amount of participation bet sent from the terminal controller 110.

These values are stored as a "jackpot."

(Participation State Table)

FIG. 88 is a diagram showing a participation state table. The participation state table is stored in the ROM 42 of each terminal 10, and indicates the bonus games for which a participation request has been made, the amounts of participation bets, and participation states. In the example of the participation state table shown in FIG. 88, a participation request is made for three bonus games "Bonus Game A", "Bonus Game B", and "Bonus Game C". The amounts of participation bets are $10, $1, and $15, and the participation states are "Accepted", "Being Requested", and "Being Requested", respectively.

(Participation Acceptance Table)

FIG. 89 is a diagram showing a participation acceptance table. The participation acceptance table is stored in the RAM 243 of each bonus controller 200. The participation acceptance table indicates the bonus games to which a participation request has been made, the terminals 10 that have made the request, the amounts of participation bets, and participation states.

In the examples of the participation acceptance table shown in FIG. 89, "Terminal 1" and "Terminal 2" have made a participation request to "Bonus Game A" with the participation bets $10 and $20, respectively. The participation states are "Not Final" for "Terminal 1," and "Final" for "Terminal 2."

It is also shown that "Terminal 3" has made a participation request to "Bonus Game B" with the participation bet $15. The participation state is "Not Final" for "Terminal 3."

(Participation History Table)

FIG. 90 is a diagram showing a participation history table. The participation history table is stored in the RAM 243 of each bonus controller 200. The participation history table indicates bonus games, the terminals 10 that have participated in the bonus games, and the sum of participation bets made by each terminal 10 on the bonus game. In the example of the participation history table shown in FIG. 90, "Terminal 1" and "Terminal 2" have participated in "Bonus Game A", and the sums of participation bets made by these terminals are $500 and $20, respectively. It is also shown that "Terminal 3" has participated in "Bonus Game B", and the sum of participation bets made by this terminal is $15.

(Operation of Gaming System: Boot Process)

The following describes a boot process which takes place in the gaming system. Upon powering on the gaming system, a boot process routine shown in FIG. 93 starts in: the mother board 240 and gaming board 260 in the bonus controller 200, and in the mother board 40 and the gaming board 50 in the terminal controller 110. The memory cards 53 and 263 are assumed to be inserted into the card slots 53S and 263S of the gaming boards 50 and 260, respectively. Further, the GALs 54 and 264 are assumed to be attached to the IC sockets 54S and 264S, respectively.

First, turning on the power switch of (powering on) the power units 45 and 245 boots the motherboards 40 and 240, and the gaming boards 50 and 260. Booting the motherboards 40 and 240 and the gaming boards 50 and 260 starts separate processes in parallel. Specifically, in the gaming boards 50 and 260, the CPUs 51 and 261 read out preliminary authentication programs stored in the boot ROMs 52 and 262, respectively. Then, preliminary authentication is performed according to the read out programs so as to confirm and authenticate that no modification is made to authentication programs, before reading them in the motherboards 40 and 240, respectively (S1). Meanwhile, the main CPUs 41 and 241 of the motherboards 40 and 240 run BIOS stored in the ROMs 42 and 242 to load into the RAMs 43 and 243 compressed data built in the BIOS, respectively (S2). Then, the main CPUs 41 and 241 run a procedure of the BIOS according to the data loaded into the RAMs 43 and 243 so as to diagnose and initialize various peripheral devices (S3).

The main CPUs 41 and 241, which are respectively connected to the ROMs 55 and 265 of the gaming boards 50 and 260 via PCI buses, read out authentication programs stored in the ROMs 55 and 265 and stores them in the RAMs 43 and 243 (S4). During this step, the main CPUs 41 and 241 each derives a checksum through ADDSUM method (a standard check function) which is adopted in a standard BIOS, and store the authentication programs into RAMs 43 and 243 while confirming if the operation of storing is carried out without an error.

Next, the main CPUs 41 and 241 each checks what connects to the IDE bus. Then, the main CPUs 41 and 241 access, via the IDE buses, to the memory cards 53 and 263 inserted into the card slots 53S and 263S, and read out game programs and gaming system programs from the memory cards 53 and 263, respectively. In this case, the CPUs 41 and 241 each reads out four bytes of data constituting the game program and the gaming system program at one time. Next, according to the authentication programs stored in the RAMs 43 and 243, the CPUs 41 and 241 authenticate the game program and the gaming system program read out to confirm and prove that these programs are not modified (S5).

When the authentication properly ends, the main CPUs 41 and 241 write and store the authenticated game programs and gaming system programs in RAMs 43 and 243 (S6).

Next, the main CPUs 41 and 241 access, via the PCI buses, to the GALs 54 and 264 attached to the IC socket 54S•264S, and read out payout rate setting data from the GALs 54 and 264, respectively. The payout rate setting data read out is then written and stored in the RAMs 43 and 243 (S7).

Next, the main CPUs 41 and 241 read out, via the PCI buses, country identification information stored in the ROMs 55 and 265 of the gaming boards 50 and 260, respectively. The country identification information read out is then stored in the RAMs 43 and 243 (S8).

Figure 94:
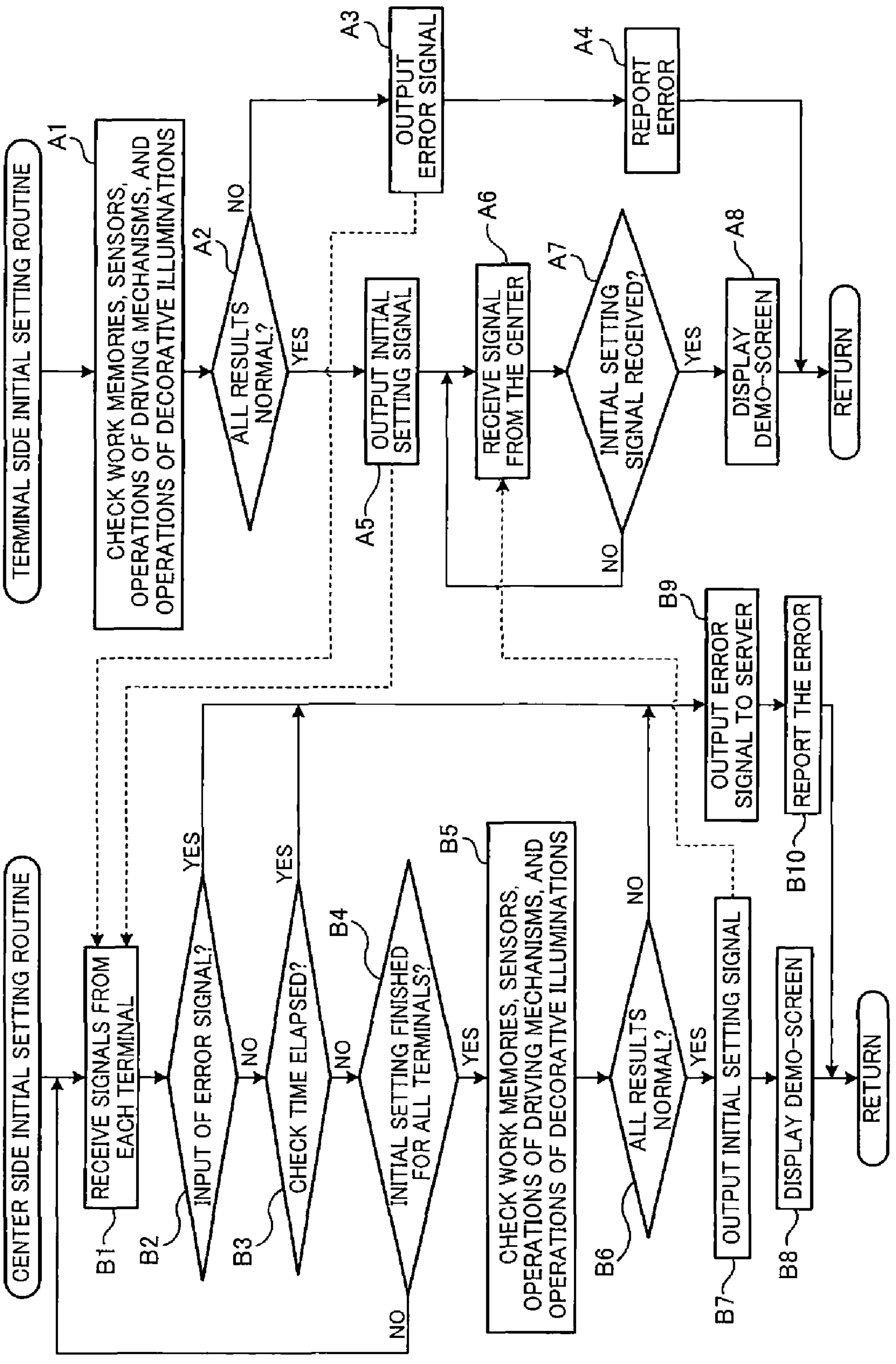
FIG. 94 is a flowchart illustrating an initial process executed by the gaming terminal and the bonus controller.

After this, the main CPUs 41 and 241 each perform an initial process of FIG. 94.

(Operation of Gaming System: Initial Process)

Figure 93:
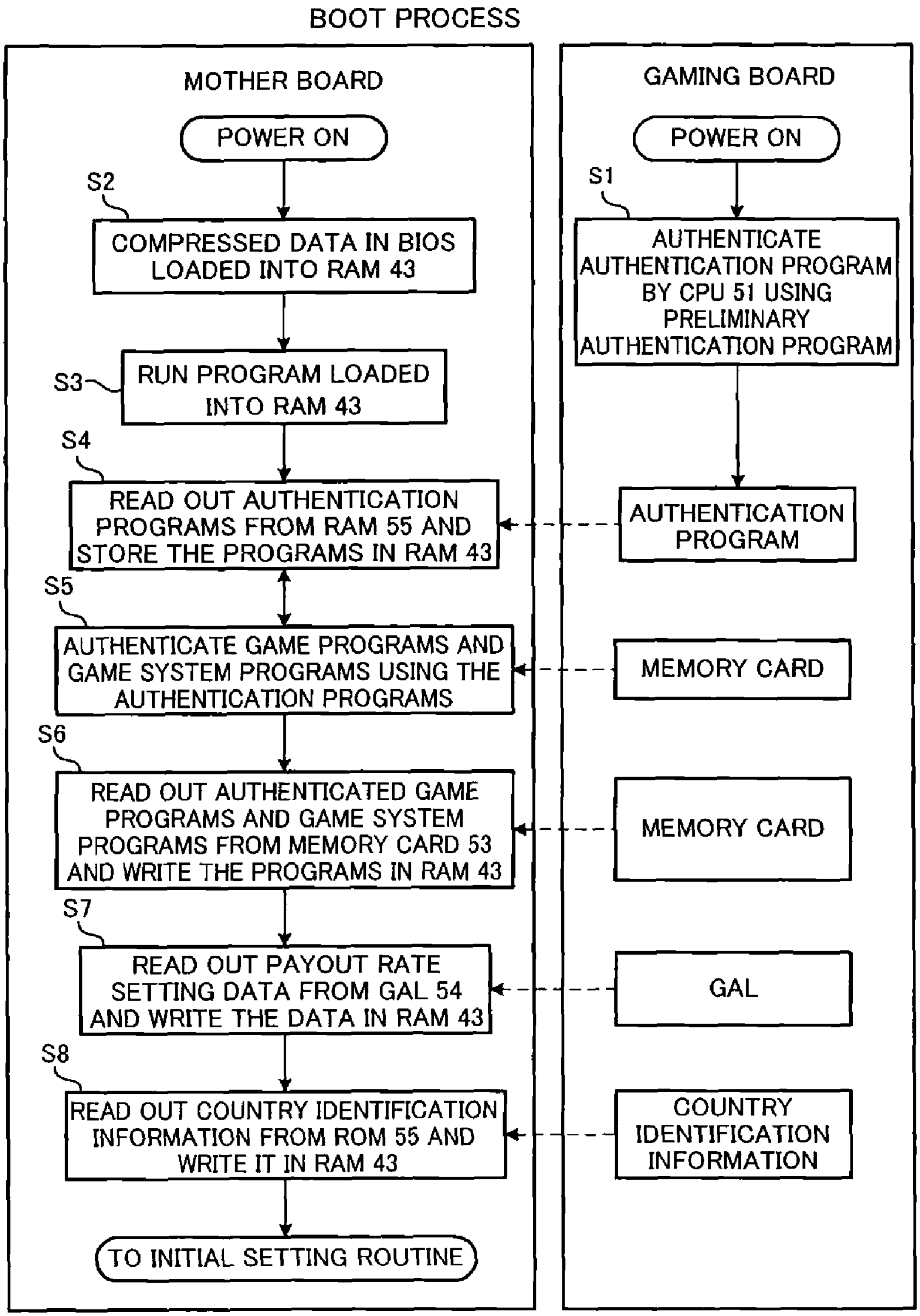
FIG. 93 is a flowchart illustrating a boot process executed by the gaming terminal and the bonus controller.

The following describes an initial process which takes place in the gaming system. When the boot process of FIG. 93 is completed, the bonus controller 200 reads out from the RAM 243 a center side initial setting routine illustrated in FIG. 94 and executes the routine. Meanwhile, the terminal 10 reads out from the RAM 43 a terminal side initial setting routine illustrated in FIG. 94 and executes the routine. The center side and terminal side initial setting routines are executed in parallel.

First, the main CPU 41 of each of the terminals; 10 checks operations of work memories such as the RAM 43, various sensors, various driving mechanisms, and various decorative illuminations (A1). Then, the main CPU 41 determines if all the check results are normal (A2). If the main CPU 41 determines that the check results contains an error (A2: NO), the main CPU 41 outputs a signal notifying the error (hereinafter, error signal) to the bonus controller 200 (A3). Further, the main CPU 41 reports the error in the form of illuminating the lamp 30 or the like (A4), and then ends the routine.

On the other hand in A2, if the main CPU 41 determines that all the check results are normal (A2: YES), an initial setting signal is output to the bonus controller 200 (A5). Then, an initial setting signal is waited from the bonus controller 200 (A6, A7: NO).

The main CPU 241 of the bonus controller 200 receives signals from each of the terminals; (B1). Then, the main CPU 241 determines whether a signal received is an error signal (B2). If the main CPU 241 determines that the signal is an error signal (B2: YES), the main CPU 241 outputs the error signal to a server of a not-shown host computer or the like (B9) to report the error (B10), and ends the routine.

On the other hand in B2, if the main CPU 241 determines that the signal is not an error signal (B2:NO), the main CPU 241 determines whether a predetermined time (check time) has elapsed from the time of powering on (B3). If the main CPU 241 determines that the check time has elapsed (B3: YES), B9 is executed. On the other hand, if the main CPU 241 determines that the check time has not yet elapsed (B3:NO), it is determined whether an initial setting signal is received from each of the terminals; 10 (B4). If the main CPU 241 determines that an initial setting signal from any one of the terminals 10 is not received (B4: NO), the process returns to B1. On the other hand, if it is determined that initial setting signals from all the terminals 10 are received (B4: YES), the main CPU 241 checks operations of work memories such as RAM 243, various sensors, various driving mechanisms, and various decorative illuminations (B5). Then, the main CPU 241 determines whether all the check results are normal (B6). If the main CPU 241 determines the check results contain an error (B6: NO), the main CPU 241 executes B9.

On the other hand in B6, if the main CPU 241 determines that all the check results are normal (B6: YES), the main CPU 241 outputs an initial setting signal to all the terminals 10 (B7), and causes the shared display 102 to display a demo-screen (B8). Then, the main CPU 241 ends the routine.

In A7, the main CPU 41 of each of the terminals; 10 determines that an initial setting signal is received from the bonus controller 200 (A7: YES), and causes the terminal display 101 to display a demo-screen (A8). The main CPU 41 then ends the routine.

(Operation of Terminal 10: Terminal Process Routine)

Figure 95:
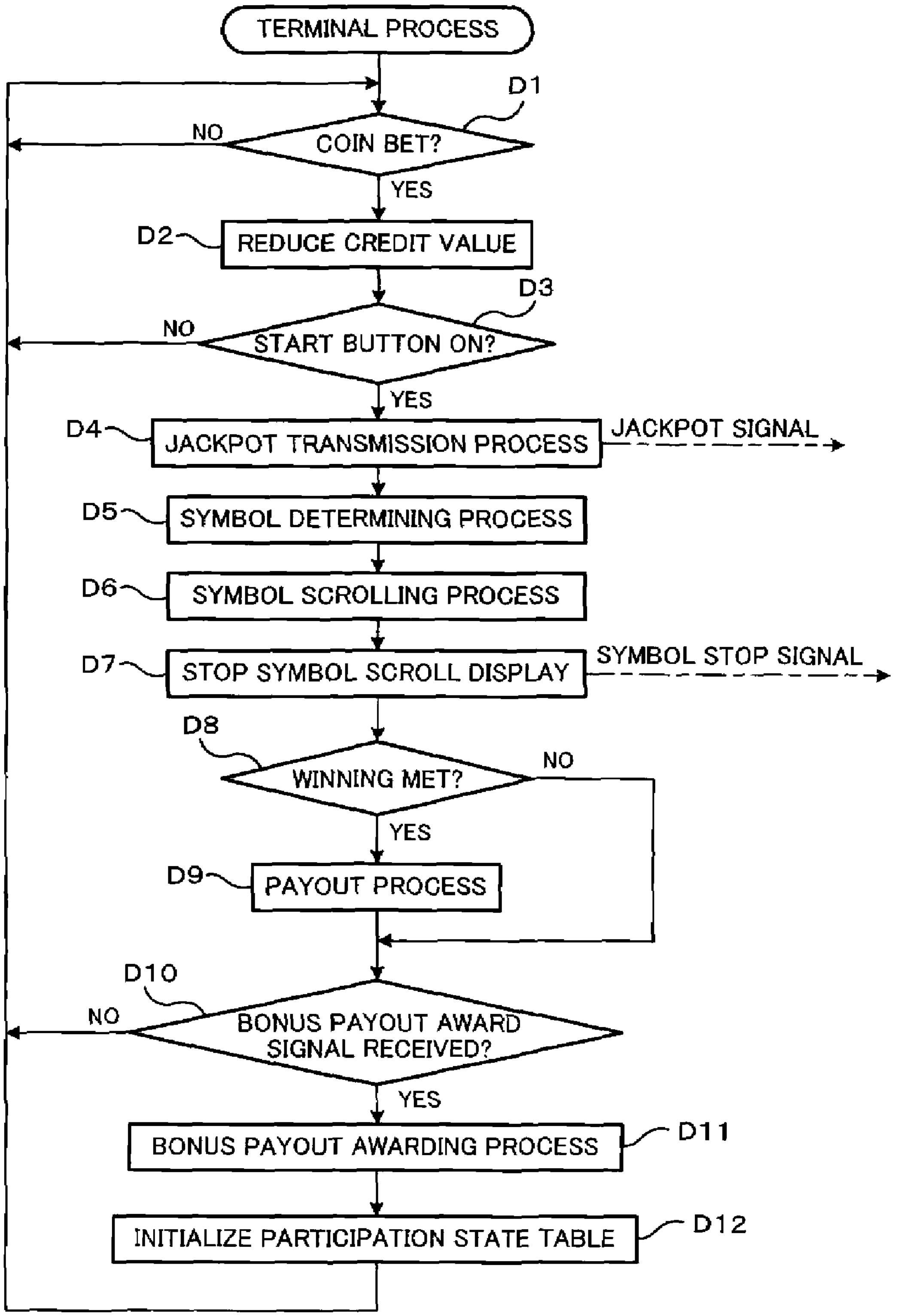
FIG. 95 is a flowchart illustrating a terminal process routine executed in the terminal.

After the terminal side initial setting routine of FIG. 94, the main CPU 41 of the terminal 10 performs a terminal process routine of FIG. 95. Through this terminal process routine performed by the main CPU 41, a base game is run.

As illustrated in FIG. 95, in the terminal process routine, it is determined whether a coin is bet (D1). In this step, it is determined whether a signal from the 1-BET switch 26S entered by pressing of the 1-BET button 26 is received. Meanwhile, it is determined whether a signal from the maximum BET switch 27S entered by pressing of the maximum BET button 27 is received. If no coin is bet (D1: NO), D1 is repeated until a coin is bet.

On the other hand, if a coin is bet (D1: YES), the credit value stored in the RAM 43 is reduced according to the number of coins bet (D2). When the number of coins bet surpasses the number of coins equivalent to the credit value stored in the RAM 43, the process goes to D3 (described later) without the reduction of the credit value. When the number of coins bet exceeds the maximum number of coins bettable one game (50 pieces in this embodiment), the process goes to the later-described step D3 without the reduction of the credit value.

Then, it is determined whether a spin button 23 is pressed (D3). If the spin button 23 is not pressed (D3: NO), the process returns to D1. Here, if the spin button 23 is not pressed (for example, the spin button 23 is not pressed but a command to end the game is input), the reduction of the credit value in D2 is canceled.

On the other hand, if the spin button 23 is pressed (D3: YES), a jackpot transmission process is executed (D4). In other words, a jackpot signal indicating a part of the game value bet is transmitted to the bonus controller 200.

Next executed is a symbol determining process (D5). That is, the stop symbol determining program stored in the RAM 43 is run to determine symbols 180 to be arranged in the matrix 156. Through this, a symbol combination to be formed along the payline L is determined.

Then, the scrolling process is executed to scroll symbols 180 on the terminal display 101 (D6). The scrolling process is a process in which the symbols 180 determined in D5 are stopped (rearranged) in the matrix 156 after scrolling of symbols 180 in a direction indicated by an arrow symbol (D7). Upon stopping the symbol scroll display, a symbol stop signal is output.

Next, it is determined whether symbols 180 rearranged in the matrix 156 form a winning combination (D8). If the symbols 180 form a winning combination (D8: YES), a payout process is executed (D9). More specifically, when a winning combination is formed, the number of coins according to the combination is calculated. On the other hand in D8, if it is determined that no winning combination is formed (D8: NO), the process of D10 is executed.

Next, the main CPU 41 determines whether a bonus award signal is received from the bonus controller 200 (D10). If the main CPU 41 determines that a bonus award signal is received (D10:YES), a payout is awarded according to the bonus award signal (D11). If the bonus award signal indicates no bonus payout, the terminal display 101 displays as such. Then, the participation state table stored in the RAM 43 is initialized (D12), and the process returns to D1. On the other hand in D10, if the main CPU 41 determines that no bonus award signal is received (D10: NO), the process returns to D1.

(Operation of Terminal 10: Bonus Game Participation Process Routine)

Figure 96:
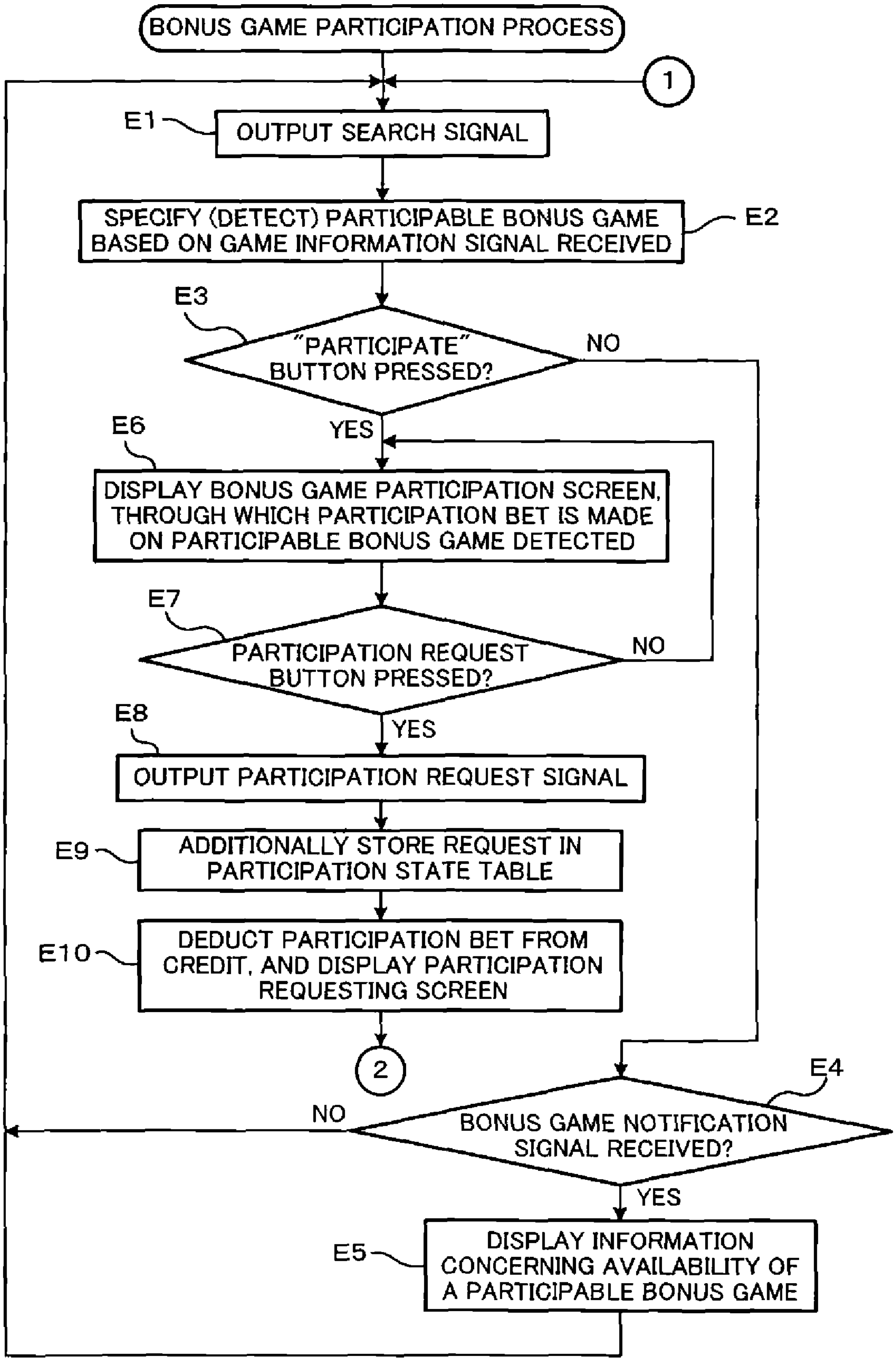
FIG. 96 is a flowchart illustrating a bonus game participation process routine executed in the terminal.
Figure 97:
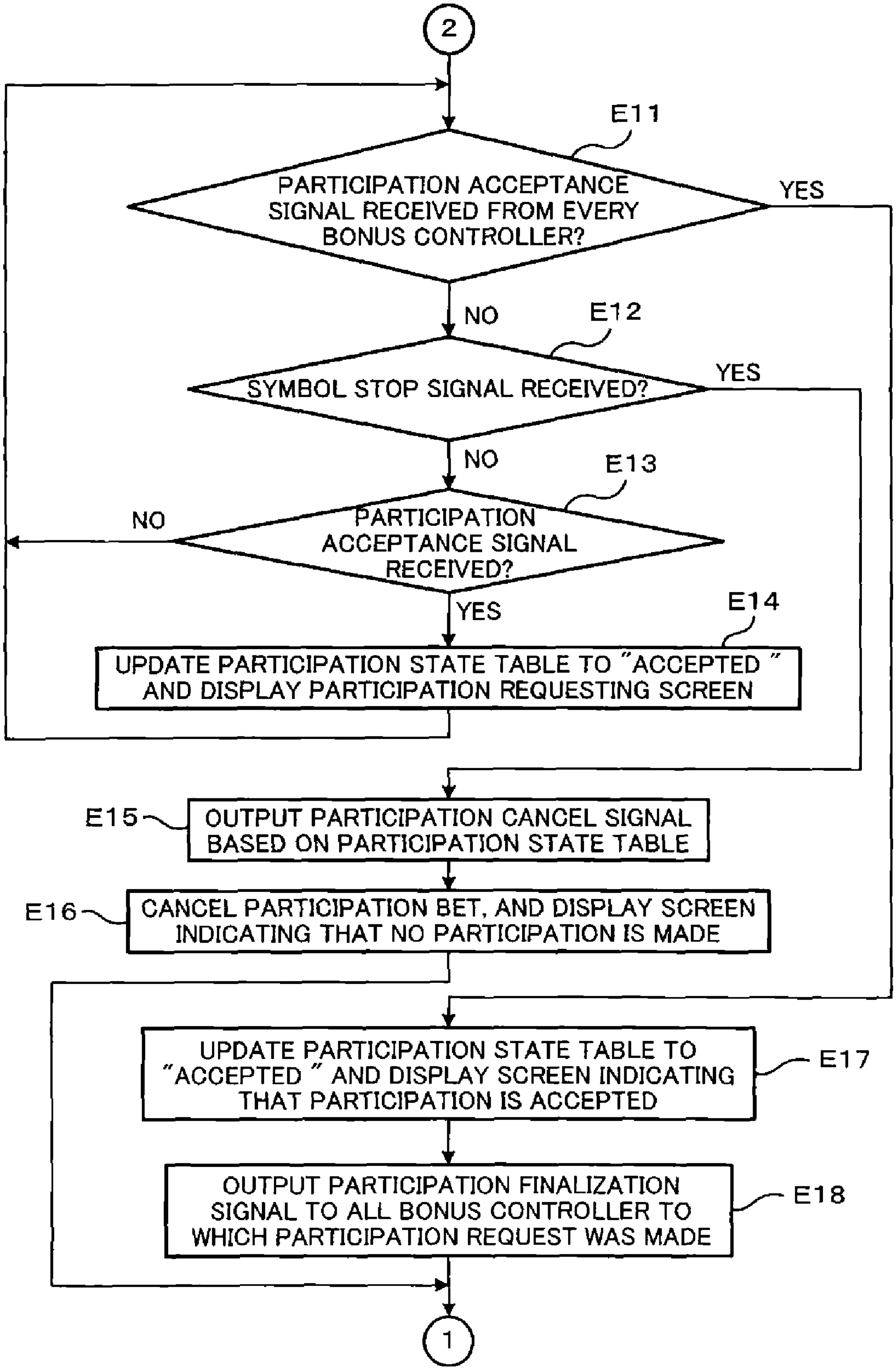
FIG. 97 is a flowchart illustrating a bonus game participation process routine executed in the terminal.

Upon finishing the terminal side initial setting routine shown in FIG. 94, the main CPU 41 of the terminal 10 executes the bonus game participation process routine shown in FIG. 96 and FIG. 97, along with the terminal process routine. The main CPU 41, by executing the bonus game participation process routine, allows the terminal 10 to participate in more than one bonus game.

As shown in FIG. 96 and FIG. 97, in the bonus game participation process routine, the main CPU 41 outputs a search signal, used to make an inquiry for availability of a participable bonus game (E1). In replay to the search signal, the main CPU 41 receives a game information signal, and specifies (detects) a participable bonus game based on the game information signal so received (E2). Note that, the game information signal is received for each bonus game, and as such, receiving no game information signal means that there is no participable bonus game.

Then, the main CPU 41 determines whether the participation screen button 121 or availability information image 122 has been pressed (E3). If it is determined that the participation screen button 121 or availability information image 122 has been pressed (E3:YES), the main CPU 41 causes the terminal display 101 to display a bonus game participation screen, through which a participation bet is made on the participable bonus game detected in E2 (E6). The main CPU 41 then determines whether the participation request button 130 has been pressed (E7). The main CPU 41 performs the process concerning the bonus game participation screen until it determines that the participation request button 130 is pressed (E7:NO). If it is determined that the participation request button 130 has been pressed (E7:YES), the main CPU 41 outputs a participation request signal to the bonus controller 200 running the bonus game bet by the participation bet (E8), and additionally stores this bonus game and the amount of participation bet in the participation state table (E9). The main CPU 41 then deducts the participation bet from the credit, and displays the participation requesting screen shown in the middle of FIG. 82 (E10).

Next, the main CPU 41 determines whether a participation acceptance signal is received from the bonus controller 200 (E11). If it is determined that the participation acceptance signal is not received from all of the bonus controllers 200 to which the participation request was made (E11:NO), the main CPU 41 determines whether a symbol stop signal, indicative of the stop of the scroll display of the symbols 180, is received (E12). If it is determined that the symbol stop signal is not received (E12:NO), the main CPU 41 determines whether a participation acceptance signal is received from the bonus controller 200 (E13). If it is determined that a participation acceptance signal is received (E13:YES), the main CPU 41 updates the participation state table to “Accepted” in the cell corresponding to the participation acceptance signal, and causes the terminal display 101 to display the participation requesting screen shown in the middle of FIG. 82 (E14). The main CPU 41 then executes the process of E11. On the other hand, if it is determined that a participation acceptance signal is not received (E13:NO), the main CPU 41 executes the process of E11.

If it is determined in E12 that the symbol stop signal is received (E12:YES), the main CPU 41 outputs a participation cancellation signal—a signal canceling the participation request—to the bonus controller 200 to which the participation request was made, based on the participation state table (E15), so as to cancel the participation bet. The main CPU 41 also causes the terminal display 101 to display the screen indicating that no participation is made, as shown in the bottom right of FIG. 82 (E16). The main CPU 41 then executes the process of E1.

If it is determined in E11 that the participation acceptance signal has been received from all of the bonus controllers 200 to which the participation request was made (E11:YES), the main CPU 41 updates the participation state table to “Accepted” in the cell corresponding to the participation acceptance signal, and displays the participation requesting screen shown in the left bottom of FIG. 82 (E17), and outputs a participation finalization signal, indicating the participation to the bonus game was finalized, to all the bonus controller 200 to which the participation request was made (E18). The main CPU 41 then executes the process of E1.

If it is determined in E3 that the participation screen button 121 or availability information image 122 is not pressed (E3: NO), the main CPU 41 determines whether a bonus game notification signal, notifying availability of a participable bonus game, is received from the bonus controller 200 (E4). If it is determined that the bonus game notification signal is received (E4:YES), the main CPU 41 causes the terminal display 101 to display the availability information image 122 indicative of the information concerning availability of the bonus game (E5), and executes that process of E1. On the other hand, if it is determined that the bonus game notification signal is not received (E4:NO), the process returns to E1.

(Operation of Bonus Controller 200: Bonus Controller Process Routine)

Figure 98:
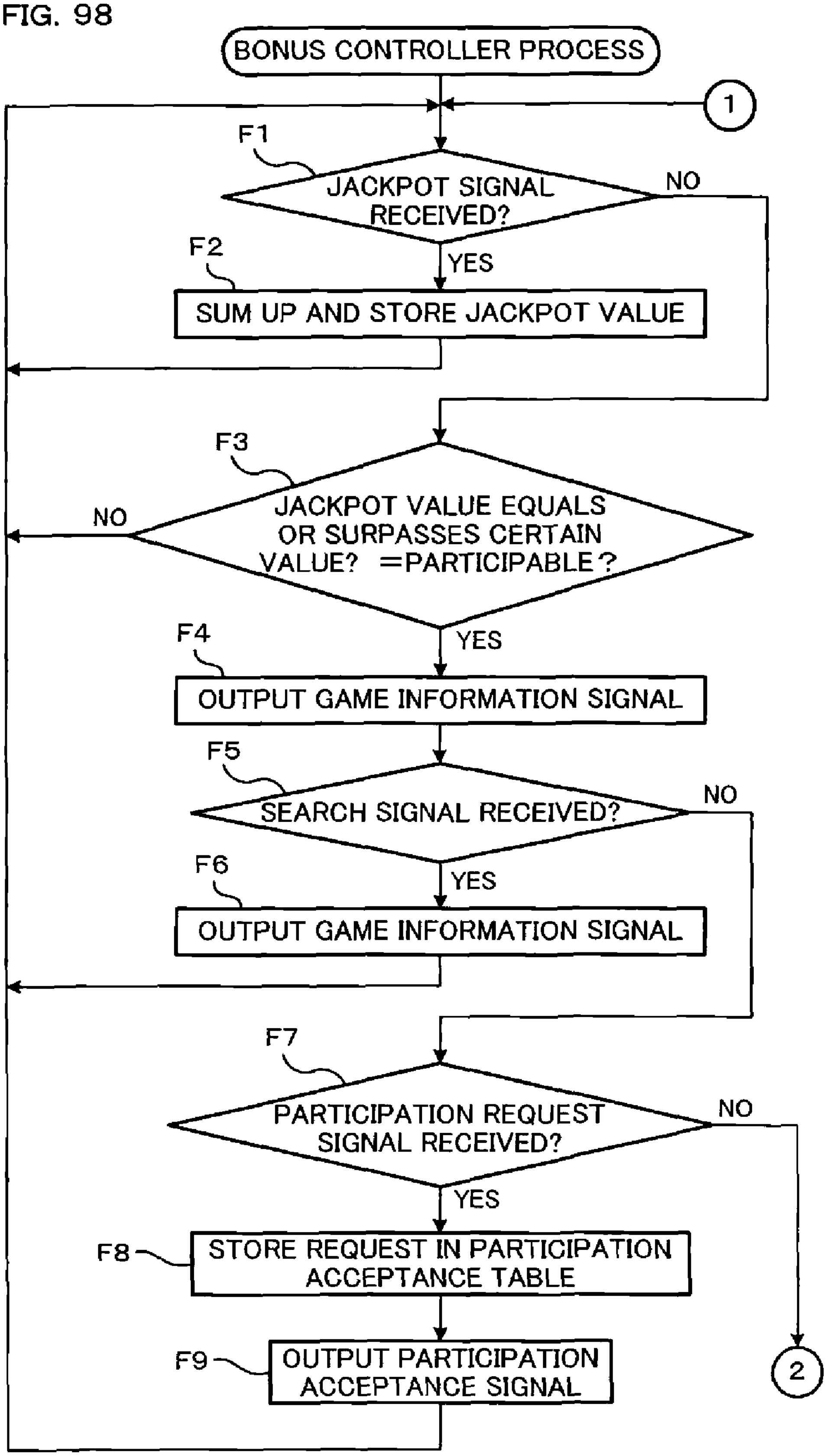
FIG. 98 is a flowchart illustrating a bonus controller process routine executed in the bonus controller.
Figure 99:
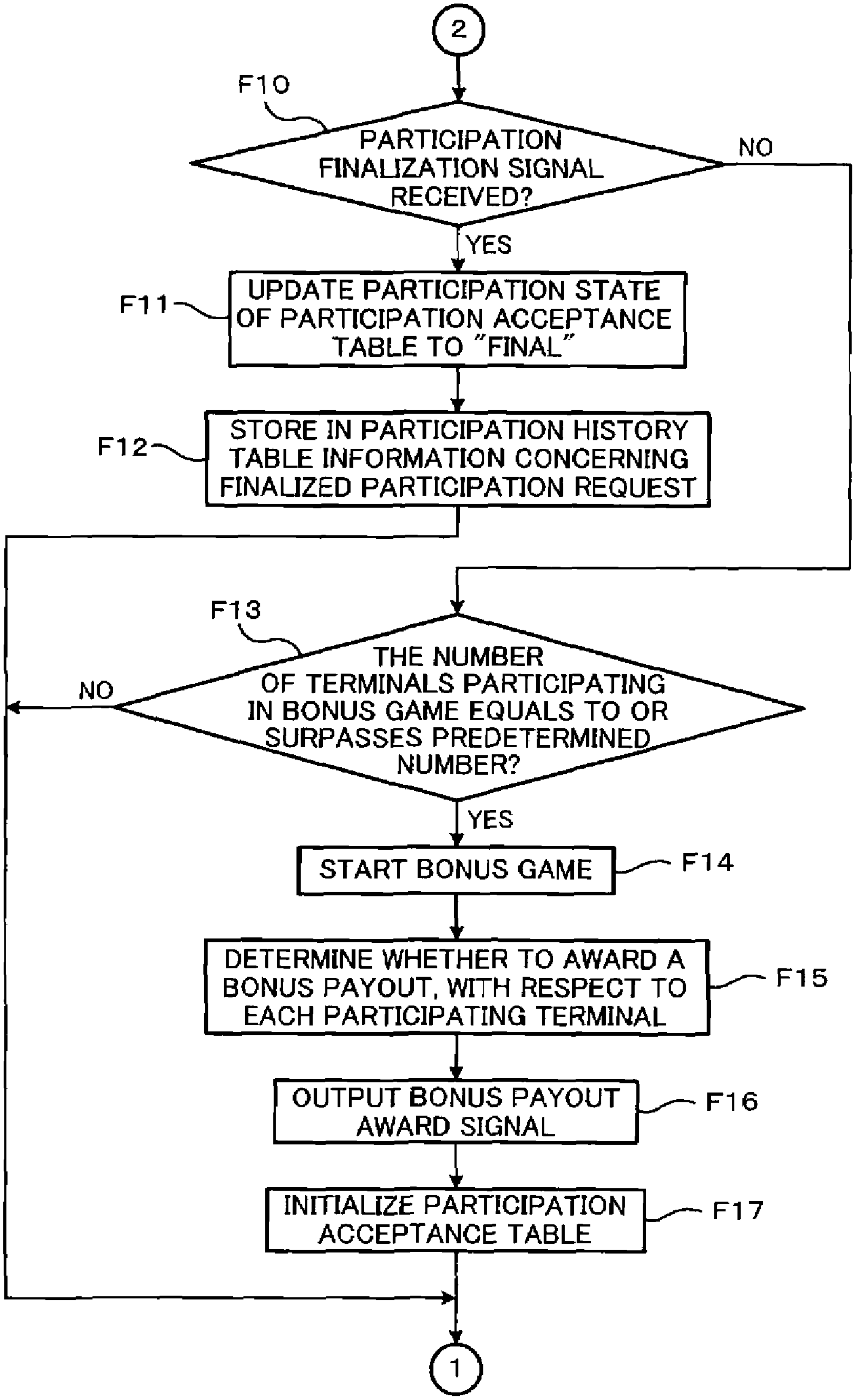
FIG. 99 is a flowchart illustrating a bonus controller process routine executed in the bonus controller.

After the center side initial setting routine of FIG. 94, the main CPU 241 of the bonus controller 200 executes a bonus controller process routine of FIG. 98 and FIG. 99. The main CPU 241 performs the bonus controller process routine to run a bonus game.

As illustrated in FIG. 98 and FIG. 99, in the bonus controller process routine, the main CPU 241 determines whether a jackpot signal is received from a terminal 10 (F1). If it is determined that a jackpot signal is received (F1:YES), the game value indicated by the jackpot signal is stored cumulatively (F2). The process then returns to F1.

On the other hand in F1, if the main CPU 241 determines no jackpot signal is received (F1: NO), the main CPU 241 determines if the jackpot value equals or surpasses a predetermined value (F3). If it is determined that the jackpot does not equal or surpass a predetermined value, i.e., the terminal is not allowed to participate in a bonus game (F3:NO), the main CPU 241 repeats the process of F1. On the other hand, if it is determined that the jackpot equals or surpasses a predetermined value, i.e., the terminal is allowed to participate in a bonus game (F3:YES), the main CPU 241 outputs a bonus game notification signal to each terminal 10 (F4). Note that, the bonus game is set such that the terminals are allowed to participate in the bonus game when the jackpot equals or surpasses a predetermined value.

Then, the main CPU 241 determines whether a search signal is received from the terminal 10 (F5). If it is determined that the search signals is received (F5:YES), the main CPU 241 outputs a game information signal, indicative of a participable bonus game (F6), and repeats the process of F1. On the other hand, if it is determined that the search signal is not received (F5:NO), the main CPU 241 determines whether a participation request signal is received from the terminal 10 (F7). If it is determined that the participation request signal is received (F7:YES), the main CPU 241 causes the participation acceptance table in the RAM 243 to store the participation request of the terminal for the bonus game indicated by the participation request signal (F8), and outputs a participation acceptance signal (F9). The main CPU 241 then repeats the process of F1.

On the other hand, if it is determined in F7 that the participation request signal is not received (F7:NO), the main CPU 241 determines whether the participation finalization signal is received from the terminal 10 (F10). If it is determined that the participation finalization signal is received (F10:YES), the main CPU 241 updates the participation state of the participation acceptance table to "Final", and stores the participation acceptance table, based on the participation request indicated by the participation finalization signal received (F11). The information concerning the finalized participation request is stored in the participation history table (F12), and the process returns to F1.

On the other hand, if it is determined in F10 that the participation finalization signal is not received (F10:NO), the main CPU 241 determines whether the number of terminals participating in the bonus game equals to or surpasses a predetermined number (F13). This determination is performed based on whether the number of participation requests finalized in a given bonus game equals to or surpasses a predetermined number in the participation acceptance table. If it is determined that the number of terminals participating in the bonus game does not equal to or surpass a predetermined number (F13:NO), the main CPU 241 repeats the process of F1. On the other hand, if it is determined that the number of terminals participating in the bonus game equals to or surpasses a predetermined number (F13:YES), the main CPU 241 starts the bonus game (F14), determines whether to award a bonus payout, with respect to each terminal participating in the bonus game (F15), outputs a bonus payout award signal, indicative of whether to award or not award the bonus payout, to the terminals 10 participating in the bonus game (F16), initializes the participation acceptance table (F17), and repeats the process of F1.

As described above, the bonus controllers 200 simultaneously run multiplayer bonus games. Since a bonus game can be participated by placing a participation bet on a participable bonus game through the participation bet input unit 104, a gaming system can be provided that enables one terminal 10 to simultaneously participate in more than one bonus game. Further, since the entry of participation bet is finalized upon receipt of a notification of acceptance of the participation request from all of the bonus controllers 200 to which the request was made, there will be no trouble, such as not being able to participate in a bonus game despite spending the participation bet, which may occur when there is a network 300 error or other failures in bonus games simultaneously participated by one terminal 10. Further, when a notification of acceptance of the participation request is not received from all of the bonus controllers 200 to which the request was made, the entry of participation bet and the participation request are cancelled. In this way, the participation request will be cancelled in all of the bonus games to which the request was made, when any of the bonus games is not available for participation. This makes the procedure more predictable because the player knows that the participation-requested bonus games are all treated equally.

Further, since whether a notification of acceptance of the participation request is received is determined before the decision is made on win or lose of a base game, whether to participate in a bonus game is finalized before the base game ends. Because there is no interference to the next base game, the player can play games without any interference.

As described, when a bonus game becomes available to the terminals 10, the terminal display 101 of each terminal 10 displays information (availability information image 122) concerning availability of the participable bonus game to have the participation bet input unit 104 receive a participation bet, facilitating a player to participate in the bonus game. Further, as described, the process of deducting the participation bet from the credit can be performed by the terminal controller alone.

The foregoing described the Embodiment 5 of the present invention. The present invention, however, is not limited to the embodiment described above.

Embodiment 6

The following will describe a gaming system and a playing method thereof according to an Embodiment 6 of the present invention. In the description below, no further explanation will be made for the configurations already described in the Embodiment 5, and like elements are given the same reference numerals.

Figure 100:
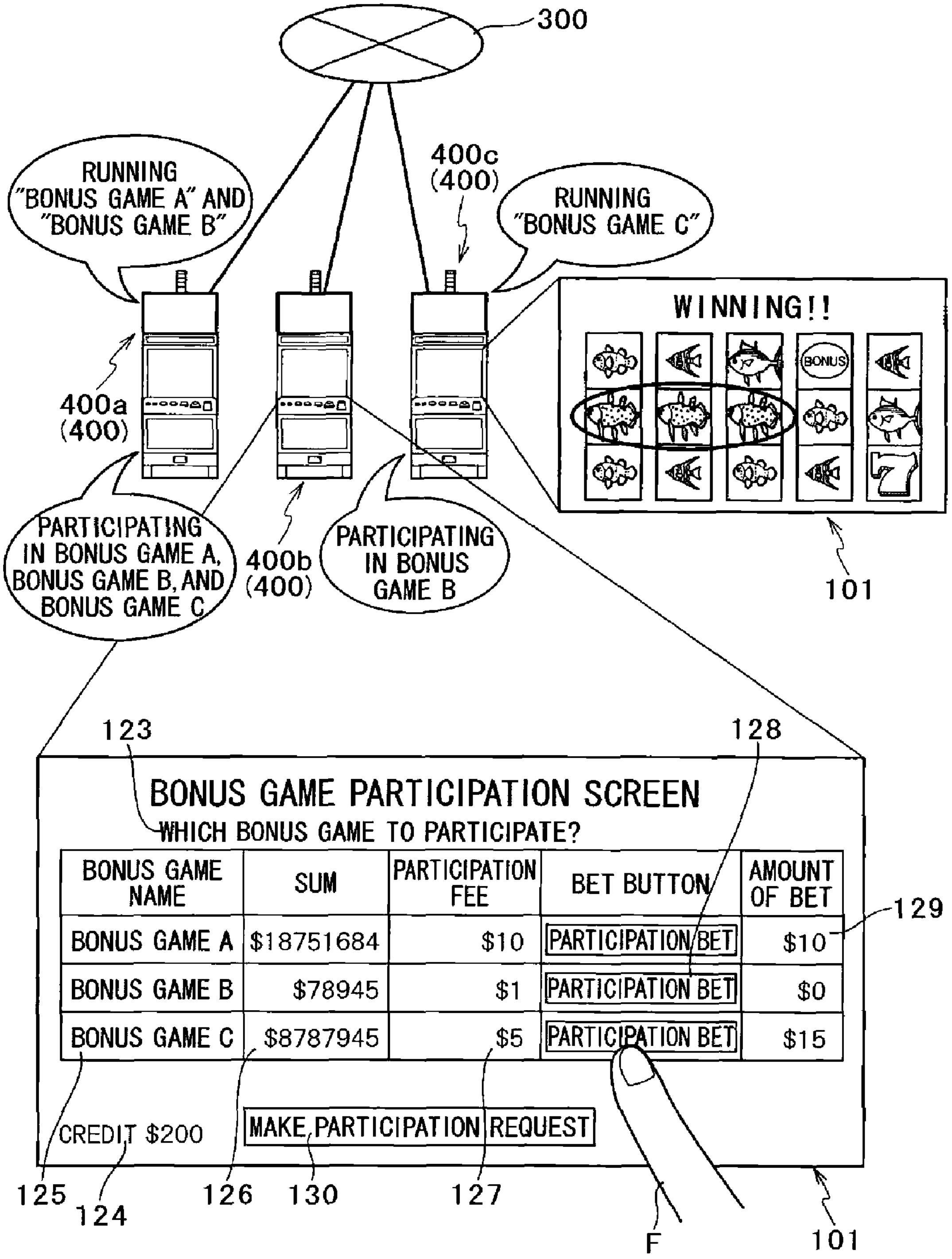
FIG. 100 is a schematic diagram illustrating a gaming system and a playing method thereof, according to an Embodiment 6 of the present invention.
Figure 101:
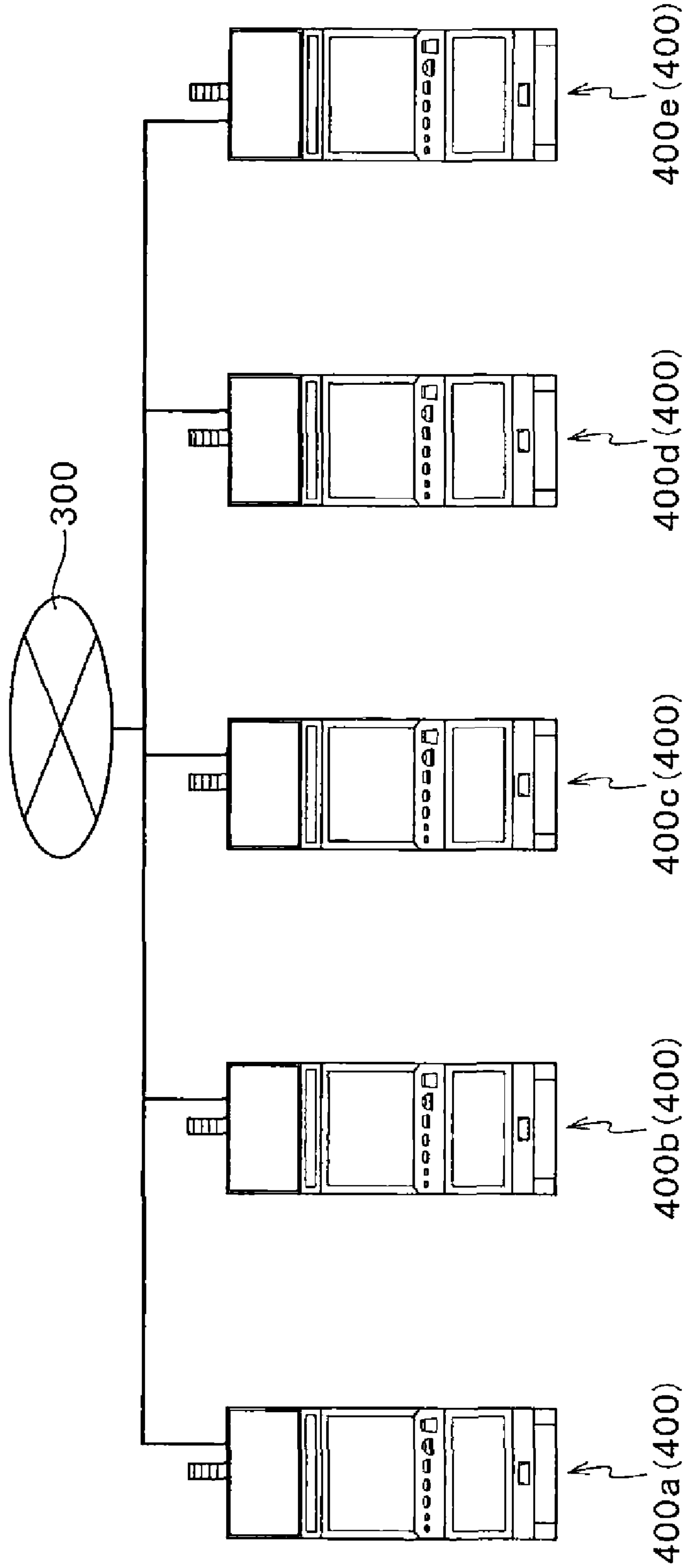
FIG. 101 is a diagram illustrating a mechanical structure of the gaming system, according to the Embodiment 6 of the present invention.

As shown in FIG. 100 and FIG. 101, the gaming system includes terminals 400, and a network 300 connecting the terminals 400 to one another to enable communications therebetween. That is, the gaming system differs from its counterpart in the Embodiment 5 in that the bonus controller 200, a physical unit, is not provided, and that each terminal 400 also serves as the bonus controller.

Figure 102:
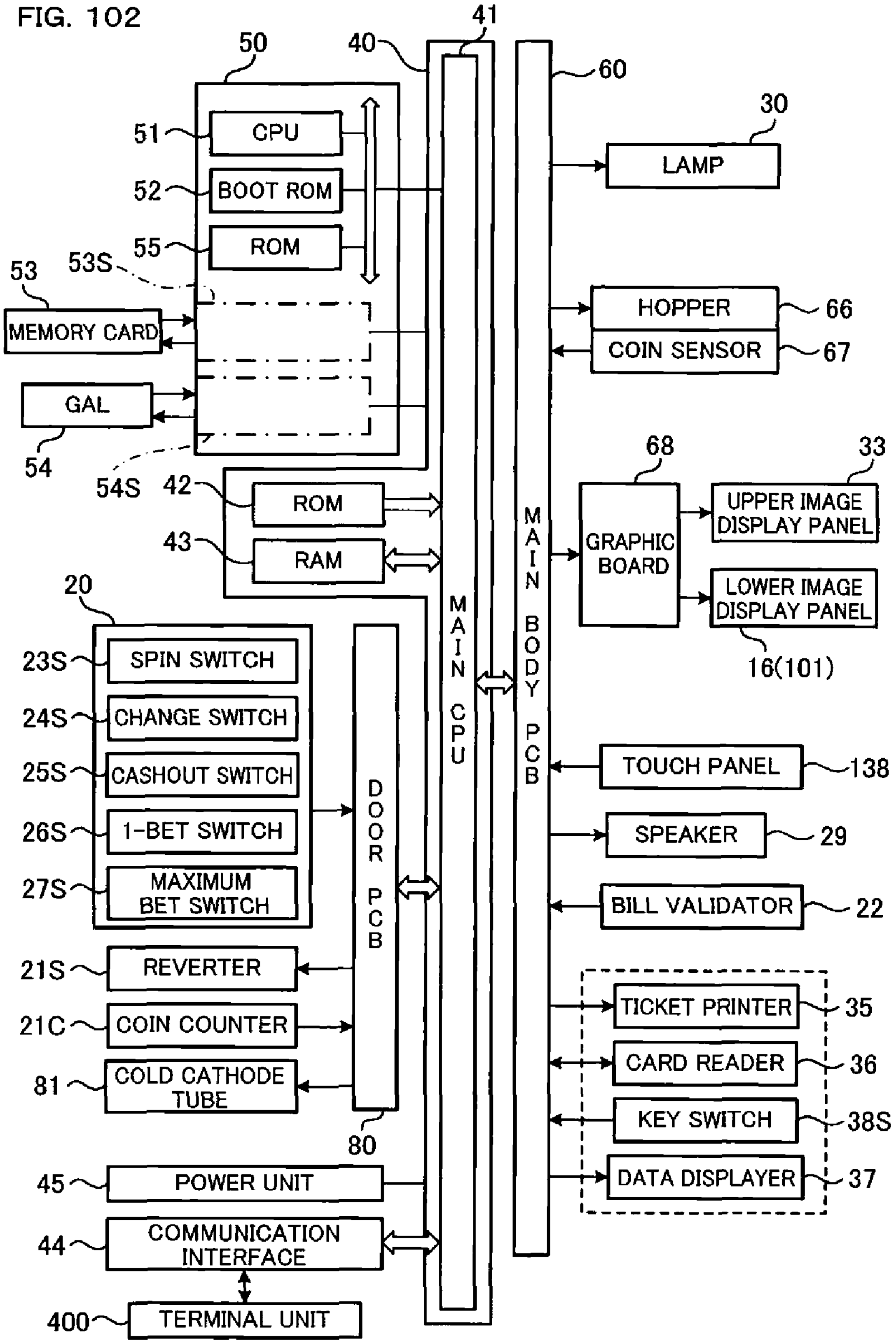
FIG. 102 is a diagram illustrating an electrical structure of a terminal of the gaming system, according to the Embodiment 6 of the present invention.

An electrical structure of the terminal 400 is described with reference to FIG. 102. The terminal 400 of the Embodiment 6 differs from the terminal 10 of the Embodiment 5 in that the payout memory 250 is connected to the main body PCB 60. In this way, in the terminal 400, a bonus payout corresponding in amount to a participation bet can be accumulatively stored in the payout memory 250, and the terminal 400 serves as a bonus controller as the main CPU 41 executes the bonus controller process routine described in the Embodiment 5.

(Operation of Terminal 400: Bonus Data Transfer Process Routine)

Figure 103:
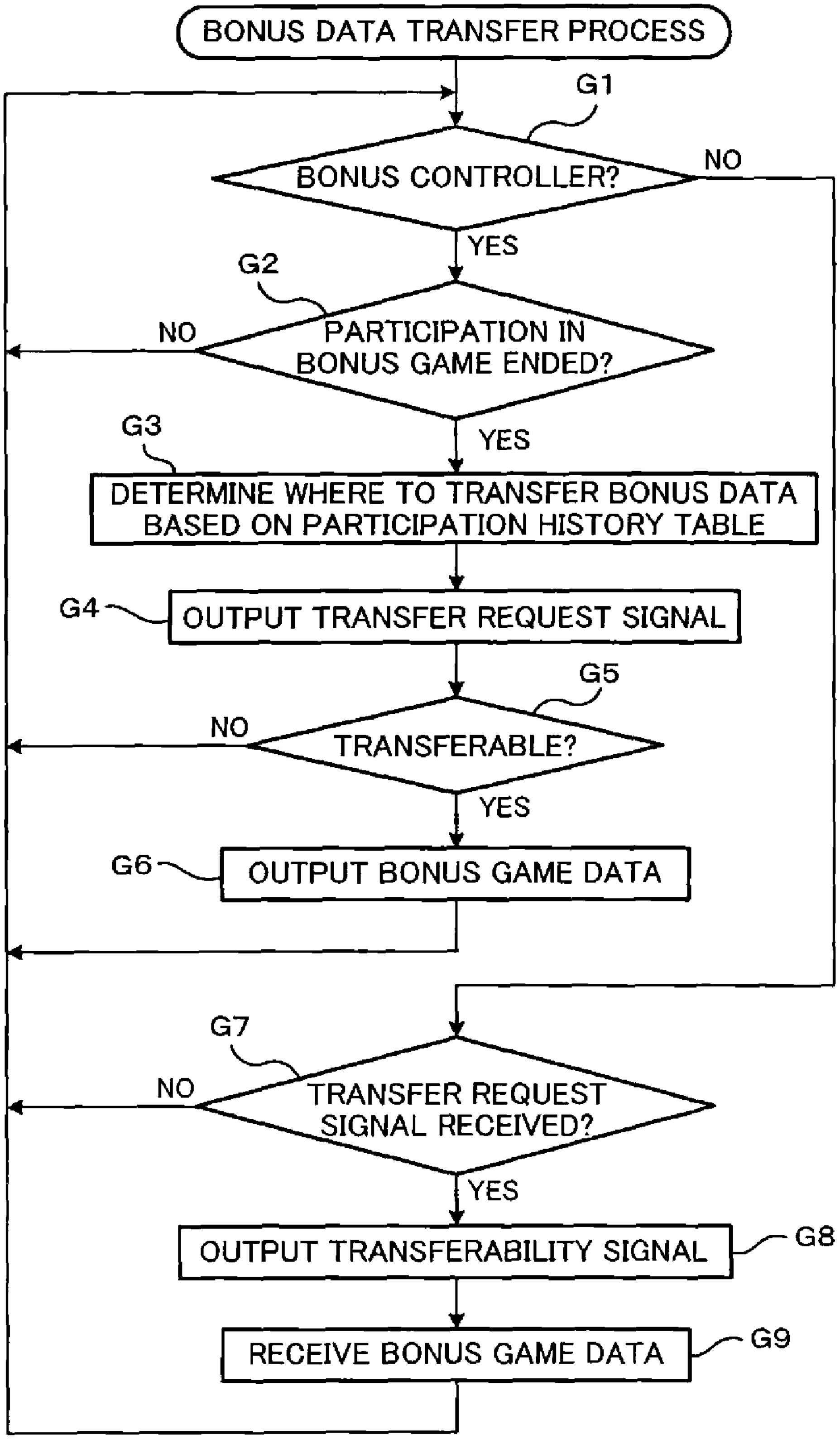
FIG. 103 is a flowchart illustrating a bonus data transfer process routine executed in the terminal of the gaming system, according to the Embodiment 6 of the present invention.

The main CPU 41 of the terminal 400, upon finishing the terminal side initial setting routine shown in FIG. 94, executes the bonus game participation process routine shown in FIG. 96 and the bonus data transfer process routine shown in FIG. 103, along with the terminal process routine. The main CPU 41 performs the bonus controller process routine to run a bonus game.

As the main CPU 41 executes the bonus data transfer process routine, the gaming system can be operated by the terminal 400 alone, without using a unit designated as a bonus controller. That is, when the terminal 400 operating as a bonus controller loses its functionality as a bonus controller, another terminal 400 with the function of a bonus controller needs to take over the process of the bonus controller. This takeover is possible by the execution of the bonus data transfer process routine. Generally, the terminal 400 "losing its functionality as a bonus controller" means that the participation of the terminal 400 in a bonus game is terminated by a player's manipulation, for example.

As shown in FIG. 103, in the bonus data transfer process routine, the main CPU 41 determines whether the main CPU 41 is executing the bonus controller process routine (G1). When it is determined that the bonus controller process routine is being executed (G1: YES), the main CPU 41 determines whether participation in the bonus game has ended (G2). When it is determined that the participation in the bonus game has not yet ended (G2: No), the process returns to G1. On the other hand, when it is determined that participation in the bonus game has ended (G2: YES), the main CPU 41 determines where to transfer the bonus data, based on the participation history table (G3). Specifically, the CPU 41 determines as the destination, a terminal 400 whose sum of participation bet stored in the participation history table is larger than those of the other terminals 400. Next, the main CPU 41 outputs a transfer request signal requesting transfer of bonus data to the terminal 400 set as the destination (G4). Next, the main CPU 41 receives a transferability signal in reply to the transfer request signal, and determines whether the transferability signal indicates transfer of bonus data is possible (G5). When it is determined that transfer of bonus data is not possible (G5:NO), the process returns to G1. On the other hand, when it is determined that transfer of bonus data is possible (G5: YES), the main CPU 41 transmits to the terminal 400 set as the destination the bonus data, then ends the bonus controller process routine (G6). The process then returns to G1.

In G1, when it is determined that the bonus controller process routine is not executed (G1: NO), the main CPU 41 determines whether a transfer request signal is received from other terminals 400 (G7). When it is determined that no transfer request signal is received (G7: NO), the process returns to G1. On the other hand, when it is determined that a transfer request signal is received (G7: YES), a transferability signal is transmitted in reply to the transfer request signal, to indicate whether the requested transfer is possible in consideration of the burden on the CPU 41 in processing (G8), and the bonus data is received (G9). The process then returns to G1.

With the structure, the bonus controllers simultaneously run multiplayer bonus games. Since a bonus game can be participated by placing a participation bet on at least one participable bonus game through the participation bet input unit, a gaming system can be provided that enables one terminal to simultaneously participate in more than one bonus game. Further, the entry of participation bet is finalized upon receipt of a notification of acceptance of the request from all of the bonus controllers to which the request was made. In this way, there will be no trouble, such as not being able to participate in a bonus game despite spending the participation bet, which may occur when there is a network error or other failures in bonus games simultaneously participated by one terminal. Further, when a notification of acceptance of the participation request is not received from all of the bonus controllers to which the request was made, the entry of participation bet and the participation request are cancelled. In this way, the participation request will be cancelled in all of the bonus games to which the request was made, when any of the bonus games is not available for participation. This makes the procedure more predictable because the player knows that the participation-requested bonus games are all treated equally. Further, a need for a device exclusively used as a bonus controller is eliminated, because the bonus controller runs the bonus game after transferring the data related to the bonus game to a terminal, based on the history of the participation bet.

With the structure, a terminal to which data related to bonus game is transferred is determined, in the descending order of amounts of the summed bet value on the bonus game. A player having placed a large amount of bet on a bonus game more likely continues the bonus game to win a bonus payout from the bonus game. Therefore, a terminal with a large summed bet value on the base game less likely stop participating in the bonus game. It is therefore more appropriate to transfer the data related to the bonus game to such a terminal. This reduces the number of times the data related to the bonus game is transferred.

The foregoing described the Embodiment 6 of the present invention. The present invention, however, is not limited to the embodiment described above.

Embodiment 7

The following will describe a gaming system and a playing method thereof according to an Embodiment 7 of the present invention. In the description below, no further explanation will be made for the configurations already described in the Embodiment 5, and like elements are given the same reference numerals.

Figure 104:
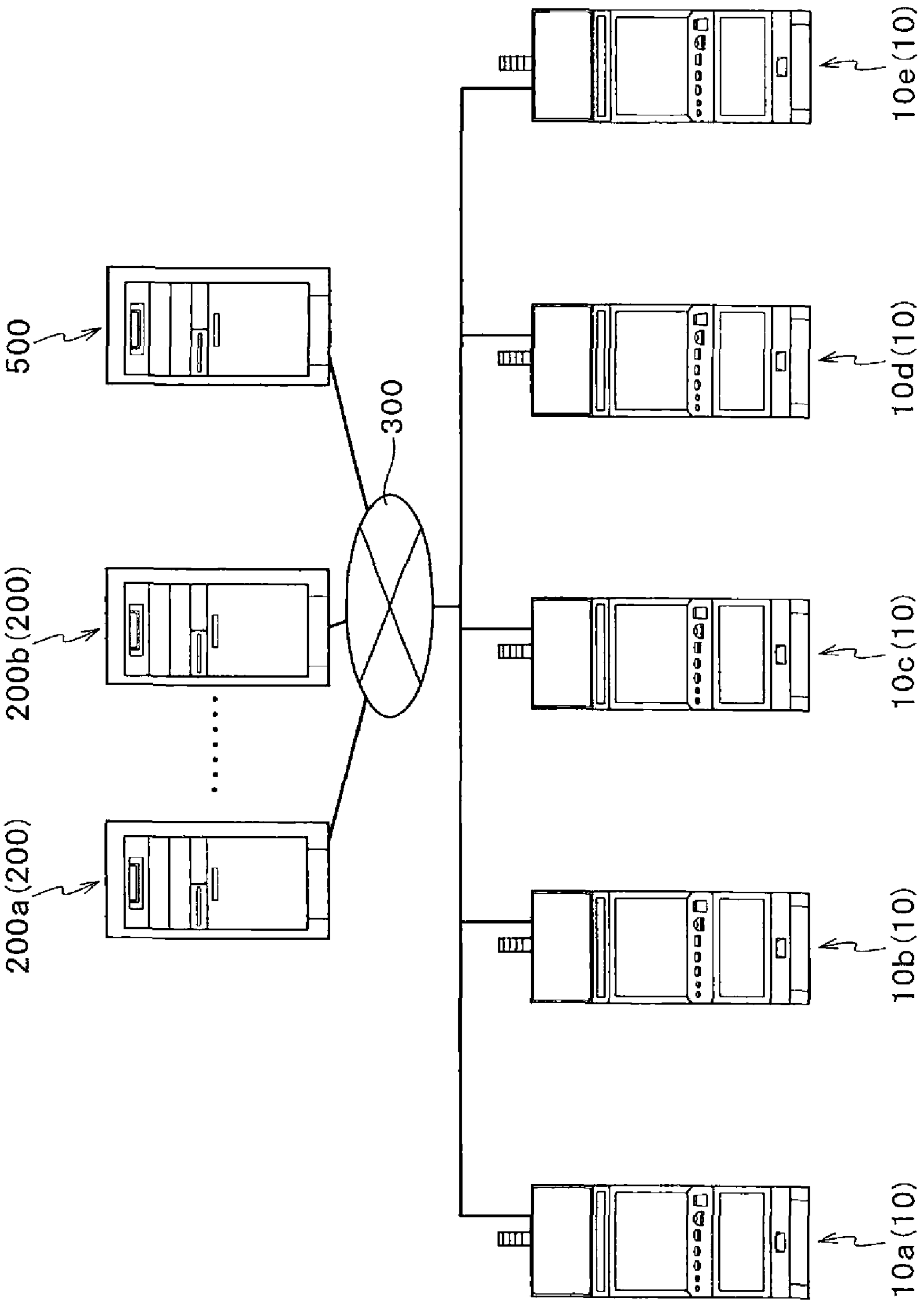
FIG. 104 is a diagram illustrating a mechanical structure of a gaming system, according to an Embodiment 7 of the present invention.

As shown in FIG. 104, the gaming system includes terminals 10, bonus controllers 200, a master controller 500, and a network 300 connecting the terminals 10 and the bonus controllers 200 with each other to enable communications therebetween. That is, the gaming system differs from its counterpart in the Embodiment 5 in that the master controller 500 is provided.

The electrical structure of the master controller 500 is the same as that of the bonus controller 200, and the entire operation of the gaming system is described with reference to FIG. 105.

Figure 105:
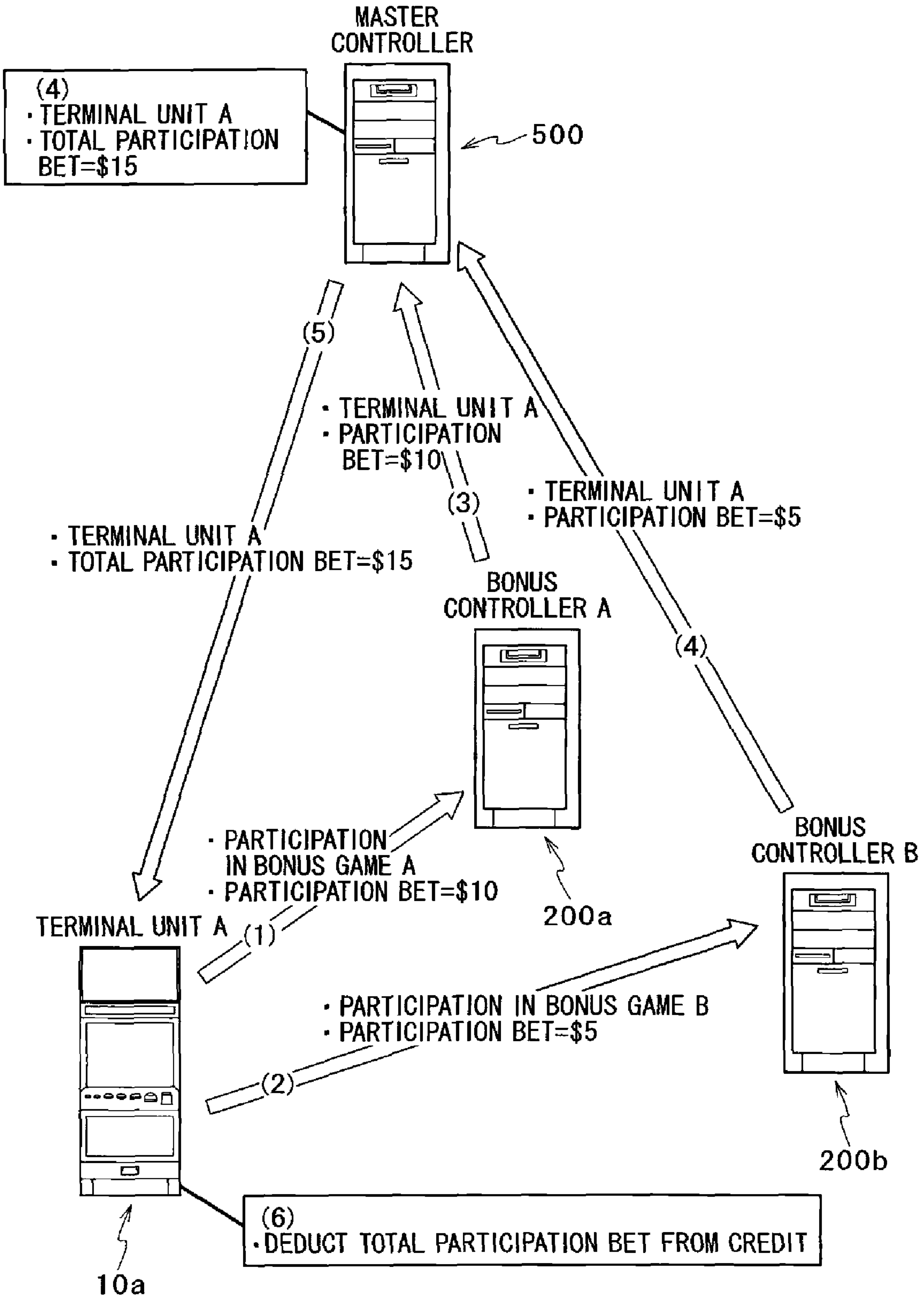
FIG. 105 is an explanatory diagram illustrating the entire operation of the gaming system, according to the Embodiment 7 of the present invention.

First, "Terminal A" which is a terminal 10*a* notifies a "Bonus Controller" A which is a bonus controller 200*a* that a participation request to a Bonus game A is finalized, and that the participation bet therefor is $10 (step (1) of FIG. 105). Note that "Bonus Controller A" is a bonus controller that runs the bonus game A. Further, "Terminal A" notifies a "Bonus Controller B" which is a bonus controller 200*b* that a participation request to a Bonus Game B is finalized, and that the participation bet therefor is $5 (step (2) of FIG. 105). Note that "Bonus Controller B" is a bonus controller that runs the bonus game B.

Then, "Bonus Controller A" notifies the master controller 500 that a participation bet of $10 is placed in "Terminal A" (step (3) of FIG. 105). "Bonus Controller B" notifies the master controller 500 that a participation bet of $5 is bet in "Terminal A" (step (4) of FIG. 105).

The master controller 500 having received the notifications from the bonus controllers 200 sums up the amount of participation bets of "Terminal A", so that the total participation bet is $15 (step (5) of FIG. 105). After the calculation, the master controller 500 notifies the "Terminal A" that the total participation bet is $15 and instructs the "Terminal A" to deduct the amount from the credit. The "Terminal A" then performs a deduction process (step (6) of FIG. 105).

With the above structure, the process of deducting the participation bet from the credit is centralized in the master controller.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer or computer network. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes performed in the steps or blocks, these processes are essentially executed by various devices. Further, the other structures necessary for the steps or blocks are obvious from the above descriptions.

What is claimed is:

1. A gaming system, comprising:

random number sampling device which samples a random number from a predetermined range of random numbers;

an input device which starts a base game awarding a base game payout according to a given winning;

a data storage device storing special game condition data which defines, within a given value range, a plurality of sub ranges respectively allotted to special game conditions or "No Special Game" meaning no special game is run, each of the special game conditions corresponding to a numerical value range and being associated with an average payout different from those associated with the other special game conditions; and, a controller programmed to perform the processes of:

(a1) sampling the random number based on an input from the input device;

(a2) running the base game using the random number, and awarding the base game payout according to a resulted winning;

(a3) upon obtaining an arrangement of special symbols for triggering a special game in the base game, selecting one of the sub ranges allotted to one of the special game conditions or "No Special Game" based on the random number used in the base game and the special game condition data stored in the storage device, the selected sub range including the random number; and (a4) when a sub range allotted to any of the special game conditions is selected, running a special game under that special game condition and awarding a special game payout when a winning is achieved.

2. The gaming system according to claim 1, wherein the sub ranges allotted to the special game conditions in the special game condition data are variable according to an amount of bet placed by a player.

3. The gaming system according to claim 1, wherein the controller is programmed to perform the process of:

accumulating a percentage of a betted game value in each base game executed at each of the terminal devices, and upon obtaining an arrangement of special symbols corresponding to a jackpot at a terminal device, awarding the accumulated betted game value to the terminal device.

4. A gaming system, comprising:

a plurality of gaming terminals; and, a central server communicatively connected to each of the gaming terminals; wherein each of the gaming terminals includes:

a display for arranging/rearranging game symbols;

an input device for starting a base game in which a base game payout amount is awarded according to a combination of arranged/rearranged game symbols;

a random number sampling device, which samples a random number from a predetermined range of random numbers upon start of the base game; and, a winning determination unit, which determines whether a combination of arranged/rearranged game symbols in the base game constitutes a winning combination or special combination of game symbols, and which transmits the random number to the central server upon satisfaction of a predetermined combination of symbols; and wherein, the central server includes:

a data storage device storing special game condition data defining a plurality of special game sub-ranges, including a "No Special Game" game sub-range wherein a special game is not operated, each of the special game sub-ranges corresponding to a numerical value range associated with an average payout, which differs according to sub-range; and, a sub-range selecting unit, which selects one of the special game sub-ranges or the "No Special Game" sub-range, based on the random number used in the base game and the stored special game condition data; and wherein, upon determining that an arrangement/rearrangement of symbols at the gaming terminal corresponds to the special combination of game symbols, transmitting the random number from the gaming terminal to the central server and selecting one of the special game sub-ranges or the "No Special Game" sub-range based on the random number and the special game condition data stored in the storage device of the central server, the selected sub range including the random number; and based on the special game sub-range selected by the central server, running a special game at the gaming terminal according to the selected sub-range, and awarding a special game payout when a winning is achieved.

5. The gaming system according to claim 4, wherein the numerical value range of each sub-range is variable according to an amount of bet placed by a player.

6. The gaming system of claim 4, wherein a percentage of a betted game value in each base game executed at each of the terminal devices is accumulated by the central server, and upon determining that an arrangement/rearrangement of symbols at a gaming terminal corresponds to a jackpot, transmitting a signal to the central server so as to cause the central server to award the accumulated betted game value to the gaming terminal obtaining the jackpot.

* * * * *